(12) United States Patent  (10) Patent No.: US 8,126,938 B2
Cohen et al.  (45) Date of Patent: *Feb. 28, 2012

(54) GROUP CONTENT SUBSTITUTION IN MEDIA WORKS

(75) Inventors: Alexander J. Cohen, Mill Valley, CA (US); Edward K. Y. Jung, Bellevue, WA (US); Royce A. Levien, Lexington, MA (US); Robert W. Lord, Seattle, WA (US); William H. Mangione-Smith, Kirkland, WA (US); Mark A. Malamud, Seattle, WA (US); John D. Rinaldo, Jr., Bellevue, WA (US); Clarence T. Tegreene, Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 231 days.

This patent is subject to a terminal disclaimer.

(21) Appl. No.: 11/807,352

(22) Filed: May 25, 2007

(65) Prior Publication Data

US 2007/0299877 A1  Dec. 27, 2007

Related U.S. Application Data

(63) Continuation-in-part of application No. 11/807,350, filed on May 25, 2007, which is a continuation-in-part of application No. 11/807,353, filed on May 25, 2007, and a continuation-in-part of application No. 11/796,543, filed on Apr. 27, 2007, and a continuation-in-part of application No. 11/796,570, filed on Apr. 26, 2007, and a continuation-in-part of application No. 11/731,795, filed on Mar. 30, 2007, and a continuation-in-part of application No. 11/731,738, filed on Mar. 30, 2007, and a continuation-in-part of application No. 11/195,358, filed on Aug. 2, 2005, now Pat. No. 7,860,342, and a continuation-in-part of application No. 11/195,346, filed on Aug. 2, 2005, now abandoned, and a continuation-in-part of application No. 11/173,990, filed on Jul. 1, 2005, and a continuation-in-part of application No. 11/174,432, filed on Jul. 1, 2005.

(51) Int. Cl.
*G06F 7/00* (2006.01)
*G06F 17/30* (2006.01)
(52) U.S. Cl. .................................................. 707/806
(58) Field of Classification Search ............... 707/1–10, 707/100–104.1, 200–206, 600–831
See application file for complete search history.

(56) References Cited

U.S. PATENT DOCUMENTS 3,713,148 A  1/1973  Cardullo et al.
(Continued)

FOREIGN PATENT DOCUMENTS

JP  2005-005960 A  1/2005
(Continued)

OTHER PUBLICATIONS

Eitetsu Oomoto et al., OVID: Design and Implementations of a Video-Object Database System, 1993, IEEEE, 629-643.*

(Continued)

*Primary Examiner* — Jean B Fleurantin

(57) ABSTRACT

A classification method and system for possible content alteration of a media work may include criteria regarding content that is feasible for alteration. Such criteria may be maintained in records that are accessible to an interested party. Some embodiments may include a record of primary authorization rights applicable to a possible content alteration. A further embodiment feature may include a record of secondary authorization rights applicable to substitute altered content incorporated in a derivative version. Various techniques may be used to incorporate substitute altered content in a derivative version of the media work in accordance with applicable substitution guidelines.

39 Claims, 75 Drawing Sheets

U.S. PATENT DOCUMENTS

| | | | |
|---|---|---|---|
| 4,467,349 A | 8/1984 | Maloomian | |
| 4,872,056 A | 10/1989 | Hicks et al. | |
| 5,029,014 A | 7/1991 | Lindstrom | |
| 5,060,171 A | 10/1991 | Steir et al. | |
| 5,343,386 A | 8/1994 | Barber | |
| 5,345,313 A | 9/1994 | Blank | |
| 5,428,732 A | 6/1995 | Hancock et al. | |
| 5,469,536 A | 11/1995 | Blank | |
| 5,481,664 A | 1/1996 | Hiroya et al. | |
| 5,623,587 A | 4/1997 | Bulman | |
| 5,629,736 A | 5/1997 | Haskell et al. | |
| 5,682,326 A | 10/1997 | Klingler et al. | |
| 5,708,709 A | 1/1998 | Rose | |
| 5,748,956 A | 5/1998 | Lafer et al. | |
| 5,828,402 A | 10/1998 | Collings | |
| 5,859,662 A | 1/1999 | Cragun et al. | |
| 5,892,900 A | 4/1999 | Ginter et al. | |
| 6,067,399 A | 5/2000 | Berger | |
| 6,181,336 B1 | 1/2001 | Chiu et al. | |
| 6,253,193 B1 | 6/2001 | Ginter et al. | |
| 6,297,853 B1* | 10/2001 | Sharir et al. | |
| 6,363,488 B1 | 3/2002 | Ginter et al. | |
| 6,385,592 B1 | 5/2002 | Angles et al. | |
| 6,389,402 B1 | 5/2002 | Ginter et al. | |
| 6,394,356 B1 | 5/2002 | Zagami | |
| 6,400,374 B2 | 6/2002 | Lanier | |
| 6,427,140 B1 | 7/2002 | Ginter et al. | |
| 6,493,744 B1 | 12/2002 | Emens et al. | |
| 6,505,169 B1 | 1/2003 | Bhagavath et al. | |
| 6,574,793 B1 | 6/2003 | Ngo et al. | |
| 6,654,814 B1 | 11/2003 | Britton et al. | |
| 6,675,387 B1 | 1/2004 | Boucher et al. | |
| 6,704,930 B1 | 3/2004 | Eldering et al. | |
| 6,719,565 B1 | 4/2004 | Saita et al. | |
| 6,745,226 B1* | 6/2004 | Guedalia | 709/203 |
| 6,775,381 B1 | 8/2004 | Nelson et al. | |
| 6,779,117 B1 | 8/2004 | Wells | |
| 6,801,642 B2 | 10/2004 | Gorday et al. | |
| 6,816,628 B1 | 11/2004 | Sarachik et al. | |
| 6,829,368 B2 | 12/2004 | Meyer et al. | |
| 6,829,780 B2 | 12/2004 | Kraft et al. | |
| 6,903,756 B1 | 6/2005 | Giannini | |
| 6,912,571 B1 | 6/2005 | Serena | |
| 6,937,730 B1 | 8/2005 | Buxton | |
| 6,959,099 B2 | 10/2005 | Gutta et al. | |
| 6,970,602 B1 | 11/2005 | Smith et al. | |
| 6,973,130 B1 | 12/2005 | Wee et al. | |
| 7,032,014 B2 | 4/2006 | Thiyagarajan et al. | |
| 7,092,568 B2 | 8/2006 | Eaton | |
| 7,120,250 B2 | 10/2006 | Candelore | |
| 7,133,845 B1 | 11/2006 | Ginter et al. | |
| 7,162,690 B2 | 1/2007 | Gupta et al. | |
| 7,181,758 B1 | 2/2007 | Chan | |
| 7,212,650 B2 | 5/2007 | Sumi | |
| 7,251,048 B2 | 7/2007 | Cheatle et al. | |
| 7,290,285 B2 | 10/2007 | McCurdy et al. | |
| 7,313,810 B1 | 12/2007 | Bell et al. | |
| 7,333,957 B2 | 2/2008 | Levy et al. | |
| 7,334,017 B2 | 2/2008 | Hawkes et al. | |
| 7,346,585 B1 | 3/2008 | Alabraba et al. | |
| 7,391,432 B2 | 6/2008 | Terada | |
| 7,406,434 B1 | 7/2008 | Chang et al. | |
| 7,456,871 B2 | 11/2008 | Iida et al. | |
| 7,571,385 B2 | 8/2009 | Miller et al. | |
| 7,668,242 B2 | 2/2010 | Sullivan et al. | |
| 7,668,345 B2 | 2/2010 | Kiyohara et al. | |
| 7,673,013 B2 | 3/2010 | Rudolph et al. | |
| 7,680,819 B1 | 3/2010 | Mellmer et al. | |
| 8,006,186 B2 | 8/2011 | Kellock et al. | |
| 2001/0016820 A1 | 8/2001 | Tanaka et al. | |
| 2001/0023436 A1* | 9/2001 | Srinivasan et al. | |
| 2001/0033661 A1 | 10/2001 | Prokoski | |
| 2001/0033671 A1 | 10/2001 | Kearey | |
| 2001/0033674 A1 | 10/2001 | Chen et al. | |
| 2001/0041050 A1 | 11/2001 | Iwata et al. | |
| 2001/0044781 A1 | 11/2001 | Shutes | |
| 2002/0010757 A1 | 1/2002 | Granik et al. | |
| 2002/0081003 A1 | 6/2002 | Sobol | |
| 2002/0144262 A1 | 10/2002 | Plotnick et al. | |
| 2002/0146123 A1 | 10/2002 | Tian | |
| 2002/0146238 A1* | 10/2002 | Sugahara | |
| 2002/0178077 A1 | 11/2002 | Katz et al. | |
| 2002/0194595 A1 | 12/2002 | Miller et al. | |
| 2002/0198909 A1 | 12/2002 | Huynh et al. | |
| 2002/0199189 A1 | 12/2002 | Prijatel et al. | |
| 2003/0007700 A1 | 1/2003 | Gutta et al. | |
| 2003/0028432 A1 | 2/2003 | Troyansky et al. | |
| 2003/0028543 A1 | 2/2003 | Dusberger | |
| 2003/0028873 A1 | 2/2003 | Lemmons | |
| 2003/0033202 A1* | 2/2003 | Ogawa et al. | |
| 2003/0058939 A1 | 3/2003 | Lee et al. | |
| 2003/0076321 A1 | 4/2003 | Clavadetscher | |
| 2003/0123701 A1 | 7/2003 | Dorrell et al. | |
| 2003/0128343 A1 | 7/2003 | Crasnianski et al. | |
| 2003/0135464 A1 | 7/2003 | Mourad et al. | |
| 2003/0145323 A1* | 7/2003 | Hendricks et al. | |
| 2003/0156134 A1* | 8/2003 | Kim | |
| 2003/0174837 A1 | 9/2003 | Candelore et al. | |
| 2003/0196164 A1 | 10/2003 | Gupta et al. | |
| 2003/0202124 A1 | 10/2003 | Alden | |
| 2003/0208466 A1 | 11/2003 | Stern | |
| 2003/0208469 A1 | 11/2003 | Stern | |
| 2003/0229549 A1 | 12/2003 | Wolinsky et al. | |
| 2003/0233438 A1 | 12/2003 | Hutchinson et al. | |
| 2003/0236886 A1 | 12/2003 | Oren et al. | |
| 2004/0073916 A1 | 4/2004 | Petrovic et al. | |
| 2004/0111467 A1 | 6/2004 | Willis | |
| 2004/0111468 A1 | 6/2004 | Enomoto | |
| 2004/0158858 A1 | 8/2004 | Paxton et al. | |
| 2004/0194128 A1* | 9/2004 | McIntyre et al. | |
| 2004/0202382 A1 | 10/2004 | Pilu | |
| 2004/0205508 A1 | 10/2004 | Wecker et al. | |
| 2004/0218100 A1 | 11/2004 | Staker et al. | |
| 2004/0239681 A1* | 12/2004 | Robotham et al. | 345/581 |
| 2004/0249864 A1 | 12/2004 | Laumen et al. | |
| 2005/0008242 A1 | 1/2005 | Liege et al. | |
| 2005/0028193 A1* | 2/2005 | Candelore et al. | |
| 2005/0028217 A1* | 2/2005 | Marler et al. | |
| 2005/0108754 A1 | 5/2005 | Carhart et al. | |
| 2005/0114214 A1 | 5/2005 | Itoh | |
| 2005/0144635 A1 | 6/2005 | Boortz | |
| 2005/0154636 A1 | 7/2005 | Hildinger et al. | |
| 2005/0161368 A1 | 7/2005 | Gillespie et al. | |
| 2005/0225566 A1 | 10/2005 | Kojo | |
| 2005/0273470 A1 | 12/2005 | Heigold | |
| 2005/0278256 A1 | 12/2005 | Vandewater et al. | |
| 2005/0278731 A1 | 12/2005 | Cameron et al. | |
| 2006/0015904 A1 | 1/2006 | Marcus | |
| 2006/0020962 A1 | 1/2006 | Stark et al. | |
| 2006/0064384 A1 | 3/2006 | Mehrotra et al. | |
| 2006/0069987 A1 | 3/2006 | Jones et al. | |
| 2006/0123246 A1 | 6/2006 | Vantalon et al. | |
| 2006/0125930 A1 | 6/2006 | Mindrum et al. | |
| 2006/0130119 A1 | 6/2006 | Candelore et al. | |
| 2006/0156219 A1 | 7/2006 | Haot et al. | |
| 2006/0161838 A1 | 7/2006 | Nydam et al. | |
| 2006/0171423 A1 | 8/2006 | Helms et al. | |
| 2006/0178997 A1 | 8/2006 | Schneck et al. | |
| 2006/0179403 A1 | 8/2006 | Kirkpatrick | |
| 2006/0212805 A1* | 9/2006 | Allen et al. | 715/520 |
| 2006/0238380 A1 | 10/2006 | Kimchi et al. | |
| 2006/0253330 A1 | 11/2006 | Maggio et al. | |
| 2006/0271980 A1* | 11/2006 | Mankovitz | |
| 2006/0277454 A1 | 12/2006 | Chen | |
| 2006/0282319 A1 | 12/2006 | Maggio | |
| 2007/0006077 A1 | 1/2007 | Grubbs | |
| 2007/0044011 A1 | 2/2007 | Cottrille et al. | |
| 2007/0050718 A1 | 3/2007 | Moore et al. | |
| 2007/0061838 A1 | 3/2007 | Grubbs et al. | |
| 2007/0083571 A1 | 4/2007 | Meller et al. | |
| 2007/0097955 A1 | 5/2007 | Li et al. | |
| 2007/0098267 A1 | 5/2007 | Lee et al. | |
| 2007/0100648 A1 | 5/2007 | Borquez et al. | |
| 2007/0100698 A1 | 5/2007 | Neiman et al. | |
| 2007/0101247 A1 | 5/2007 | Matsuki et al. | |
| 2007/0113184 A1 | 5/2007 | Haot et al. | |
| 2007/0153091 A1 | 7/2007 | Watlington et al. | |

| | | | |
|---|---|---|---|
| 2008/0127298 | A1 | 5/2008 | Reeves et al. |
| 2009/0154806 | A1 | 6/2009 | Chang et al. |
| 2009/0177542 | A1 | 7/2009 | Haberman et al. |
| 2009/0222489 | A1 | 9/2009 | Sudoh et al. |
| 2009/0327848 | A1 | 12/2009 | Glazer et al. |
| 2010/0083077 | A1 | 4/2010 | Paulsen et al. |
| 2010/0192175 | A1 | 7/2010 | Bachet et al. |

FOREIGN PATENT DOCUMENTS

| | | |
|---|---|---|
| KR | 10-2007-1012360 A | 10/2007 |
| WO | WO 2005/078597 A1 | 8/2005 |

OTHER PUBLICATIONS

U.S. Appl. No. 11/173,990, Rinaldo, Jr. et al.
U.S. Appl. No. 11/174,432, Royce A. Levien.
U.S. Appl. No. 11/195,346, Rinaldo, Jr. et al.
U.S. Appl. No. 11/195,358, Levien et al.
U.S. Appl. No. 11/701,167, Jung et al.
U.S. Appl. No. 11/701,524, Jung et al.
U.S. Appl. No. 11/701,527, Jung et al.
U.S. Appl. No. 11/728,729, Jung et al.
U.S. Appl. No. 11/731,738, Cohen et al.
U.S. Appl. No. 11/731,795, Cohen et al.
U.S. Appl. No. 11/796,543, Cohen et al.
U.S. Appl. No. 11/796,570, Cohen et al.
U.S. Appl. No. 11/807,353, Cohen et al.
U.S. Appl. No. 11/807,350, Cohen et al.
U.S. Appl. No. 11/823,473, Cohen et al.
U.S. Appl. No. 11/823,483, Cohen et al.
U.S. Appl. No. 11/824,515, Cohen et al.
U.S. Appl. No. 11/827,106, Cohen et al.
U.S. Appl. No. 11/827,140, Cohen et al.
U.S. Appl. No. 11/827,440, Cohen et al.
U.S. Appl. No. 11/894,026, Cohen et al.
U.S. Appl. No. 11/897,989, Cohen et al.
U.S. Appl. No. 11/903,193, Cohen et al.
U.S. Appl. No. 11/906,988, Cohen et al.
U.S. Appl. No. 12/455,301, Cohen et al.
U.S. Appl. No. 12/384,217, Cohen et al.
U.S. Appl. No. 12/384,213, Cohen et al.
U.S. Appl. No. 12/380,570, Cohen et al.
U.S. Appl. No. 12/322,605, Cohen et al.
U.S. Appl. No. 12/322,372, Cohen et al.
"BA cuts Branson from Bond movie"; BBC News; bearing a date of Apr. 21, 2007; p. 1; located at http://news.bbc.co.uk/go/pr/fr/-/2/hi/entertainment/6579839.stm; printed on Apr. 21, 2007.
"Robust video transmission using MPEG Markup Language and adaptive error correction codes"—(abstract); bearing a date of 2007; p. 1; located at http://ieeexplore.ieee.org/xpls/absprintf.jsp?arnumber=1394682; printed on Jan. 7, 2008.
Sun, Xiaoming; Kuo, C.-C. Jay; "Robust video transmission using MPEG Markup Language and adaptive error correction codes"; IEEE International Conference on Multimedia and Expo; bearing a date of Jun. 27-30, 2004; pp. 2107-2110; vol. 3; IEEE.
Zhou, Tina T.; Jin, Jesse S.; "Principles of Video Annotation Markup Language (VAML)"; Pan-Sydney Area Workshop on Visual Information Processing; bearing a date of 2004; pp. 123-127; Australian Computer Society, Inc.
Wang, Ching-Te et al.; "Detecting and restoring the tampered images based on iteration-free fractal compression"; The Journal of Systems and Software; bearing a date of 2003; pp. 131-140; vol. 67; © 2002 Elsevier Inc.
Dionisio et al.; "A Unified Data Model for Representing Multimedia, Timeline, and Simulation Data"; IEEE; Sep./Oct. 1998; pp. 746-767; vol. 10, No. 5.
Lin, Eugene T., et al.; "Detection of Image Alterations Using Semi-Fragile Watermarks"; bearing a date of 2000; Google 2000; pp. 1-12.
Maes, Frederik, et al.; "Multimodality Image Registration by Maximization of Mutual Information"; IEEE Transactions on Medical Imaging ; bearing a date of Apr. 1997; pp. 187-198; vol. 16.; No. 2.
Oomoto et al., "OVID; Design and Implementation of a Video-Object Database System"; IEEE Transactions on Knowledge and Data Engineering; Aug. 1993; pp. 629-643; vol. 5, No. 4.

\* cited by examiner

FIG. 2
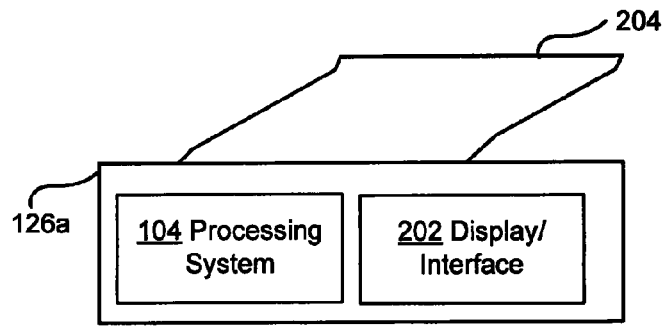
FIG. 2A
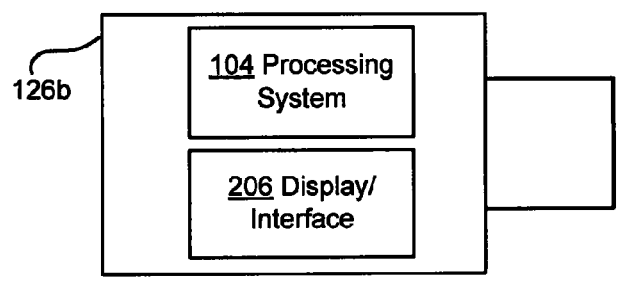
FIG. 2B
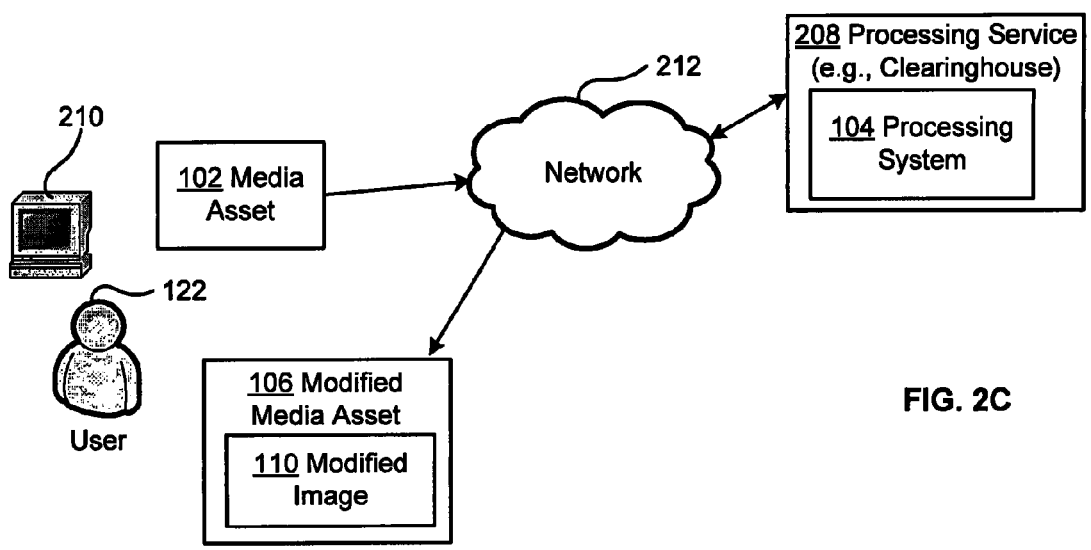
FIG. 2C

FIG. 12

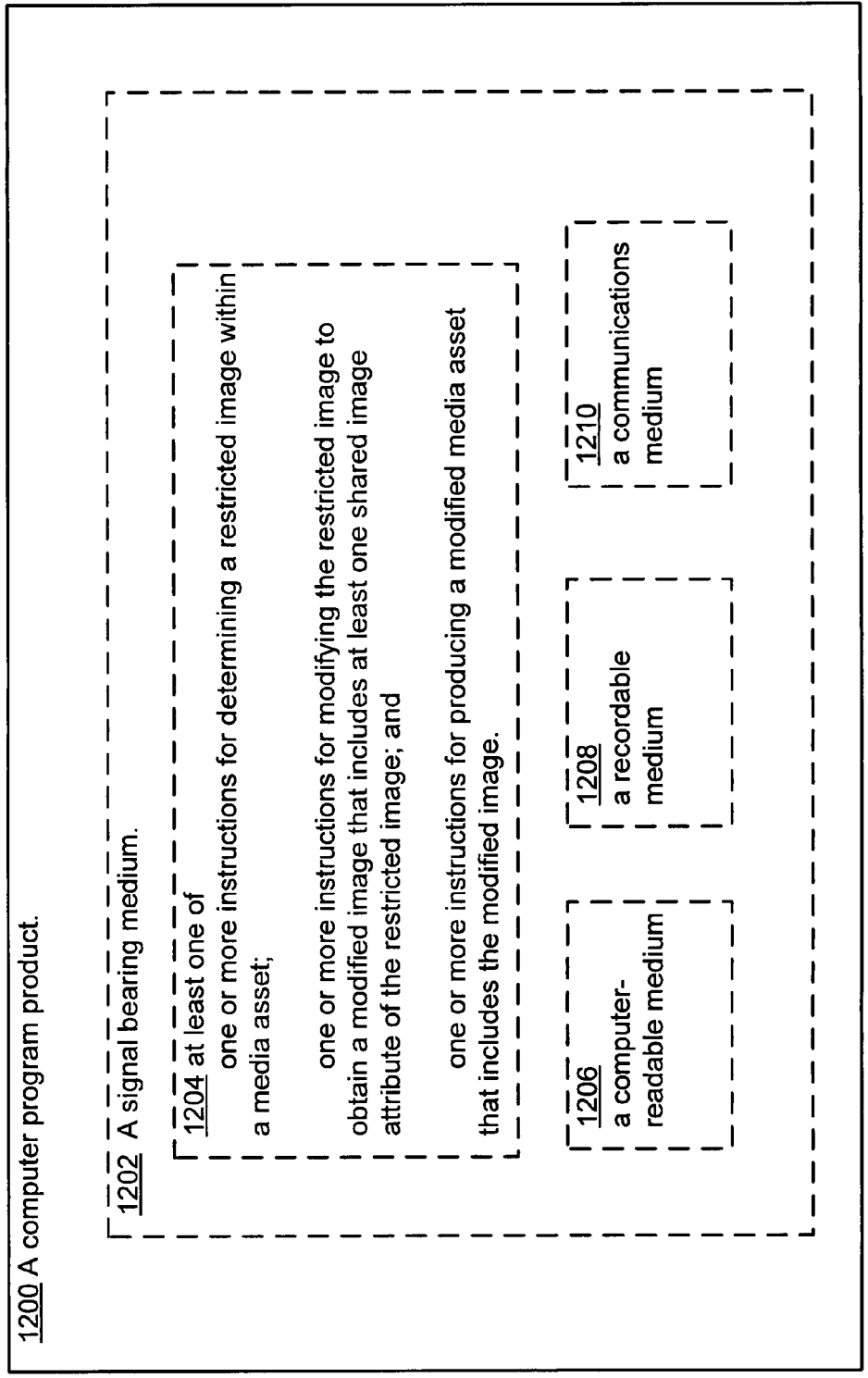

1200 A computer program product.

1202 A signal bearing medium.

1204 at least one of
one or more instructions for determining a restricted image within a media asset;

one or more instructions for modifying the restricted image to obtain a modified image that includes at least one shared image attribute of the restricted image; and one or more instructions for producing a modified media asset that includes the modified image.

1206 a computer-readable medium 1208 a recordable medium 1210 a communications medium

FIG. 24

2040 → FEASIBLE CONTENT ALTERATIONS

| COMPONENT ELEMENT 2042 | DESIGNATED ALTERABLE ASPECTS 2044 |
|---|---|
| MUSIC 2046 | (SONG LYRICS) 2048 (BACKGROUND MUSIC) (VOCALIST) (INSTRUMENTS) |
| SETTING 2050 | (BEACH) 2052 (APARTMENT) (HOTEL) (URBAN) (AIRPORT) (COLLEGE) (STORE) |
| HERO 2054 | (AGE) 2056 (STATURE) (HAIR STYLE) (ETHNIC GROUP) (ACCENT) (AFFLUENCE) |
| HEROINE 2058 | (AGE) 2060 (PERSONALITY) (JEWELRY) (FAMILY STATUS) (CAREER) (HOBBY) |
| VILLAIN 2062 | (VOICE) 2064 (WEAPON) (ADDICTION) (JOB) (SCARS) (TATTOOS) (PROFANITY) |
| CLOTHING 2066 | (1920's) 2068 (EXPENSIVE) (STYLISH) (GAUDY) (MILITARY) (ATHLETIC) (HATS) |
| VEHICLE 2070 | (AIRPLANE) 2072 (MOTORCYLE) (LIMOUSINE) (TRAIN) (MODEL T) (SAILBOAT) |
| COMPANY 2074 | (WESTERN UNION) 2076 (BARNUM & BAILEY) (UNION PACIFIC) (FORD MOTOR) |
| ANIMAL 2078 | (COLLIE DOG) 2080 (SIAMESE CAT) (PARAKEET) (RACE HORSE) (WALRUS) |
| FOOD 2082 | (SOUP) 2084 (FISH & CHIPS) (SAUSAGE) (PLUM PUDDING) (SAUERKRAUT) |
| PRODUCT 2086 | (TELEPHONE) 2088 (RADIO) (PIANO) (PISTOL) (MAGAZINES) (NEWSPAPER) |
| BRAND 2090 | (SEARS ROEBUCK) 2092 (RCA) (WESTINGHOUSE) (GE) (PAN AM) (KODAK) |
| DIALOGUE 2094 | (U.S. ENGLISH) 2096 (GERMAN) (COCKNEY) (SOUTHERN DRAWL) (SLANG) |

FIG. 26

| | OWNERSHIP OF PRIMARY ORIGINAL CONTENT RIGHTS 2193 | APPLICABLE PROVISIONS FOR ORIGINAL CONTENT RIGHTS 2194 | OWNERSHIP OF SECONDARY SUBSTITUTED CONTENT RIGHTS 2196 | APPLICABLE PROVISIONS FOR SUBSTITUTED CONTENT RIGHTS 2198 |
|---|---|---|---|---|
| ALTERED ELEMENTS 2190 PERSON / CHARACTER 2202 | | | | |
| ACTOR / ACTRESS 2204 | | | | |
| OBJECT / ITEM 2206 | | | | |
| PRODUCT CATEGORY 2208 | | | | |
| ALTERED ASPECTS 2192 VIDEO ASPECT 2210 | | | | |
| AUDIO ASPECT 2212 | | | | |
| AUDIOVISUAL ASPECT 2214 | | | | |
| ANIMATION ASPECT 2216 | | | | |
| SET(S) OF RELATED ASPECTS 2218 | | | | |

TYPE OF DERIVATIVE VERSION 2182

TYPE OF MEDIA FORMAT 2183

TYPE OF DISTRIBUTION CHANNEL 2184

OTHER DERIVATIVE VERSIONS 2185

ASSOCIATED REAL-WORLD ENTITY 2186

ASSOCIATED REAL-WORLD PERSON 2187

DATA RECORDS FOR AUTHORIZATION RIGHTS 2180

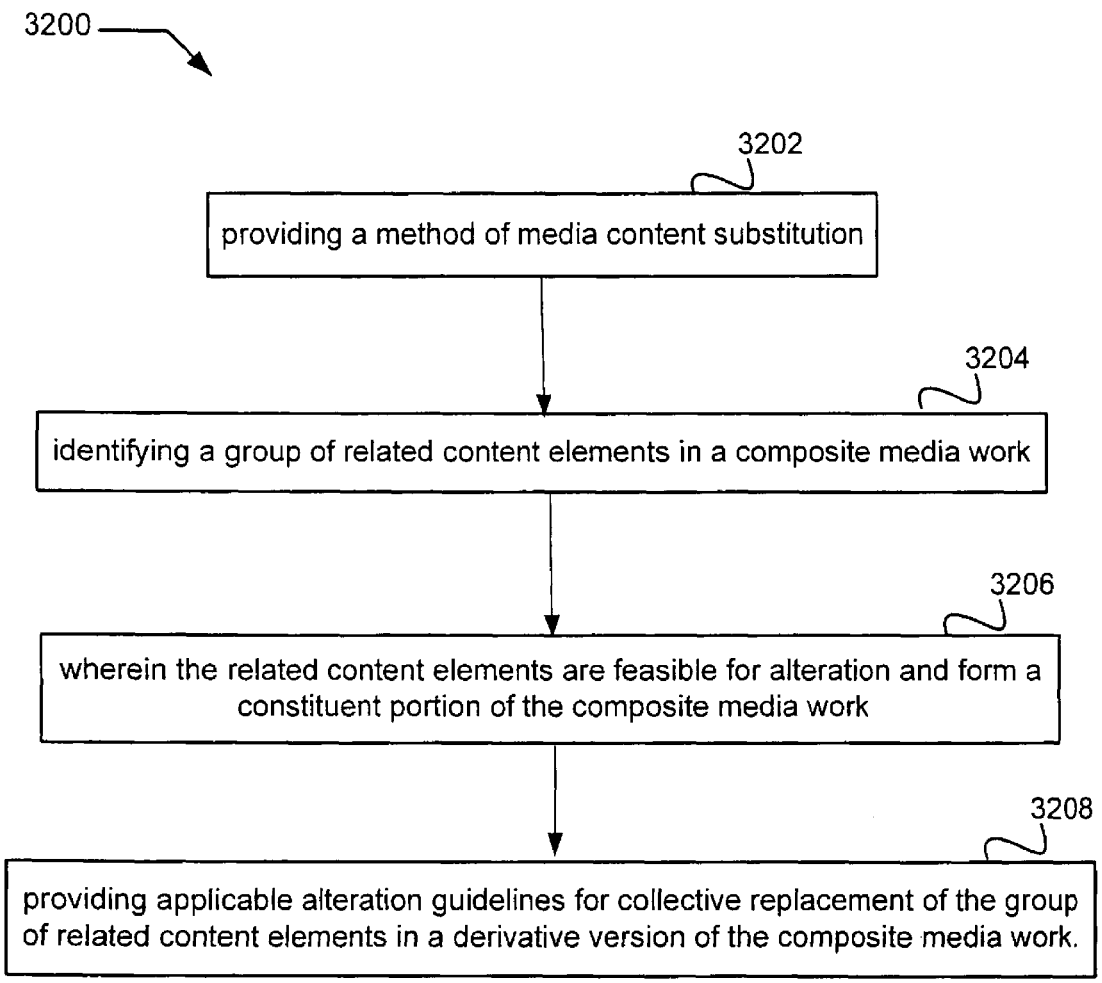

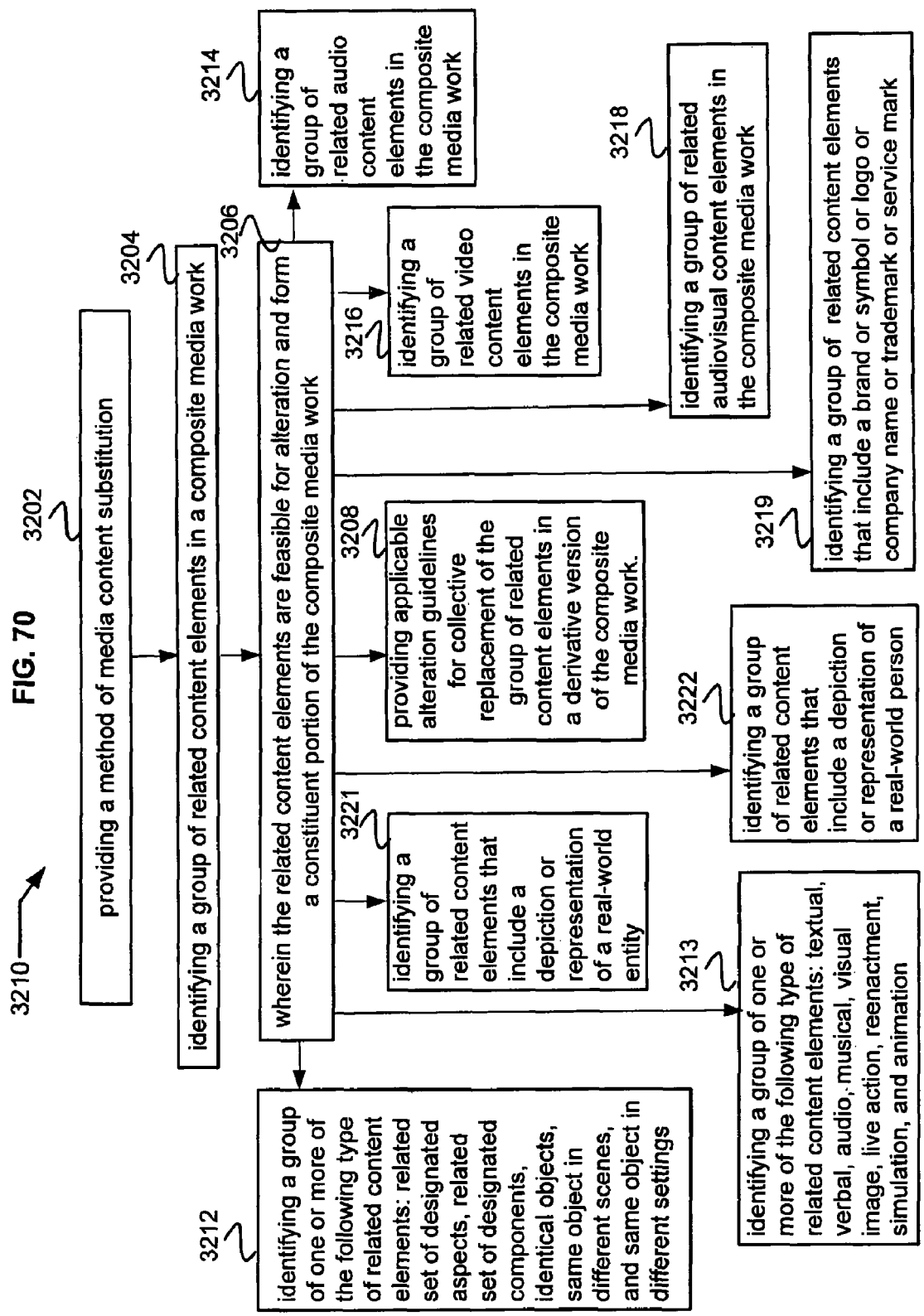

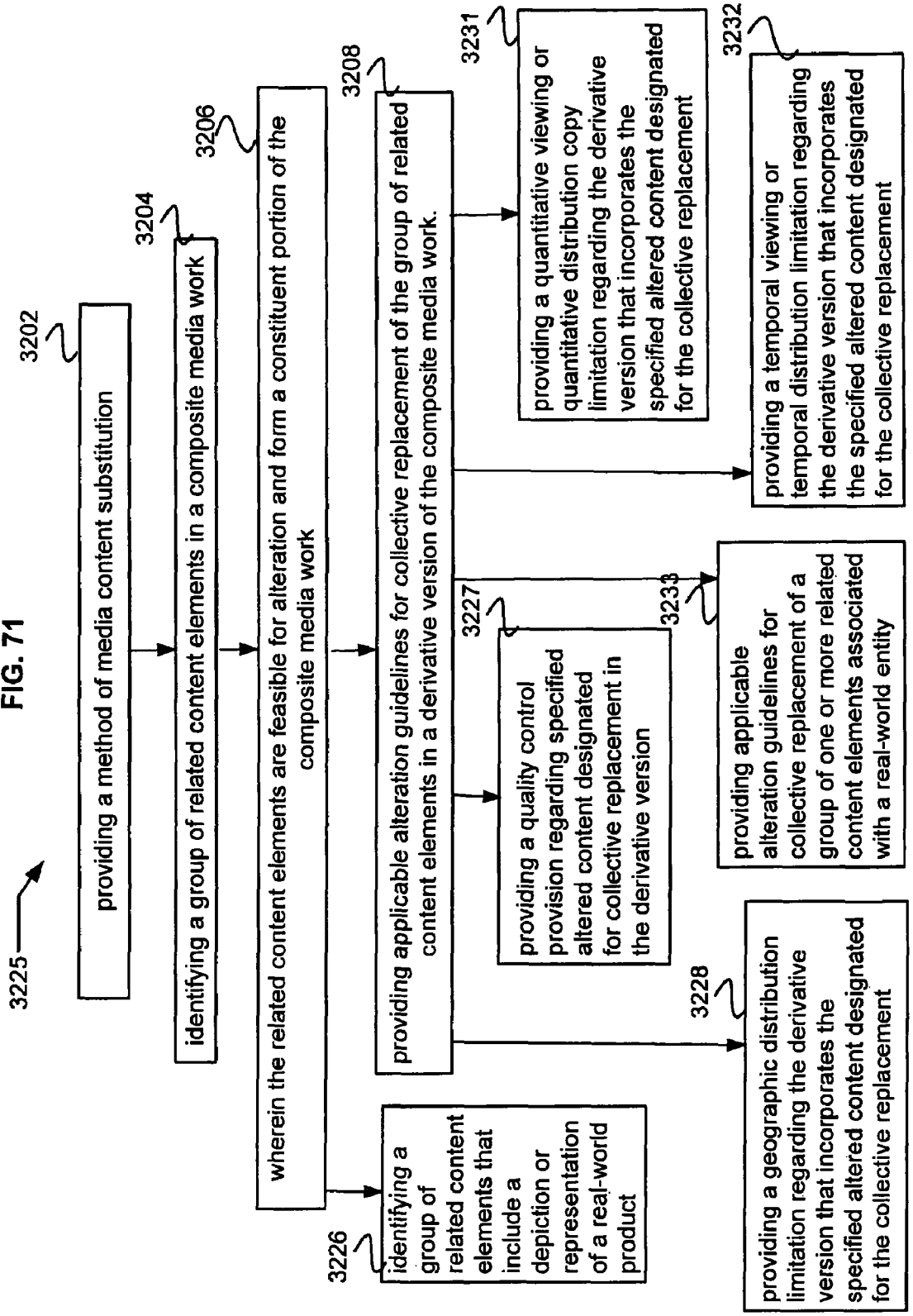

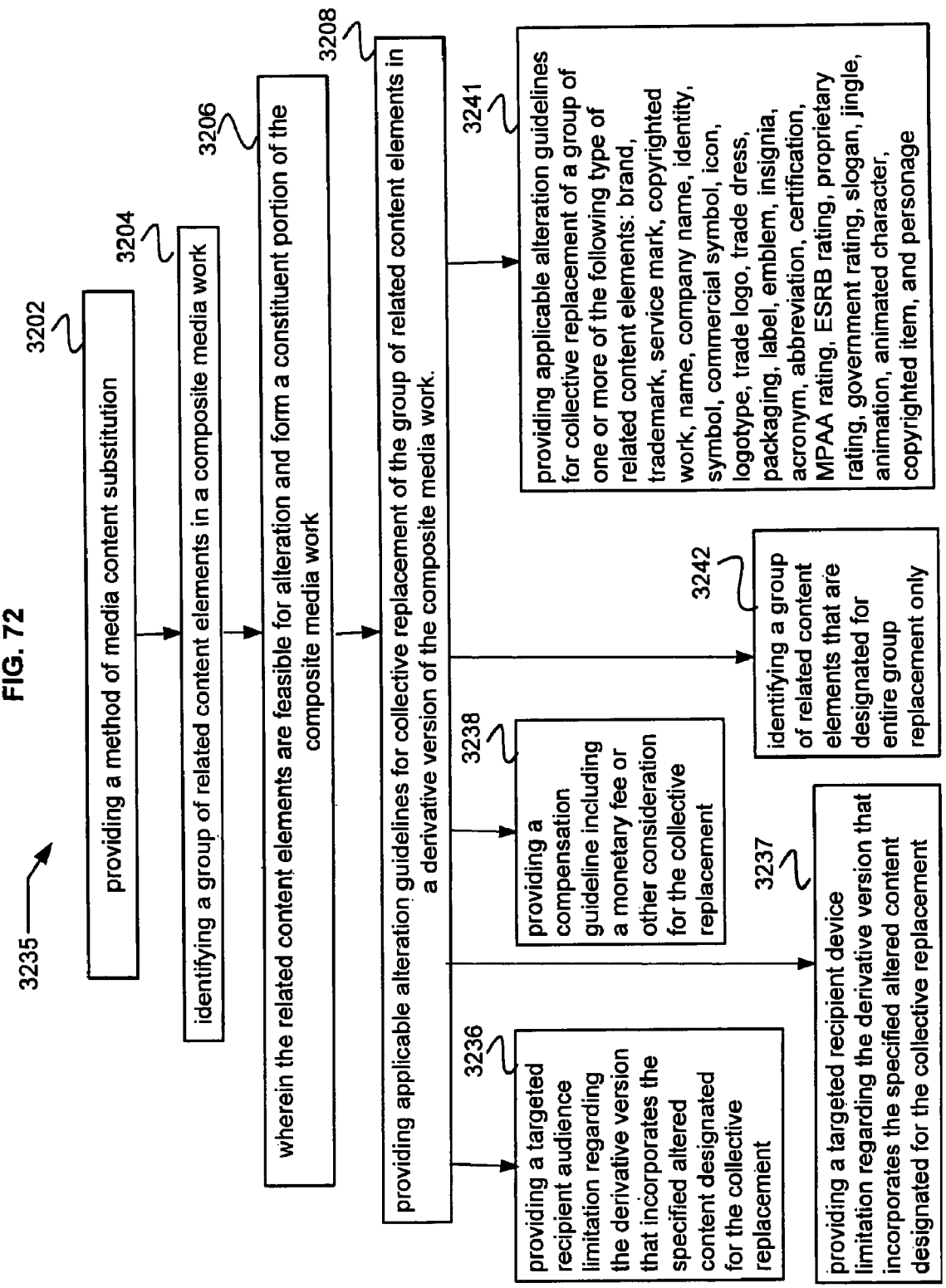

3204: identifying a group of related content elements in a composite media work

3206: wherein the related content elements are feasible for alteration and form a constituent portion of the composite media work 3208: providing applicable alteration guidelines for collective replacement of the group of related content elements in a derivative version of the composite media work.

3249: providing applicable alteration guidelines for collective replacement of a group of one or more of the following type of related content elements: textual, verbal, audio, musical, visual, image, live action, reenactment, simulation, and animation 3248: providing applicable alteration guidelines for collective replacement of a group of one or more of the following type of related content elements: product, service, invention, accessory, vehicle, place, address, location, store, building, school, university, hospital, church, club, group, organization, and business 3246: providing recognition for one or more of the following type of sponsorship credits associated with the collective replacement: monetary contribution, monetary support, product donation, service donation 3247: providing applicable alteration guidelines for collective replacement of a group of one or more of the following type of related content elements: livery, color scheme, dress, fabric, jewelry, pattern, design, sculpture, artistic work, musical work, composition, publication, document, event, exhibit, performance, person, animal, mascot, character, obscured attribute, highlighted attribute, and avatar

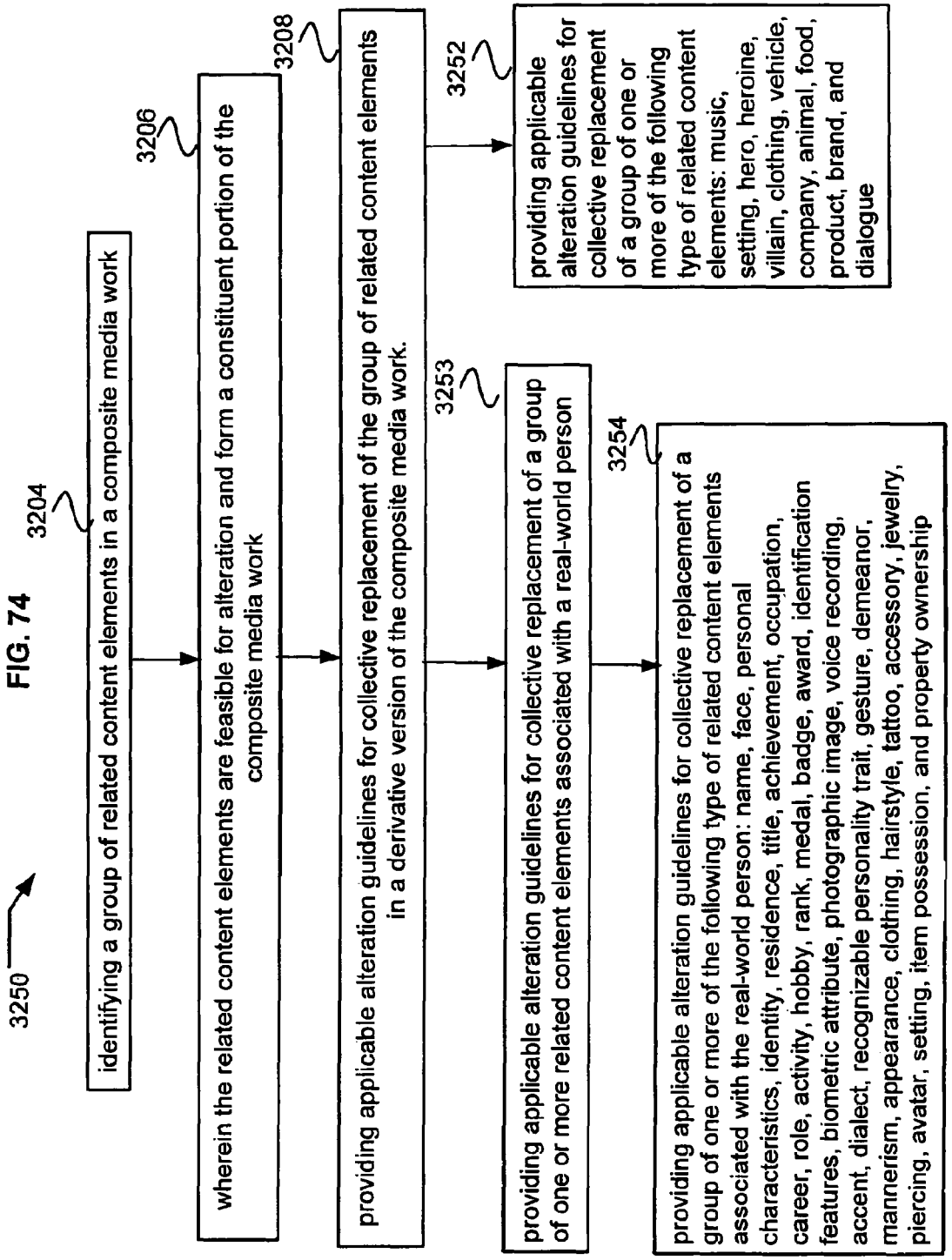

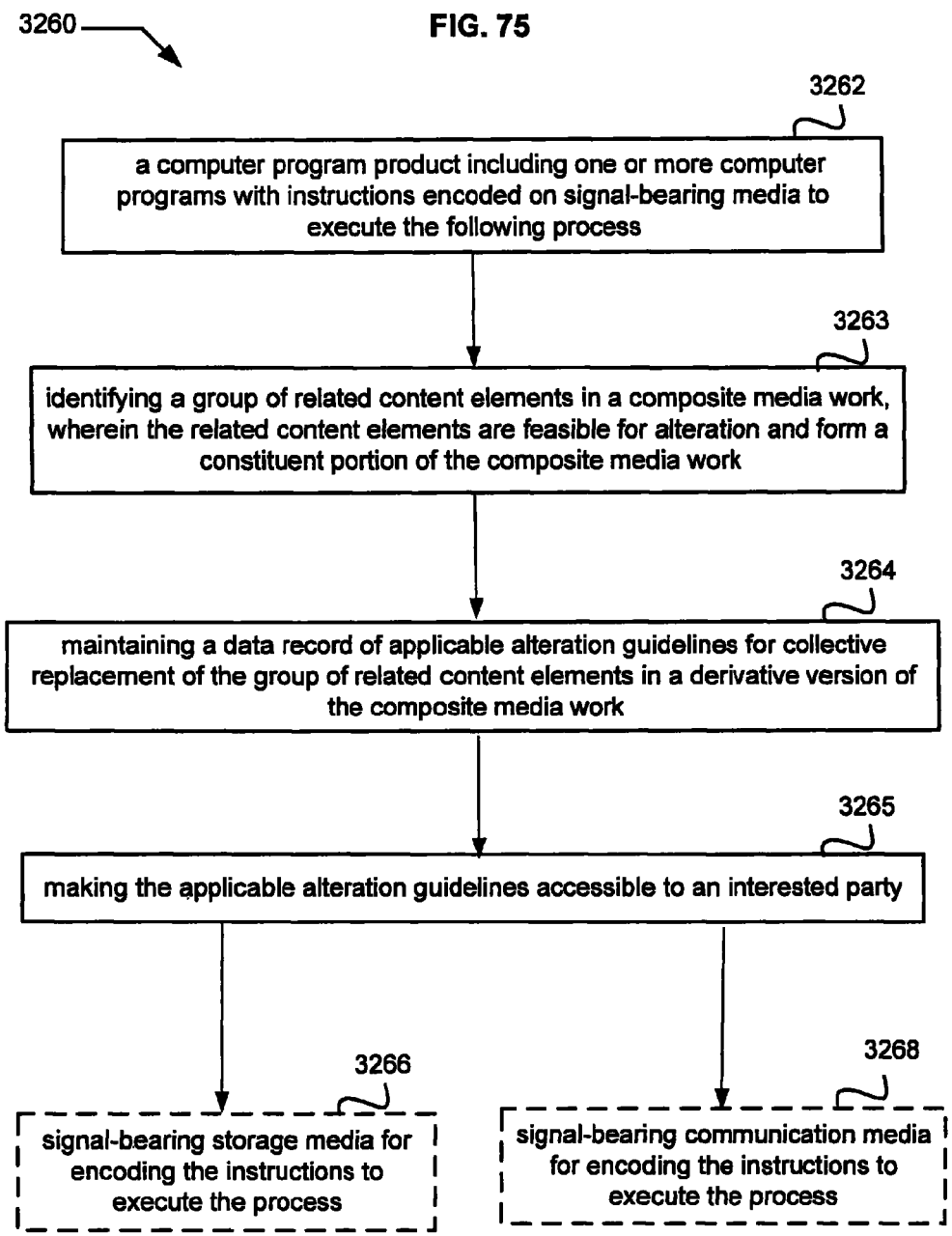

GROUP CONTENT SUBSTITUTION IN MEDIA WORKS

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purpose of the USPTO extra-statutory requirements, the present application constitutes a continuation-in-part of U.S. patent application Ser. No. 11/807,350 entitled IMPLEMENTING GROUP CONTENT SUBSTITUTION IN MEDIA WORKS, naming Alexander J. Cohen, Edward K. Y. Jung, Royce A. Levien, Robert W. Lord, Mark A. Malamud, William Henry Mangione-Smith, John D. Rinaldo, Jr. and Clarence T. Tegreene as inventors, filed 25 May 2007, which is currently co-pending, or is an application of which a currently co-pending application is entitled to the benefit of the filing date.

For purpose of the USPTO extra-statutory requirements, the present application constitutes a continuation-in-part of U.S. patent application Ser. No. 11/807,353 entitled PROMOTIONAL PLACEMENT IN MEDIA WORKS, naming Alexander J. Cohen, Edward K. Y. Jung, Royce A. Levien, Robert W. Lord, Mark A. Malamud, William Henry Mangione-Smith, John D. Rinaldo, Jr. and Clarence T. Tegreene as inventors, filed 25 May 2007, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/796,543 entitled IMPLEMENTATION OF MEDIA CONTENT ALTERATION, naming Alexander J. Cohen, Edward K. Y. Jung, Royce A. Levien, Robert W. Lord, Mark A. Malamud, William Henry Mangione-Smith, John D. Rinaldo, Jr. and Clarence T. Tegreene as inventors, filed 27 Apr. 2007, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/796,570 entitled AUTHORIZATION RIGHTS FOR SUBSTITUTE MEDIA CONTENT, naming Alexander J. Cohen, Edward K. Y. Jung, Royce A. Levien, Robert W. Lord, Mark A. Malamud, William Henry Mangione-Smith, John D. Rinaldo, Jr. and Clarence T. Tegreene as inventors, filed 26 Apr. 2007, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/731,795 entitled AUTHORIZATION FOR MEDIA CONTENT ALTERATION, naming Alexander J. Cohen, Edward K. Y. Jung, Royce A. Levien, Robert W. Lord, Mark A. Malamud, William Henry Mangione-Smith, John D. Rinaldo, Jr. and Clarence T. Tegreene as inventors, filed 30 Mar. 2007, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/731,738 entitled APPROVAL TECHNIQUE FOR MEDIA CONTENT ALTERATION, naming Alexander J. Cohen, Edward K. Y. Jung, Royce A. Levien, Robert W. Lord, Mark A. Malamud, William Henry Mangione-Smith, John D. Rinaldo, Jr. and Clarence T. Tegreene as inventors, filed 30 Mar. 2007, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/195,358 entitled MODIFYING RESTRICTED IMAGES, naming Royce A. Levien, Robert W. Lord, Mark A. Malamud and John D. Rinaldo, Jr. as inventors, filed 2 Aug. 2005, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/195,346 entitled RESTORING MODIFIED ASSETS, naming Royce A. Levien, Robert W. Lord, Mark A. Malamud and John D. Rinaldo, Jr. as inventors, filed 2 Aug. 2005, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/173,990 entitled TECHNIQUES FOR IMAGE GENERATION, naming Royce A. Levien, Robert W. Lord, Mark A. Malamud and John D. Rinaldo, Jr. as inventors, filed 1 Jul. 2005, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 11/174,432 entitled PROVIDING PROMOTIONAL CONTENT, naming Royce A. Levien, Robert W. Lord, Mark A. Malamud and John D. Rinaldo, Jr. as inventors, filed 1 Jul. 2005, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

BACKGROUND

Content alteration of media works provides new opportunities and benefits in connection with the distribution of various derivative versions of an original work.

SUMMARY

Method and system embodiments involving implementation of content alteration in a media work as disclosed herein may take different forms. For example, one or more computer program products having process instructions may be incorporated in a computerized system.

An exemplary system embodiment for content alteration of a media work may include a composite media work having a group of related component elements that are feasible for alteration and are included in a constituent portion of the composite media work, a data record of applicable alteration guidelines regarding collective replacement of the group of related component elements by an addition or deletion or modification or replacement in a proposed derivative version, computerized apparatus operably coupled to the data record and to the composite media work, and an access interface linked to the computerized apparatus.

An exemplary process embodiment may provide a method of media content substitution including identifying a group of related content elements in a composite media work, wherein the related content elements are feasible for alteration and form a constituent portion of the composite media work; and providing applicable alteration guidelines for collective replacement of the group of related content elements in a derivative version of the composite media work.

An exemplary computer program product embodiment may include one or more computer programs with instructions encoded on signal-bearing media to execute a process. Such a programmed process may include identifying a group of related content elements in a composite media work, wherein the related content elements are feasible for alteration and form a constituent portion of the composite media work; maintaining a data record of applicable alteration guidelines for collective replacement of the group of related content elements in a derivative version of the composite media work; and making the applicable alteration guidelines accessible to an interested party.

Some implementations for a computer program embodiment may include process instructions encoded on a storage medium and/or a communication medium.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIGS. 2A-2C illustrate certain alternative embodiments of the device and/or processing system of FIG. 1.

FIG. 12 illustrates a partial view of an example computer program product that includes a computer program for executing a computer process on a computing device.

FIG. 24 is a tabular depiction of exemplary elements and aspects that may be feasible for possible alteration in a composite media work.

FIG. 26 is a tabular representation showing additional exemplary types of data records that may be used in connection with an authorization rights embodiment for media works.

FIG. 69 is a high level flow chart illustrating another exemplary process embodiment for providing applicable alteration guidelines for a derivative version of a media work.

FIGS. 70-74 are more detailed flow charts illustrating additional possible features that may be included in an exemplary process embodiment.

FIG. 75 is a diagrammatic flow chart for another exemplary computer program product embodiment.

DETAILED DESCRIPTION

Figure 1:
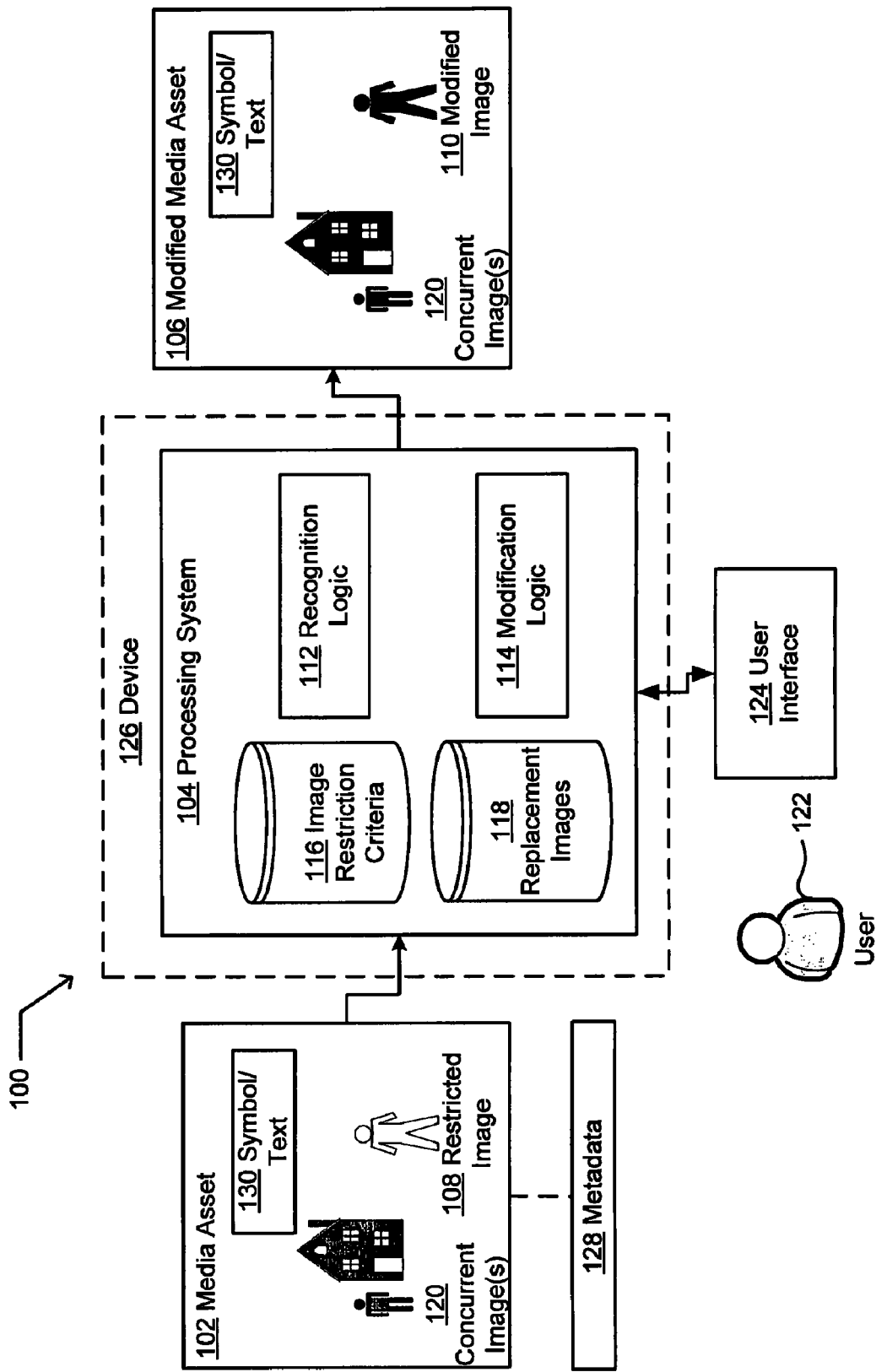
FIG. 1 illustrates an example system in which embodiments may be implemented, perhaps in a device.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 illustrates an example system 100 in which embodiments may be implemented, perhaps in the context of a device. In FIG. 1, a media asset 102 is illustrated as being received at a processing system 104 and thereafter output by the processing system 104 as a modified media asset 106. More specifically, the media asset 102 includes a restricted image 108, and the processing system 104 is operable to determine that the restricted image 108 is, in fact, restricted.

The processing system 104 is further operable to modify the media asset 102, and in particular, to modify the restricted image 108, and thereafter output the modified media asset 106 having a modified image 110. In this way, for example, an identity or other information about the restricted image 108 may be protected, hidden, or obscured, while maintaining a general presentation context of the media asset 102. For example, a person who is a subject of the restricted image 108 may be made anonymous within the modified media asset 106, while inclusion of the modified image 110, which shares attributes of the restricted image 108 (or, at least, shares one common attribute of the restricted image 108), may serve to limit or prevent an observer of the modified media asset 106 from noticing that the modified media asset 110, has, in fact, been modified.

The processing system 104 includes recognition logic 112 that is operable to recognize the restricted nature of the restricted image 108. The processing system 104 also includes modification logic 114 that is operable to modify the media asset 102 (including the restricted image 108) to obtain the modified media asset 106 and the modified image 110.

As described in more detail below, the recognition logic 112 may determine the restricted image 108 within the media asset 102 using image restriction criteria 116. As also described in more detail below, the modification logic 114 may obtain/create the modified image 110 by accessing a number of stored or accessible replacement images 118. Specific examples of operations involving these elements of the processing system 104 are provided in the context of various operational flows.

Generally speaking, however, the recognition logic 112 may operate to analyze various attributes of the media asset 102, including attributes of the restricted image 108, in order to determine a restricted nature of the restricted image 108. One example of attributes of the media asset 102 that is illustrated in FIG. 1 includes concurrent image(s) 120, i.e., the recognition logic 112 may make a determination that the restricted image 108 is restricted based on a presence or absence of the concurrent image(s) 120, or based on the presence or absence of certain attributes of the concurrent image(s) 120. Of course, attributes of the media asset 102 are not necessarily limited to image characteristics of the media asset 102, and also may include, for example, metadata associated with the media asset 102, an identity of a person, place, or thing within or in association with the restricted image 108, or information related to a person and/or device involved in capturing the media asset 102.

Further in FIG. 1, a user 122 accesses the processing system 104 by way of a user interface 124. In this way, the user 122 may, for example, submit the media asset 102 to the processing system 104, or receive the modified media asset 106 from the processing system 104, or may become involved in operations of the processing system 104. The user interface 124 also may be used, for example, to define or modify the image restriction criteria 116, or to select the replacement images 118. The user interface 124 also may be used to control a type and/or extent of the recognition performed by the recognition logic 112, or to control a type and/or extent of the modifications performed by the modification logic 114.

Also in FIG. 1, a device 126 is shown in which the processing system 104 may operate. As described in more detail with respect to FIG. 2 and following Figures, the device 126 may include in some examples, an image capture device, a print device, a general-purpose computing device, or virtually any other device or combination of devices that may be used to store, transmit, display, or render a media asset.

The processing system 104 also may be operable to perform other processing of the media asset 102, such as, for example, enhancing, editing, displaying, or otherwise improving the media asset 102, or, in other example embodiments, such additional processing may be performed by other external systems (not shown), if needed.

FIG. 1 also illustrates the possibility that the media asset 102 may be associated with metadata 128. For example, a video stream may have an associated closed-captioning stream, or a web page may have metadata associated with content of the page. Typically, such metadata 128 may not be viewable to the user 122, or may only be viewable if some specific action is taken by the user 122. The metadata 128 may be intended by a designer or producer of the media asset 102, or by an intervening user of the media asset 102, to provide additional information or level of enjoyment to the user 122, and may be used by the processing system to assist in, for example, determining the restricted image 108, as described in more detail, below. The metadata 128 may or may not be included within the modified media asset 106.

A symbol or text 130, on the other hand, generally represents information that is included within the media asset 102 for normal viewing. For example, a web page may include a news article that names a person who is pictured in the article. By using the name text, the recognition logic 112 may be able to determine identity or other information regarding the restricted image 108, or the concurrent image(s) 120.

In FIG. 1, it should be understood that any and/or all of the illustrated elements, and other elements, not illustrated, may be in communication with one another according to any known methods, including but not limited to the various communication techniques discussed herein. As such, it should be understood that the various elements need not be located or co-located as illustrated in the example of FIG. 1. For example, in some embodiments, the recognition logic and/or the image restriction criteria 116 may be remote from the processing system 104. Similarly, the user interface 124 may be implemented at a local computing device of the user 122, remote from the processing system 104, or may be a part of the device 126 that may house the processing system 104, as well.

FIGS. 2A-2C illustrate certain alternative embodiments of the device 126 and/or processing system 104 of FIG. 1. In FIG. 2A, the device 126 is illustrated as a printer 126a, which includes the processing system 104 and a display 202. The display 202 may be used to display a preview of a media asset to be printed with the printer 126a, such as, for example, the media asset 102 and/or the modified media asset 106, and, of course, the printer 126a may be used to print the media asset 102 and/or the modified media asset 106 on paper 204, as well.

The display 202 also should be understood to function, in some example embodiments, as the user interface 124. For example, the display 202 may include touch-screen control for operating the printer 126a and/or the processing system 104, or various buttons, keys, or other selection/input devices (not shown) may be used. In additional or alternative embodiments, an external computing device may be connected to the printer 126a for control thereof, including control of the processing system 104.

In FIG. 2B, the device 126 is illustrated as a camera 126b, which, similarly to the printer 126a, includes some or all of the processing system 104, as well as a display 206. As with the printer 126a, the camera 126b (and/or the processing system 104) may be controlled by the user 122, either using the display 206 (and possibly associated controls), or using an external computing device.

In FIG. 2C, the processing system 104 is illustrated as part of a processing service 208, which may be remote from the user 122 at a computing station 210, and in communication therewith by way of a network 212. In such example embodiments, the user 122 may use the workstation 210 to transmit and receive the media asset 102 and/or the modified media asset 106, respectively, in order to obtain the various advantages described herein. In one example, discussed in more detail below, the processing service 208 may operate as a clearinghouse at which media assets of various types and captured by a number of users may be processed, so that any restricted images therein may be modified appropriately.

Figure 3:
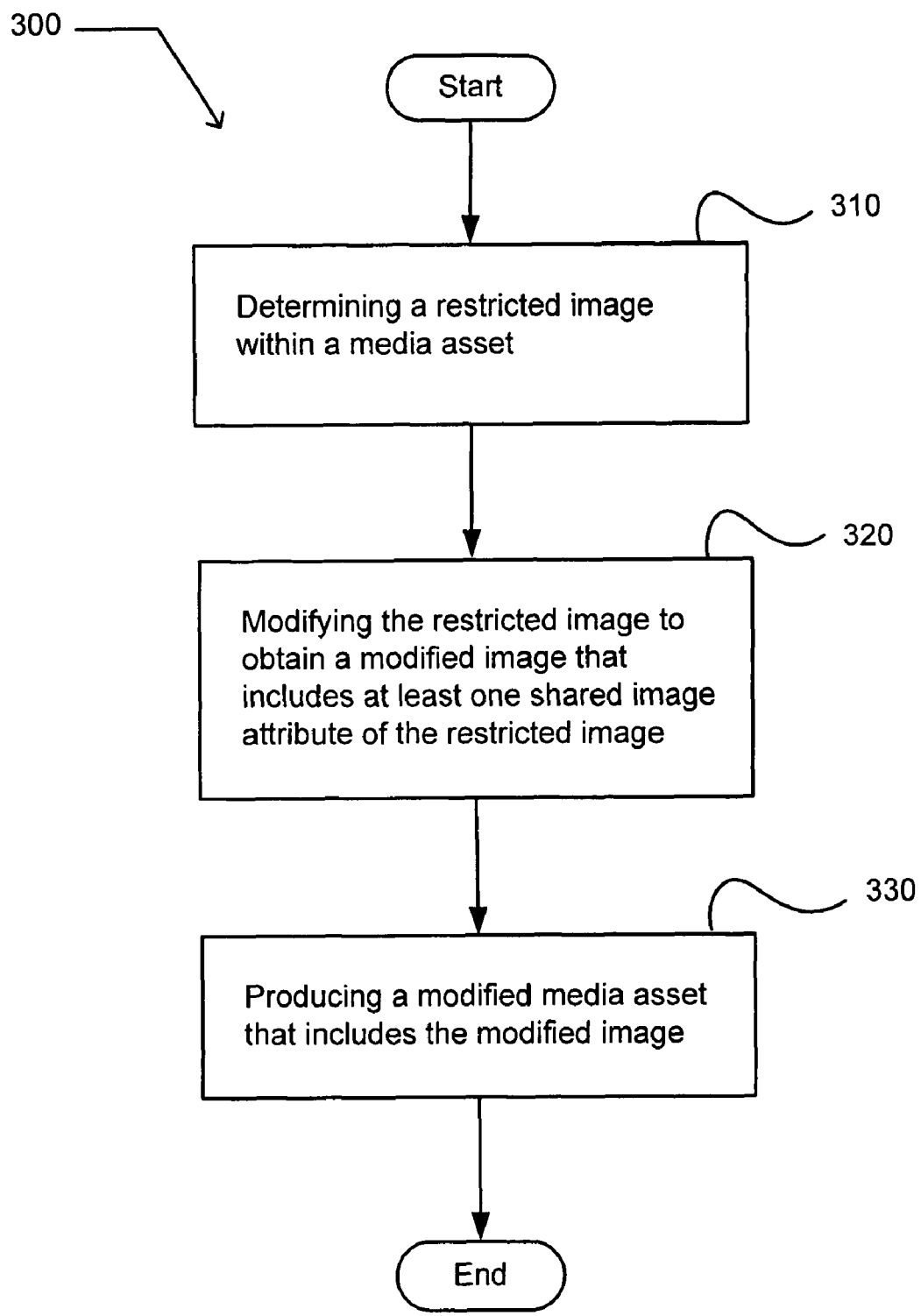
FIG. 3 illustrates an operational flow representing example operations that produce a modified media asset that includes a modified image.

In FIG. 3 and in following Figures that include various examples of operational flows, discussion and explanation may be provided with respect to the above-described examples of FIGS. 1, 2A, 2B, and 2C, and/or with respect to other examples and contexts. However, it should be understood that the operational flows may be executed in a number of other environment and contexts, and/or in modified versions of FIGS. 1, 2A, 2B, and 2C. Also, although the various operational flows are presented in the sequence(s) illustrated, it should be understood that the various operations may be performed in other orders than those which are illustrated, or may be performed concurrently.

FIG. 3 illustrates an operational flow 300 representing example operations that produce the modified media asset 106. After a start operation, the operational flow 300 moves to a determining operation 310 where the restricted image 108 is determined to be included within the media asset 102. For example, the recognition logic 112 of the processing system 104 may determine that the restricted image 108 is of a person, place, or thing that is not to be included within produced (modified) versions of the media asset 102.

At a modifying operation 320, the restricted image 108 is modified to obtain a modified image that includes at least one shared image attribute of the restricted image. For example, as in FIG. 1, the modification logic 114 may operate to replace an image of a person or a part of a person with a new or separate image of another person. In this case, the shared image attribute could include one or more of a body (part) shape, a shared facial feature or skin tone, a shared gender or race, a shared hair color or body physique, or numerous other examples. Of course, the restricted image need not be of a person, but also may include virtually any object that may be imaged, including places, objects, or landmarks, to name just a few. Further, the restricted image need not be of a single one of these possibilities, but could include multiple people, places, or things, or combinations thereof. Other examples of restricted images and image attributes are provided below.

At an operation 330, the modified media asset 106 is produced that includes the modified image 110. For example, the processing system 104, which may be included in the print device 126a, the camera 126b, or the processing service 208, may output the modified media asset 106 for printing, viewing, storing, or transmitting, as the case may be, for use or enjoyment by, for example, the user 122. The operational flow 300 then moves to an end operation.

In some embodiments, the user 122 may include a person, an entity, and/or a government. Although a user may be shown herein as a single illustrated Figure, and/or be described in the singular, those skilled in the art will appreciate that the term user may be representative of one or more human user(s), robotic user(s) (e.g., computational entity), and/or substantially any combination thereof (e.g., a user may be assisted by one or more robotic agents). Further, the user, as set forth herein, even if shown as a single entity, may in fact be composed of two or more entities. Those skilled in the art will appreciate that, in general, the same may be said of "sender" and/or other entity-oriented terms as such terms may be used herein.

In some embodiments, the media asset 102 may include a visual image, a picture, a website, an audio recording, a video stream, and/or an audio stream. In additional or alternative embodiments, the media asset 102 also may include text. The media asset 102 may be embodied in various forms, including but not limited to digital files or transmissions, analog recordings or transmissions, or may be embodied in physical form, such as, for example, on paper, plastic, canvas, wood, or any other physical medium in which text, image, or other representations may be embodied.

The media asset 102 may be received, stored and/or transmitted using typical elements of a computer environment. The media asset 102 (and the modified media asset 106) may be transmitted over a network such as the network 212 of FIG. 2, which may represent, for example, a local area network (LAN), a wide area network (WAN), or a peer-to-peer (P2P) network, or the media asset 102 may be broadcast over the air.

The media asset 102 (and the modified media asset 106) may be captured, received, displayed and/or transmitted, for example and without limitation, using one or more of the following: an electronic device; an appliance; a computing device, such as a personal computer and a server; a limited resource computing device; a pervasive computing device; a personal digital assistant (PDA); a cell phone; a Blackberry appliance; a vehicle, such as a car, boat, and/or aircraft; an X-Box; a home gateway; a set-top box; a television, a radio, a camera; a printer; a digital video disc (DVD) recorder or burner; and a TiVo or other digital video recorder (DVR).

Figure 4:
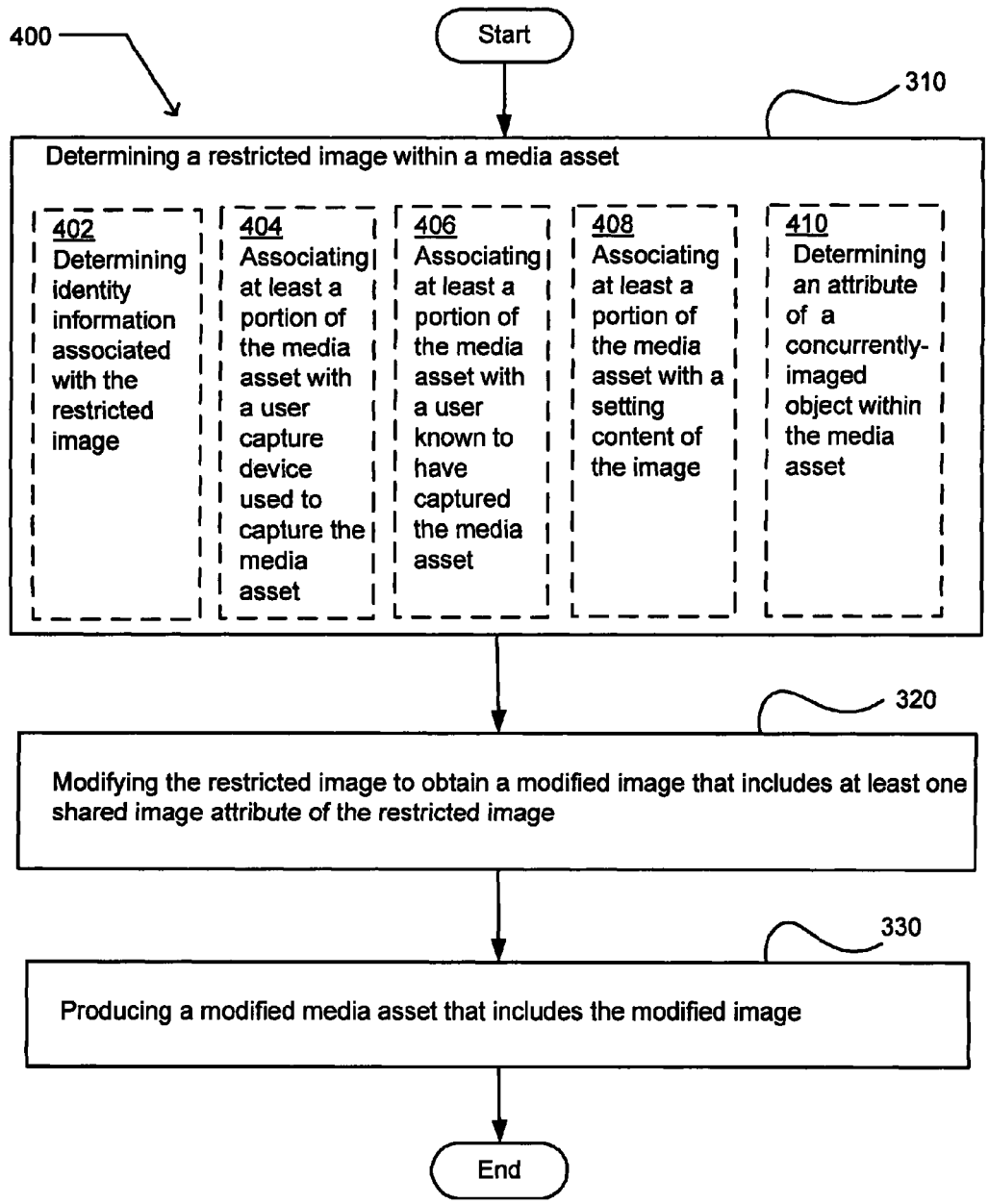
FIG. 4 illustrates an alternative embodiment of the example operational flow of FIG. 3.

FIG. 4 illustrates alternative embodiments of the example operational flow 300 of FIG. 3. FIG. 4 illustrates example embodiments where the determining operation 310 may include at least one additional operation. Additional operations may include operation 402, operation 404, operation 406, operation 408, and/or operation 410.

At the operation 402, identity information associated with the restricted image 108 is determined. For example, the recognition logic 112 may determine identity information of a person within the restricted image information, which may include, for example, a name, an occupation, an association (e.g., as a spouse, relative, friend, or employer/employee), a race, a gender, a body physique, a height, a hair color or hair style, a style of dress, or any other distinguishing information that identifies the person, and, in some examples, that uniquely identifies the person.

Examples of techniques for performing the determining of identity information are described in more detail below. Also, examples of how such identity information may be used by the modification logic 114 to produce the modified image 110 are described in more detail below, although it may be mentioned here that, by determining identity information as described above, it follows that the modified image 110 may include or be associated with different identity information. For example, a person associated with the restricted image 108 may wish to remain anonymous, or otherwise should not be included in the media asset 102, and, in such cases, the modified image 110 may include an anonymized image in which the original identity information is hidden, obscured, replaced, and/or otherwise modified.

Additionally, since the modified image 110 maintains at least one, and possibly many, image attributes of the restricted image 108, and a presentation context of the media asset 102 may be maintained within the modified media asset 110, observers, users, or recipients of the modified media asset 110 may not be aware that such modification has, in fact, taken place.

Of course, similar comments apply not just to persons within the restricted image 108, but to virtually any object that may be imaged and associated with identity information. For example, the restricted image 108 may include a physical place, such as a public or private landmark, a building, or a sports arena, and the identity information associated therewith may be determined by the recognition logic 112. Similarly, any particular object having identity information, such as, for example, a car or type of car, a work of art, an animal, a computer or computing device, a piece of jewelry or clothing, or any other object, may have identity information associated therewith for determining that the associated image is restricted.

At the operation 404, at least a portion of the media asset 102 is associated with a user capture device used to capture the media asset, such as, for example, the camera 126b of FIG. 2. That is, for example, the recognition logic 112 may determine that the media asset 102 was captured by the camera 126b that is restricted from capturing certain images. For example, cameras in a high-security facility, or cameras at an event with a public figure(s) (e.g., a movie star, politician, or professional athlete) may be restricted from capturing images of certain people, places, or things.

At the operation 406, at least a portion of the media asset 102 is associated with a user known to have captured the media asset. In this case, as described in more detail below, the recognition logic 112 may associate the media asset 102 or a portion thereof with the user 122 by recognizing the metadata 128 associated with the media asset 102, such as, for example, a marker on the media asset 102 that was imposed by a camera of the user 122 when (or after) the media asset was obtained. In other examples, the user 122 may be required to identify him or herself to the processing system 104 before processing begins, so that the recognition logic 112 may react accordingly.

At the operation 408, at least a portion of the media asset 102 is associated with a setting content of the image. For example, the concurrent image(s) 120 of FIG. 1 may be considered to provide setting content within the media asset 102. In this way, for example, and as referenced above, media assets obtained in a certain location, as reflected within the content of the media asset 102, may be recognized by the recognition logic 112 as containing one or more restricted images. As with virtually all of the operational flows described herein, such an association may be combined for enactment within the recognition logic 112. For example, the recognition logic 112 may determine that if a content setting of the media asset 102 references a setting where certain public figures will be present, and if identity information associated with a person's image within the media asset 102 identifies that person as being a spouse of a public figure, then the recognition logic 112 may cue the modification logic to anonymize the spouse's image by, for example, replacing the spouse's image with that of a replacement image from the replacement images memory 118. Such replacements may be undertaken, for example, based on a wish of the, in this case, spouse, to maintain anonymity.

As another example, the recognition logic 112 may analyze the media asset 102 to determine that the setting content is such that all non-recognized persons should be anonymized.

At the operation 410, an attribute of a concurrently-imaged object within the media asset 102 is determined. For example, an attribute of the concurrent image(s) 120 may be determined, where the concurrent image(s) 120 may include virtually any item that may be imaged within the media asset 102. As mentioned above, the concurrently-imaged object(s) 120 also may be used to determine a setting content of the media asset 102, although the attribute of a concurrently-imaged object reference in operation 410 may refer to any particular imaged item, or attribute thereof, which may or may not be a part of a setting content of the media asset 102.

Figure 5:
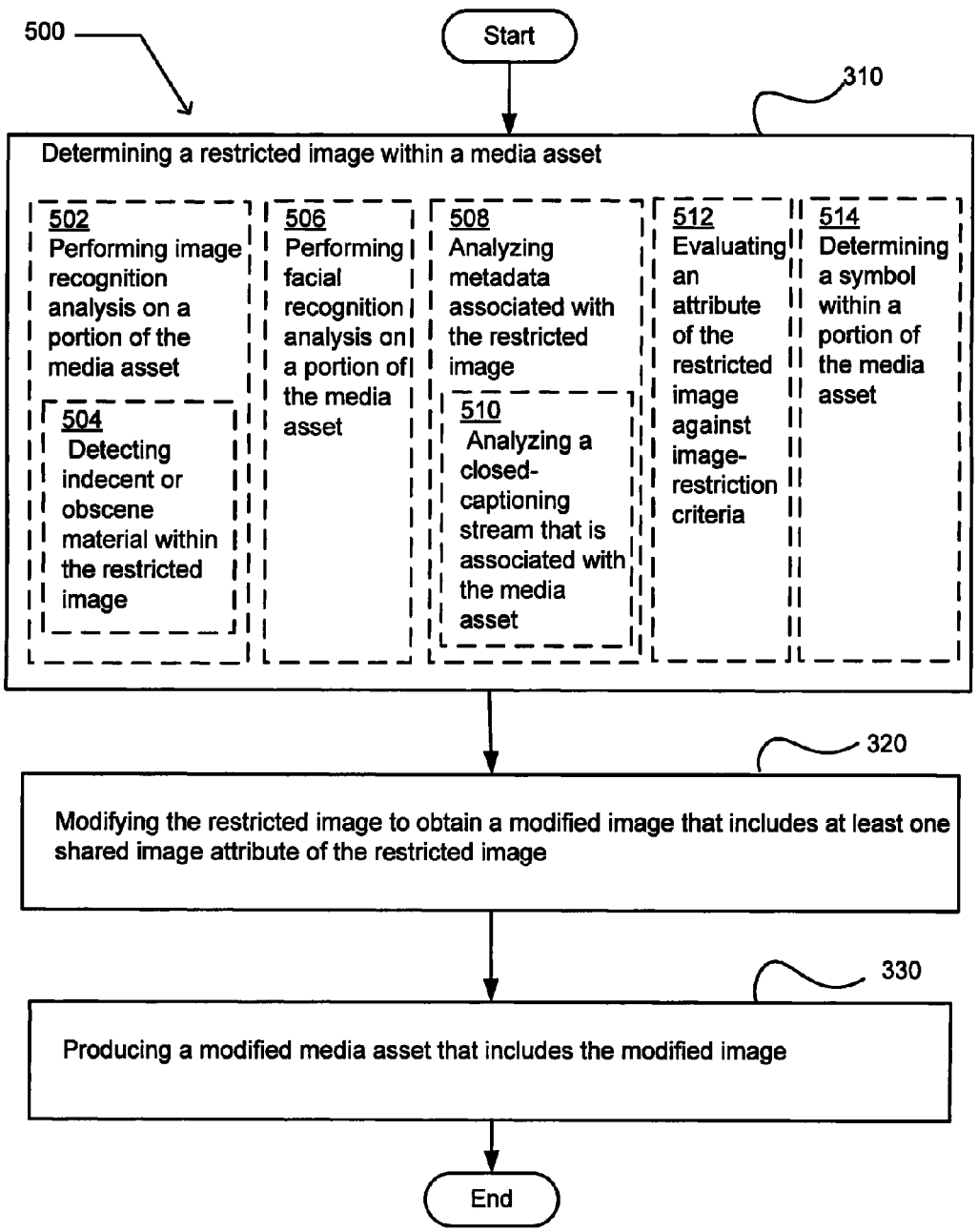
FIG. 5 illustrates another alternative embodiment of the example operational flow of FIG. 3.

FIG. 5 illustrates alternative embodiments of the example operational flow 300 of FIG. 3. FIG. 5 illustrates example embodiments where the determining operation 310 may include at least one additional operation. Additional operations may include operation 502, operation 504, operation 506, operation 508, operation 510, operation 512, and/or operation 514.

At the operation 502, image recognition analysis is performed on a portion of the media asset. For example, the recognition logic 112 may perform image recognition analysis on the restricted image 108 to determine that the restricted image 108 includes an image of a person, or portion thereof, or any other object that may be visually imaged. The image recognition analysis may include, for example, color analysis, pattern-matching, pattern-recognition, or any other technique for recognizing a particular image or type of image. In particular, in an example additional operation 504 that may be performed in addition to, or in association with, operation 502, indecent or obscene material may be detected. For example, the recognition logic 112 may recognize nudity or other restricted imagery within the restricted image 108. In this case, as described in more detail below, later modification of the restricted image 108 may include addition of clothes or other modification of the restricted image, where again, and as opposed to simple blurring or blocking of the restricted image, a presentation context of the restricted image 108 may be maintained, so that an observer of the modified media asset 106 may not notice that such a modification has taken place. As is apparent, moreover, such image recognition analyses may be performed on any part of the media asset 102, including, for example, the concurrent image(s) 120, as part of the determining operation 502.

At the operation 506, facial recognition analysis is performed on a portion of the media asset. For example, the recognition logic 112 may perform a facial recognition analysis on a person within the restricted image 108, or on any other portion of the media asset.

At the operation 508, metadata associated with the restricted image is analyzed. For example, the recognition logic 112 may analyze the media asset 102 to determine and consider any associated metadata 128. For example, where the media asset includes a web page, the recognition logic 112 may analyze portions of the web page, including source code associated with the web page, that may provide information about, for example, any of the factors mentioned herein, or other factors (e.g., identity information, a capturing user or device, a setting content, a concurrently-imaged object, or any other information about the media asset 102 that may be useful to the recognition logic 112 in determining the restricted image 108). In a further example of the operation 508, at the operation 510, a closed-captioning stream that is associated with the media asset 102 is analyzed. For example, the media asset 102 may represent a television show or movie that has an associated closed-captioning stream, which may be analyzed by the recognition logic 112 to assist in making a determination regarding the restricted image 108.

At the operation 512, an attribute of the restricted image is evaluated against image-restriction criteria. For example, the recognition logic 112 may communicate with the image restriction criteria 116 in order to assist in performing recognition processes. In this case, the attribute of the restricted image 108 may include any image attribute mentioned herein, or other attributes, including a size, shape, color, identity, race, gender, physique, an associated capture device or capturing user, or any other attribute. The image restriction criteria 116 may involve, for example, any of the various criteria described herein, such as identity information, setting content, image or facial recognition analysis, metadata, and so on, as well as criteria not explicitly mentioned here. Moreover, the image restriction criteria 116 and recognition logic 112 may interoperate to determine the restricted image 108 based on any combination of these criteria, as may be determined and configured by the user 122 by way of the user interface 124.

At the operation 514, a symbol is determined within a portion of the media asset 102. For example, the symbol or text 130 may be determined by way of text-recognition software, and thereby used to determine identity or other information related to the restricted image 108.

Figure 6:
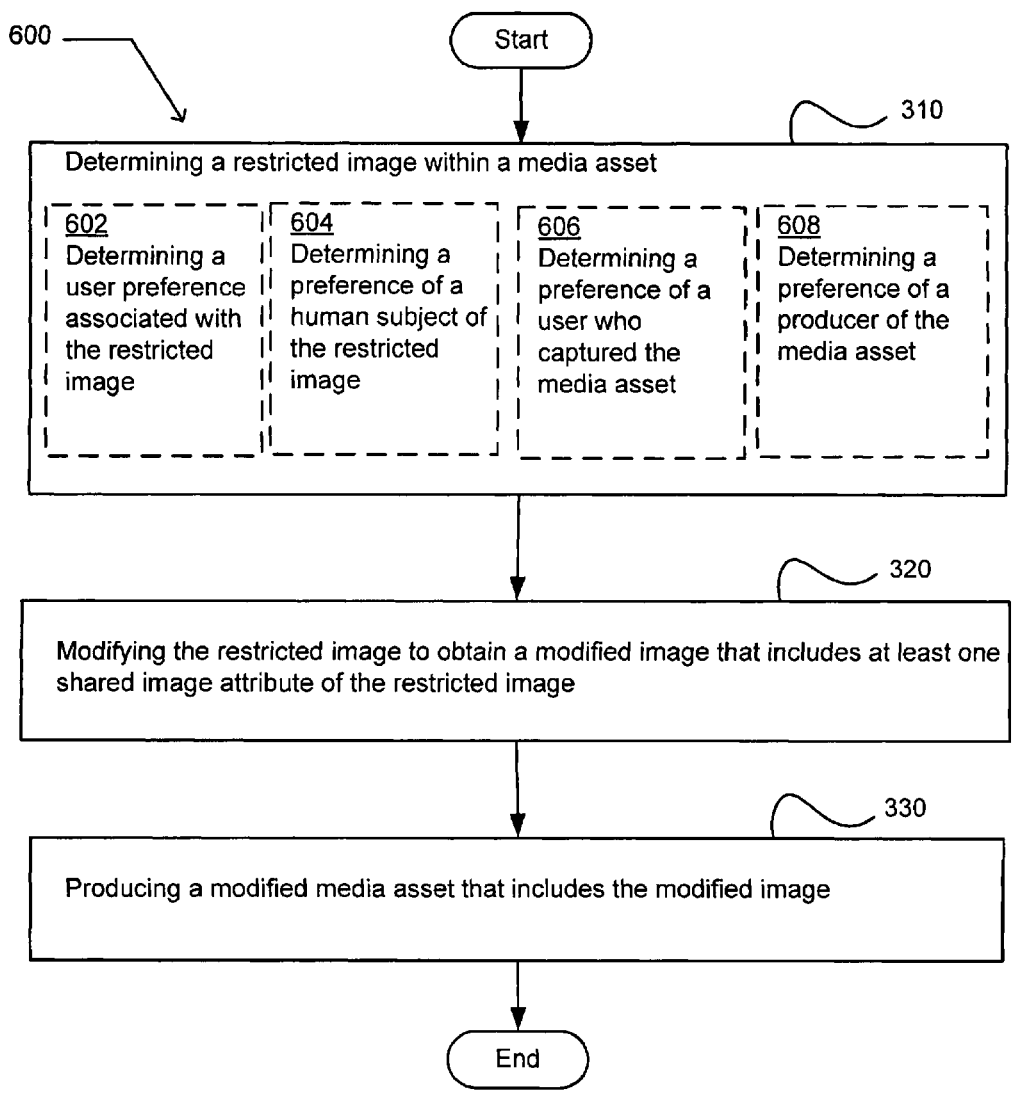
FIG. 6 illustrates another alternative embodiment of the example operational flow of FIG. 3.

FIG. 6 illustrates alternative embodiments of the example operational flow 300 of FIG. 3. FIG. 6 illustrates example embodiments where the determining operation 310 may include at least one additional operation. Additional operations may include operation 602, operation 604, operation 606, and/or operation 608.

At the operation 602, a user preference associated with the restricted image is determined. For example, the user 122 may express a preference as to whether the restricted image 108 should be restricted, and this preference may be coded into the image restriction criteria 116, e.g., again, using the interface 124. The user 122 may represent someone either capturing, transmitting, or reviewing the media asset 102, examples of which are described in more detail, below.

At the operation 604, a preference of a human subject of the restricted image is determined. For example, a public or private figure may express a desire not to be included in the media asset 102. Therefore, if such a person is, in fact, included in the media asset 102, then the recognition logic 112 may recognize the person and, perhaps based on the preference of the person as stored in the image restriction criteria 116, may anonymize the image of the person by, for example, replacing the image with one selected from the replacement images 118, or otherwise by modifying the image.

At the operation 606, a preference of a user who captured the media asset may be determined. For example, the user 122 may be a consumer who has captured several family photographs and wishes to distribute them to friends and relatives, but wishes to anonymize certain subjects of the photographs, perhaps dependent on who is to receive a particular one of the photographs. In this case and analogous cases, the user 122 may provide a preference(s) to the recognition logic 112 defining a level and/or type of anonymization to be provided, with respect to individual image subjects, and/or with respect to recipients of the modified media asset 106, or with respect to one or more other image-restriction criteria, various examples of which are provided herein.

At the operation 608, a preference of a producer of the media asset may be determined. For example, the user 122 may represent an editor of a newspaper who is reviewing a number of photographs taken by staff photographers, among which the media asset 102 may be included. In this case, although the editor may not have captured the media asset 102, he or she may be responsible for producing the modified media asset 106 using the processing system 104. As such, preferences of such a user defining a level and/or type of anonymization to be provided, with respect to the one or more criteria described herein, may be implemented by the recognition logic 112 in determining the restricted image 108 within the media asset 102.

Figure 7:
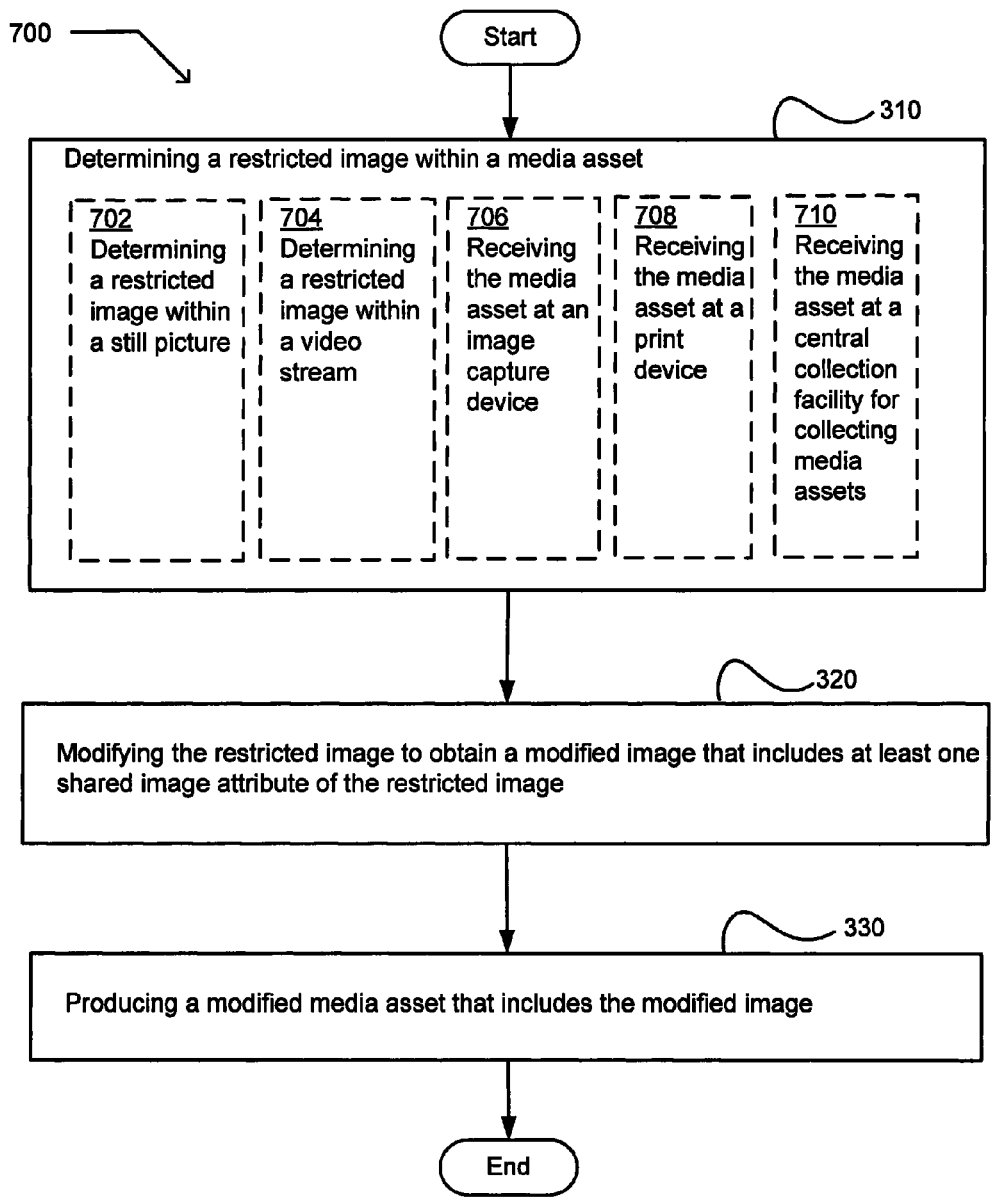
FIG. 7 illustrates another alternative embodiment of the example operational flow of FIG. 3.

FIG. 7 illustrates alternative embodiments of the example operational flow 300 of FIG. 3. FIG. 7 illustrates example embodiments where the determining operation 310 may include at least one additional operation. Additional operations may include operation 702, operation 704, operation 706, operation 708, and/or operation 710.

At the operation 702, a restricted image is determined within a still picture. For example, if the media asset 102 includes a still picture taken by a still camera, such as, for example, an embodiment of the camera 126*b* of FIG. 2, then the restricted image 108 may be determined to be any image within the still picture.

At the operation 704, a restricted image is determined within a video stream. For example, if the media asset includes any type of video, including Motion Pictures Experts Group (MPEG) video or other format, video recorded or transmitted for display on any television, computer, or other display, then the restricted image 108 may be determined as essentially any discernable element within the video. As just one example, the restricted image 108 may be determined as an image within one or more frames of the video image(s).

At the operation 706, the media asset is received at an image capture device. For example, the media asset 102 may be received at the image capture device 126*b* of FIG. 2B. As is apparent from the preceding discussion, the image capture device 126*b* may be any type of, for example, camera, digital camera, web camera (webcam) or video camera, where any of these and others may be disposed within or in association with one or more other devices, such as, for example, a cell phone or personal digital assistant (PDA).

At the operation 708, the media asset may be received at a print device. For example, the media asset 102 may be received at the print device 126*a* of FIG. 2A, such as when the media asset is downloaded thereto by way of an external computer, and/or by way of a memory card inserted into (or otherwise connected to) the print device 126*a*. In this way, for example, the print device 126*a*, as with the camera 126*b*, may be prevented from producing and/or capturing the restricted image 108.

At the operation 710, the media asset is received at a central collection facility for collecting media assets. For example, as referenced above, the processing service 208 of FIG. 2C may serve as a clearinghouse for a number of users, who may be employees of a single employer. In another example, the processing service 208 may be a commercial enterprise that received media assets from any number of disparate consumers.

Figure 8:
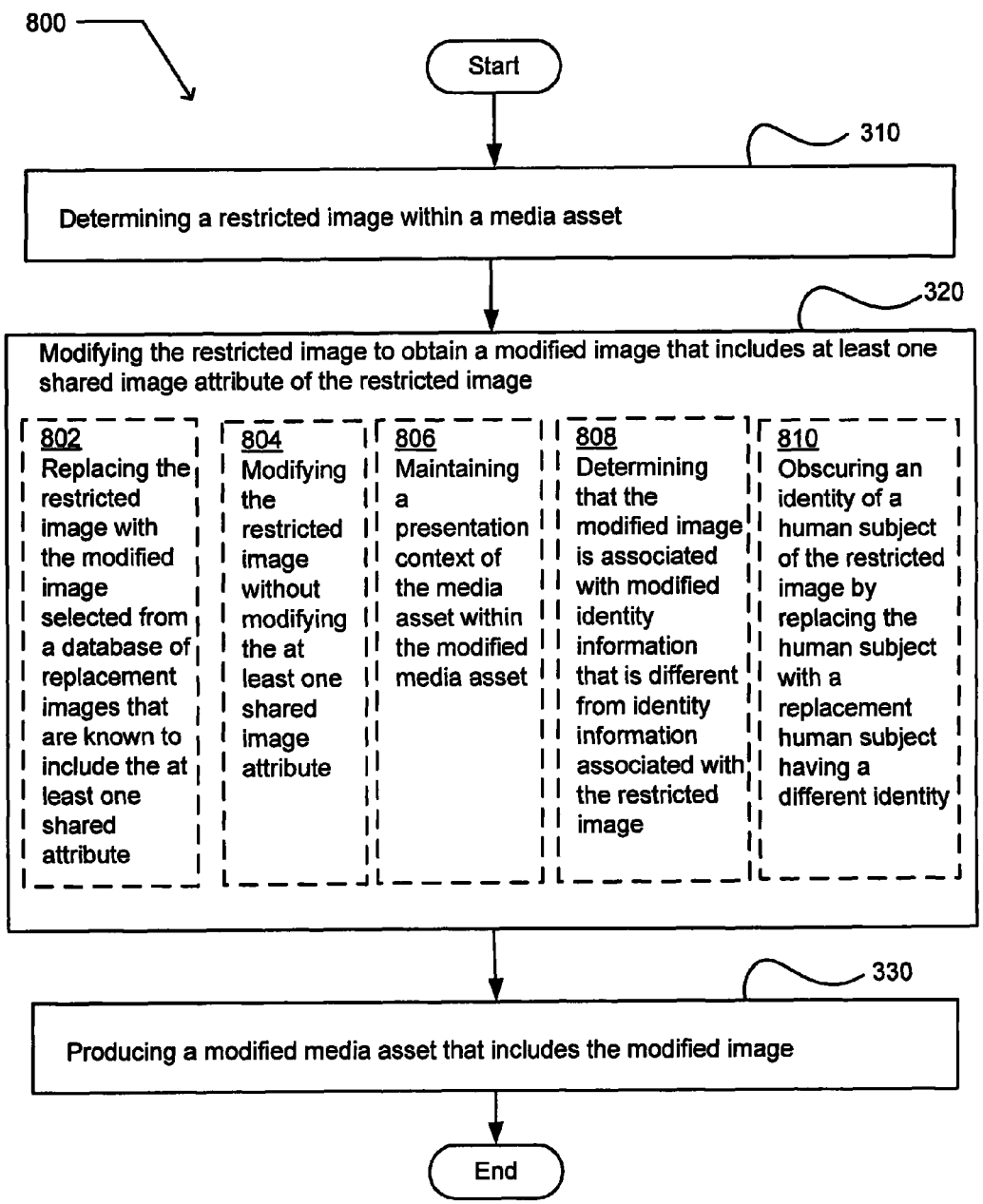
FIG. 8 illustrates an alternative embodiment of the example operational flow of FIG. 3.

FIG. 8 illustrates alternative embodiments of the example operational flow 300 of FIG. 3. FIG. 8 illustrates example embodiments where the modifying operation 320 may include at least one additional operation. Additional operations may include operation 802, operation 804, operation 806, operation 808, and/or operation 810.

At the operation 802, the restricted image is replaced with the modified image selected from a database of replacement images that are known to include the at least one shared attribute. For example, the modified image 110 may be selected from the replacement images memory 118 to overlay the restricted image 108, with appropriate scaling, warping, rotating, color-matching, or any other operation required by the modification logic 114 to insert the replacement image 110.

At the operation 804, the restricted image may be modified without modifying the at least one shared image attribute. For example, and somewhat contrary to the example just given, the restricted image may be altered without a full replacement of the image 108. For example, if the replacement image 108 includes a public figure having brown hair, a certain style of dress, or some other distinguishing characteristic, then such a characteristic may be maintained within the modified image 110. Thus, a person or other object in the restricted image 108 may be anonymized, with a minimum disruption to the media asset 102 as a whole.

At the operation 806, a presentation context of the media asset is maintained within the modified media asset. For example, not only may the concurrent image(s) 120 be maintained within the modified media asset 110, but the modified image 110 itself may be inserted with minimal or no disruption to a continuity of color, lighting, shading, clarity, or other aspects of presentation of the modified media asset.

At the operation 808, the modified image is determined to be associated with modified identity information that is different from identity information associated with the restricted image. For example, as referred to above, it may be the case that the processing system 104 is operable to anonymize a figure or object, e.g., a person, within the restricted image 108. By ensuring that the identity information (e.g., name, facial features, occupation, or any other identity information) associated with the modified image 110 is different from identity information associated with the restricted image 108, at least one aspect of the anonymization of the figure is provided.

At the operation 810, an identity of a human subject of the restricted image is obscured by replacing the human subject with a replacement human subject having a different identity. For example, and similarly to some of the examples already given, a human subject in the restricted image 108 of FIG. 1 may be replaced, perhaps using an image from the replacement images database 118, where the modification logic 114 is operable to determine the identity of the human subject, perhaps in conjunction with the image restriction criteria 116 and/or the recognition logic 112.

Figure 9:
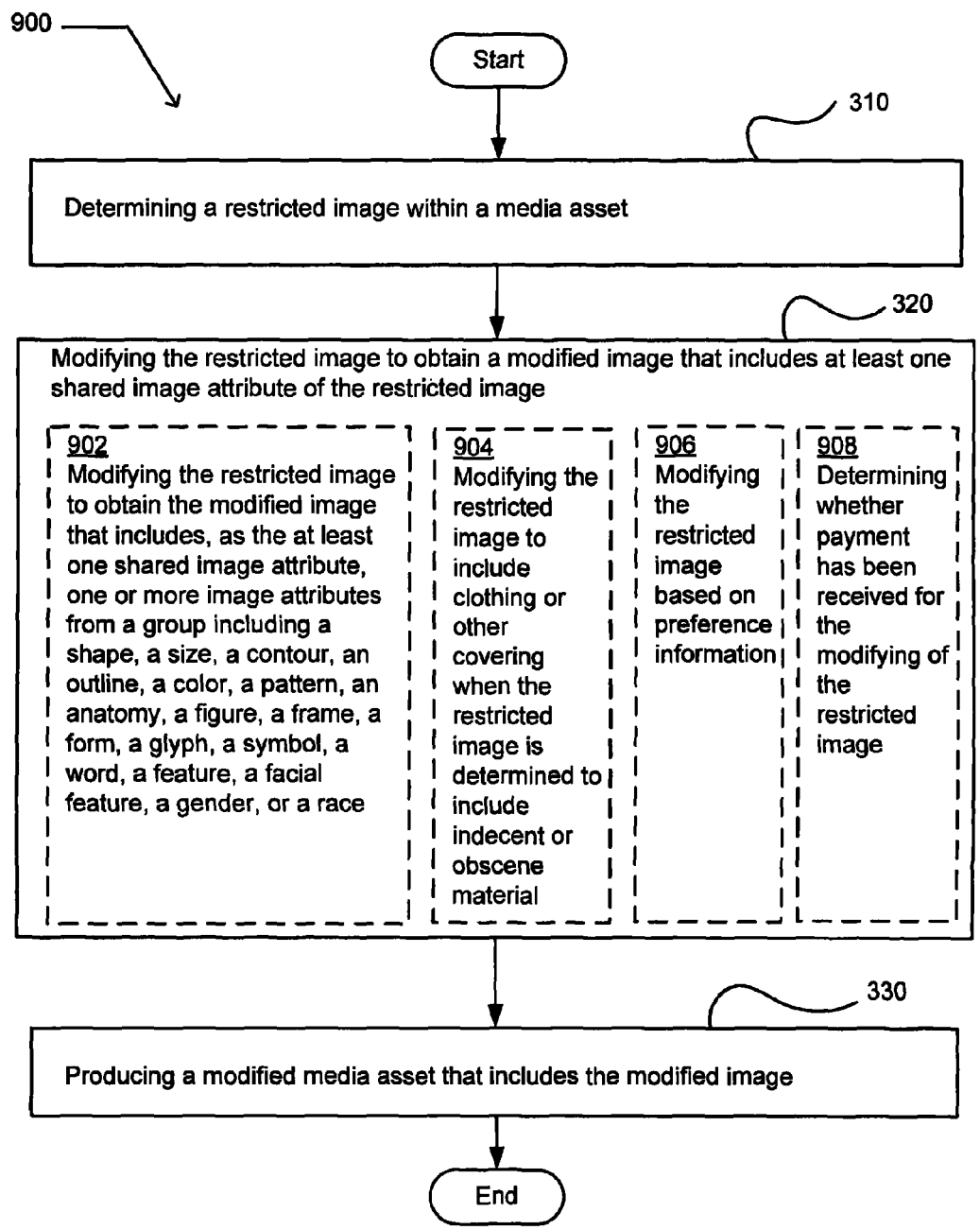
FIG. 9 illustrates an alternative embodiment of the example operational flow of FIG. 3.

FIG. 9 illustrates alternative embodiments of the example operational flow 300 of FIG. 3. FIG. 9 illustrates example embodiments where the modifying operation 320 may include at least one additional operation. Additional operations may include operation 902, operation 904, operation 906, and/or operation 908.

At the operation 902, the restricted image is modified to obtain the modified image that includes, as the at least one shared image attribute, one or more image attributes from a group including a shape, a size, a contour, an outline, a color, a pattern, an anatomy, a figure, a frame, a form, a glyph, a symbol, a word, a feature, a facial feature, a gender, or a race. For example, the recognition logic 112 may access the image restriction criteria 116 to determine one or more of these criteria, or other criteria, to determine the restricted image 108, as referenced above, and then the modification logic 114 may, perhaps in association with the replacement images 118, determine the modified image 110 in which at least one of the above attributes shared between the modified image 110 and the restricted image 108.

At the operation 904, the restricted image is modified to include clothing or other covering when the restricted image is determined to include indecent or obscene material. For example, if the media asset 102 includes a website that includes a restricted image 108 that includes nudity, then the recognition logic may so recognize, and the modification logic 114 may add clothing or other covering to the restricted image 108. In this way, a general appearance of the website may be maintained.

At the operation 906, the restricted image may be modified based on preference information. For example, a number of types of preference information are described above, including preferences of the user who captured or created the media asset 102, or preferences of a human subject of the media asset 102, or preferences of a user who is in charge of producing, storing, transmitting, or delivering the media asset 102. Although such preference information was described above in terms of determining the restricted image 108, the operation 906 and examples provided herein also illustrate that such preferences, and other preferences, also may be used to determine a type or extent of modification that is performed by, for example, the modification logic 114.

At the operation 908, it is determined whether payment has been received for the modifying of the restricted image. For example, the user 122 may access the processing service 208 as part of a paid service in which the user 122 obtains modification of the media asset 102 in exchange for payment.

In this context, payment may refer generally to any type of monetary compensation, and/or non-monetary compensation, and/or economic value exchange. Such payment may, for example, occur between any pair of entities and/or other group of entities. By way of example and not limitation, a payment may include a non-monetary payment, such as a credit or coupon that may be exchanged for goods or services, a reduced or eliminated cost to a user or users for related or non-related goods or services. In another example, a payment may include granting a party certain rights or permissions as payment, such as information-related permissions. The user also may accept cash or cash-equivalents as payment from the provider for providing such entitlements, rights, or permissions. Thus, by providing and/or receiving monetary or non-monetary value, in an amount that may be designated as part of an agreement between the relevant parties, the parties may gain advantages and benefits that are mutually acceptable to both.

Figure 10:
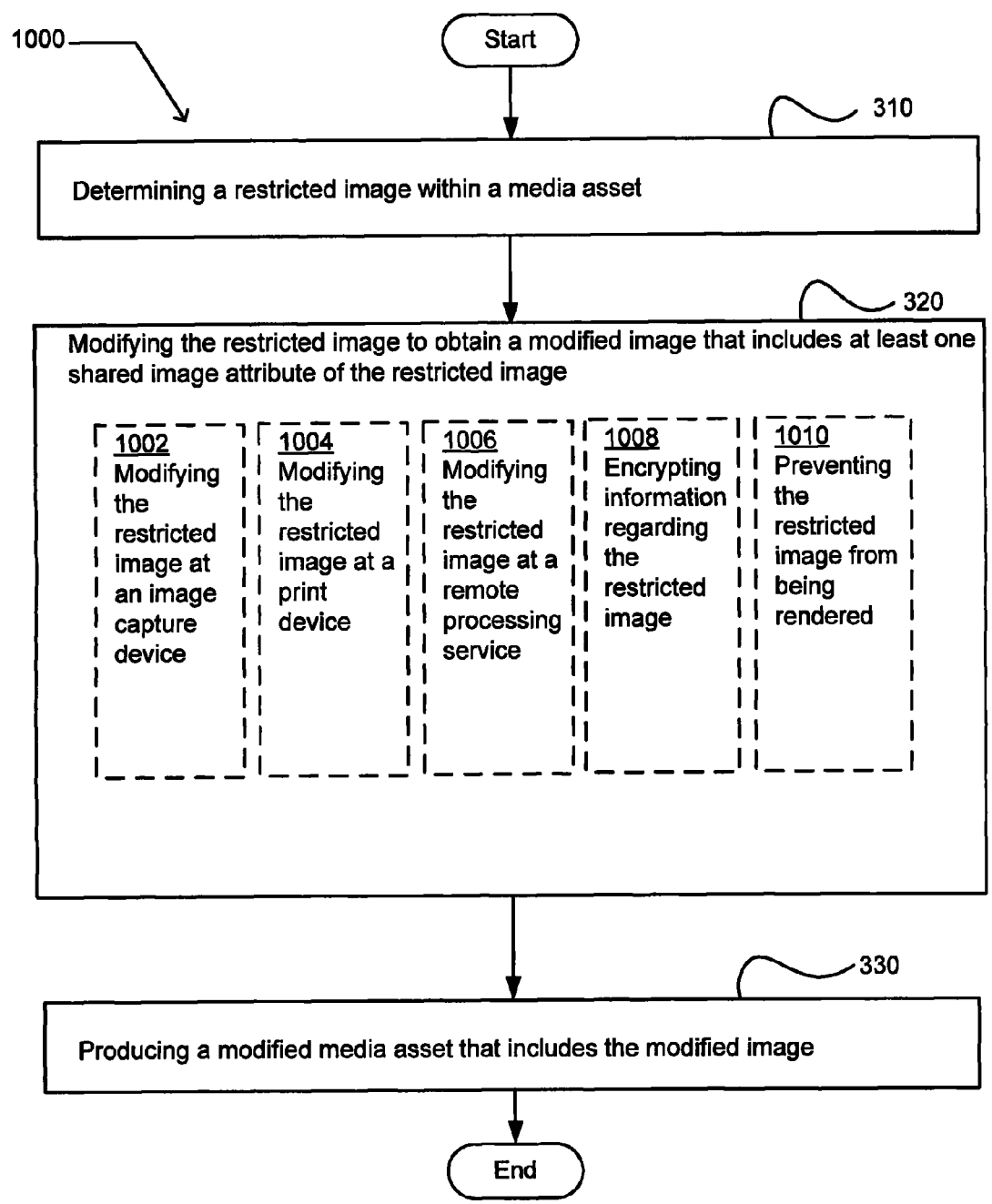
FIG. 10 illustrates an alternative embodiment of the example operational flow of FIG. 3.

FIG. 10 illustrates alternative embodiments of the example operational flow 300 of FIG. 3. FIG. 10 illustrates example embodiments where the modifying operation 320 may include at least one additional operation. Additional operations may include operation 1002, operation 1004, operation 1006, operation 1008, and/or operation 1010.

At the operation 1002, the restricted image is modified at an image capture device. For example, the restricted image 108 is modified at the processing system 104 within the camera 126b of FIG. 2B. Further, at the operation 1004, the restricted image is modified at a print device. For example, the restricted image 108 may be modified at the processing system 104 by the print device 126a of FIG. 2A. Further, at the operation 1006, the restricted image may be modified at a remote processing service. For example, the restricted image 108 may be modified at a processing system 104 of the processing service 208 of FIG. 2C.

At the operation 1008, information regarding the restricted image may be encrypted. For example, the modification logic 114 may be operable to encrypt the media asset 102 and/or the restricted image 108, prior to, or in conjunction with, producing the modified media asset 110. For example, the encrypted restricted image 108 may be aggregated with the modified media asset for output, or the encrypted restricted image 108 may be stored remotely from the modified media asset 110.

At the operation 1010, the restricted image is prevented from being rendered. For example, the modification logic 114 may corrupt information regarding the restricted image 108 such that the information is not, or can not be, stored for later access. In this way, for example, the anonymity of a person in the restricted image 108 may be maintained in full confidence.

Figure 11:
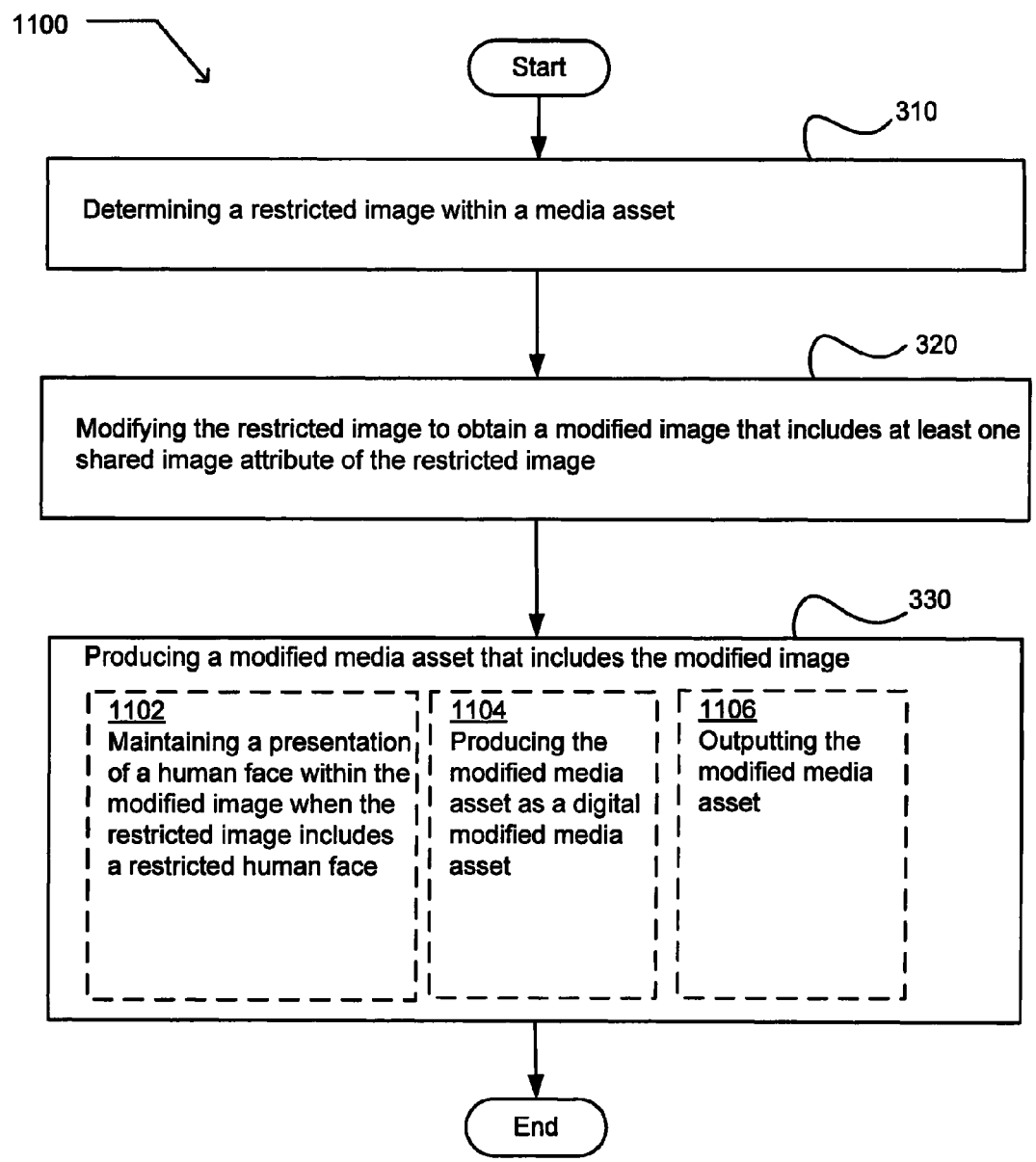
FIG. 11 illustrates an alternative embodiment of the example operational flow of FIG. 3.

FIG. 11 illustrates alternative embodiments of the example operational flow 300 of FIG. 3. FIG. 11 illustrates example embodiments where the producing operation 330 may include at least one additional operation. Additional operations may include operation 1102, operation 1104, and/or operation 1106.

At the operation 1102, a presentation of a human face is maintained within the modified image when the restricted image includes a restricted human face. For example, if the restricted image 108 includes a human face of a public figure or some other individual who has requested some level of anonymity, then that face may be replaced or otherwise modified, perhaps using the replacement images 118, by the modification logic 114.

At the operation 1104, the modified media asset is produced as a digital modified media asset. For example, the modification logic 114 may be operable to output the modified media asset 110 as a digital media asset.

At the operation 1106, the modified media asset is output. For example, the modified media asset 110 may be output to the user 122, who, as is apparent from the above discussion, may represent someone who has captured the media asset, someone who is reviewing the media asset, someone who is receiving the media asset, or anyone else who may have cause to receive the media asset.

FIG. 12 illustrates a partial view of an exemplary computer program product 1200 that includes a computer program 1204 for executing a computer process on a computing device. An embodiment of the exemplary computer program product 1200 is provided using a signal bearing medium 1202, and may include at least one of one or more instructions for determining a restricted image within a media asset, one or more instructions for modifying the restricted image to obtain a modified image that includes at least one shared image attribute of the restricted image, and one or more instructions for producing a modified media asset that includes the modified image. The one or more instructions may be, for example, computer executable and/or logic-implemented instructions. In one implementation, the signal-bearing medium 1202 may include a computer-readable medium 1206. In one implementation, the signal-bearing medium 1202 may include a recordable medium 1208. In one implementation, the signal-bearing medium 1202 may include a communications medium 1210.

Figure 13:
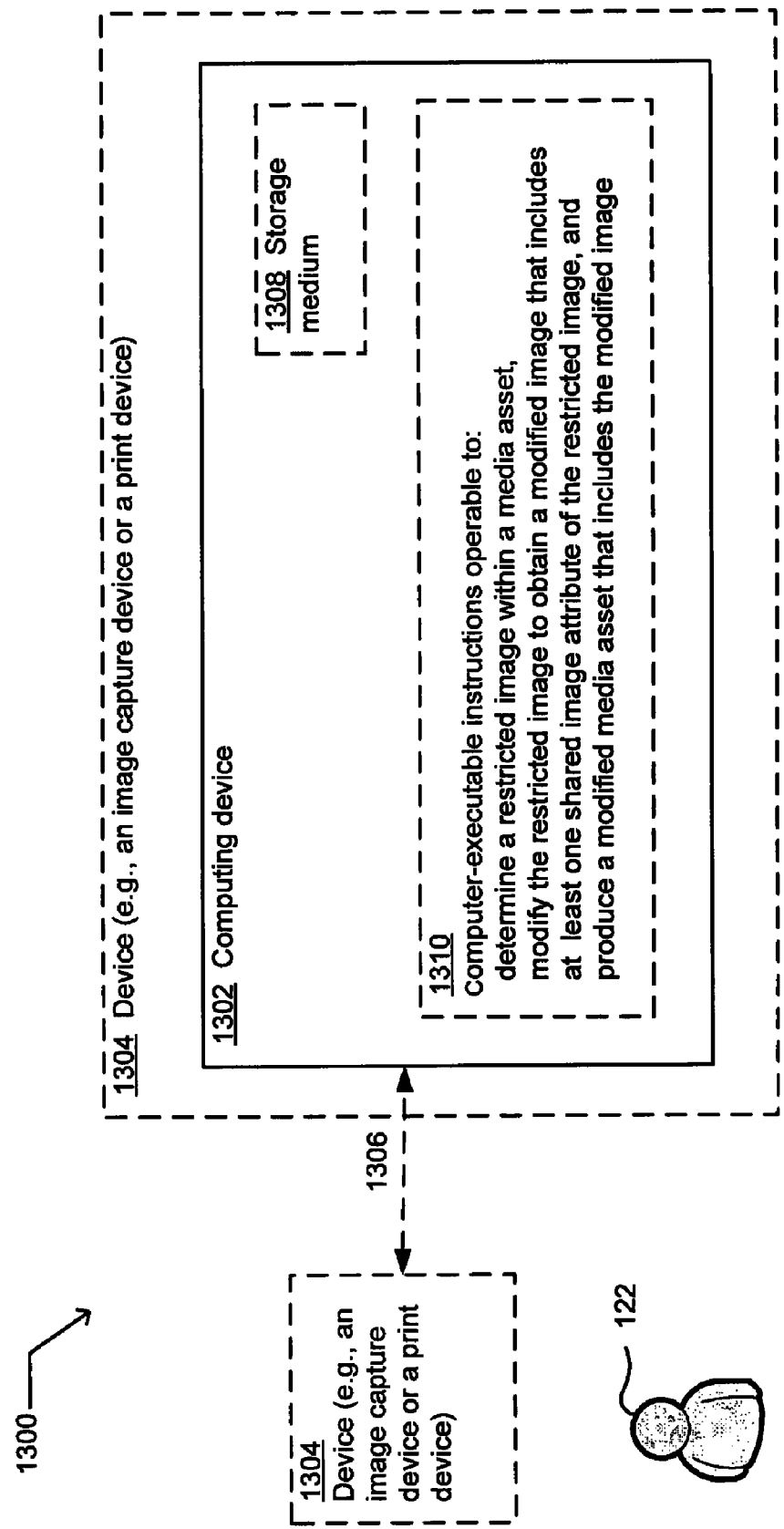
FIG. 13 illustrates an example device in which embodiments may be implemented.

FIG. 13 illustrates an exemplary system 1300 in which embodiments may be implemented. The system 1300 includes a computing system environment. The system 1300 also illustrates the user 122 using a user device 1304, which is optionally shown as being in communication with a computing device 1302 by way of an optional coupling 1306. The optional coupling 1306 may represent a local, wide-area, or peer-to-peer network, or may represent a bus that is internal to a computing device (e.g., in example embodiments in which the computing device is contained in whole or in part within the user device 1304. A storage medium 1308 may be any computer storage media.

The computing device 1302 includes an operability to receive the media asset 102. The computing device 1302 also includes computer executable instructions 1310 that when executed on the computing device 1302 causes the computing device 1302 to determine a restricted image within a media asset, modify the restricted image to obtain a modified image that includes at least one shared image attribute of the restricted image, and produce a modified media asset that includes the modified image.

As referenced above and as shown in FIG. 13, in some examples, the computing device 1302 may optionally be contained in whole or in part within the user device 1304, and may include the image-capture device (camera) 126b or the printer 126a. For example, the user device 1304 may include a cell phone, and the computing device 1302 may be included as part of a digital camera included within the cell phone. In another example embodiment, the computing device 1302 is operable to communicate with the user device 1304 associated with the user 122 to receive the media asset 102 from the user 122 and to provide the modified media asset 106 to the user 122.

Figure 14:
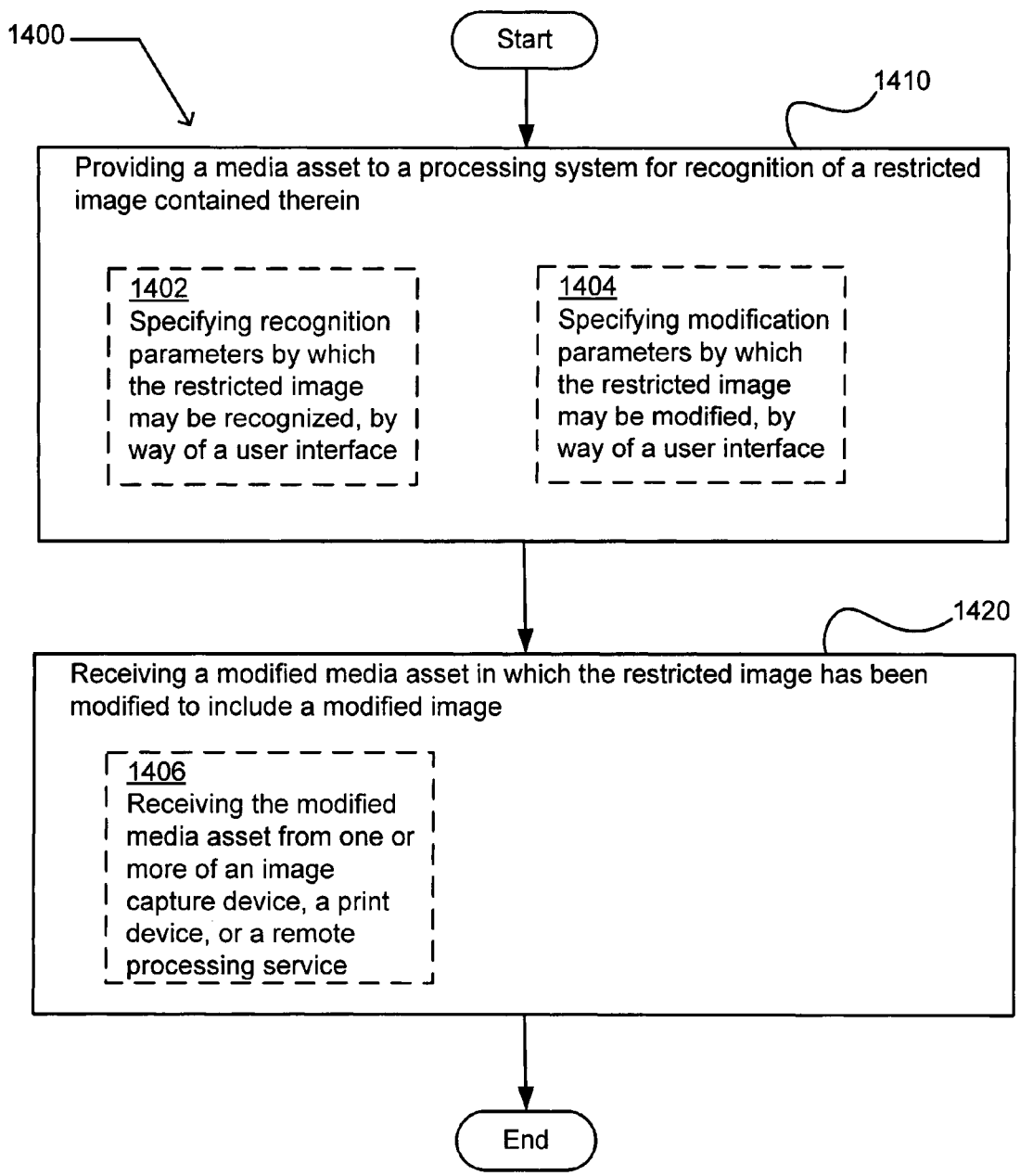
FIG. 14 illustrates an operational flow representing example operations by which a user receives a modified media asset that includes a modified image.

FIG. 14 illustrates an operational flow 1400 representing example operations by which the user 122 obtains the modified media asset 106 that includes the modified image 110. At operation 1410, a user provides a media asset to a processing system for recognition of a restricted image contained therein. For example, the user 122 may provide the media asset 102 to the processing system 104 for recognition of the restricted image 108 by the recognition logic 112. At operation 1420, a modified media asset is received in which the restricted image has been modified to include a modified image. For example, the modified media asset 106 may be received in which the restricted image 108 has been modified to include the modified image 110.

The operation 1410 may include one or more additional operations. For example, the operation 1410 may include an operation 1402 in which recognition parameters by which the restricted image may be recognized are specified by way of a user interface. For example, the user 122 may set parameters of the recognition logic 112.

Also, the operation 1410 may include an operation 1404, in which modification parameters by which the restricted image may be modified are specified by way of a user interface. For example, the user 122 may specify parameters of the modification logic 114, by way of the user interface 124.

The operation 1420 may include one or more operations. For example, the operation 1420 may include an operation 1406, in which the modified media asset is received from one or more of an image capture device, a print device, or a remote processing service. For example, the user 122 may receive the modified media asset 106 by way of the print device 126a, the camera 126b, or the remote processing system 208.

Of course, the user 122 may receive the modified media asset 106 in other ways. For example, the modified media asset 106 may be received as stored on a memory device. For example, the user may capture an audio and/or visual file using an image capture device or by way of downloading from a website or other location. The user may store the resulting digital file on a memory card, memory stick, CD, DVD, or other storage media.

Figure 15:
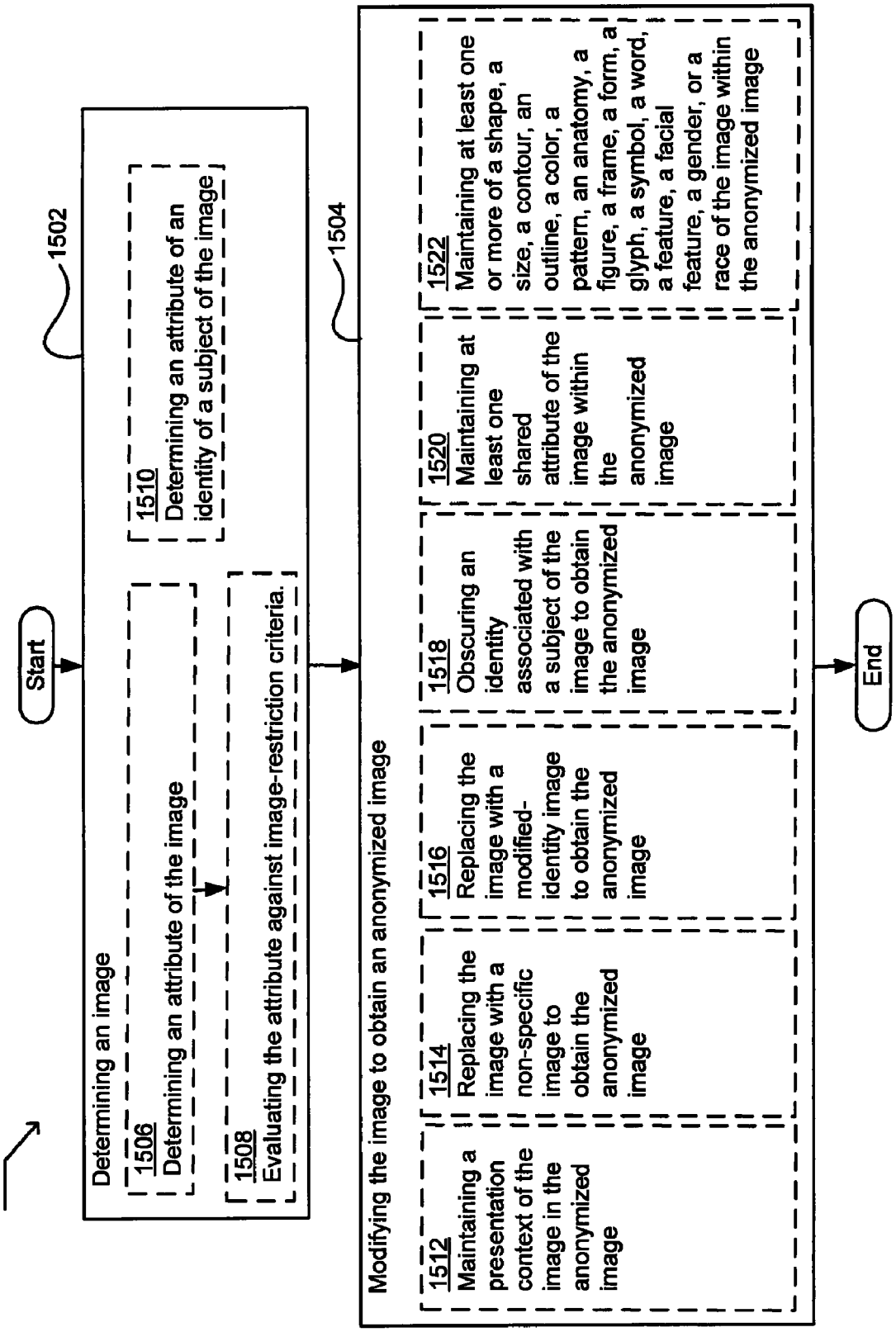
FIG. 15 illustrates an operational flow representing example operations that produce an anonymized image.

FIG. 15 illustrates an operational flow 1500 representing example operations that produce the modified media asset 106. After a start operation, the operational flow 1500 moves to a determining operation 1502 where an image is determined. For example, the image 108 may be determined to exist within the media asset 102. At the operation 1504, the image is modified to obtain an anonymized image. For example, as described in various contexts above, one image may be altered or changed such that a subject of the image is protected from inclusion therein, yet without alerting a user in a normal or anticipated use of the image from noticing the protection.

The operational flow 1500 may include additional operations. For example, the operational flow 1500 may include operations 1506, 1508, 1510, 1512, 1514, 1516, 1518, 1520, and 1522.

At the operations 1506 and 1508, respectively, and as an alternative embodiment of the determining operation 1502, an attribute of the image is determined, and the attribute is evaluated against image-restriction criteria. For example, the recognition logic 112 may determine an attribute(s) of the media asset 102, or of the image 108 itself, including any of the numerous attributes discussed herein, or others not specifically discussed. Then, the recognition logic 112 may evaluate the attribute against the image restriction criteria 116.

At the operation 1510, an attribute of an identity of a subject of the image is determined. For example, a subject of the image 108 may be a public figure, or someone else who has specified (or about whom it has been specified) that any or certain images of him or herself should be anonymized. The recognition logic 112 may thus determine an attribute of an identity of this person, including those mentioned herein such as name, occupation, physical trait, or others.

The modifying operation 1504 may include alternative embodiments, as well. For example, at the operation 1512, a presentation context of the image in the anonymized image is preserved. For example, the modified image 110 may be presented with a same or similar clarity, resolution, contrast, color, or balance as the image 108 (as opposed to, e.g., simply blocking out or blurring the image 108), and/or the concurrent image(s) 120 may be maintained.

At the operation 1514, the image may be replaced with a non-specific image to obtain the anonymized image. For example, a non-specific image, e.g., an image that is not specific to the media asset 102, and/or to a subject of the image 108, may be selected from the replacement images 118.

At the operation 1516, the image may be replaced with a modified-identity image to obtain the anonymized image. For example, the modified image 110 may be associated with a subject having an identity different from that of an identity of the image 108.

At the operation 1518, an identity associated with a subject of the image may be obscured to obtain the anonymized image. For example, an identity of the subject of the image 108 may be obscured, as opposed to the image 108 itself being obscured in the sense of being blocked out, covered, or blurred.

At the operation 1520, at least one shared attribute of the image may be maintained within the anonymized image. Also, at the operation 1522, at least one or more of a shape, a size, a contour, an outline, a color, a pattern, an anatomy, a figure, a frame, a form, a glyph, a symbol, a word, a feature, a facial feature, a gender, or a race of the image may be maintained within the anonymized image. For example, any of the above attributes, or combinations thereof, or other attributes, may be maintained within the anonymized image 110 with respect to the image 108.

Figure 16:
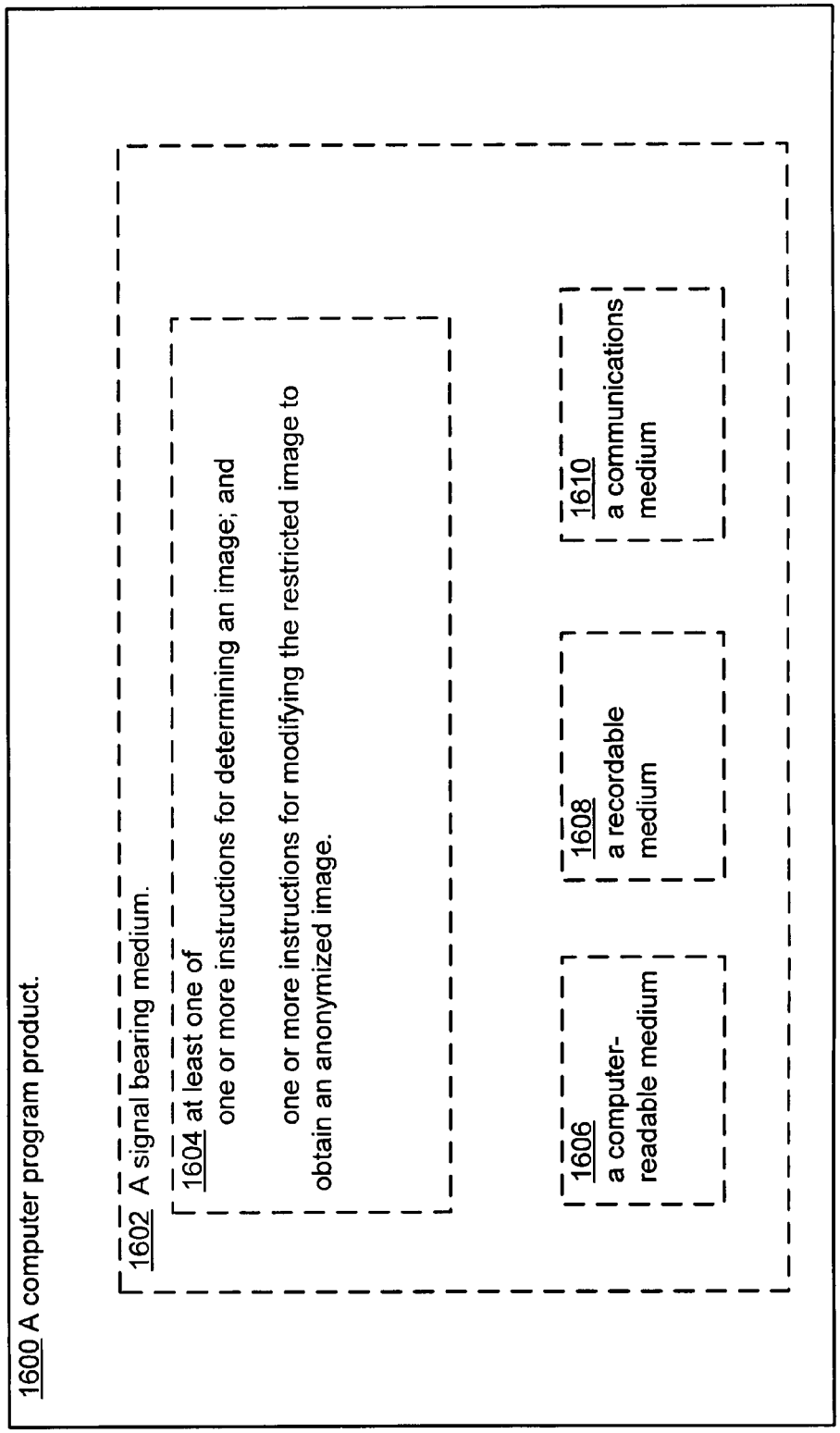
FIG. 16 illustrates a partial view of an example computer program product that includes a computer program for executing a computer process on a computing device.

FIG. 16 illustrates a partial view of an exemplary computer program product 1600 that includes a computer program 1604 for executing a computer process on a computing device. An embodiment of the exemplary computer program product 1600 is provided using a signal bearing medium 1602, and may include at least one of one or more instructions for determining an image, and one or more instructions for modifying the image to obtain an anonymized image. The one or more instructions may be, for example, computer executable and/or logic-implemented instructions. In one implementation, the signal-bearing medium 1602 may include a computer-readable medium 1606. In one implementation, the signal-bearing medium 1602 may include a recordable medium 1608. In one implementation, the signal-bearing medium 1602 may include a communications medium 1610.

Figure 17:
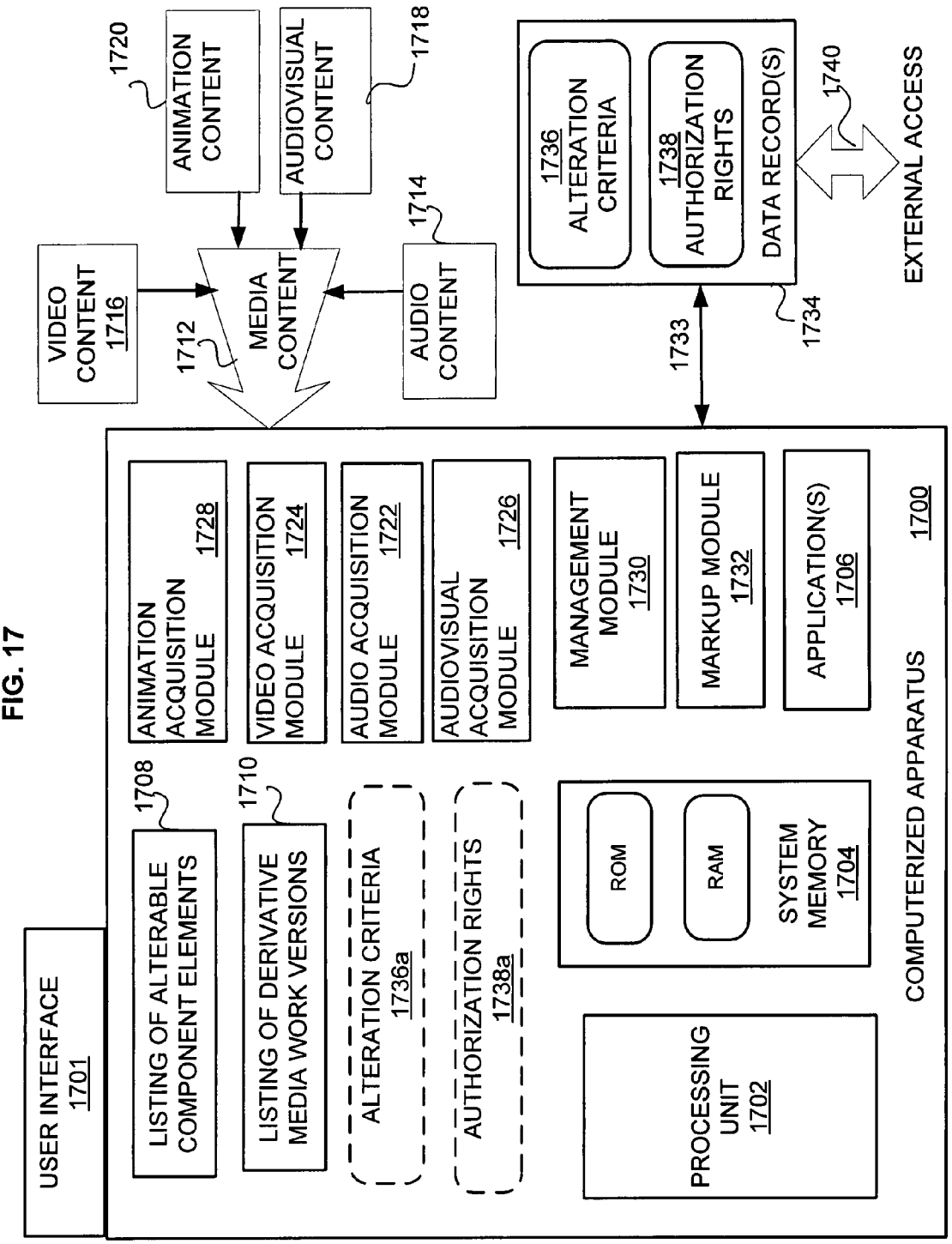
FIG. 17 is a schematic block diagram showing an exemplary embodiment for implementing possible content alteration of a media work.

Referring to the schematic block diagram of FIG. 17, an exemplary embodiment may include computerized apparatus 1700 having a processing unit 1702, system memory 1704, and one or more program applications 1706. Access may be provided via user interface 1701. Possible data records may include a listing of alterable component elements 1708 of a media work, and a listing of derivative media work versions 1710.

Media content 1712 available to the computerized apparatus 1700 may include audio content 1714, video content 1716, audiovisual content 1718, and animation content 1720. Such content may be received by audio acquisition module 1722, video acquisition module 1724, audiovisual acquisition module 1726, and animation acquisition module 1728. The various component elements and designated aspects of the media content 1712 may be manipulated and processed by management module 1730 and markup module 1732 in accordance with applicable criteria and authorization procedures.

Additional separate data records 1734 illustrated in FIG. 17 may be accessible to computerized apparatus 1700 through a communication link 1733. Such additional data records 1734 may also be available via an external access link 1740. Pertinent informational data records for one or more derivative versions of a composite media work may include records regarding alteration criteria 1736 and records regarding authorization rights 1738. It will be understood that various storage locations may be provided for pertinent information records related to possible alteration of the composite media work. In some instances the computerized apparatus 1700 may include local data records for alteration criteria 1736*a* and local records for authorization rights 1738*a* as well as additional local data records, depending on the circumstances.

Figure 18:
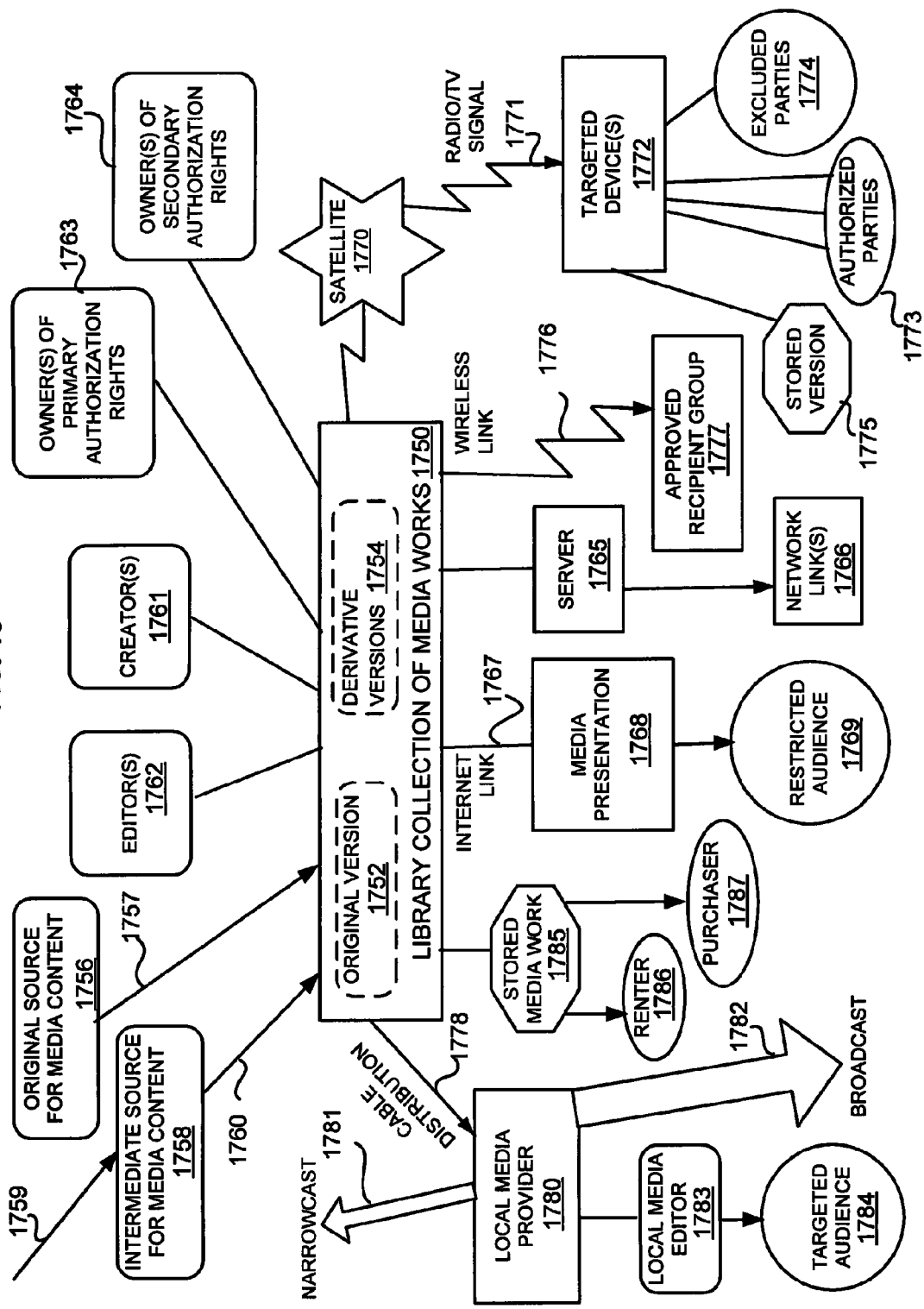
FIG. 18 is a schematic representation of various exemplary options for distribution of derivative versions of media works that incorporate content alterations.

The schematic representation of FIG. 18 illustrates various possible embodiment features for a library collection of media works 1750 that may include an original version 1752 of a media work as well as derivative versions 1754. Such media works may have capability for the addition, deletion, modification, and replacement of media element components as well as one or more designated aspects of the media content, as disclosed in more detail herein.

Some media works may be provided from an original source for media content 1756 via communication link 1757. In some instances a media work may have originated elsewhere and be transferred (e.g., delivered, downloaded, etc.) as shown by arrow 1759 to an intermediate source for media content 1758, and ultimately via communication link 1760 to be included in the library collection of media works 1750. Of course the library collection is shown schematically as a centralized block only for illustrative purposes, and can be collectively or randomly dispersed as deemed appropriate.

Organization and categorization of media content for purposes of possible alteration as well as implementation of such content alteration may be done by content creators 1761, editors 1762 and the like. In many instances it will be necessary to have direct or indirect participation by one or more owners of primary authorizations rights 1763 regarding an existing media work. It may also be necessary to have direct or indirect participation by one or more owners of secondary authorization rights 1764 regarding substitute content (e.g., already incorporated, scheduled for possible incorporation, in process of being created or selected for incorporation, etc.) for a derivative version of the media works.

For purposes of clarity, it will be understood that a "derivative version" as used herein is deemed to include all derived or iterative versions of a published or unpublished work including so-called "original" or "master" versions of a media work.

As further illustrated in FIG. 18, it will be understood that there are many possible embodiment features related to possible distribution channels for derivative versions that incorporate content alterations or are candidates for content alterations. For example, such distribution may be implemented by a server 1765 having one or more network links 1766. Another possible distribution channel may be provided by an Internet link 1767 for a media presentation 1768 to a restricted audience 1769.

A further possible distribution channel may be provided by satellite transmission 1770 of a radio or television signal 1771 to one or more targeted devices 1772. Such targeted devices 1772 may provide further controlled distribution to authorized parties 1773 as well as prevent distribution (e.g., access) to excluded parties 1774. In some instances a stored version 1775 may be approved and appropriate for future availability.

A wireless link 1776 may be available in some locations for distribution to an approved recipient group 1777. A further distribution channel may include cable distribution 1778 to a local media provider 1780 for re-transmittal via a narrowcast 1781 or a broadcast 1782 to potential viewers or listeners. In some instances additional content alteration of component elements or designated aspects may be accomplished by a local media editor 1783 for further distribution to a targeted audience 1784.

Another possible distribution technique may be implemented by making a stored media work 1785 available to a renter 1786 or a purchaser 1787 in accordance with applicable criteria and authorization rights. Of course, other distribution channels and techniques may be implemented, and the examples shown and described are not intended to be limiting.

Figure 19:
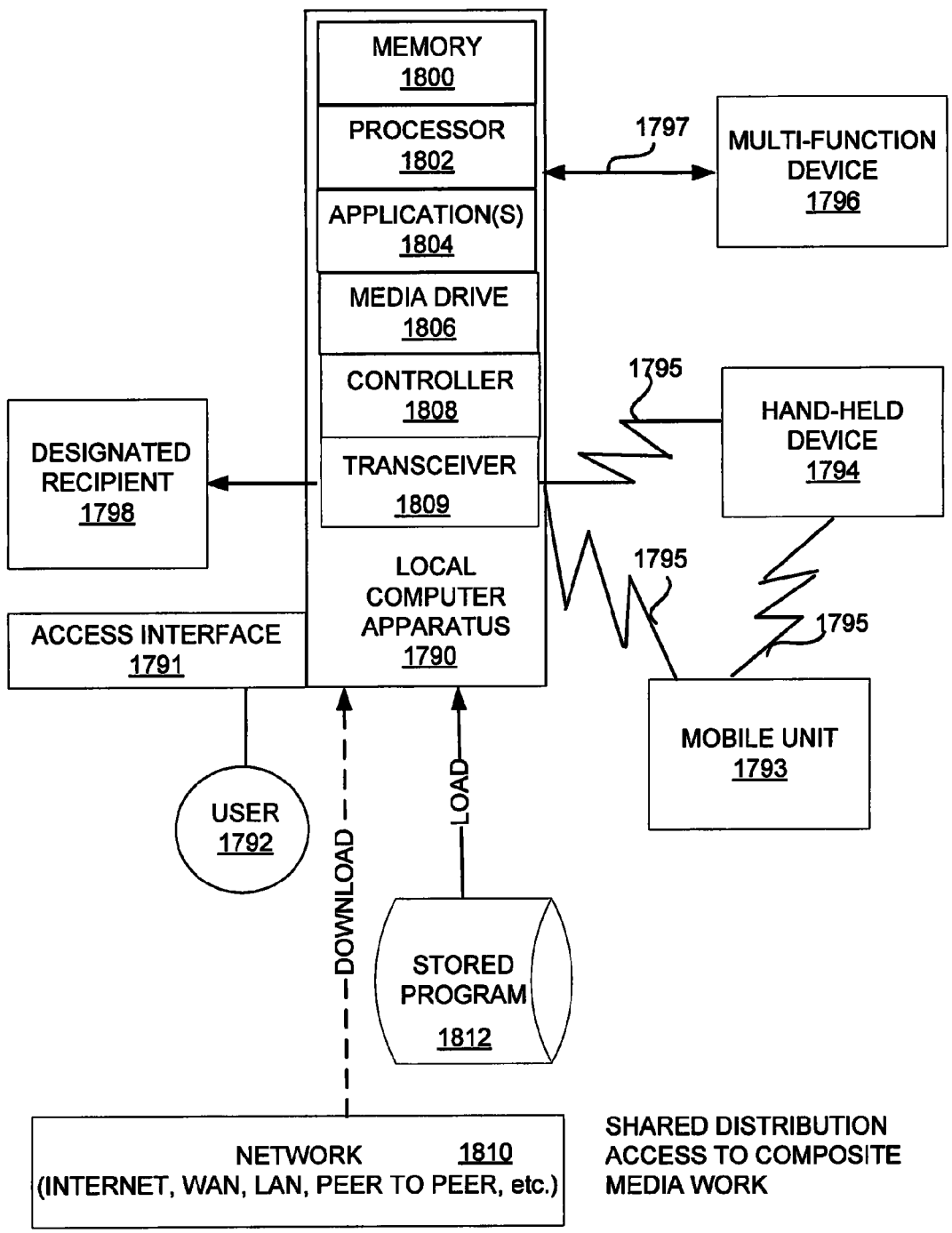
FIG. 19 is a schematic block diagram showing an exemplary embodiment that provides shared access to derivative versions of media works.

Referring to the schematic block diagram of FIG. 19, other exemplary features that may be implemented in connection with shared distribution access to composite media works having alterable content. For example, local computer apparatus 1790 may have an access interface 1791 for a user 1792. Additional features of computer apparatus 1790 may include memory 1800, processor 1802, one or more applications 1804, media drive 1806, controller 1808, and transceiver 1809.

The composite media work may already reside in the local computer apparatus 1790 or may be available via network 1810 (e.g., Internet, WAN, LAN, Peer to Peer, etc.). In some instances the composite media work may be partially or wholly available by loading a stored program 1812.

Shared distribution (e.g., access) of the composite media work may be implemented via wireless links 1795 to mobile unit 1793 and to hand-held device 1794. Other shared distribution may be accomplished via communication link 1797 to multi-function device 1796, and also via a separate communication link to a designated recipient 1798. Other types of shared distribution accessibility may be implemented depending on the circumstances, and in some instances depending on the available communication terminals approved by the owners of primary or secondary authorization rights for the derivative version of the composite media work.

Figure 20:
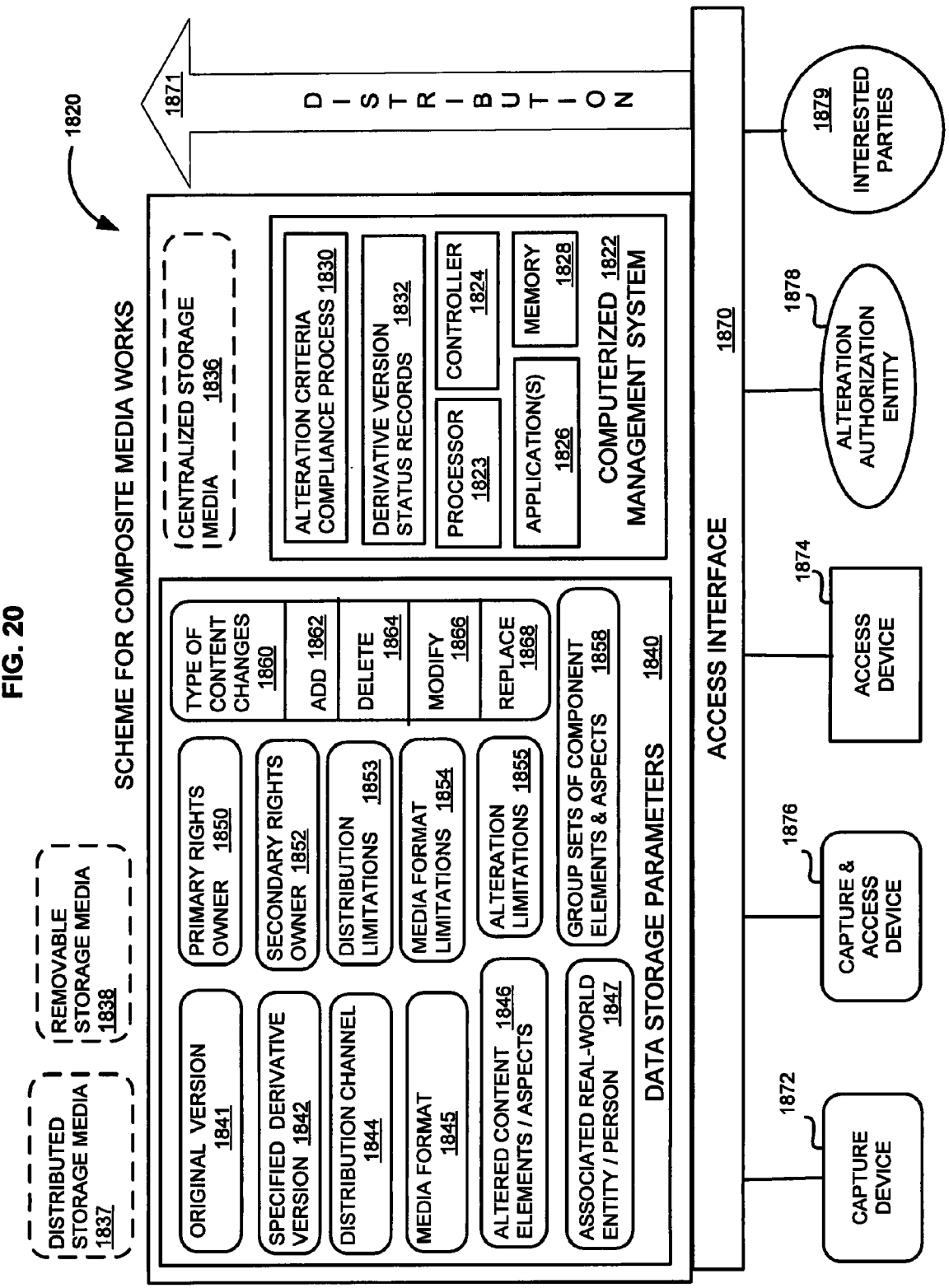
FIG. 20 is a schematic block diagram showing exemplary features of an embodiment scheme for management of media works that incorporate content alterations.

The schematic block diagram of FIG. 20 illustrates a possible embodiment 1820 of an exemplary scheme for composite media works capable of altered content. A computerized management system 1822 may include processor 1823, controller 1824, one or more applications 1826, and memory 1828. Additional modules may implement an alteration criteria compliance process 1830 and may maintain derivative version status records 1832.

There are many possible storage arrangements that may include but are not limited to centralized storage media 1836, distributed storage media 1837, and removable storage media 1838.

Data storage parameters 1840 may be organized with respect to an original media work version 1841, a specified derivative version 1842, a distribution channel 1844, and a media format 1845. Additional possible storage parameters may be organized to include informational data with respect to altered content elements or aspects 1846 and with respect to associated real-world entities or persons 1847.

Possible informational data records may relate to a primary rights owner 1850, a secondary rights owner 1852, distribution limitations 1853, media format limitations 1854, and alteration limitations 1855. Other informational data records may relate to group sets of component elements and aspects 1858 for the composite media works capable of altered content.

Further possible data storage parameter records for some embodiments may relate to specified types of content changes 1860 such as the capability to add 1862, delete 1864, modify 1866, and replace 1868 alterable component elements or designated aspects that are feasible for alteration.

As illustrated in FIG. 20, an access interface 1870 may provide a communication link to a capture device 1872, access device 1874, and capture/access device 1876. Additional links may be provided for an alteration authorization entity 1878 as well as for interested parties 1879 that may need read and/or write accessibility to the computerized management system 1822 as well as to the informational data represented by the data storage parameters 1840.

It will be understood by those skilled in the art that appropriate distribution 1871 of various altered or alterable derivative versions of the composite media works may be initiated, controlled, or monitored by the computerized management system 1822. In some instances oversight or interaction or monitoring may be provided by external communications via the access interface 1870.

Figure 21:
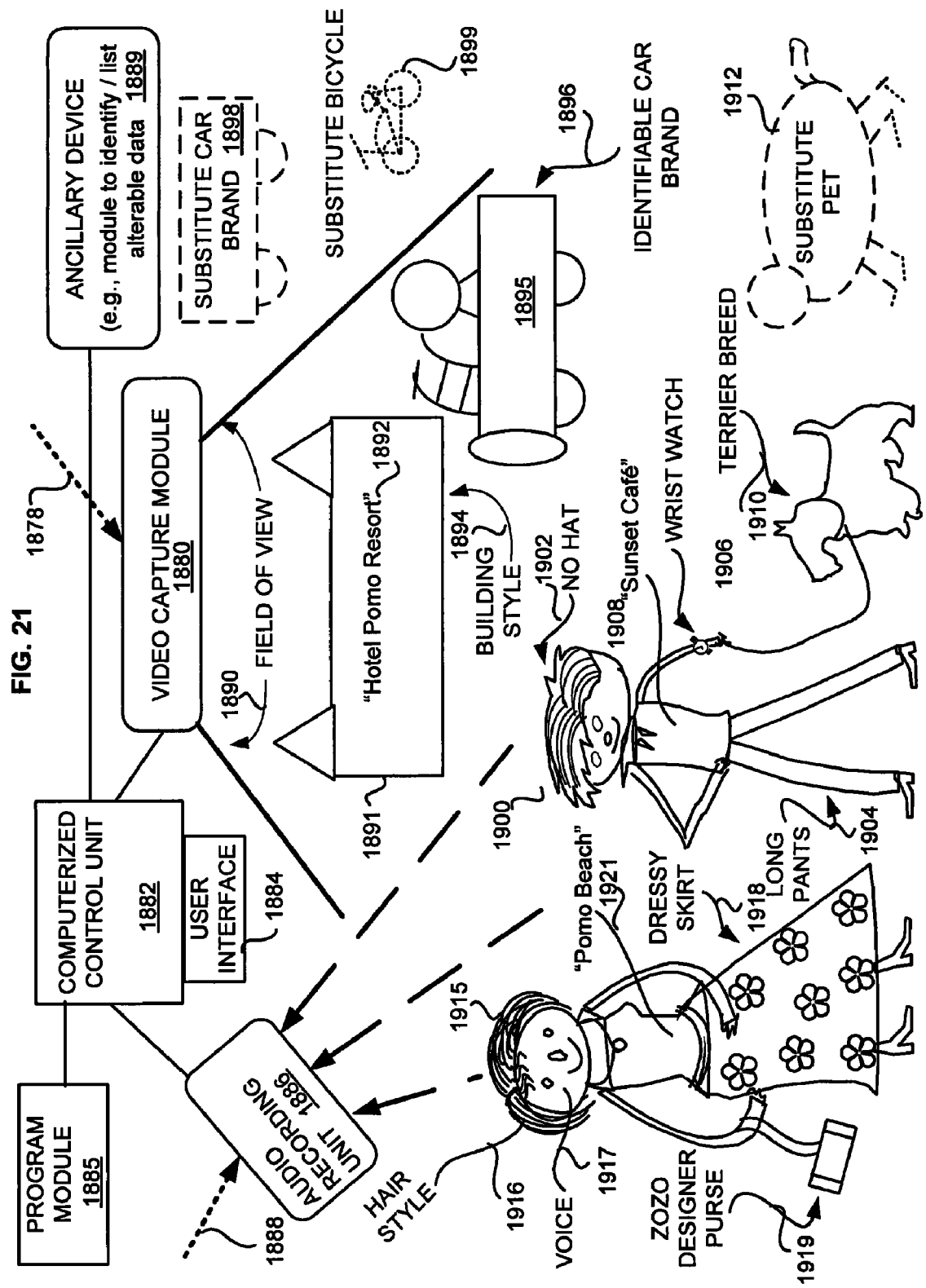
FIG. 21 is a schematic representation that illustrates an exemplary system for capturing potentially alterable content to be incorporated in a composite media work.

The schematic representation of FIG. 21 illustrates an exemplary embodiment for providing alterable content in a media work. Embodiment features include video capture module 1880, computerized control unit 1882 with user interface 1884, program module 1885, audio recording unit 1886, and ancillary device 1889. A field of view 1890 for the video capture module 1880 and for the audio recording unit 1886 enables ongoing capture of audiovisual content that includes audio and visual aspects of multiple objects and people.

The computerized control unit 1882 is operably coupled with the program module 1885 as well as the audio recording unit 1886 and video capture module 1880 to capture the scene depicted in FIG. 21. The computerized control unit 1882 is also operably coupled with the ancillary device 1889 to identify and in some instances list alterable data content that may be available for subsequent alteration in accordance with applicable criteria and authorization rights.

It will be understood that some embodiments may include possible supplemental video data 1878 as an additional input to video capture module 1880 to create a desired visual content for the composite media work. Similarly some embodiments may include possible supplemental audio data 1888 as an additional input to audio recording unit 1886 to create a desired audio content for the composite media work. In some instances, some or all of such additional inputs 1878, 1888 may be identified or listed as alterable content and therefore subject to possible future deletion, modification or replacement in accordance with applicable alteration criteria and applicable authorization rights.

Various examples of possible alterable content are illustrated in FIG. 21. Such alterable content may include an alterable building component element 1891 having designated aspects such as a name "Hotel Pomo Resort" 1892 and a building style 1894. Additional alterable content may include an alterable vehicle component element 1895 having one or more identifiable aspects such as an identifiable car brand 1896. Possible substitute objects that may be available as a replacement for the alterable vehicle component element 1895 are shown in phantom lines, and may include a substitute car brand 1898 and a substitute bicycle 1899.

A male character 1900 is shown as an alterable component element having designated alterable aspects such as no hat 1902, long pants 1904, wrist watch 1906 and a shirt display of a name "Sunset Café" 1908. The male character has a pet component element shown as a terrier breed 1910 that may be alterable. For example, a possible substitute pet 1912 is illustrated in phantom lines.

A female character 1915 is shown as an alterable component element having designated alterable aspects such as hair style 1916, voice 1917, dressy skirt 1918, a "ZoZo" brand designer purse 1919, and a blouse logo "Pomo Beach" 1921.

It will be understood that the exemplary embodiment features of alterable content as well as possible substitute content are not intended to be limiting, but are disclosed for purposes of illustration only. Many other types of alterable content and substitute content may be incorporated in composite media works pursuant to the disclosure set forth herein.

Figure 22:
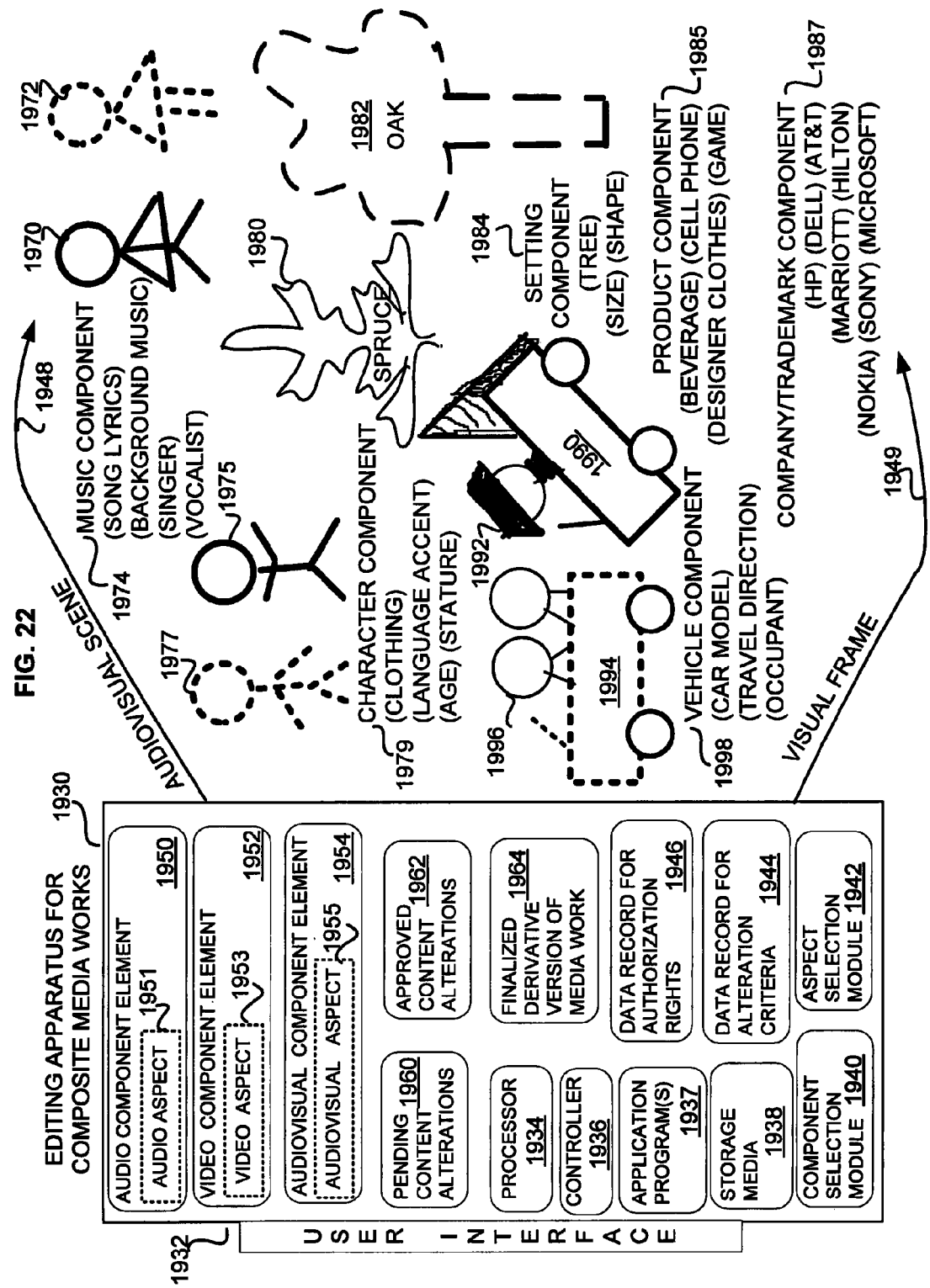
FIG. 22 is a schematic representation that illustrates an exemplary editing apparatus for processing informational data related to a composite media work that includes alterable content.

The schematic depiction of FIG. 22 illustrates additional possible embodiment features regarding possible alteration of content in media works. For example, an editing apparatus 1930 for composite media works may include user interface 1932, processor 1934, controller 1936, one or more application programs 1937, and storage media 1938. The editing apparatus 1930 may also include a data record for the alteration criteria 1944 and a data record for the authorization rights 1946 applicable to a composite media work as well as various derivative versions thereof.

The user interface 1932 may provide accessibility to interested parties involved in providing substitute content and editing derivative versions, as well as accessibility to interested parties seeking information regarding compliance with alteration criteria and authorization rights.

Additional possible features of the illustrated editing apparatus 1930 may include a component selection module 1940 and an aspect selection module 1942. Such selection modules 1940, 1942 may be configured to select (e.g., identify) existing component elements or designated aspects that are feasible for alteration, and may be further configured to select (e.g., identify, retrieve, etc.) substitute content for consideration and possible incorporation in a derivative version of the composite media work.

A possible audiovisual scene 1948 as well as one or more individual visual frames 1949 may include alterable content that may be subject to alteration criteria and authorization rights. Such alterable content may include an audio component element 1950 that includes one or more designated audio aspects 1951. Such alterable content may further include a video component element 1952 that includes one or more designated video aspects 1953. Such alterable content may additionally include an audiovisual component element 1954 that includes one or more audiovisual aspects 1955.

Informational data may also be processed and made available by the editing apparatus 1930, including status data regarding pending content alterations 1960, approved content alterations 1962, and finalized derivative versions of a media work 1964.

Examples of alterable content are illustrated in FIG. 22. For example, an illustrated female character 1970 (e.g., live actress, animated personage, live singing, dubbed singing, live music, synthesized music, etc.) may be identified as an alterable component element that may be replaced by a substitute live or animated female character 1972. A different type of content alteration may be a partial or hybrid modification of certain designated aspects of a musical component element 1974 related to such female character 1970. Possible alterable designated aspects may include song lyrics, background music, singing character, and actual vocalist.

A further illustrated example of alterable content may be a male person 1975 (e.g., self-portrayed person, live actor, animated personage, etc.) that is identified as an alterable component element that may be replaced by a substitute male person 1977. A different type of content alteration may be a partial or hybrid substitution of certain designated aspects of a character component element 1979 related to such male person. Possible alterable designated aspects may include clothing, language accent, age, and stature.

Yet another illustrated example of alterable content may be a scene setting component element 1984 that includes certain designated alterable aspects. The applicable alteration criteria may already require in some circumstances a replacement of a spruce tree 1980 with a pre-determined substitute oak tree 1982. Other possible alterable designated aspects may include a size or shape of the spruce tree 1980 as well as a size or shape of the replacement oak tree 1982.

Referring again to FIG. 22, an additional illustrated example of alterable content may be a vehicle component element 1990 that includes certain designated alterable aspects. Such designated alterable aspects may be combined together to provide a basis for an optional pre-determined substitute replacement 1994 (e.g., modified car model, travel direction and bare-headed double occupancy 1996). Alternatively, certain individual designated alterable aspects in the existing vehicle component element 1998 (single occupancy, hat 1992, car model, travel direction, occupancy, etc.) may be modified separately in accordance with applicable alteration criteria.

Another exemplary type of alterable component element that may be incorporated in the audiovisual scene 1948 and the visual frame 1949 is referenced as product component element 1985. Possible designated aspects of such a product component element may include a type of beverage, cell phone, designer clothes, and game.

A further exemplary type of alterable component is referenced in FIG. 22 as a company or trademark component 1987. Possible substitute content pursuant to applicable alteration criteria and authorization rights may include addition, deletion, modification or replacement of recognizable entity trade names as indicated in the drawing Figure (e.g., HP, Dell, AT&T, Marriott, Hilton, Nokia, Sony, Microsoft) as well as many others. This type of content alteration may also involve negotiation and agreement regarding terms and conditions included in a compensation arrangement with such recognizable entities.

Figure 23:
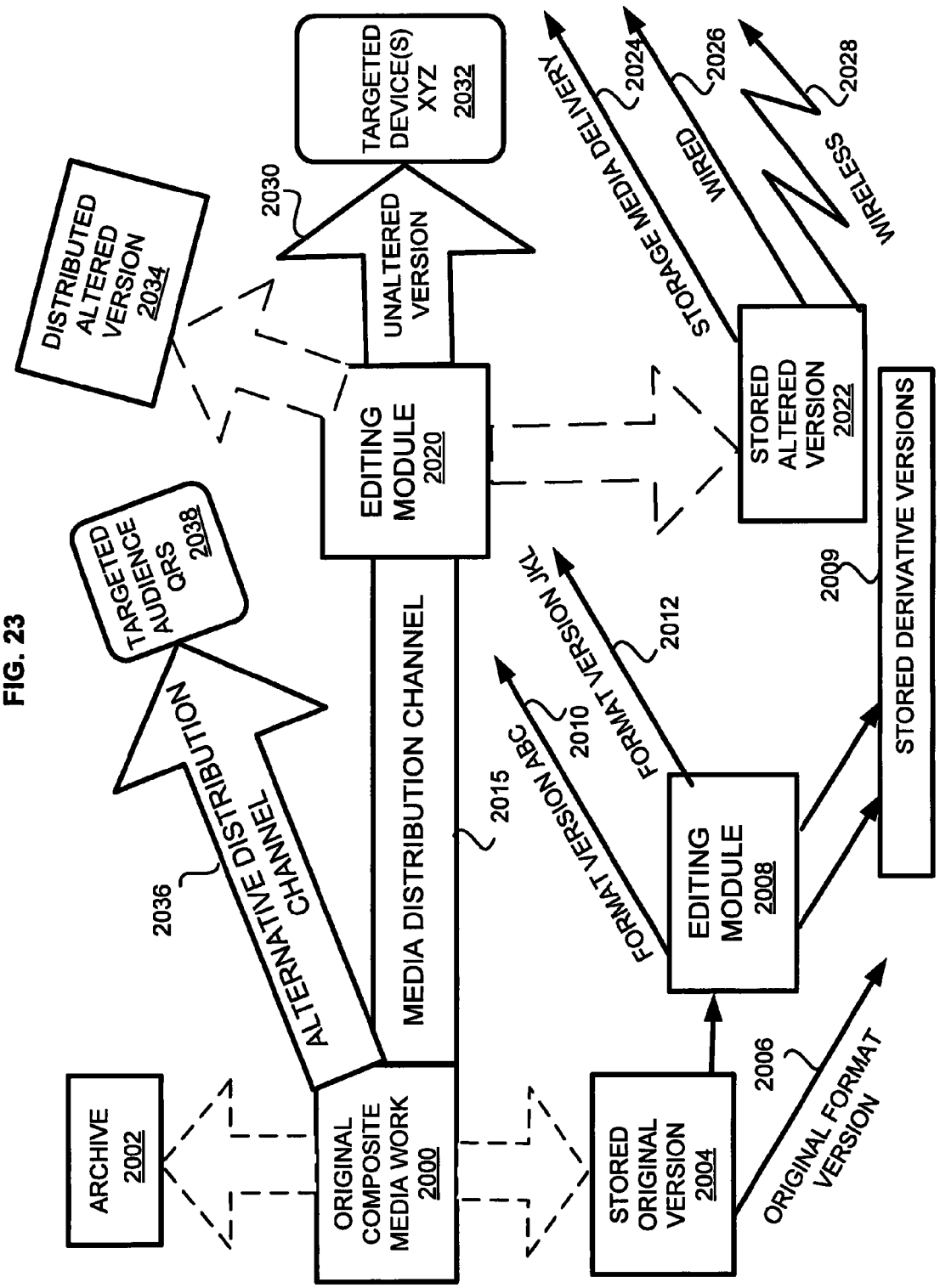
FIG. 23 is a schematic representation of further exemplary options for distribution of composite media works having alterable content.

The schematic representation of FIG. 23 illustrates optional embodiment features for distribution possibilities regarding media works having alterable content. For example, an original composite media work 2000 may be retained in archive 2002 for future reference or use. A stored original version 2004 may provide a basis for distribution of an original format version 2006, and may also be transferred to editing module 2008.

An altered derivative version may be available from editing module 2008 for distribution in format version ABC (see 2010) as well as in a different format version JKL (see 2012). Editing module 2008 may also provide output for additional stored derivative versions 2009.

A possible media distribution channel 2015 may provide an unaltered version 2030 to one or more targeted devices XYZ (see 2032). An editing module 2020 may have a communication link to media distribution channel 2015, and process the original composite media work 2000 in order to provide a distributed altered version 2034 as well as a stored altered version 2022. Additional distribution of the stored altered version 2022 may be accomplished with storage media delivery 2024, wired transfer 2026, and wireless transmission 2028.

An alternative distribution channel 2036 may provide an additional communication link for transferring a version of the original composite media work 2000 to a targeted audience QRS (see 2038).

It will be understood that the various altered derivative versions, media formats, and distribution channels as depicted in FIG. 23 may be subject to limitations and compensation requirements pursuant to applicable alteration criteria as well as to applicable authorization rights.

The tabular depiction of FIG. 24 illustrates an exemplary embodiment for feasible content alterations 2040. Possible alterable component elements 2042 may involve music 2046, setting 2050, hero 2054, heroine 2058, and villain 2062. Additional possible alterable component elements 2042 may involve clothing 2066, vehicle 2070, company 2074, and animal 2078. Further types of component elements that may be alterable may include food 2082, product 2086, brand 2090, and dialogue 2094.

It will be understood that each composite media work may include a standardized type of alterable component elements and a related group of designated alterable aspects. However in many instances the type of alterable component elements and related group of designated alterable aspects may be customized for a particular media work or group of media works. The examples of alterable content disclosed in FIG. 23 and elsewhere herein are therefore not intended to be limiting, but are provided by way of example only.

As shown in the tabular depiction 2044 of FIG. 24, some exemplary designated alterable aspects that may be included within an alterable music component element 2046 are song lyrics, background music, vocalist, and instruments (see 2048). Other exemplary designated alterable aspects that may be included within an alterable setting component element 2050 are beach, apartment, hotel, urban, airport, college, and store (see 2052).

Some possible exemplary designated alterable aspects that may be included within an alterable hero component element 2054 are age, stature, hair style, ethnic group, voice accent, and affluence (see 2056). Other exemplary designated alterable aspects that may be included within an alterable heroine component element 2058 are age, personality, jewelry, family status, career, and hobby (see 2060). Further exemplary designated alterable aspects that may be included within an alterable villain component element 2062 are voice, weapon, addiction, job, scars, tattoos, and profanity (see 2064).

Some exemplary designated alterable aspects that may be included within an alterable clothing component element 2066 are 1920s era, expensive, stylish, gaudy, military, athletic, and hats (see 2068). Other exemplary designated alterable aspects that may be included within an alterable vehicle component element 2070 are airplane, motorcycle, limousine, train, model T car, and sailboat (see 2072).

As further shown in FIG. 24, some exemplary designated alterable aspects that may be included within an alterable company component element 2074 are Western Union, Barnum & Bailey, Union Pacific, and Ford Motor (see 2076). Other exemplary designated alterable aspects that may be included within an alterable animal component element 2078 are collie dog, Siamese cat, parakeet, race horse, and walrus (see 2080).

Some additional exemplary designated alterable aspects that may be included within an alterable food component element 2082 are soup, fish & chips, sausage, plum pudding and sauerkraut (see 2084). Further exemplary designated alterable aspects that may be included within an alterable product component element 2086 are telephone, radio, piano, pistol, magazines, and newspaper (see 2088).

Other exemplary designated alterable aspects that may be included within an alterable brand component element 2090 are Sears Roebuck, RCA, Westinghouse, GE, PanAm, and Kodak (see 2092). Additional exemplary designated alterable aspects that may be included within an alterable dialogue component element 2094 are U.S. English, German, cockney accent, southern drawl, and slang (see 2096).

It will be understood that the various informational data of the type depicted in FIG. 24 may be maintained in various centralized and dispersed locations for accessibility, status review, management and editing of derivative versions of composite media works with alterable or altered content.

Figure 25:
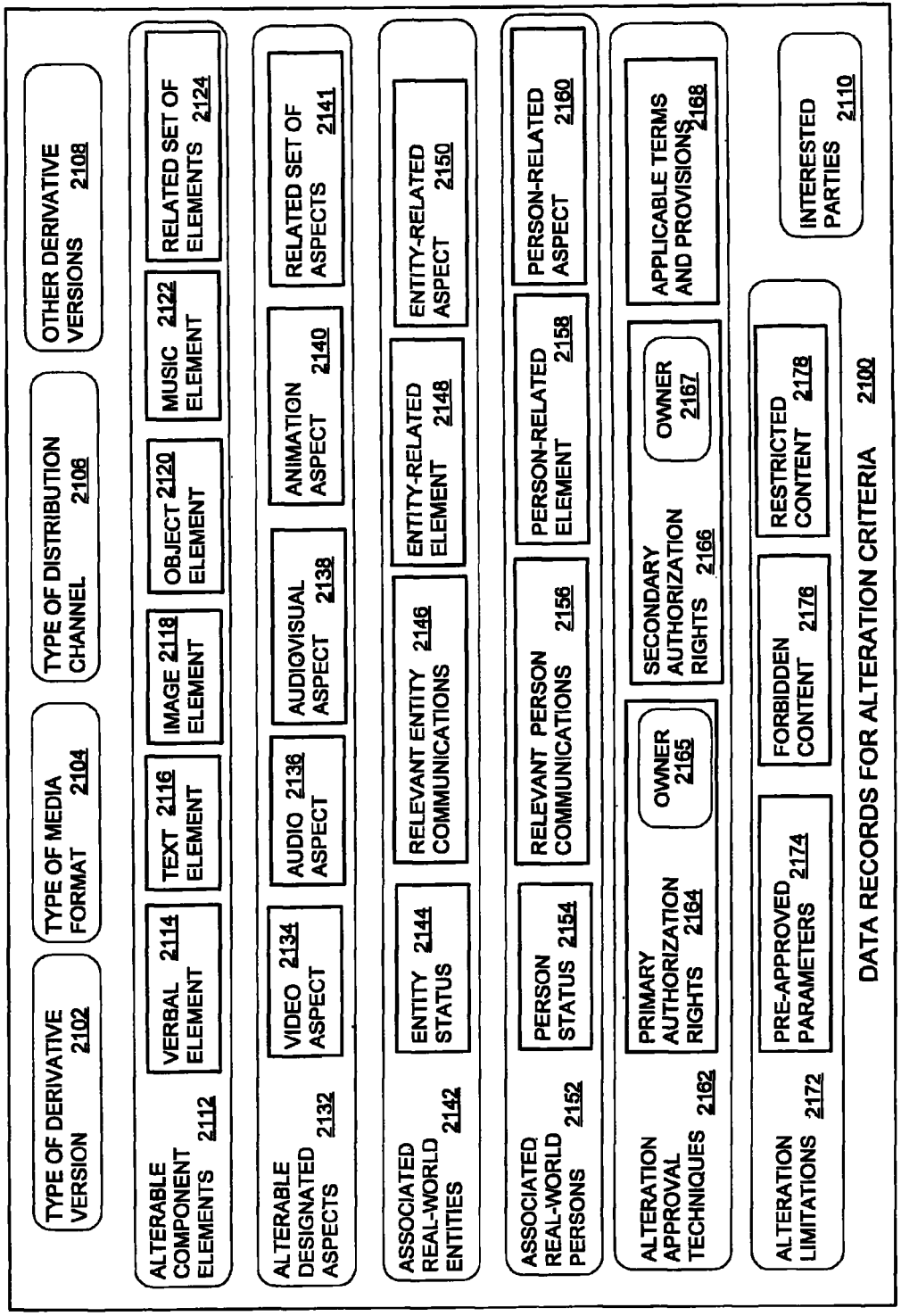
FIG. 25 is a schematic representation that illustrates exemplary types of data records that may be used in connection with an alteration criteria embodiment for media works.

The schematic representation of FIG. 25 shows exemplary types of data records for alteration criteria 2100. For example, certain data records in some embodiments may include a type of derivative version 2102, type of media format 2104, type of distribution channel 2106, and other derivative versions 2108. Additional possible data record types may include a listing of interested parties 2110 that may request or require access to such data records for alteration criteria 2100.

Further possible data records for alteration criteria 2100 in some embodiments may include a listing of alterable component elements 2112 including but not limited to verbal element 2114, text element 2116, image element 2118, object element 2120, music element 2122, and related set of element 2124. Other possible data record types may include a listing of alterable designated aspects 2132 including but not limited to video 2134, audio 2136, audiovisual 2138, animation 2140 and related set of aspects 2141.

Some embodiments may include data records regarding various associated real-world entities 2142 for related types of objects depicted in a composite media work capable of alterable content. Specific categories of data records for associated real-world entities 2142 may include entity status 2144, relevant entity communications 2146, one or more entity-related elements 2148, and one or more entity-related aspects 2150.

Some embodiments may include data records regarding various associated real-world persons 2152 for related types of objects depicted in a composite media work capable of alterable content. Specific categories of data records for associated real-world persons 2152 may include person status 2154, relevant person communications 2156, one or more person-related elements 2158, and one or more person-related aspects 2160.

Additional types of possible data records may include alteration approval techniques 2162 for substituted content. Related categories of data records may include primary authorization rights 2164 and information regarding an owner 2165 of such primary authorization rights. Other related categories of data records may include secondary authorization rights 2166 and information regarding an owner 2167 of such secondary authorization rights. A further related category of data records may include applicable terms and provisions 2168 regarding primary and secondary authorization rights 2164, 2166.

Other possible types of data records for alteration criteria 2100 may relate to alteration limitations 2172. Particular categories of data records may include pre-approved parameters 2174, forbidden content 2176, and restricted content 2178.

It will be understood that the various informational data of the type depicted in FIG. 25 may be maintained in various centralized and dispersed locations for accessibility, status review, management and editing of derivative versions of composite media works with alterable or altered content.

It will be further understood that some data record categories in the illustrated embodiments herein may not be necessary in some circumstances, and in some instances additional data record categories may be deemed to be helpful. The need for such data record flexibility is contemplated and the exemplary data file names and categories disclosed herein are not intended to be limiting.

Referring to embodiment features of FIG. 26, an exemplary tabular representation of data records for authorization rights 2180 may includes a listing of alterable elements 2190 and alterable aspects 2192 for a particular derivative version of a composite media work capable of content alteration. Such data records for authorization rights 2180 may further include specified data records regarding type of derivative version 2182, type of media form 2183, type of distribution channel 2184, and other derivative versions 2185.

Additional data records may provide informational data regarding an associated real-world entity 2186 for related alterable objects, and also regarding an associated real-world person 2187 for related alterable objects.

It will be understood that informational data regarding ownership of primary original content rights 2193 may involve related informational data of applicable provisions for original content rights 2194. Similarly informational data regarding ownership of secondary substituted content rights 2196 may involve different informational data of applicable provisions for substituted content rights 2198.

In some embodiments the ownership status and the related applicable provisions may vary with respect to different types or categories of alterable content. For example, separate informational listings regarding ownership rights and their related provisions (e.g., term, conditions, compensation, limitations, authorization procedure, contact agent, etc.) may be separately maintained for individually identifiable alterable component elements including but not limited to a person or character 2202, an actor or actress 2204, an object or item 2206, and a product category 2208.

As a further example, separate informational listings regarding ownership rights and their related provisions (e.g., term, conditions, compensation, limitations, authorization procedure, contact agent, etc.) may be maintained for individually identifiable alterable aspects including but not limited to video 2210, audio 2212, audiovisual 2214, animation 2216, and set of related aspects 2218.

It will be understood that the various informational data of the type depicted in FIG. 26 may be maintained in various centralized and dispersed locations for accessibility, status review, management and editing of derivative versions of composite media works with alterable or altered content.

It will be understood from the exemplary embodiments disclosed herein that various system implementations may include combined or separate listings of alterable component elements and alterable designated aspects feasible for alteration. Other possible data listings may include a further listing of the one or more of the following type of possible content alterations: related set of designated aspects, related set of alterable components, identical objects, same object in different scenes, and same object in different settings. A further possible listing may include one or more of the following type of possible content alterations: textual, verbal, visual, image, audio, musical, and animation.

Some system embodiments may include a data record that includes informational data regarding a specified derivative version of the composite media work, wherein the specified derivative version includes capability for incorporating substituted content. A further system data record may include informational data to identify a specified derivative version incorporating previously altered content; and another system data record may include informational data to identify a specified derivative version having capability to incorporate future substituted content.

A further possible system embodiment feature may include a management module to coordinate compliance with the criteria for possible content alteration. Other possible system embodiment features may include further data records that identify one or more of the following: alteration limitation applicable to a derivative version of the composite media work; media format limitation applicable to a derivative version of the composite work; distribution limitation applicable to a derivative version of the composite work; a group or set of related component elements capable of alteration; and a group or set of designated aspects capable of alteration.

Further possible system embodiment features may include a further data record that identifies an entity, or a person, associated with substituted content incorporated in a derivative version of the composite media work.

Content alteration of different types of media works may involve various types of procedural guidelines and consent requirements regarding the substituted content as well respecting its integration into a composite media work. In some instances compliance with alteration criteria may constitute sufficient approval to proceed with a content alteration of a composite media work. Under some circumstances there may be multiple approvals required that may involve both compliance with alteration criteria as well as consent by an owner of primary authorization rights. In other instances it may be possible to merely obtain such consent by an owner of primary authorization rights without having to comply with additional alteration criteria. It will be understood that features of the exemplary embodiments disclosed herein may be adapted for implementation in existing media works as well as in newly created media works.

Some system embodiments may include a listing of alterable content that is subject to authorization rights. In some instances an exemplary implementation may include a further listing of the one or more of the following type of alterable content subject to the authorization rights: related set of designated aspects, related set of alterable components, identical objects, same object in different scenes, and same object in different settings. Another possible system feature may include a further listing of the one or more of the following type of alterable content subject to the authorization rights: textual, verbal, visual, image, audio, musical, and animation.

Additional exemplary features of a system embodiment may include a data record that includes authorization rights applicable to one or more of the following targeted categories for the composite media work: geographic distribution, distribution channel, audience, time period, and demographic distribution. Other exemplary system features may include a data record that includes authorization rights regarding possible content alteration of one or more of the following type of content associated with a real-world entity: brand, trademark, service mark, copyrighted work, name, company name, identity, symbol, commercial symbol, icon, logotype, trade logo, trade dress, packaging, label, emblem, insignia, acronym, abbreviation, certification, slogan, jingle, animation, animated character, copyrighted item, and personage.

Further exemplary system enhancements may include a data record that includes authorization rights regarding possible content alteration of one or more of the following type of content associated with a real-world person: name, face, personal characteristics, identity, residence, title, achievement, rank, medal, badge, award, identification features, biometric attribute, photographic image, voice recording, accent, dialect, recognizable personality trait, gesture, demeanor, mannerism, appearance, clothing, hairstyle, tattoo, accessory, jewelry, piercing, avatar, setting, item possession, and property ownership.

Another exemplary system embodiment may include a management module to coordinate compliance with the authorization rights. Other possible embodiments may include an additional data record of secondary authorization rights applicable to substitute content for the composite media work. Some related system data records may include secondary authorization rights applicable to a substitute component element or a substitute designated aspect incorporated as a content alteration in the composite media work.

Figure 27:
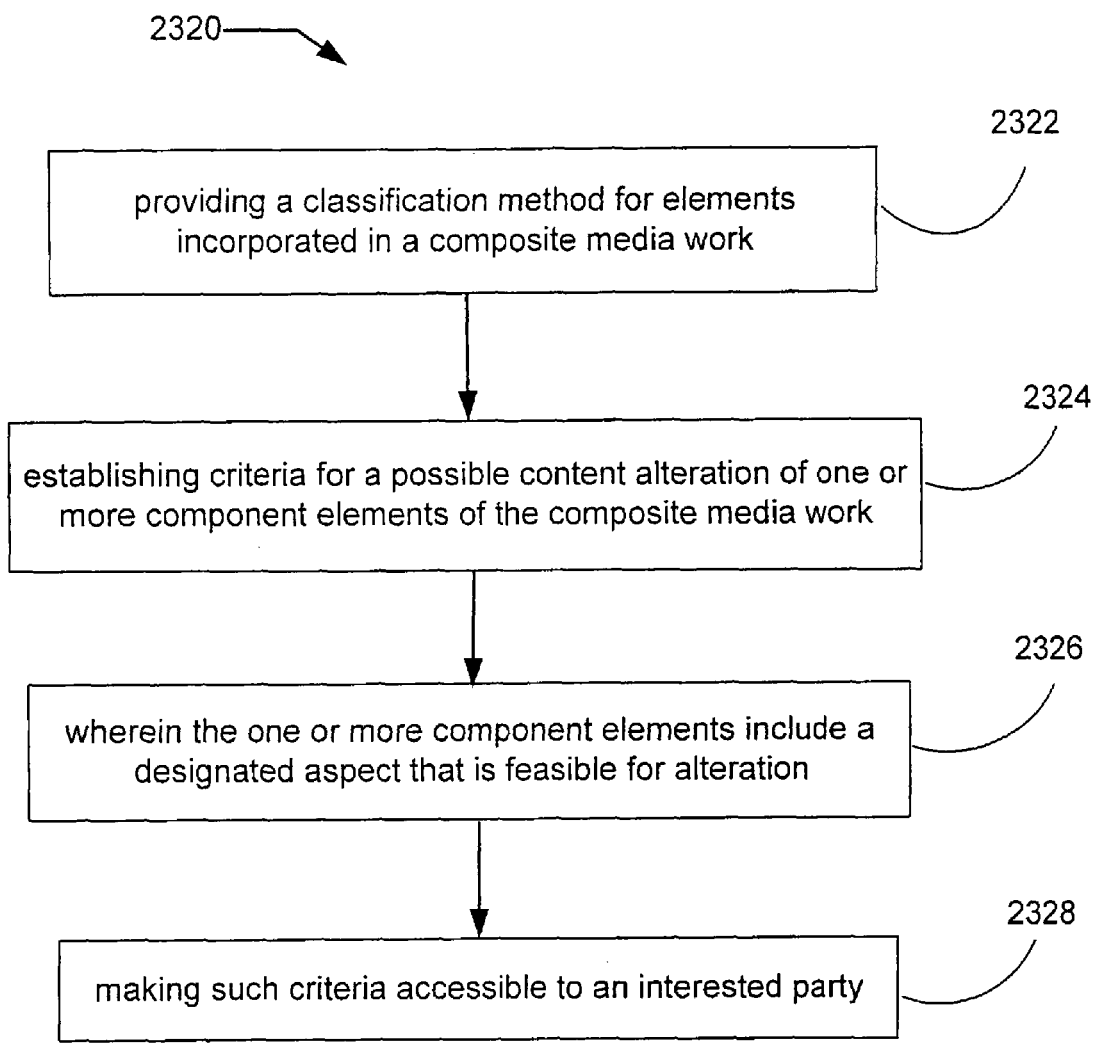
FIG. 27 is a high level flow chart for an exemplary process embodiment for media content alteration.

The high level flow chart of FIG. 27 illustrates an embodiment 2320 that provides a classification method for elements incorporated in a composite media work (block 2322), including establishing criteria for possible content alteration of one or more component elements of the composite media work (block 2322), wherein the one or more component elements include a designated aspect that is feasible for alteration (block 2324); and making such criteria accessible to an interested party (block 2328).

Figure 28:
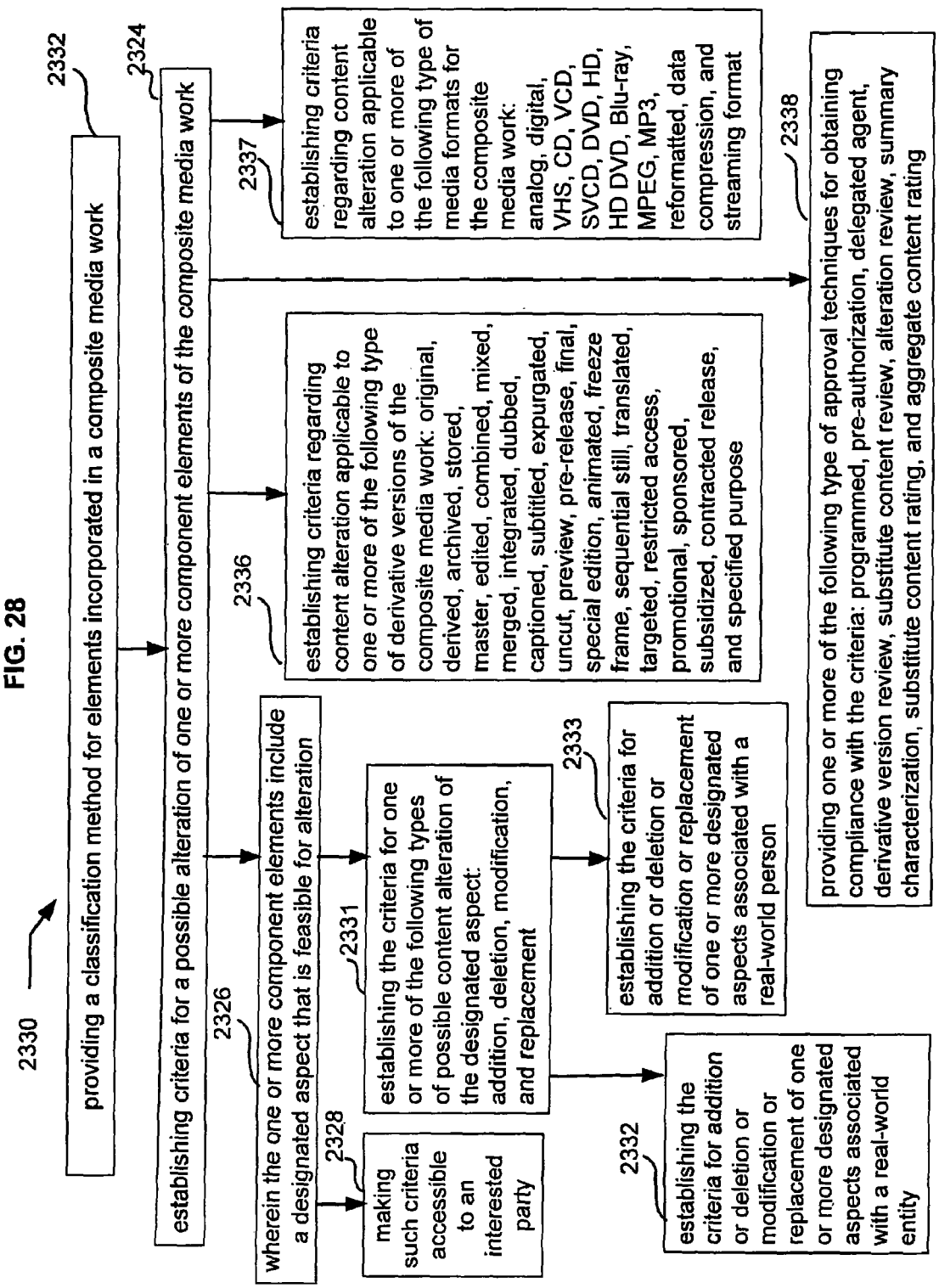
FIGS. 28-33 are more detailed flow charts illustrating various exemplary process features regarding media content alteration.

Referring to another process embodiment 2330 illustrated in the detailed flow chart of FIG. 28, exemplary features may include previously described process components 2322, 2324, 2326, 2328 in combination with establishing the criteria for one or more of the following types of possible content alteration of the designated aspect: addition, deletion, modification, and replacement (block 2331).

Some implementations may also include establishing the criteria for addition or deletion or modification or replacement of one or more designated aspects associated with a real-world entity (block 2332), or associated with a real-world person (block 2333). A further possible implementation provides one or more of the following type of approval techniques for obtaining compliance with the criteria: programmed, pre-authorization, delegated agent, derivative version review, substitute content review, alteration review, summary characterization, substitute content rating, and aggregate content rating (block 2338).

Other possible process enhancements may include establishing criteria regarding content alteration applicable to one or more of the following type of derivative versions of the composite media work: original, derived, archived, stored, master, edited, combined, mixed, merged, integrated, dubbed, captioned, subtitled, expurgated, uncut, preview, pre-release, final, special edition, animated, freeze frame, sequential still, translated, targeted, restricted access, promotional, sponsored, subsidized, contracted release, and specified purpose (block 2336).

Additional exemplary features may include establishing criteria regarding content alteration applicable to one or more of the following type of media formats for the composite media work: analog, digital, VHS, CD, VCD, SVCD, DVD, HD, HD DVD, Blu-ray, MPEG, MP3, reformatted, data compression, and streaming format (block 2337).

Figure 29:
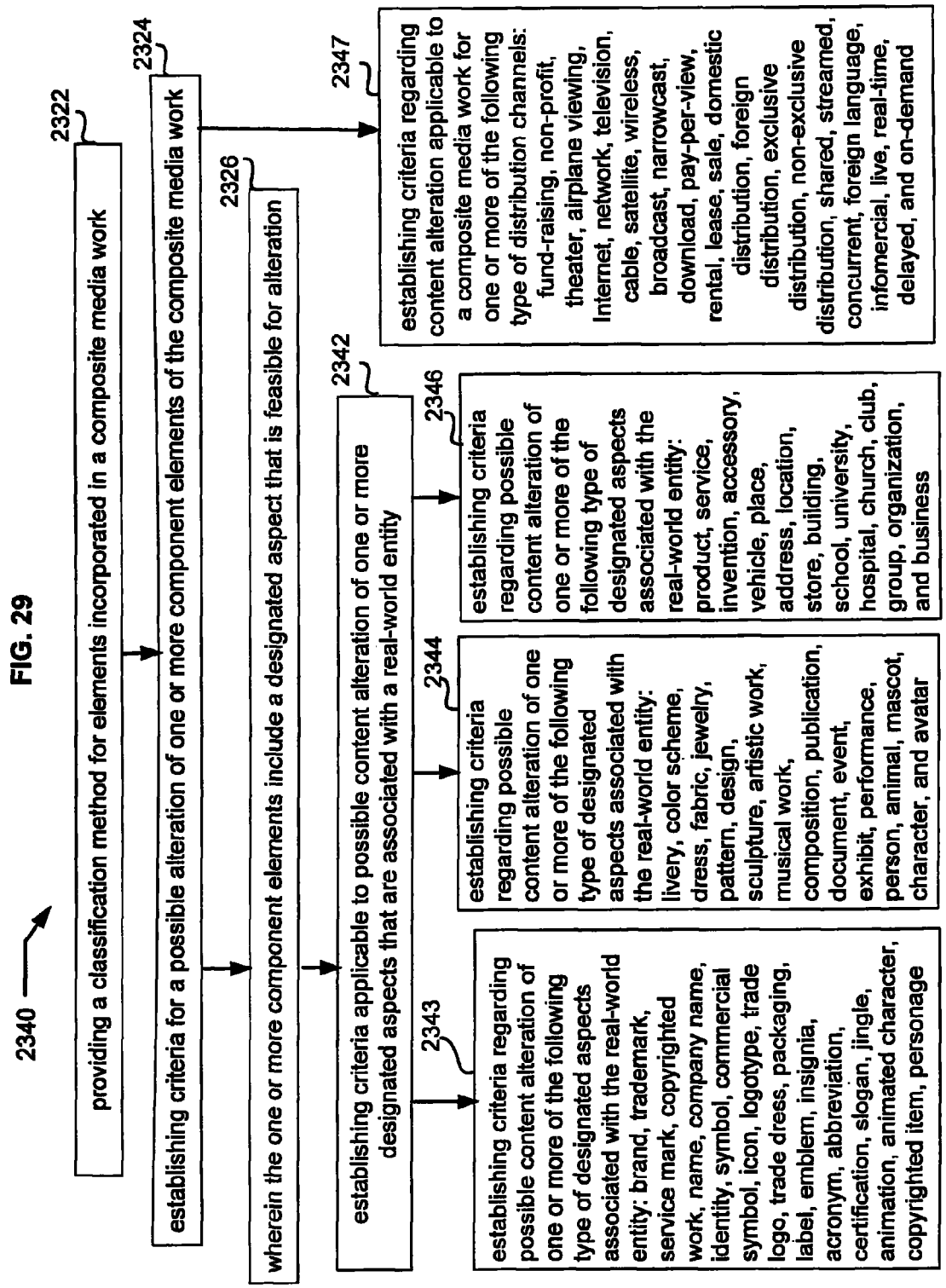

Referring to the exemplary embodiment features 2340 of FIG. 29, previously described process features 2322, 2324, 2326 are illustrated along with additional possible enhancements regarding criteria for possible content alterations. For example, some process embodiments may include establishing criteria regarding content alteration applicable to a composite media work for one or more of the following type of distribution channels: fund-raising, non-profit, theater, airplane viewing, Internet, network, television, cable, satellite, wireless, broadcast, narrowcast, download, pay-per-view, rental, lease, sale, domestic distribution, foreign distribution, exclusive distribution, non-exclusive distribution, shared, streamed, concurrent, foreign language, infomercial, live, real-time, delayed, and on-demand (block 2347).

A further enhancement feature may include establishing criteria applicable to possible content alteration of one or more designated aspects that are associated with a real-world entity (block 2342). Related possible enhancements may establish criteria regarding possible content alteration of one or more of the following type of designated aspects associated with the real-world entity: brand, trademark, service mark, copyrighted work, name, company name, identity, symbol, commercial symbol, icon, logotype, trade logo, trade dress, packaging, label, emblem, insignia, acronym, abbreviation, certification, slogan, jingle, animation, animated character, copyrighted item, and personage (block 2343).

Another exemplary implementation may establish establishing criteria regarding possible content alteration of one or more of the following type of designated aspects associated with the real-world entity: livery, color scheme, dress, fabric, jewelry, pattern, design, sculpture, artistic work, musical work, composition, publication, document, event, exhibit, performance, person, animal, mascot, character, and avatar (block 2344). Further possible features may include establishing criteria regarding possible content alteration of one or more of the following type of designated aspects associated with the real-world entity: product, service, invention, accessory, vehicle, place, address, location, store, building, school, university, hospital, church, club, group, organization, and business (block 2346).

Figure 30:
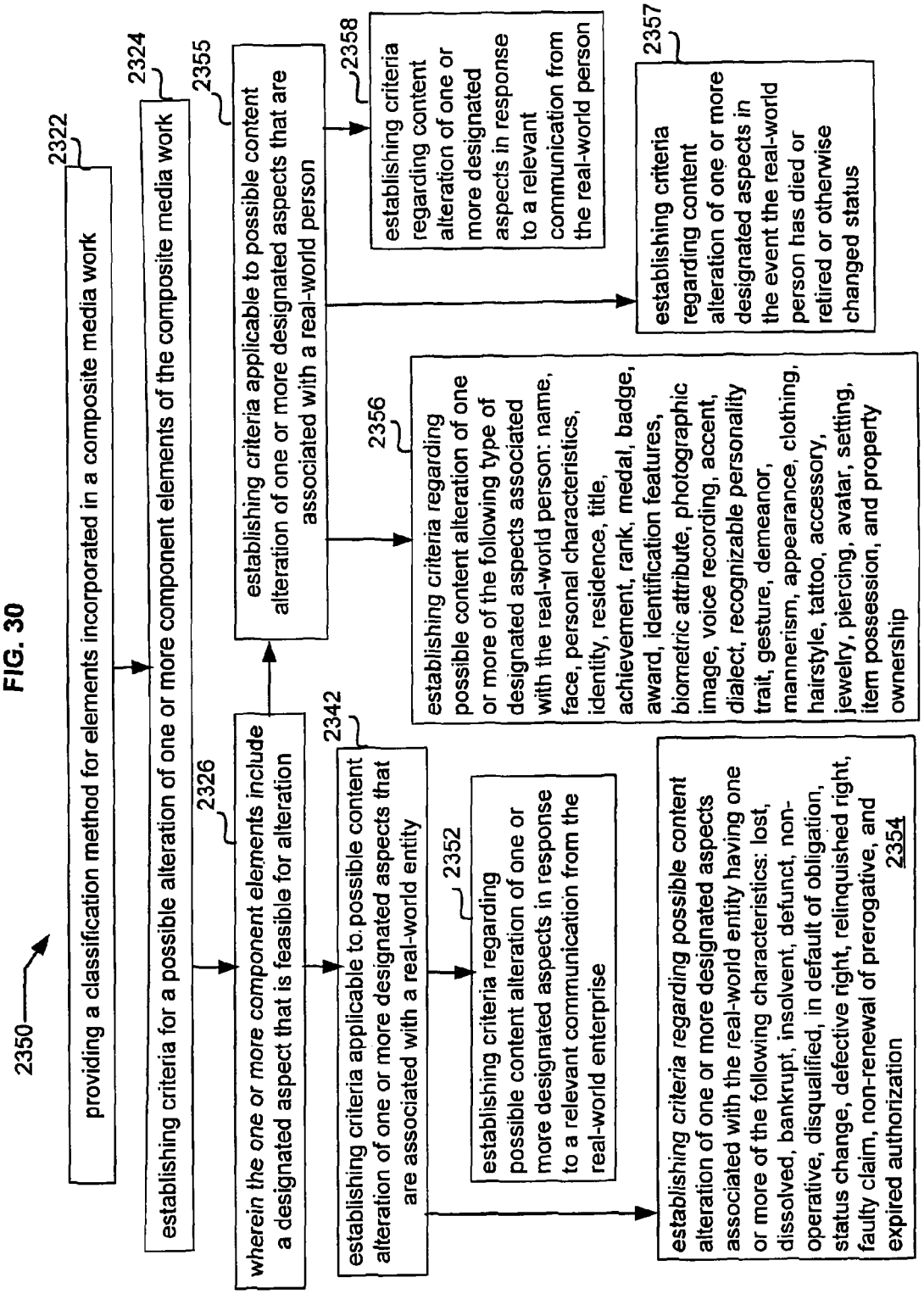

Referring to additional embodiment features 2350 illustrated in FIG. 30, previously described process components 2322, 2324, 2326 2342 are depicted along with another exemplary process feature establishing criteria regarding possible content alteration of one or more designated aspects in response to a relevant communication from the real-world enterprise (block 2352).

Further exemplary process features may include establishing criteria regarding possible content alteration of one or more designated aspects associated with the real-world entity having one or more of the following characteristics: lost, dissolved, bankrupt, insolvent, defunct, non-operative, disqualified, in default of obligation, status change, defective right, relinquished right, faulty claim, non-renewal of prerogative, and expired authorization (block 2354).

The flow chart of FIG. 30 also depicts additional exemplary enhancements related to establishing criteria applicable to possible content alteration of one or more designated aspects that are associated with a real-world person (block 2355). An additional possible enhancement may include establishing criteria regarding possible content alteration of one or more of the following type of designated aspects associated with the real-world person: name, face, personal characteristics, identity, residence, title, achievement, rank, medal, badge, award, identification features, biometric attribute, photographic image, voice recording, accent, dialect, recognizable personality trait, gesture, demeanor, mannerism, appearance, clothing, hairstyle, tattoo, accessory, jewelry, piercing, avatar, setting, item possession, and property ownership (block 2356).

Further possible related features may include establishing criteria regarding content alteration of one or more designated aspects in the event the real-world person has died or retired or otherwise changed status (block 2357), and establishing criteria regarding content alteration of one or more designated aspects in response to a relevant communication from the real-world person (block 2358).

Figure 31:
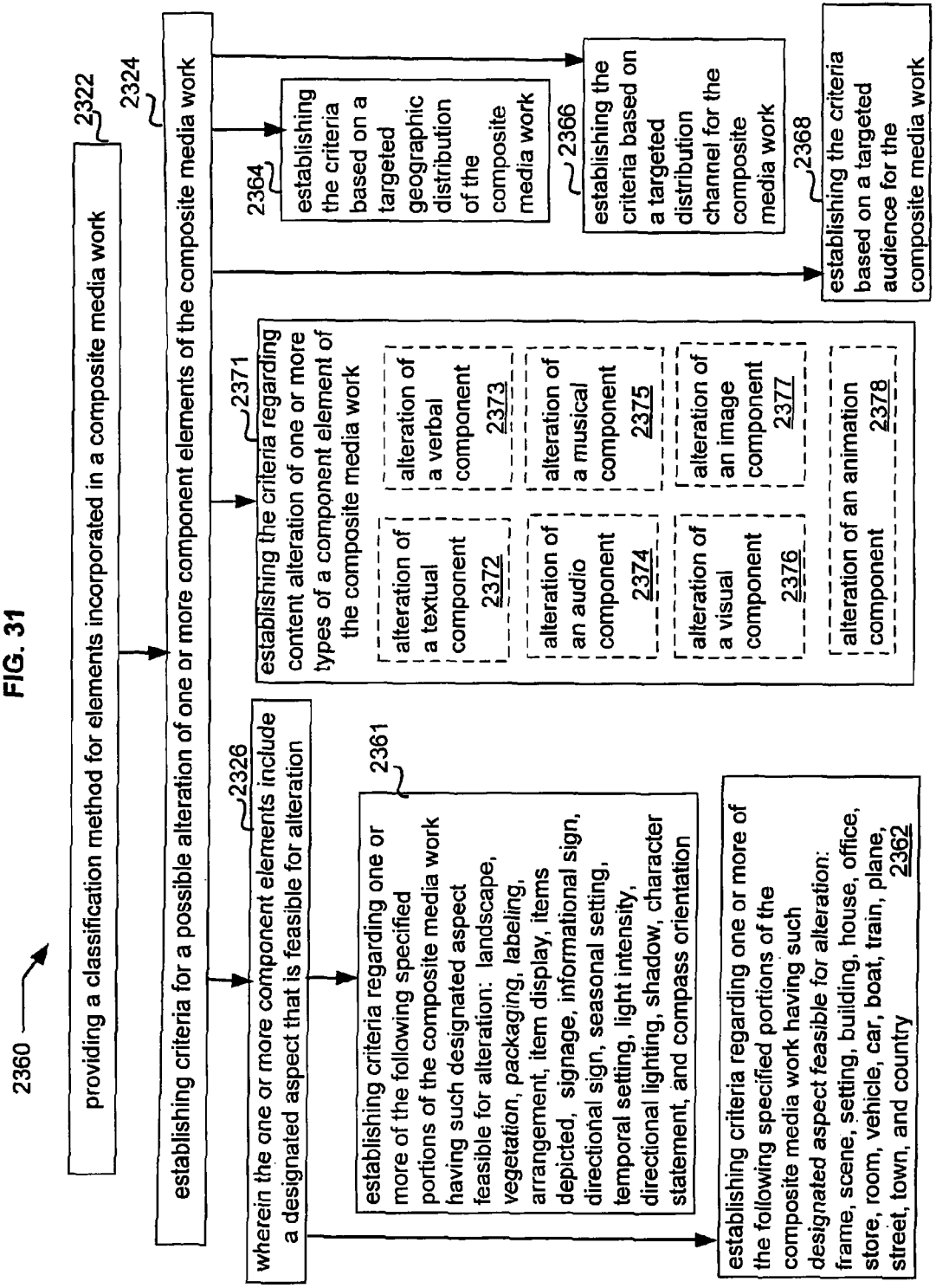

The detailed flow chart of FIG. 31 illustrates exemplary embodiment features 2360 that include previously described process features 2322, 2324, 2326 along with establishing criteria regarding one or more of the following specified portions of the composite media work having such designated aspect feasible for alteration: frame, scene, setting, building, house, office, store, room, vehicle, car, boat, train, plane, street, town, and country (block 2362).

Additional process enhancements may include establishing criteria regarding one or more of the following specified portions of the composite media work having such designated aspect feasible for alteration: landscape, vegetation, packaging, labeling, arrangement, item display, items depicted, signage, informational sign, directional sign, seasonal setting, temporal setting, light intensity, directional lighting, shadow, character statement, and compass orientation (block 2361).

Other exemplary enhancements depicted include establishing criteria based on a targeted geographic distribution of the composite media work (block 2364), or a targeted distribution channel for the composite media work (block 2366), or a targeted audience for the composite media work (block 2368).

FIG. 31 further illustrates possible process features that establish the criteria regarding content alteration of one or more types of a component element of the composite media work (block 2371). Such exemplary types of content alteration of a component element may include content alteration of a textual component (block 2372), a verbal component (block 2373), an audio component (block 2374), a musical component (block 2375), a visual component (block 2376), an image component (block 2377) or an animation component (block 2378), as well as various combinations of such components.

Figure 32:
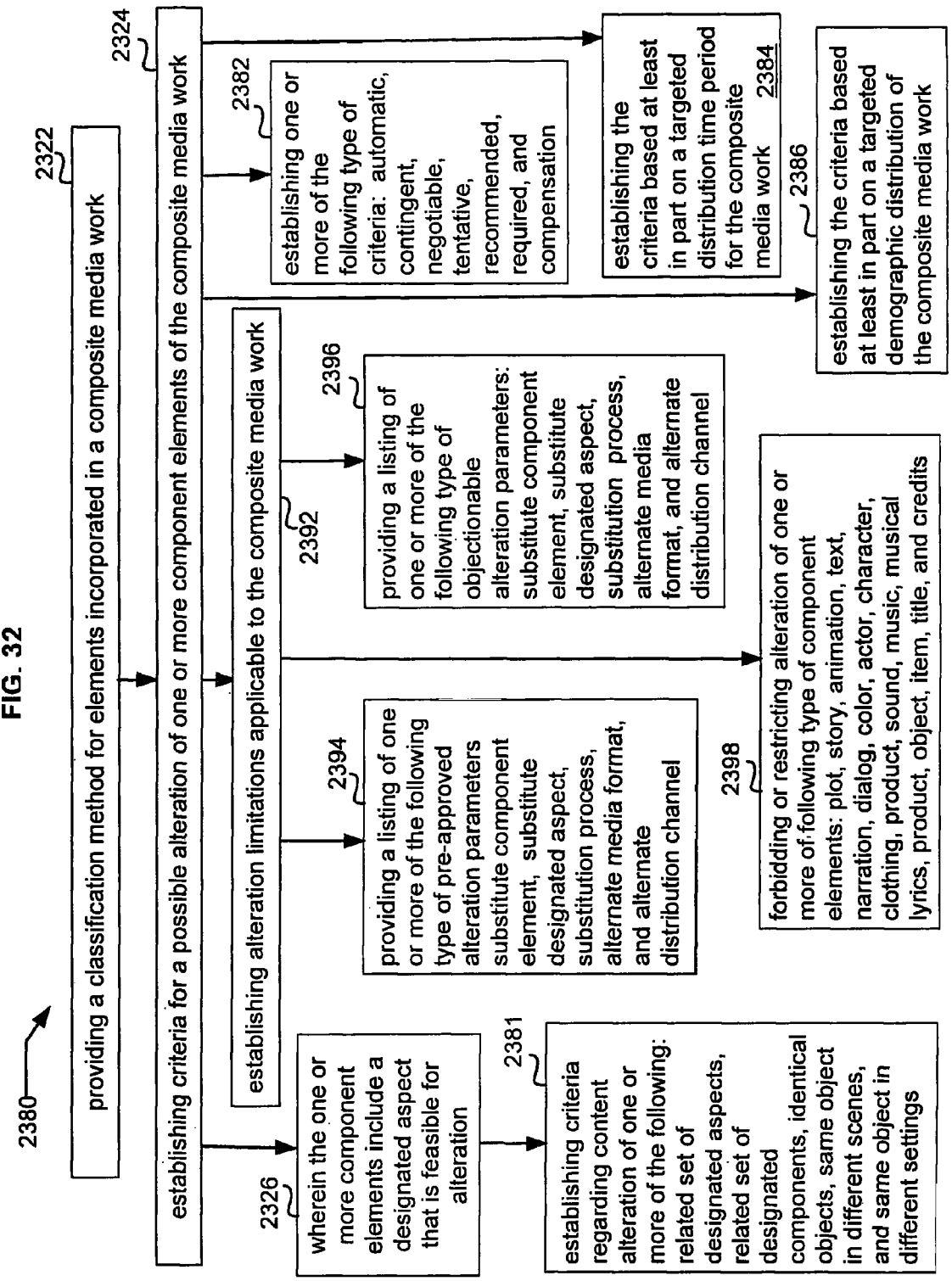

Referring to the illustrated embodiment features 2380 of FIG. 32, previously described component features 2322, 2324, 2326 are combined with possible enhancements that include establishing criteria regarding content alteration of one or more of the following: related set of designated aspects, related set of designated components, identical objects, same object in different scenes, and same object in different settings (block 2381).

Additional possible implementation features may relate to establishing alteration limitations applicable to the composite media work (block 2392). For example, some exemplary features may include providing a listing of one or more of the following type of objectionable alteration parameters: substitute component element, substitute designated aspect, substitution process, alternate media format, and alternate distribution channel (block 2396). Additional exemplary features may include forbidding or restricting alteration of one or more of following type of component elements: plot, story, animation, text, narration, dialog, color, actor, character, clothing, product, sound, music, musical lyrics, product, object, item, title, and credits (block 2398).

Additional possible implement features may include providing a listing of one or more of the following type of pre-approved alteration parameters: substitute component element, substitute designated aspect, substitution process, alternate media format, and alternate distribution channel (block 2394).

FIG. 32 further illustrates additional possible features related to criteria for possible alteration of one or more component elements of the composite media work. For example, in some instances an exemplary process feature may establishing one or more of the following type of criteria: automatic, contingent, negotiable, tentative, recommended, required, and compensation (block 2382). Other exemplary process features may establish the criteria based at least in part on a targeted distribution time period for the composite media work (block 2384), or may establish the criteria based at least in part on a targeted demographic distribution of the composite media work (block 2386).

Figure 33:
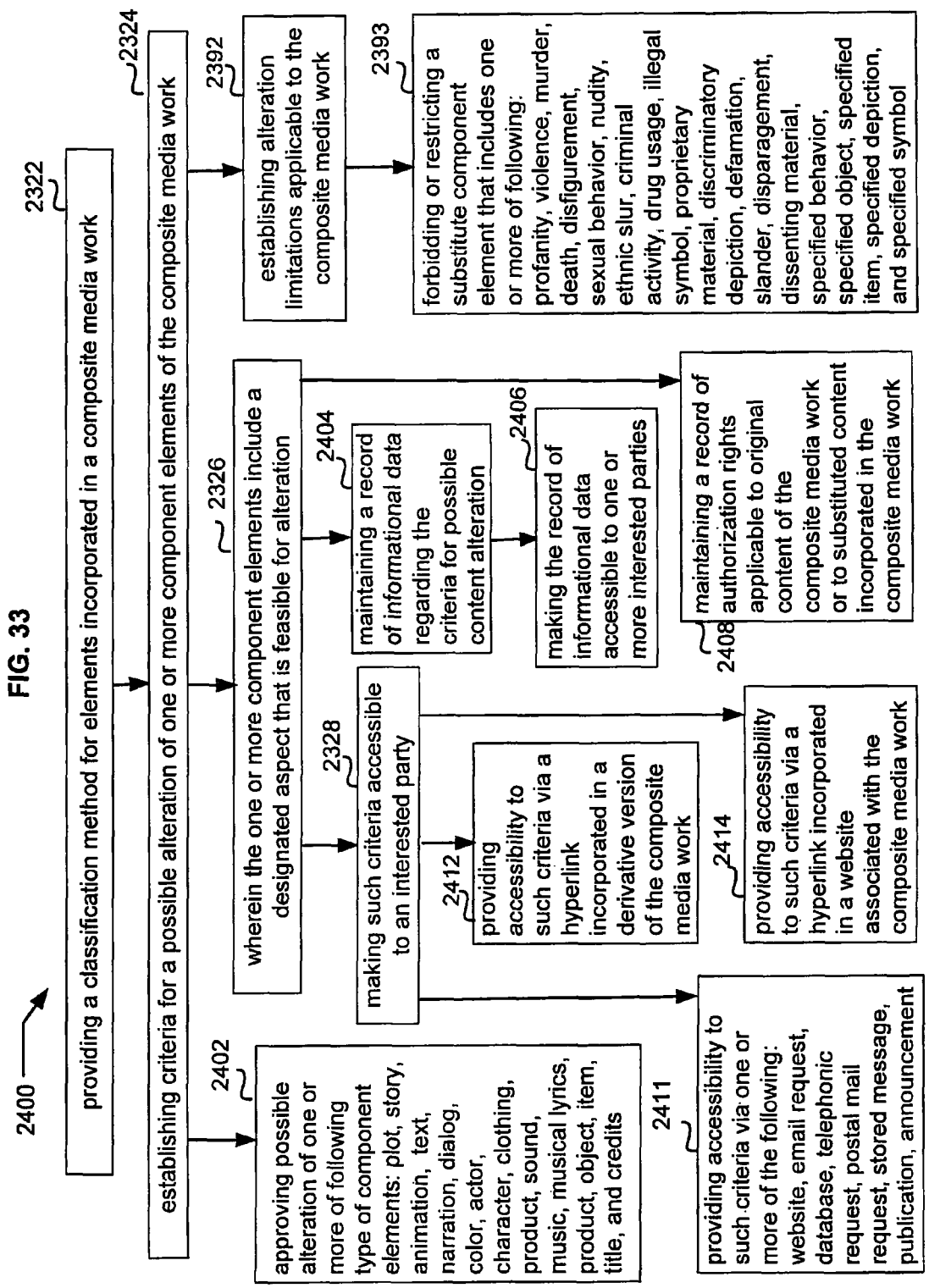

The detailed embodiment features 2400 of FIG. 33 include previously described process components 2322, 2324, 2326, 2328, 2392 along with possible process features establishing exemplary criteria. For example, an exemplary feature may include approving possible alteration of one or more of following type of component elements: plot, story, animation, text, narration, dialog, color, actor, character, clothing, product, sound, music, musical lyrics, product, object, item, title, and credits (block 2402).

Additional exemplary enhancements regarding the establishment of alteration limitations may include forbidding or restricting a substitute component element that includes one or more of following: profanity, violence, murder, death, disfigurement, sexual behavior, nudity, ethnic slur, criminal activity, drug usage, illegal symbol, proprietary material, discriminatory depiction, defamation, slander, disparagement, dissenting material, specified behavior, specified object, specified item, specified depiction, and specified symbol (block 2393).

Further possible implementation features relating to accessibility of the criteria to an interested party may include providing accessibility to such criteria via one or more of the following: website, email request, database, telephonic request, postal mail request, stored message, publication, and announcement (block 2411). Other related implementation possibilities may include providing accessibility to such criteria via a hyperlink incorporated in a derivative version of the composite media work (block 2412), and providing accessibility to such criteria via a hyperlink incorporated in a website associated with the composite media work (block 2414).

Other exemplary process features may include maintaining a record of informational data regarding the criteria for possible content alteration (block 2404), and making the record of informational data accessible to one or more interested parties (block 2406). A further possible enhancement may include maintaining a record of authorization rights applicable to original content of the composite media work or to substituted content incorporated in the composite media work (block 2408).

It will be understood by those skilled in the art that the various components and elements disclosed in the block diagrams herein as well as the various steps and sub-steps disclosed in the flow charts herein may be incorporated together in different claimed combinations in order to enhance possible benefits and advantages.

It is to be further understood that various aspects of the methods and processes disclosed in FIGS. 3-11, 14-15, 27-33, 36-42, 45-54, 57-66 and 69-74 can be incorporated in one or more different types of computer program products with a carrier medium having program instructions encoded thereon. Some exemplary computer program products may be implemented in storage carrier media having program instructions encoded thereon. In some instances exemplary computer program products may be implemented in communication carrier media having program instructions encoded thereon.

Figure 34:
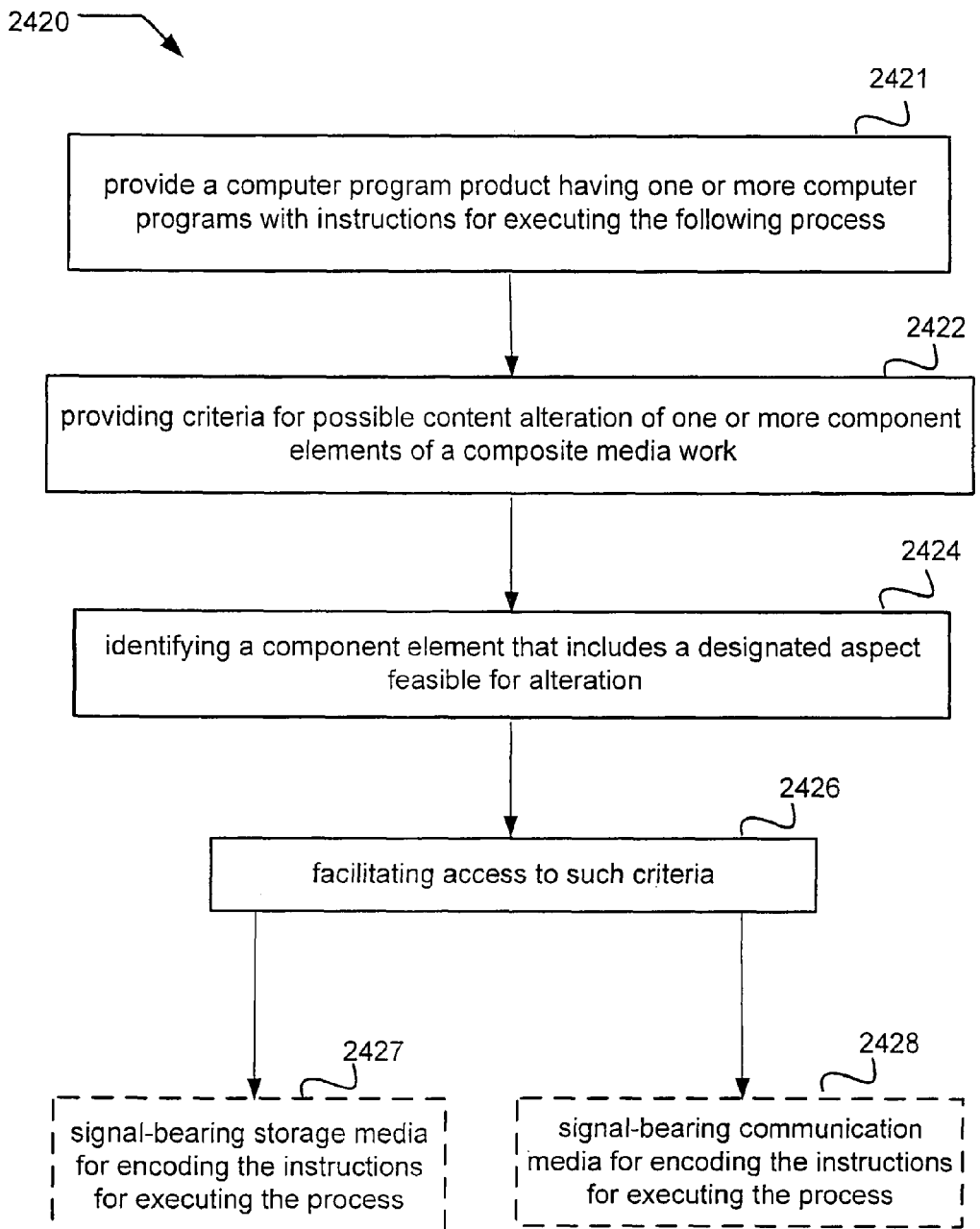
FIG. 34 is a diagrammatic flow chart for an exemplary computer program product embodiment.

The flow chart of FIG. 34 illustrates an embodiment 2420 that provides a computer program product having one or more computer programs with instructions for executing a process (block 2421). Such an exemplary process may include providing criteria for possible content alteration of one or more component elements of a composite media work (block 2422), identifying a component element that includes a designated aspect feasible for alteration (block 2424), and facilitating access to such criteria (block 2426). Further possible features may include providing signal-bearing storage media for encoding instructions for executing such an exemplary process (block 2427); and providing signal-bearing communication media for encoding instructions for executing such an exemplary process (block 2428).

Additional possible computer program product features may include providing criteria that identifies one or more of the following type of targeted categories for a derivative version of the composite media work wherein the derivative version includes capability for incorporating substituted content: geographic distribution, distribution channel, audience, recipient group, targeted device, time period, and demographic distribution.

A further possible computer program process feature may include providing criteria that identifies one or more of the following type of limitations for a derivative version of the composite media work wherein the derivative version includes capability for incorporating substituted content: distribution, media format, pre-approved alteration parameter, objectionable alteration, restricted alteration, and forbidden alteration.

Another possible process feature that may be incorporated in a computer program product includes maintaining a record of criteria regarding possible content alteration, wherein the record of criteria that includes forbidding or restricting a substitute component element that includes one or more of following: profanity, violence, murder, death, disfigurement, sexual behavior, nudity, ethnic slur, criminal activity, drug usage, illegal symbol, proprietary material, discriminatory depiction, defamation, slander, disparagement, dissenting material, specified behavior, specified object, specified item, specified depiction, and specified symbol.

Additional exemplary process features that may be incorporated in a computer program product include providing criteria for possible content alteration of a group set of related component elements or designated aspects capable of alteration.

Of course various other process aspects disclosed herein may also be incorporated into one or more computer program products, depending on the circumstances.

Figure 35:
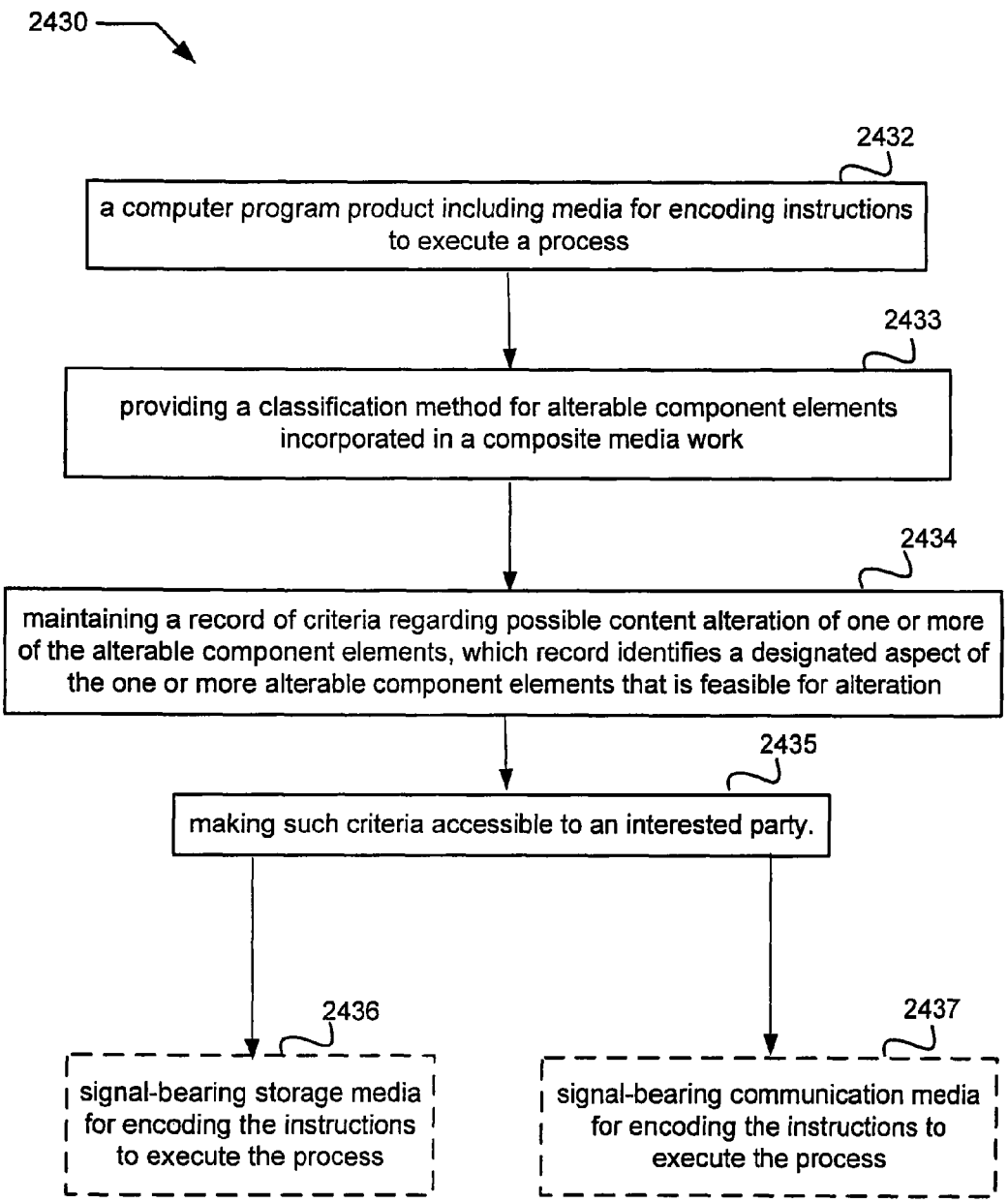
FIG. 35 is a diagrammatic flow chart for another exemplary computer program product embodiment.

The flow chart of FIG. 35 illustrates another embodiment 2430 for a computer program product including media for encoding instructions to execute a process (block 2432). Such an exemplary process may include providing a classification method for alterable component elements incorporated in a composite media work (block 2433); maintaining a record of criteria regarding possible content alteration of one or more of the alterable component elements, which record identifies a designated aspect of the one or more alterable component elements that is feasible for alteration (block 2434); and making such criteria accessible to an interested party (block 2435).

Additional possible features may include signal-bearing storage media for encoding the instructions to execute the process (block 2436), and signal-bearing communication media for encoding the instructions to execute the process (block 2437).

Other possible process features for incorporation in a computer program product may include maintaining a record of criteria applicable to one or more of the following type of possible content alteration: textual, verbal, visual, image, audio, musical, and animation. Additional exemplary process features for computer program embodiments may include maintaining a record of criteria applicable to one or more of the following type of alterable component elements: music, setting, hero, heroine, villain, clothing, vehicle, company, animals, food, product, brand, and dialogue.

Exemplary computer program instructions may also implement a process that includes maintaining a record of criteria applicable to possible content alteration of one or more of the following: related set of designated aspects, related set of alterable components, identical objects, same object in different scenes, and same object in different settings.

As a further example of process components that may be incorporated in a computer program product, such a process component may provide a classification system that identifies the following categories of alterable content incorporated in the composite media work: brand, trademark, service mark, copyrighted work, name, company name, identity, symbol, commercial symbol, icon, logotype, trade logo, trade dress, packaging, label, emblem, insignia, acronym, abbreviation, certification, slogan, jingle, animation, animated character, copyrighted item, and personage.

A further exemplary process feature for possible incorporation in a computer program product may include maintaining a record of criteria for addition or deletion or modification or replacement of an alterable component element or a designated aspect which are associated with a real-world entity, or in some instances which are associated with a real-world person.

Other possible computer program processes may include providing a classification system that identifies the following type of alterable content associated with a real-world entity: livery, color scheme, dress, fabric, jewelry, pattern, design, sculpture, artistic work, musical work, composition, publication, document, event, exhibit, performance, person, animal, mascot, character, and avatar. Additional program process features may identify the following type of alterable content associated with a real-world entity: product, service, invention, accessory, vehicle, place, address, location, store, building, school, university, hospital, church, club, group, organization, and business.

Some computer program embodiments may include a classification method that identifies the following type of alterable content associated with a real-world person: name, face, personal characteristics, identity, residence, title, achievement, rank, medal, badge, award, identification features, biometric attribute, photographic image, voice recording, accent, dialect, recognizable personality trait, gesture, demeanor, mannerism, appearance, clothing, hairstyle, tattoo, accessory, jewelry, piercing, avatar, setting, item possession, and property ownership.

In some computer program product embodiments, process instructions may facilitate accessibility to alteration criteria via one or more of the following: website, email request, database, telephonic request, postal mail request, stored message, publication, and announcement.

Figure 36:
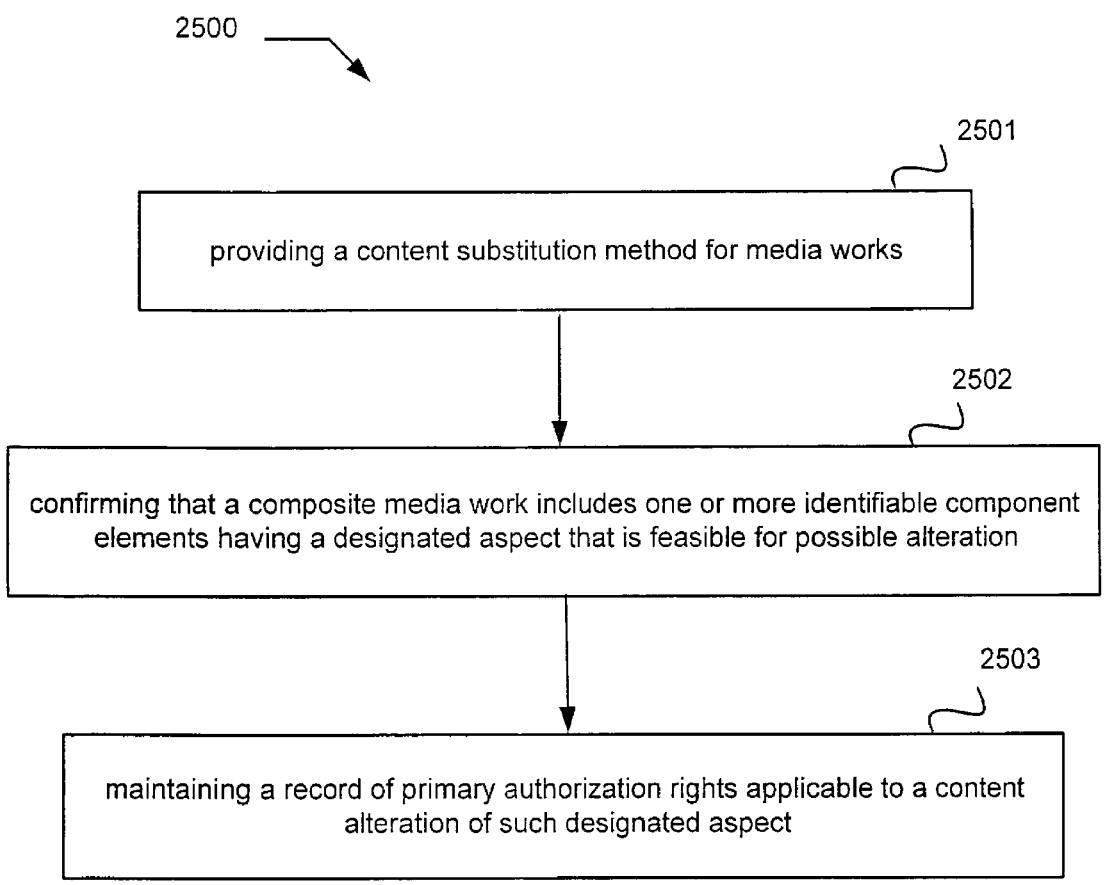
FIGS. 36-42 are more detailed flow charts illustrating various exemplary process features regarding authorization for media content alteration.

Referring to the high level flow chart of FIG. 36, an exemplary process embodiment 2500 may include providing a content substitution method for media works (block 2501), confirming that a composite media work includes one or more identifiable component elements having a designated aspect that is feasible for possible alteration (block 2502), and maintaining a record of primary authorization rights applicable to a content alteration of such designated aspect (block 2503).

Figure 37:
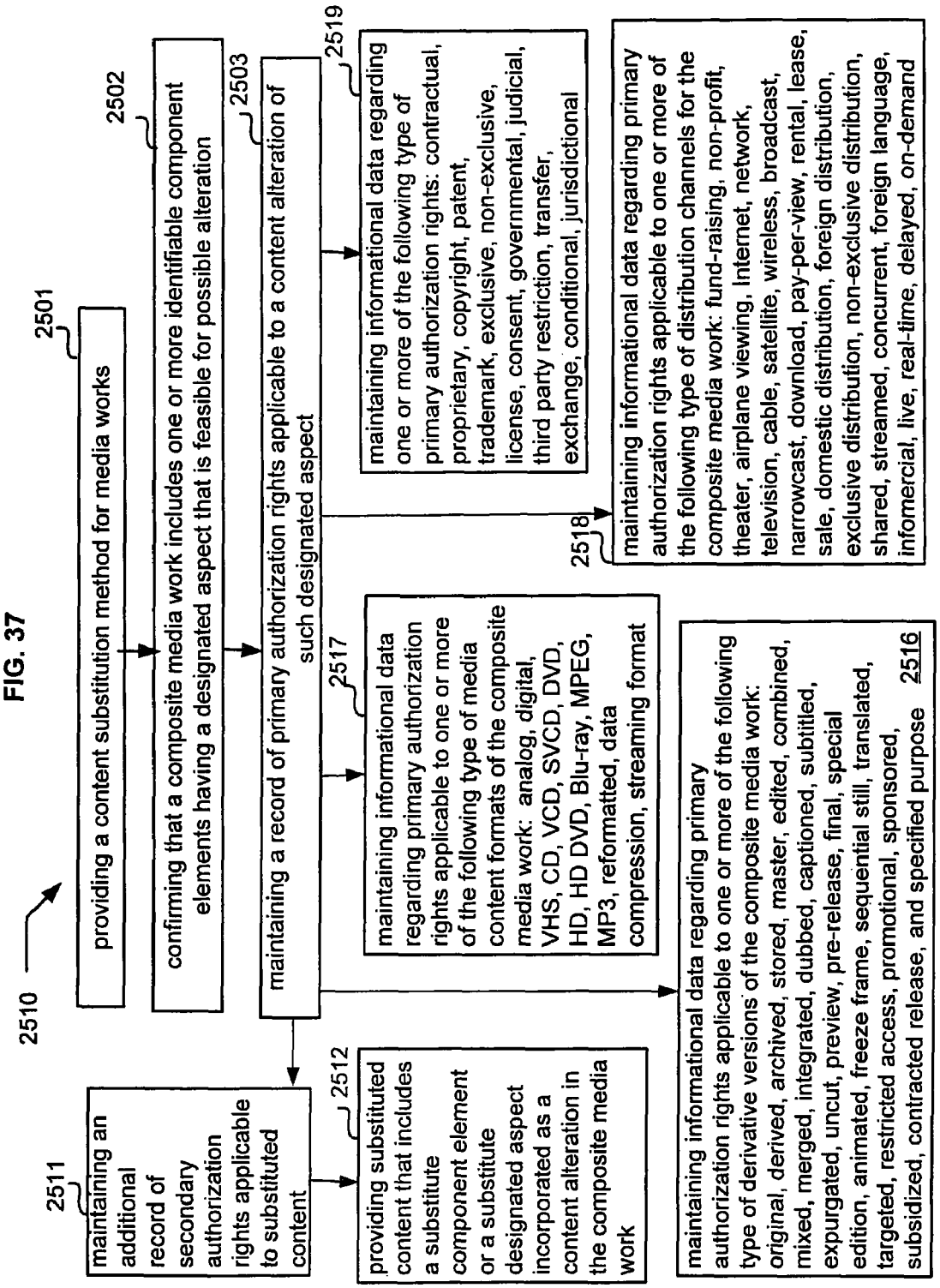

FIG. 37 is a more detailed flow chart illustrating exemplary embodiment features 2510 that include previously described process components 2501, 2502, 2503 along with maintaining an additional record of secondary authorization rights applicable to substituted content (block 2511). A related feature may include providing substituted content that includes a substitute component element or a substitute designated aspect incorporated as a content alteration in the composite media work (block 2512).

Another possible implementation feature may include maintaining informational data regarding the primary authorization rights applicable to one or more of the following type of derivative versions of the composite media work: original, derived, archived, stored, master, edited, combined, mixed, merged, integrated, dubbed, captioned, subtitled, expurgated, uncut, preview, pre-release, final, special edition, animated, freeze frame, sequential still, translated, targeted, restricted access, promotional, sponsored, subsidized, contracted release, and specified purpose (block 2516).

Further exemplary process features may include maintaining informational data regarding the primary authorization rights applicable to one or more of the following type of media content formats of the composite media work: analog, digital, VHS, CD, VCD, SVCD, DVD, HD, HD DVD, Blu-ray, MPEG, MP3, reformatted, data compression, and streaming format (block 2517). Additional exemplary enhancements may include maintaining informational data regarding one or more of the following type of primary authorization rights: contractual, proprietary, copyright, patent, trademark, exclusive, non-exclusive, license, consent, governmental, judicial, third party restriction, transfer, exchange, conditional, and jurisdictional (block 2519).

Another possible process component may include maintaining informational data regarding primary authorization rights applicable to one or more of the following type of distribution channels for the composite media work: fundraising, non-profit, theater, airplane viewing, Internet, network, television, cable, satellite, wireless, broadcast, narrowcast, download, pay-per-view, rental, lease, sale, domestic distribution, foreign distribution, exclusive distribution, non-exclusive distribution, shared, streamed, concurrent, foreign language, infomercial, live, real-time, delayed, and on-demand (block 2518).

Figure 38:
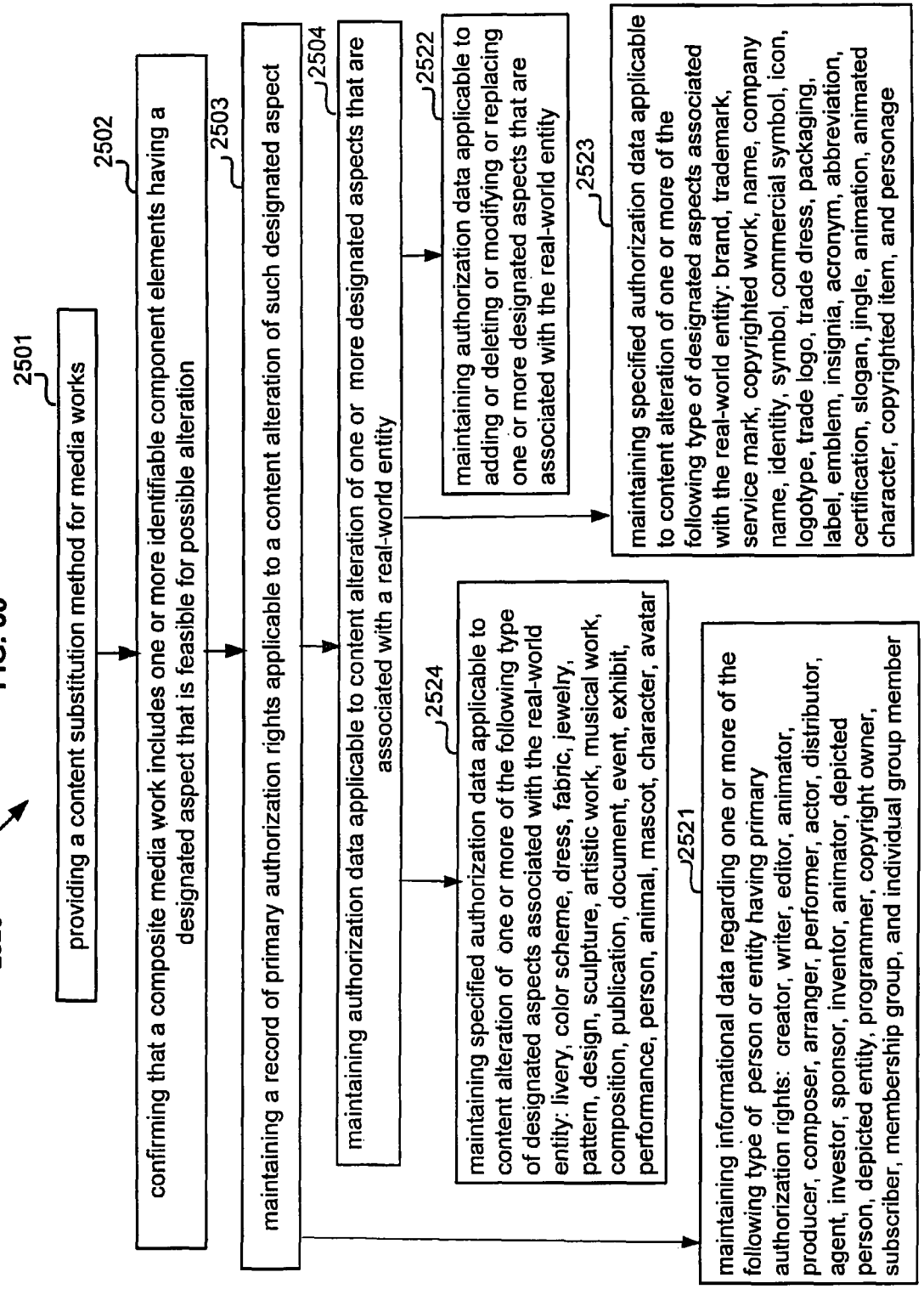

Referring to FIG. 38, an exemplary embodiment 2520 is depicted that includes previously described process components 2501, 2502, 2503 in combination with maintaining informational data regarding one or more of the following type of person or entity having primary authorization rights: creator, writer, editor, animator, producer, composer, arranger, performer, actor, distributor, agent, investor, sponsor, inventor, animator, depicted person, depicted entity, programmer, copyright owner, subscriber, membership group, and individual group member (block 2521).

Other possible process features relate to maintaining authorization data applicable to content alteration of one or more designated aspects that are associated with a real-world entity (block 2504). For example, some implementation features may include maintaining authorization data applicable to adding or deleting or modifying or replacing one or more designated aspects that are associated with the real-world entity (block 2522).

Additional possible enhancements may include maintaining specified authorization data applicable to content alteration of one or more of the following type of designated aspects associated with the real-world entity: brand, trademark, service mark, name, company name, identity, symbol, commercial symbol, icon, logotype, trade logo, trade dress, packaging, label, emblem, insignia, acronym, abbreviation, certification, slogan, jingle, animation, animated character, and personage (block 2523).

Further possible process features illustrated in FIG. 38 may include maintaining specified authorization data applicable to content alteration of one or more of the following type of designated aspects associated with the real-world entity: livery, color scheme, dress, fabric, jewelry, pattern, design, sculpture, artistic work, musical work, composition, publication, document, event, exhibit, performance, person, animal, mascot, character, and avatar (block 2524).

Figure 39:
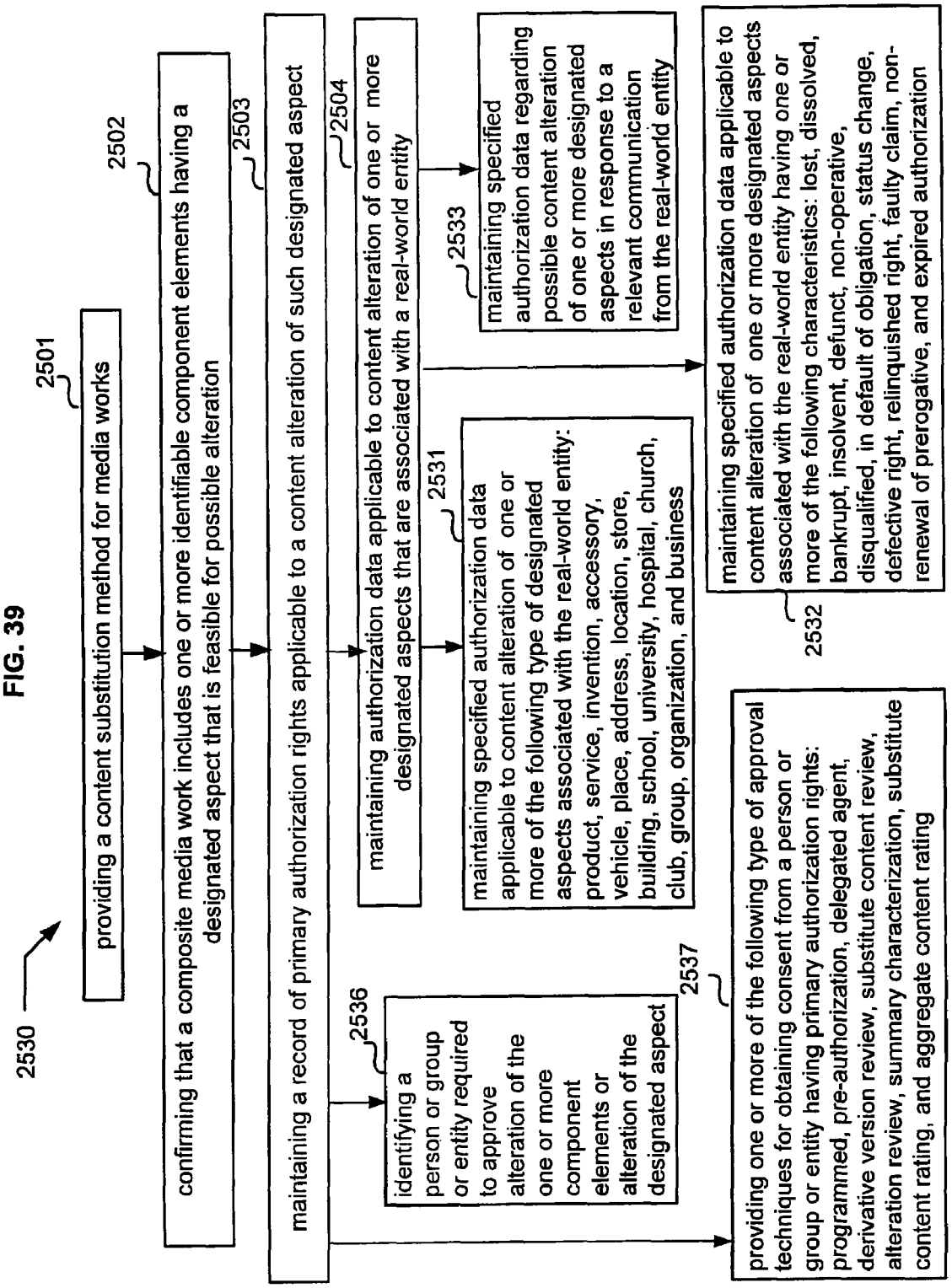

The illustrated embodiment features 2530 of FIG. 39 depict previously described process components 2501, 2502, 2503, 2504 along with maintaining specified authorization data applicable to content alteration of one or more of the following type of designated aspects associated with the real-world entity: product, service, invention, accessory, vehicle, place, address, location, store, building, school, university, hospital, church, club, group, organization, and business (block 2531).

Another possible process feature may include maintaining specified authorization data applicable to content alteration of one or more designated aspects associated with the real-world entity having one or more of the following characteristics: lost, dissolved, bankrupt, insolvent, defunct, non-operative, disqualified, in default of obligation, status change, defective right, relinquished right, faulty claim, non-renewal of prerogative, and expired authorization (block 2532). Additional possible enhancements may include maintaining specified authorization data regarding possible content alteration of one or more designated aspects in response to a relevant communication from the real-world entity (block 2533).

As further illustrated in FIG. 39, some embodiments may include identifying a person or group or entity required to approve alteration of the one or more component elements or alteration of the designated aspect (block 2536). Other possible process features may include providing one or more of the following type of approval techniques for obtaining consent from a person or group or entity having primary authorization rights: programmed, pre-authorization, delegated agent, derivative version review, substitute content review, alteration review, summary characterization, substitute content rating, and aggregate content rating (block 2537).

Figure 40:
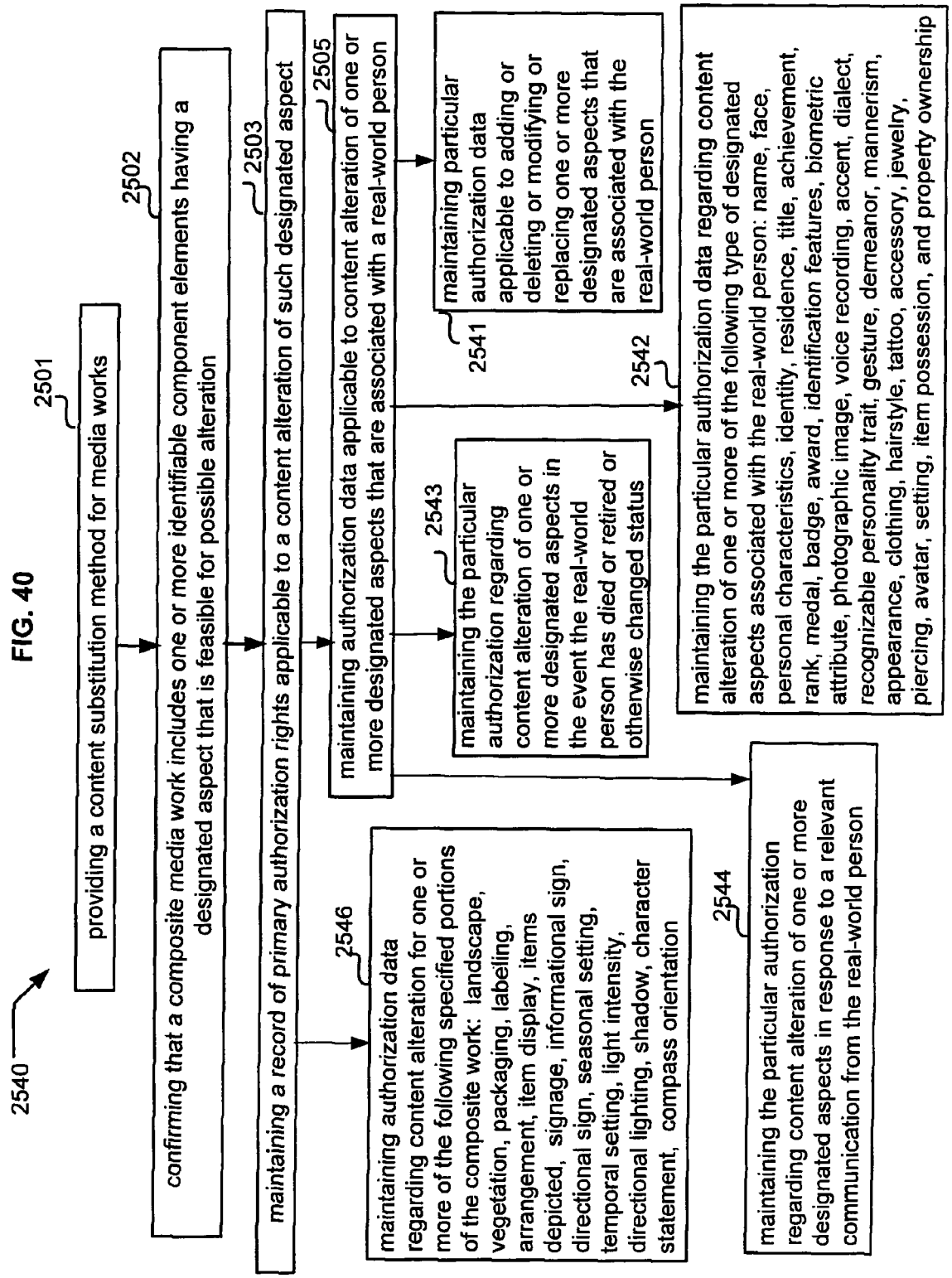

The detailed flow chart of FIG. 40 depicts various illustrated embodiment features 2540 including previously described process components 2501, 2502, 2503 along with maintaining particular authorization data applicable to content alteration of one or more designated aspects that are associated with a real-world person (block 2505). Some related possible implementation features may include maintaining particular authorization data applicable to adding or deleting or modifying or replacing one or more designated aspects that are associated with the real-world person (block 2541).

Another exemplary process feature may include maintaining the particular authorization data regarding content alteration of one or more of the following type of designated aspects associated with the real-world person: name, face, personal characteristics, identity, residence, title, achievement, rank, medal, badge, award, identification features, biometric attribute, photographic image, voice recording, accent, dialect, recognizable personality trait, gesture, demeanor, mannerism, appearance, clothing, hairstyle, tattoo, accessory, jewelry, piercing, avatar, setting, item possession, and property ownership (block 2542).

Further possible enhancements may include maintaining the particular authorization regarding content alteration of one or more designated aspects in the event the real-world person has died or retired or otherwise changed status (block 2543), and maintaining the particular authorization regarding content alteration of one or more designated aspects in response to a relevant communication from the real-world person (block 2544).

Additional possible implementation features may include maintaining authorization data regarding content alteration for one or more of the following specified portions of the composite work: landscape, vegetation, packaging, labeling, arrangement, item display, items depicted, signage, informational sign, directional sign, seasonal setting, temporal setting, light intensity, directional lighting, shadow, character statement, and compass orientation (block 2546).

Figure 41:
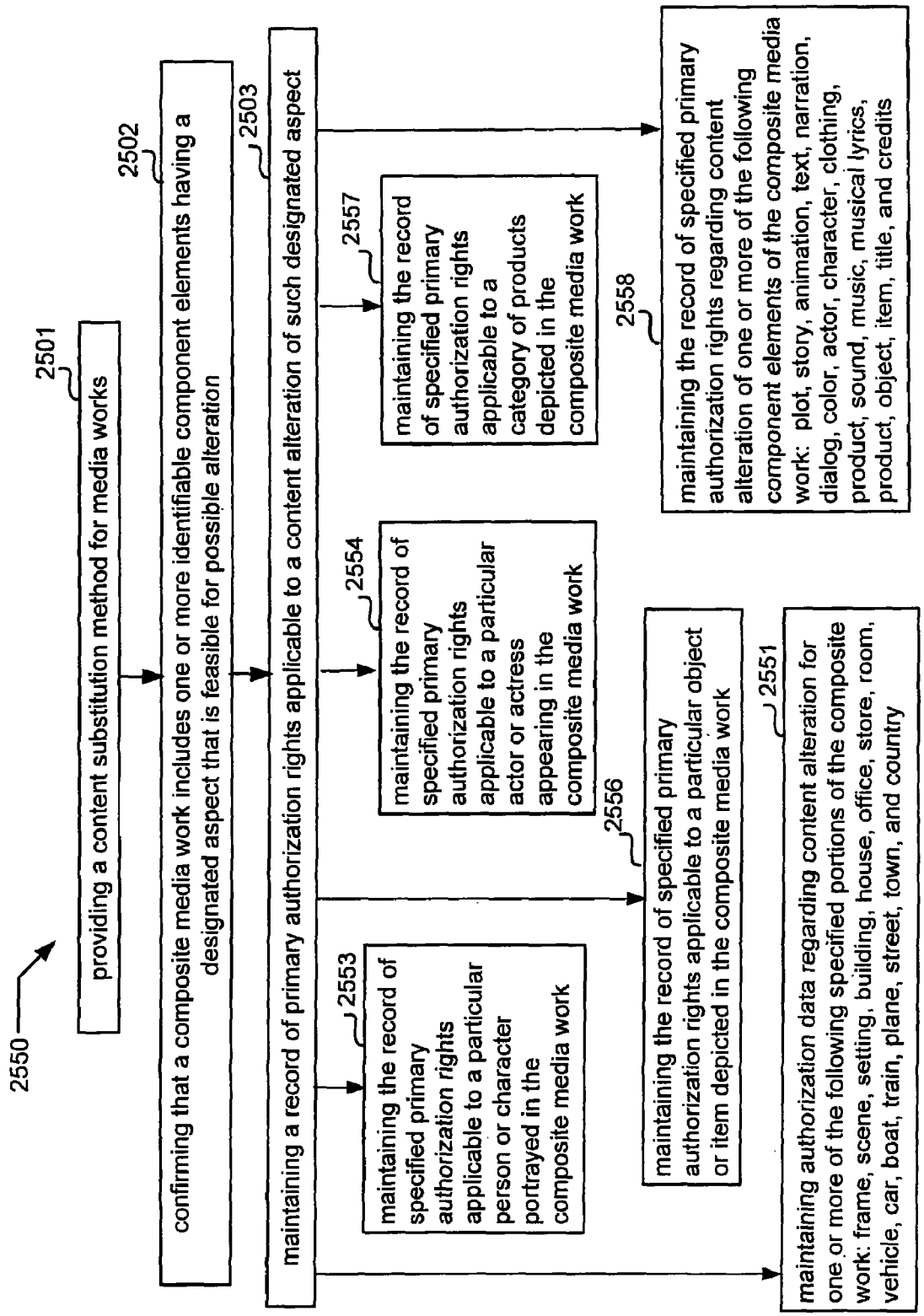

Referring to the illustrated embodiment features 2550 of FIG. 41, previously described process components 2501, 2502, 2503 are depicted in combination with maintaining authorization data regarding content alteration for one or more of the following specified portions of the composite work: frame, scene, setting, building, house, office, store, room, vehicle, car, boat, train, plane, street, town, and country (block 2551).

Another possible enhancement may include maintaining a record of specified primary authorization rights applicable to a particular person or character portrayed in the composite media work (block 2553). A related exemplary enhancement may include maintaining the record of specified primary authorization rights applicable to a particular actor or actress appearing in the composite media work (block 2554)

Additional exemplary process features may include maintaining the record of specified primary authorization rights applicable to a particular object or item depicted in the composite media work (block 2556). Related exemplary features may include maintaining the record of specified primary authorization rights applicable to a particular category of products depicted in the composite media work (block 2557).

A further possible feature may include maintaining the record of specified primary authorization rights regarding content alteration of one or more of the following component elements of the composite media work: plot, story, animation, text, narration, dialog, color, actor, character, clothing, product, sound, music, musical lyrics, product, object, item, title, and credits (block 2558).

Figure 42:
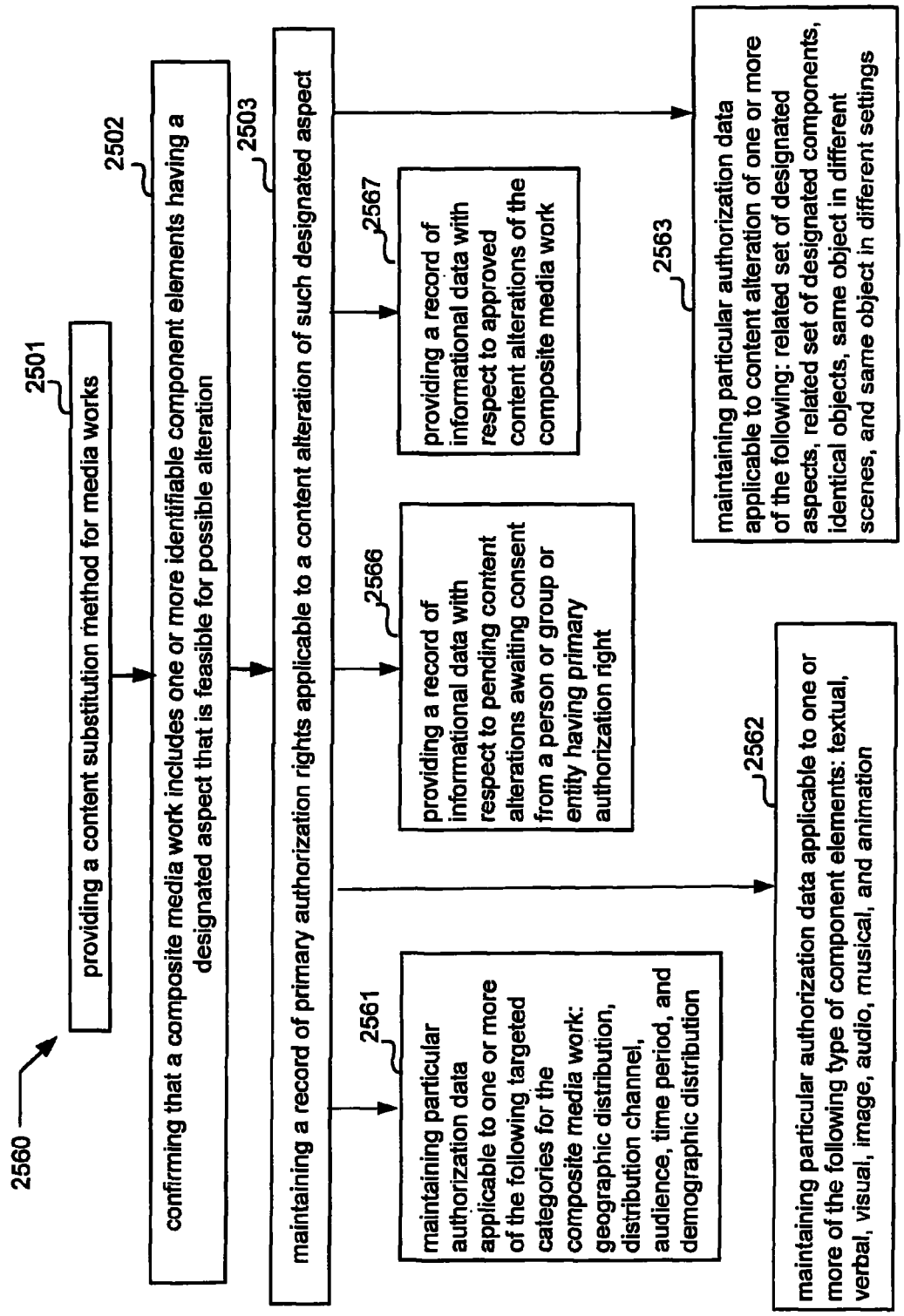

FIG. 42 illustrates various process embodiment features 2560 including previously depicted process components 2501, 2502, 2503 along with maintaining particular authorization data applicable to one or more of the following targeted categories for the composite media work: geographic distribution, distribution channel, audience, time period, and demographic distribution (block 2561). Other possible enhancements may include maintaining particular authorization data applicable to one or more of the following type of component elements: textual, verbal, visual, image, audio, musical, and animation (block 2562).

Additional implementation features may include maintaining particular authorization data applicable to content alteration of one or more of the following: related set of designated aspects, related set of designated components, identical objects, same object in different scenes, and same object in different settings (block 2563). Further possible features may include providing a record of informational data with respect to pending content alterations awaiting consent from a person or group or entity having primary authorization rights (block 2566), and providing a record of informational data with respect to approved content alterations of the composite media work (block 2567).

Figure 43:
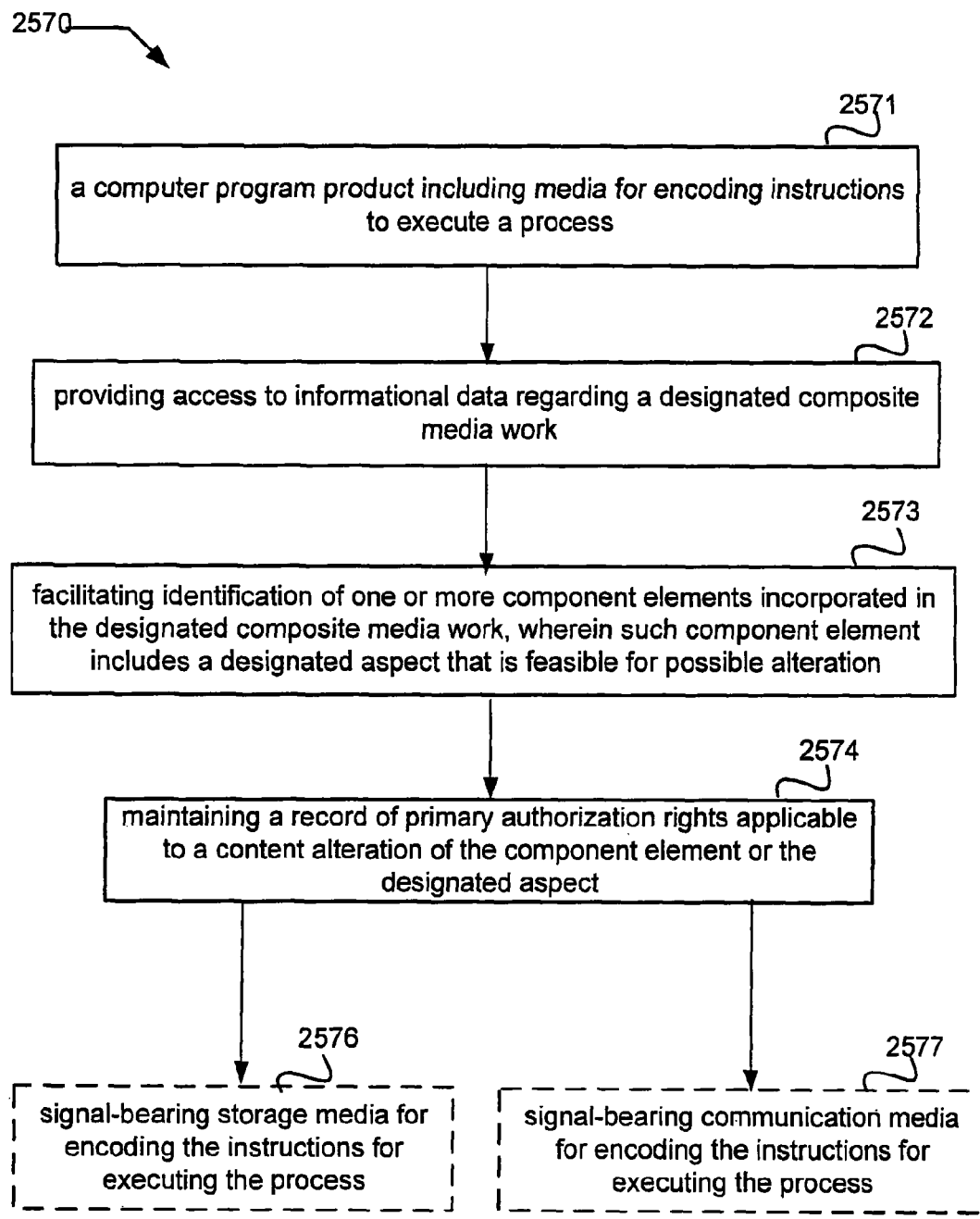
FIG. 43 is a diagrammatic flow chart for further exemplary computer program product embodiment.

Referring to FIG. 43, another exemplary embodiment 2570 may provide a computer program product including media for encoding instructions to execute a process (block 2571). Such a process may include providing access to informational data regarding a designated composite media work (block 2572); facilitating identification of one or more component elements incorporated in the designated composite media work, wherein such component element includes a designated aspect that is feasible for possible alteration (block 2573); and maintaining a record of primary authorization rights applicable to a content alteration of the component element or the designated aspect (block 2574).

Related possible features may include providing signal-bearing storage media for encoding the instructions for executing the process (block 2576), and providing signal-bearing communication media for encoding the instructions for executing the process (block 2577).

Further possible process features that may be incorporated in a program product embodiment include maintaining a record of primary authorization rights for addition or deletion or modification or replacement of an alterable component element or a designated aspect which are associated with a real-world entity, or in some instances which are associated with a real-world person.

Another exemplary feature of a program product embodiment may include maintaining specified authorization data applicable to alteration of one or more of the following type of content associated with the real-world entity: brand, trademark, service mark, copyrighted work, name, company name, identity, symbol, commercial symbol, icon, logotype, trade logo, trade dress, packaging, label, emblem, insignia, acronym, abbreviation, certification, slogan, jingle, animation, animated character, copyrighted item, and personage.

A further exemplary process feature of a program product embodiment may include maintaining specified authorization data applicable to alteration of one or more of the following type of content associated with a real-world entity: product, service, invention, accessory, vehicle, place, address, location, store, building, school, university, hospital, church, club, group, organization, and business.

Additional exemplary process features of a program product embodiment may include maintaining the particular authorization data regarding alteration of one or more of the following type of content associated with a real-world person: name, face, personal characteristics, identity, residence, title, achievement, rank, medal, badge, award, identification features, biometric attribute, photographic image, voice recording, accent, dialect, recognizable personality trait, gesture, demeanor, mannerism, appearance, clothing, hairstyle, tattoo, accessory, jewelry, piercing, avatar, setting, item possession, and property ownership.

Further possible process features in a program product embodiment may include maintaining a record of primary authorization rights applicable to one or more of the following type of possible content alteration: textual, verbal, visual, image, audio, musical, and animation. Other exemplary computer program product features may include maintaining a record of primary authorization rights applicable to one or more of the following type of alterable component elements: music, setting, hero, heroine, villain, clothing, vehicle, company, animals, food, product, brand, and dialogue.

Another exemplary feature of a program product embodiment may include maintaining a record of primary authorization rights applicable to possible content alteration of one or more of the following: related set of designated aspects, related set of alterable component elements, identical objects, same object in different scenes, and same object in different settings.

Further exemplary program product features may include maintaining a record of primary authorization rights that identifies one or more of the following type of targeted categories for a derivative version of the composite media work wherein the derivative version includes capability for incorporating substituted content: geographic distribution, distribution channel, audience, recipient group, targeted device, time period, and demographic distribution.

Additional possible process features implemented in a computer program product may include maintaining informational data regarding the primary authorization rights applicable to one or more of the following type of derivative versions of the composite media work capable of incorporating substitute content: original, derived, archived, stored, master, edited, combined, mixed, merged, integrated, dubbed, captioned, subtitled, expurgated, uncut, preview, pre-release, final, special edition, animated, freeze frame, sequential still, translated, targeted, restricted access, promotional, sponsored, subsidized, contracted release, and specified purpose Another exemplary feature of a program product embodiment may include maintaining informational data regarding the primary authorization rights applicable to one or more of the following type of media content formats of the composite media work capable of incorporating substitute content: analog, digital, VHS, CD, VCD, SVCD, DVD, HD, HD DVD, Blu-ray, MPEG, MP3, reformatted, data compression, and streaming format.

Other exemplary computer program products may include maintaining informational data regarding primary authorization rights applicable to one or more of the following type of distribution channels for the composite media work capable of incorporating substitute content: fund-raising, non-profit, theater, airplane viewing, Internet, network, television, cable, satellite, wireless, broadcast, narrowcast, download, pay-per-view, rental, lease, sale, domestic distribution, foreign distribution, exclusive distribution, non-exclusive distribution, shared, streamed, concurrent, foreign language, infomercial, live, real-time, delayed, and on-demand.

Further possibilities for a program product implementation may include providing a record of primary authorization rights that includes maintaining informational data regarding one or more of the following type of primary authorization rights: contractual, proprietary, copyright, patent, trademark, exclusive, non-exclusive, license, consent, governmental, judicial, third party restriction, transfer, exchange, conditional, and jurisdictional.

It will be understood that a computer program product embodiment may further include maintaining a record of informational data regarding one or more of the following type of person or entity having primary authorization rights: creator, writer, editor, animator, producer, composer, arranger, performer, actor, distributor, agent, investor, sponsor, inventor, animator, depicted person, depicted entity, programmer, copyright owner, subscriber, membership group, and individual group member.

Additional process features for a computer program product embodiment may include implementing one or more of the following type of approval techniques for obtaining consent from a person or group or entity having primary authorization rights: programmed, pre-authorization, delegated agent, derivative version review, substitute content review, alteration review, summary characterization, substitute content rating, and aggregate content rating. Another program product feature may include maintaining a record of primary authorization rights applicable to one or more of the following: particular person or character portrayed in the composite media work; particular actor of actress appearing in the composite work; particular object or item depicted in the composite media work; and a particular category of products depicted in the composite media work.

In some implementations, a program product feature may include maintaining a record of specified primary authorization rights regarding alteration of one or more of the following type of content in the composite media work: plot, story, animation, text, narration, dialog, color, actor, character, clothing, product, sound, music, musical lyrics, product, object, item, title, and credits. Another possible program product feature may further include maintaining a record that includes particular authorization data applicable to one or more of the following targeted categories for the composite media work: geographic distribution, distribution channel, audience, time period, and demographic distribution.

A further process feature of a computer program product embodiment may include maintaining an additional record of secondary authorization rights applicable to substitute content for the designated composite media work.

Figure 44:
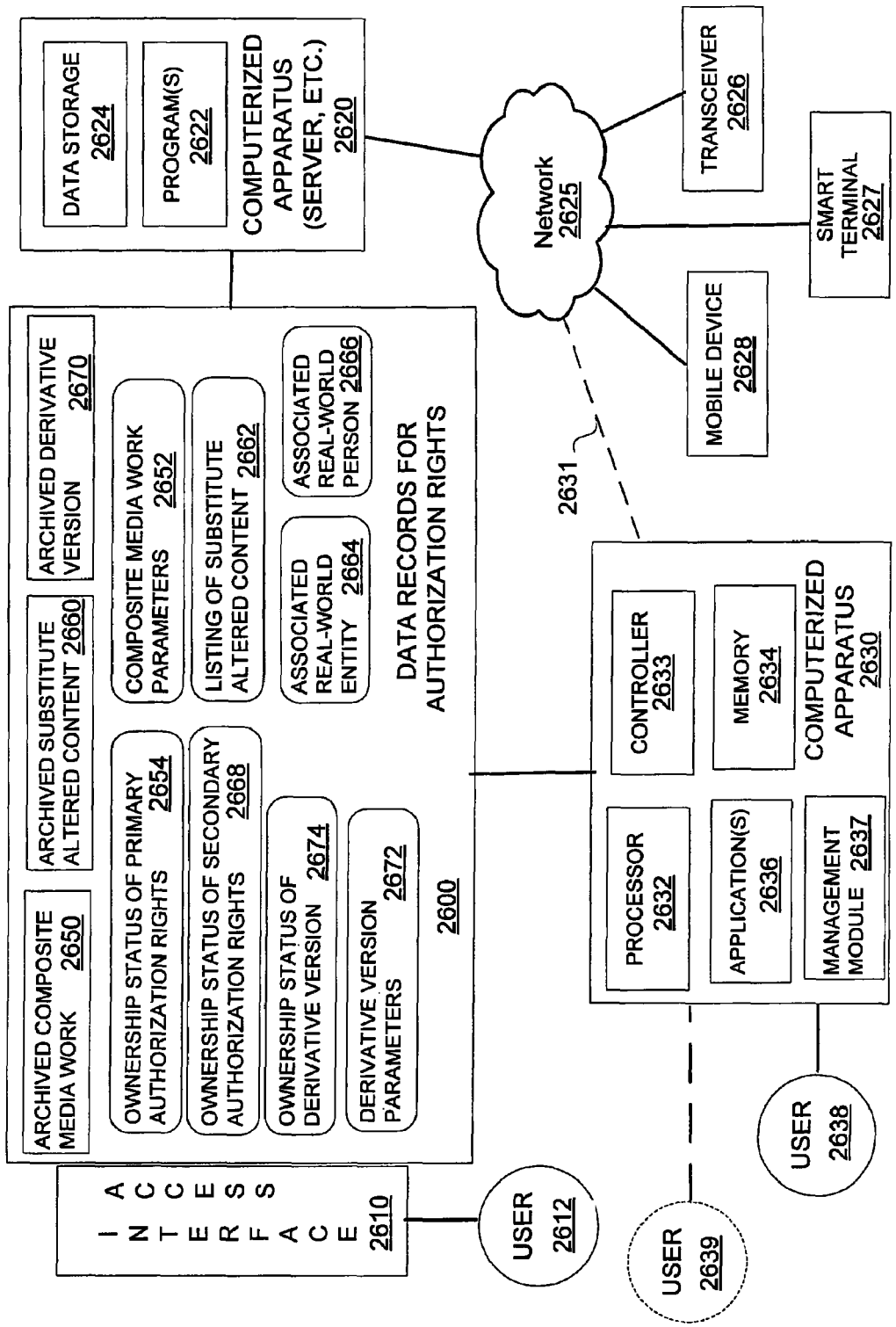
FIG. 44 is a schematic block diagram illustrating an exemplary embodiment that provides accessibility and management of data records for authorization rights regarding media content alteration.

The exemplary embodiments shown in the schematic block diagram of FIG. 44 depict various modes of accessibility to data records for authorization rights 2600 that relate to substitute media content. Such accessibility modes are not intended to be limiting, and are provided only for purposes of illustration. For example, user 2612 may have direct accessibility to a local storage location for the data records for authorization rights 2600 via access interface 2610. In some instances such accessibility may be password protected or otherwise restricted in order to maintain satisfactory data security.

Additional data record accessibility may be provided by computerized apparatus 2620 that includes typical server functionality including but not limited to programs 2622 for data management as well as data storage 2624. Such data storage 2624 could also provide backup storage as well as supplemental or replacement storage for some of the data records for authorization rights 2600. The computerized apparatus 2620 may have communication links via network 2625 (e.g., WAN, LAN, Internet, Peer-to-Peer, etc.) to many different types of access devices such as transceiver 2626, smart terminal 2627, mobile device 2628, and the like. It will be understood by those skilled in the art that future network accessibility may become ubiquitous, and the network access devices shown are for purposes of illustration only.

Further data record accessibility may be provided to active user 2638 and inactive user 2639, both of whom may operate computerized apparatus 2630, which includes an optional communication link 2631 to network 2625 as well as a direct link to the data records for authorization rights 2600. Additional data management functions may be provided by processor 2632, controller 2633, memory 2634, applications 2636, and management module 2637.

The topical categories of data records for authorization rights 2600 may include an archived composite media work 2650, related composite media work parameters 2652, and informational data regarding ownership status of primary authorization rights 2654. Other topical categories may include archived substitute altered content 2660, related listing of substitute altered content 2662, identity data for an associated real-world entity 2664, identity data for an associated real-world person 2666, and informational data regarding ownership status of secondary authorization rights 2668.

Further possible topical categories may include an archived derivative version 2670, related derivative version parameters 2672, and informational data regarding ownership status of derivative version 2674. Of course other possible topical categories may be included, and some data categories may not be required, depending on the circumstances.

It will be understood from the exemplary system embodiments disclosed herein that a system for media content alteration may include a listing that identifies substitute altered content to be incorporated in a derivative version of a composite media work. wherein the composite media work includes one or more component elements or designated aspects feasible for possible alteration. Such a listing may further include a record of one or more of the following types of substitute altered content to be incorporated in the derivative version: addition, deletion, modification, and replacement.

Additional possible system features that identify substitute altered content may include a further listing of the one or more of the following type of substitute altered content to be incorporated in the derivative version: related set of designated aspects, related set of alterable components, identical objects, same object in different scenes, and same object in different settings. Another exemplary system feature may include a further listing of the one or more of the following type of substitute altered content to be incorporated in the derivative version: textual, verbal, visual, image, audio, musical, live action, reenactment, simulation, and animation.

An exemplary system embodiment may further include a data record regarding ownership status of secondary authorization rights applicable to the substitute altered content. Such a system data record may also include ownership status information applicable to a derivative version that has incorporated the substitute altered content. Additional possible system data records may include secondary authorization rights applicable to one or more of the following targeted categories for the derivative version: geographic distribution, distribution channel, audience, MPAA rating, ESRB rating, proprietary rating, government rating, time period, and demographic distribution.

As rating systems become more widespread in various countries of the world, it will be understood that some traditional rating systems may be revised and in some instances adapted for new media categories. Also new rating systems may be developed and accepted by various media content entities. The current rating standards developed by MPAA (Motion Picture Association of America) are therefore included by way of example only (e.g., G, PG, PG-13, R, NC-17) and may be modified in the future. Similarly the current rating standards developed by ESRB (Entertainment Software Rating Board) are also included by way of example only (e.g., Early Childhood, Everyone, Everyone 10+, Teen, Mature, Adults Only) and may modified in the future. Similarly so-called proprietary and government rating systems are included by way of example only and are not intended to be limiting.

Similarly, new/revised distribution channels as well as new/revised media formats may be developed in the future, and the indicated distribution channels and media formats are included by way of example only and are not intended to be limiting.

Further system data records may include secondary authorization rights regarding one or more of the following type of substitute altered content associated with a real-world entity: brand, trademark, service mark, copyrighted work, name, company name, identity, symbol, commercial symbol, icon, logotype, trade logo, trade dress, packaging, label, emblem, insignia, acronym, abbreviation, certification, MPAA rating, ESRB rating, proprietary rating, government rating, slogan, jingle, animation, animated character, copyrighted item, and personage.

Other possible system data record information may include secondary authorization rights regarding one or more of the following type of substitute altered content associated with a real-world person: name, face, personal characteristics, identity, residence, title, achievement, occupation, career, role, activity, hobby, rank, medal, badge, award, identification features, biometric attribute, photographic image, voice recording, accent, dialect, recognizable personality trait, gesture, demeanor, mannerism, appearance, clothing, hairstyle, tattoo, accessory, jewelry, piercing, avatar, setting, item possession, and property ownership.

In some instances an exemplary system data record may include informational data regarding a specified derivative version of the composite media work, wherein the specified derivative version already includes the substitute altered content. Other possible system data records may include informational data to identify a specified derivative version having capability to incorporate future substitute content in addition to the substitute altered content. Another possible system embodiment component may include a management module to coordinate compliance with the secondary authorization rights.

It will be further understood from the exemplary system features disclosed herein that some embodiments may provide computerized apparatus operably coupled to some of the various types of data records and informational listings. User access to such data record and informational listings may be provided via an access interface to the computerized apparatus.

Figure 45:
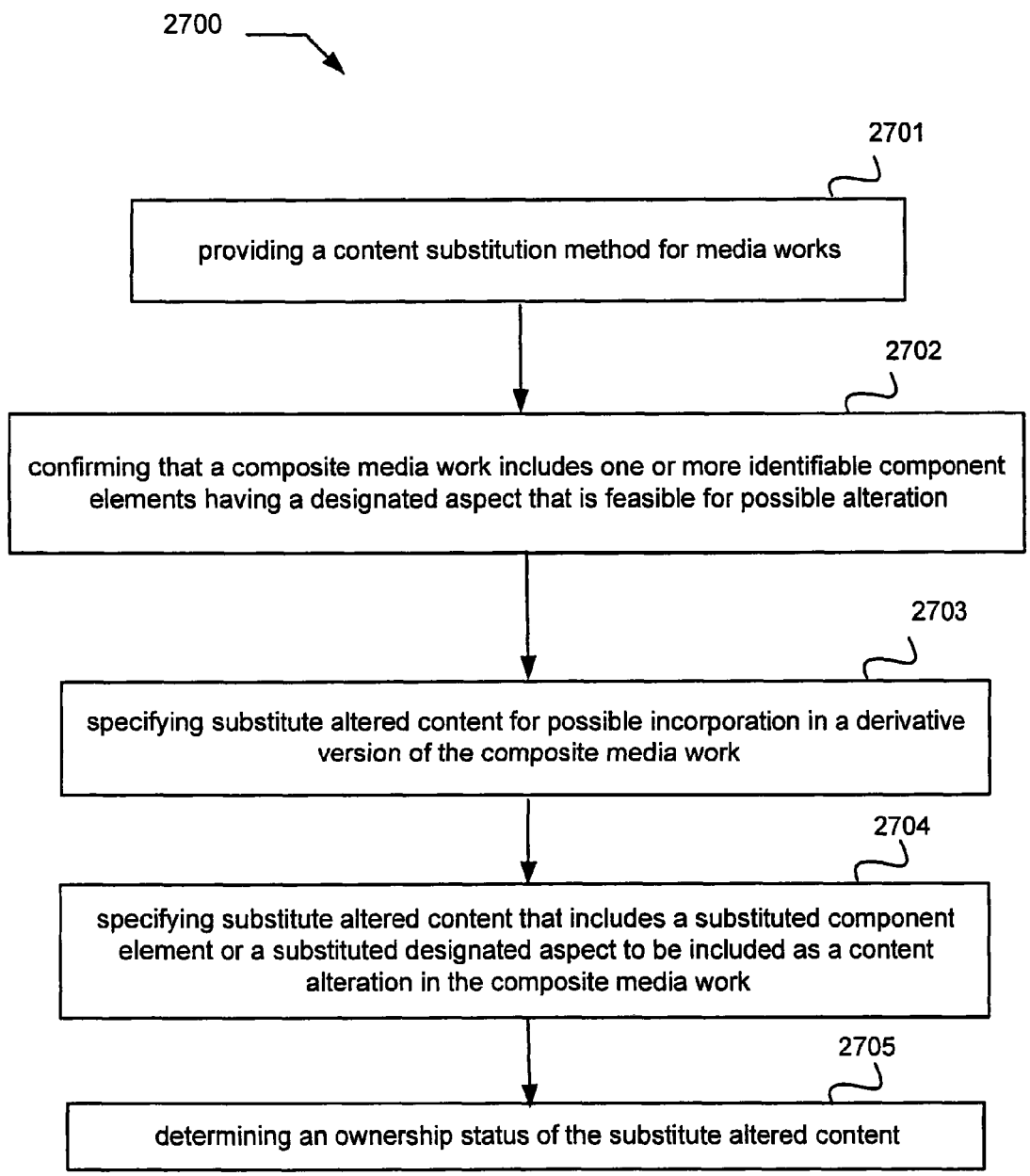
FIG. 45 is high level flow chart illustrating another exemplary process embodiment for content substitution in media works.

Referring to an exemplary process embodiment 2700 in FIG. 45, an implementation may provide a content substitution method for media works (block 2701), including confirming that a composite media work includes one or more identifiable component elements having a designated aspect that is feasible for possible alteration (block 2702), and specifying substitute altered content for possible incorporation in a derivative version of the composite media work (block 2703). Other exemplary features may include specifying substitute altered content that includes a substituted component element or a substituted designated aspect to be included as a content alteration in the composite media work (block 2704), and determining an ownership status of the substitute altered content (block 2705).

Figure 46:
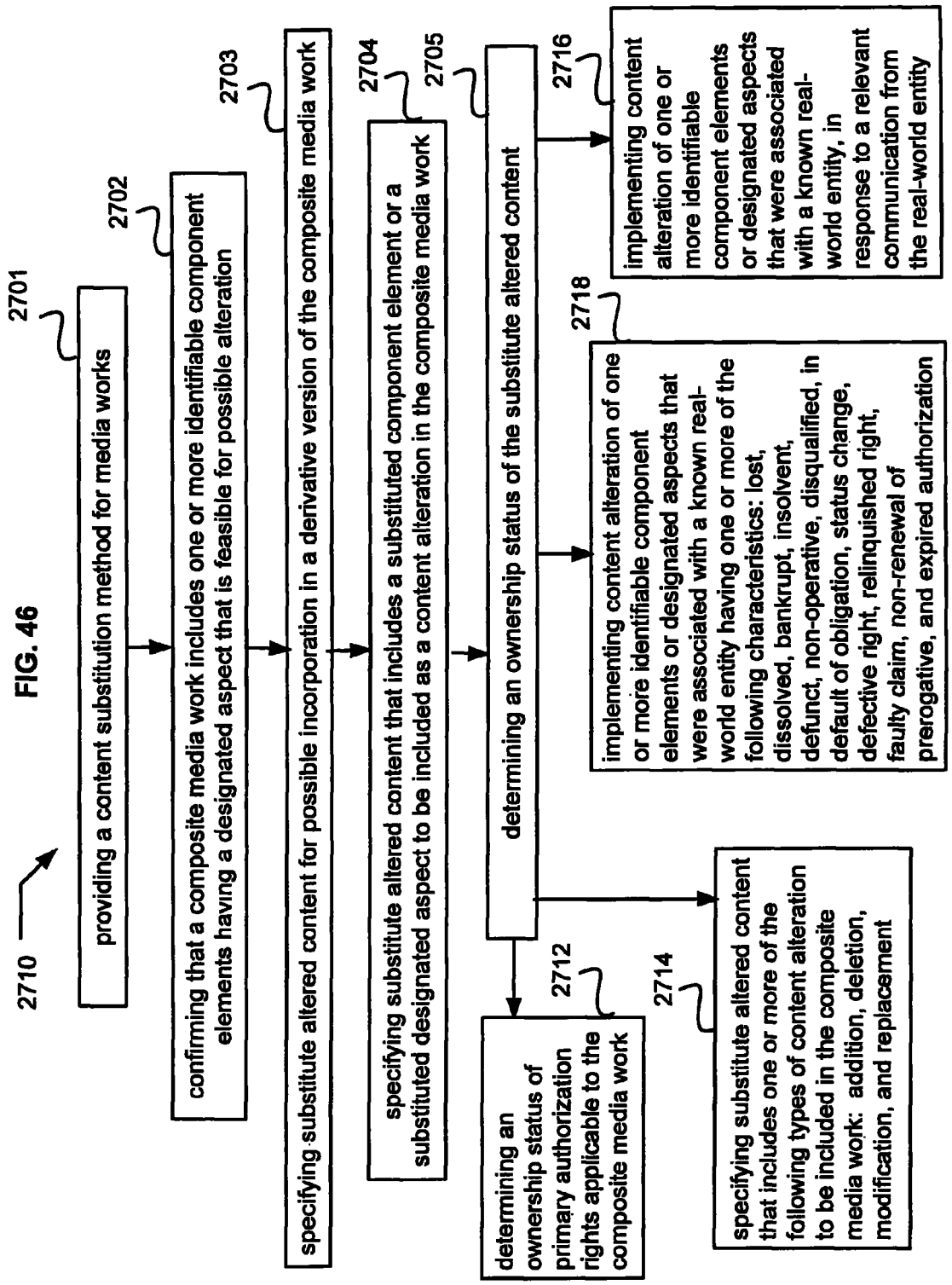
FIGS. 46-54 are more detailed flow charts illustrating management of authorization rights regarding substitute altered content for media works.

Additional detailed embodiment implementations 2710 illustrated in FIG. 46 include previously described process features 2701, 2702, 2703, 2704, 2405 in combination with determining an ownership status of primary authorization rights applicable to the composite media work (block 2712), and specifying substitute altered content that includes one or more of the following types of content alteration to be included in the composite media work: addition, deletion, modification, and replacement (block 2714).

Another possible process feature may include implementing content alteration of one or more identifiable component elements or designated aspects that were associated with a known real-world entity, in response to a relevant communication from the real-world entity (block 2716). Further possible enhancements may include implementing content alteration of one or more identifiable component elements or designated aspects that were associated with a known real-world entity having one or more of the following characteristics: lost, dissolved, bankrupt, insolvent, defunct, non-operative, disqualified, in default of obligation, status change, defective right, relinquished right, faulty claim, non-renewal of prerogative, and expired authorization (block 2718).

Figure 47:
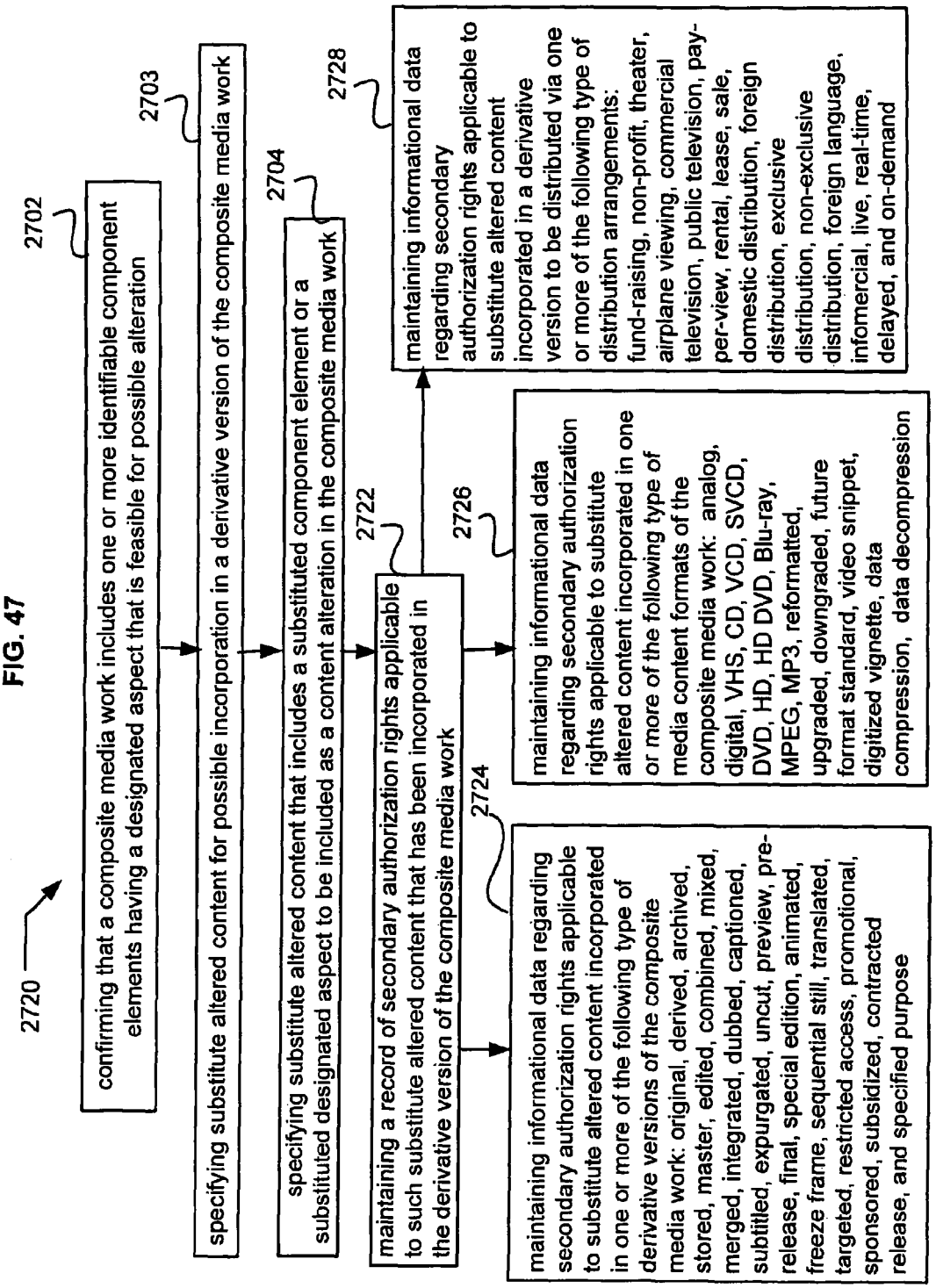

Referring to illustrated embodiments 2720 in FIG. 47, previously described process features 2702, 2703, 2704 may be combined with maintaining a record of secondary authorization rights applicable to such substitute altered content that has been incorporated in the derivative version of the composite media work (block 2722). A related exemplary feature may include maintaining informational data regarding secondary authorization rights applicable to substitute altered content incorporated in one or more of the following type of derivative versions of the composite media work: original, derived, archived, stored, master, edited, combined, mixed, merged, integrated, dubbed, captioned, subtitled, expurgated, uncut, preview, pre-release, final, special edition, animated, freeze frame, sequential still, translated, targeted, restricted access, promotional, sponsored, subsidized, contracted release, and specified purpose (block 2724).

Additional process features may include maintaining informational data regarding secondary authorization rights applicable to substitute altered content incorporated in one or more of the following type of media content formats of the composite media work: analog, digital, VHS, CD, VCD, SVCD, DVD, HD, HD DVD, Blu-ray, MPEG MP3, reformatted, upgraded, downgraded, future format standard, video snippet, digitized vignette, data compression, and data decompression (block 2726).

Further possible implementations may include maintaining informational data regarding secondary authorization rights applicable to substitute altered content incorporated in a derivative version to be distributed via one or more of the following type of distribution arrangements: fund-raising, non-profit, theater, airplane viewing, commercial television, public television, pay-per-view, rental, lease, sale, domestic distribution, foreign distribution, exclusive distribution, non-exclusive distribution, foreign language, infomercial, live, real-time, delayed, and on-demand (block 2728).

Figure 48:
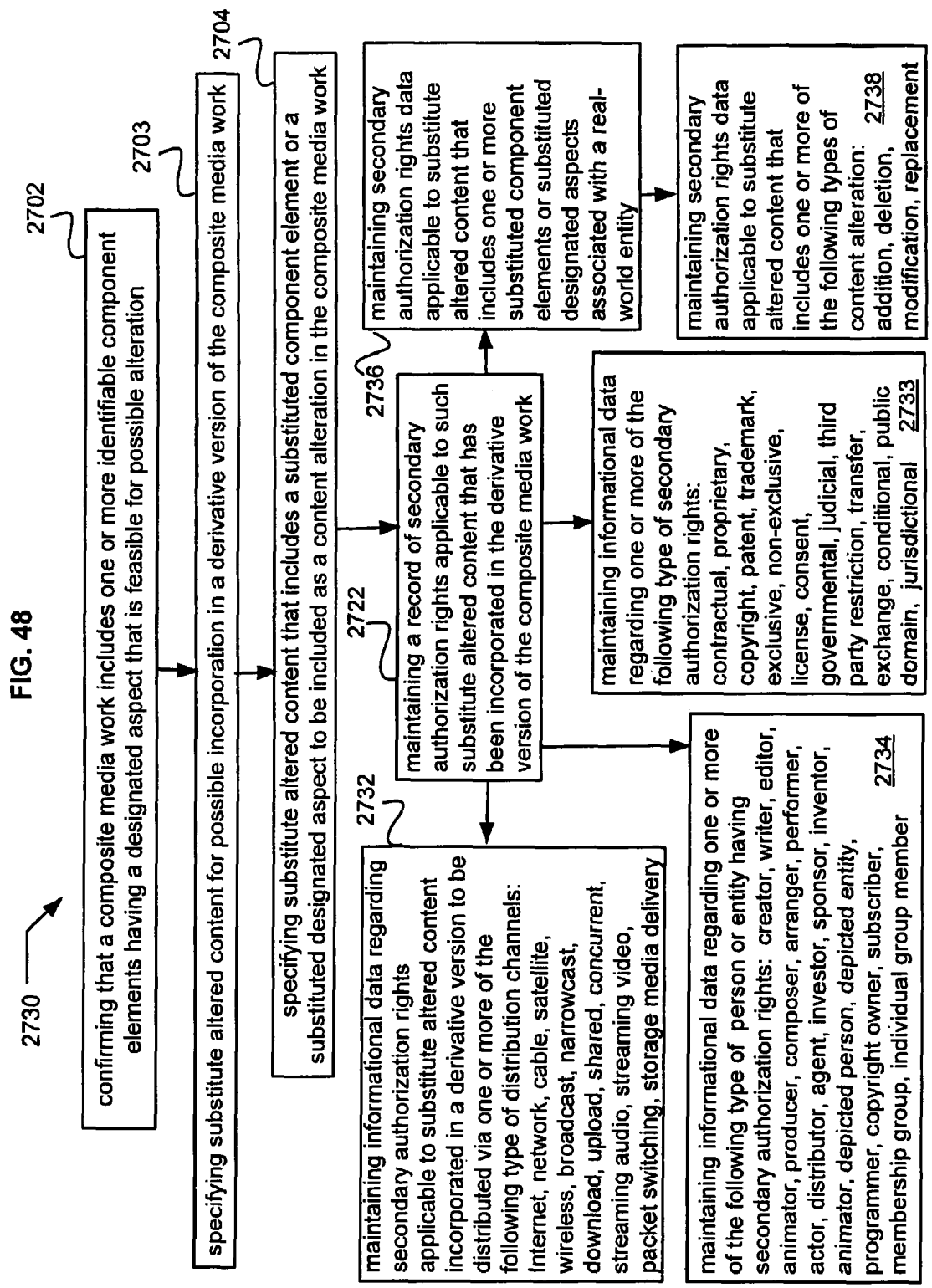

The various exemplary embodiments 2730 disclosed in FIG. 48 include previously described process features 2702, 2703, 2704, 2722 along with maintaining informational data regarding secondary authorization rights applicable to substitute altered content incorporated in a derivative version to be distributed via one or more of the following type of distribution channels: Internet, network, cable, satellite, wireless, broadcast, narrowcast, download, upload, shared, concurrent, streaming audio, streaming video, packet switching, and storage media delivery (block 2732).

Another possible enhancement may include maintaining informational data regarding one or more of the following type of secondary authorization rights: contractual, proprietary, copyright, patent, trademark, exclusive, non-exclusive, license, consent, governmental, judicial, third party restriction, transfer, exchange, conditional, public domain, and jurisdictional (block 2733).

Further exemplary features may include maintaining informational data regarding one or more of the following type of person or entity having secondary authorization rights: creator, writer, editor, animator, producer, composer, arranger, performer, actor, distributor, agent, investor, sponsor, inventor, animator, depicted person, depicted entity, programmer, copyright owner, subscriber, membership group, and individual group member (block 2734).

The flow chart of FIG. 48 further depicts additional process features including maintaining secondary authorization rights data applicable to substitute altered content that includes one or more substituted component elements or substituted designated aspects associated with a real-world entity (block 2736), and maintaining secondary authorization rights data applicable to substitute altered content that includes one or more of the following types of content alteration: addition, deletion, modification, and replacement (block 2738).

Figure 49:
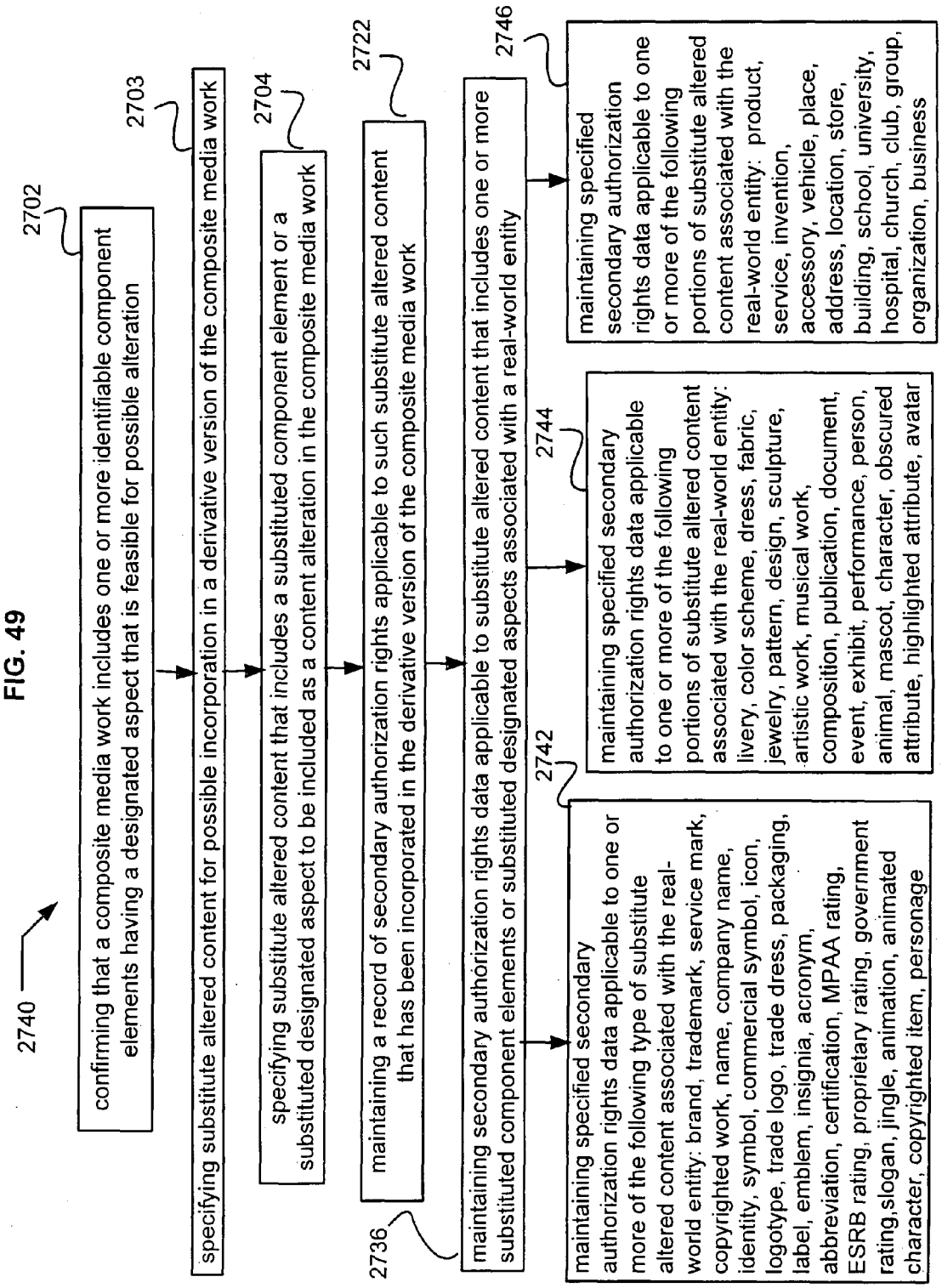

The detailed embodiments 2740 illustrated in FIG. 49 include previously described process features 2702, 2703, 2704, 2722, 2736 as well as maintaining specified secondary authorization rights data applicable to one or more of the following type of substitute altered content associated with the real-world entity: brand, trademark, service mark, copyrighted work, name, company name, identity, symbol, commercial symbol, icon, logotype, trade logo, trade dress, packaging, label, emblem, insignia, acronym, abbreviation, certification, MPAA rating, ESRB rating, proprietary rating, government rating, slogan, jingle, animation, animated character, copyrighted item, and personage (block 2742).

Further possible enhancements may include maintaining specified secondary authorization rights data applicable to one or more of the following portions of substitute altered content associated with the real-world entity: livery, color scheme, dress, fabric, jewelry, pattern, design, sculpture, artistic work, musical work, composition, publication, document, event, exhibit, performance, person, animal, mascot, character, obscured attribute, highlighted attribute, and avatar (block 2744), and maintaining specified secondary authorization rights data applicable to one or more of the following portions of substitute altered content associated with the real-world entity: product, service, invention, accessory, vehicle, place, address, location, store, building, school, university, hospital, church, club, group, organization, and business (block 2746).

Figure 50:
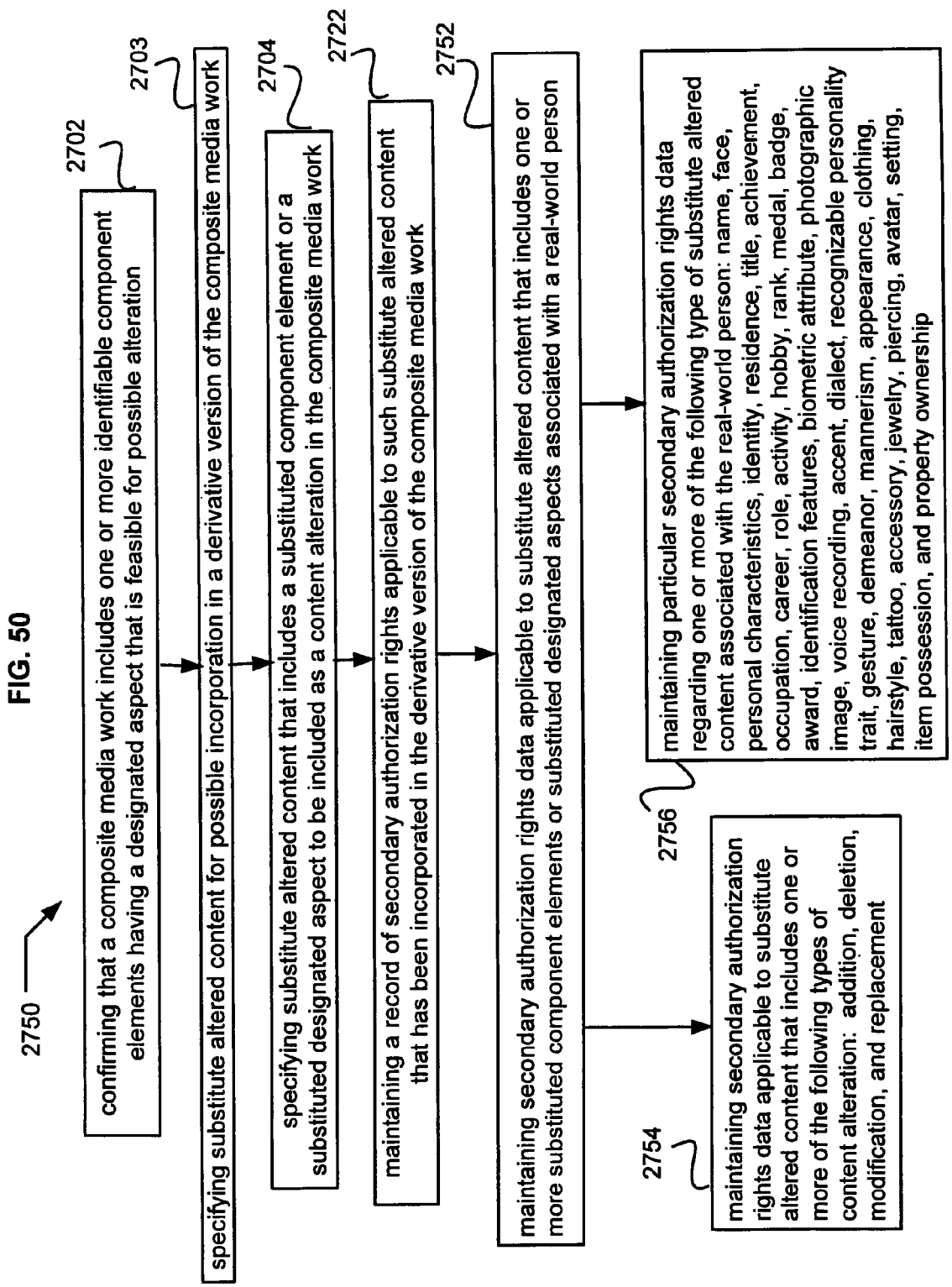

The exemplary embodiments 2750 disclosed in FIG. 50 include previously described process features 2702, 2703, 2704, 2722, in combination with maintaining secondary authorization rights data applicable to substitute altered content that includes one or more substituted component elements or substituted designated aspects associated with a real-world person (block 2752). Another possible implementation feature may include maintaining secondary authorization rights data applicable to substitute altered content that includes one or more of the following types of content alteration: addition, deletion, modification, and replacement (block 2754).

Further possibilities may include maintaining particular secondary authorization rights data regarding one or more of the following type of substitute altered content associated with the real-world person: name, face, personal characteristics, identity, residence, title, achievement, occupation, career, role, activity, hobby, rank, medal, badge, award, identification features, biometric attribute, photographic image, voice recording, accent, dialect, recognizable personality trait, gesture, demeanor, mannerism, appearance, clothing, hairstyle, tattoo, accessory, jewelry, piercing, avatar, setting, item possession, and property ownership (block 2756).

Figure 51:
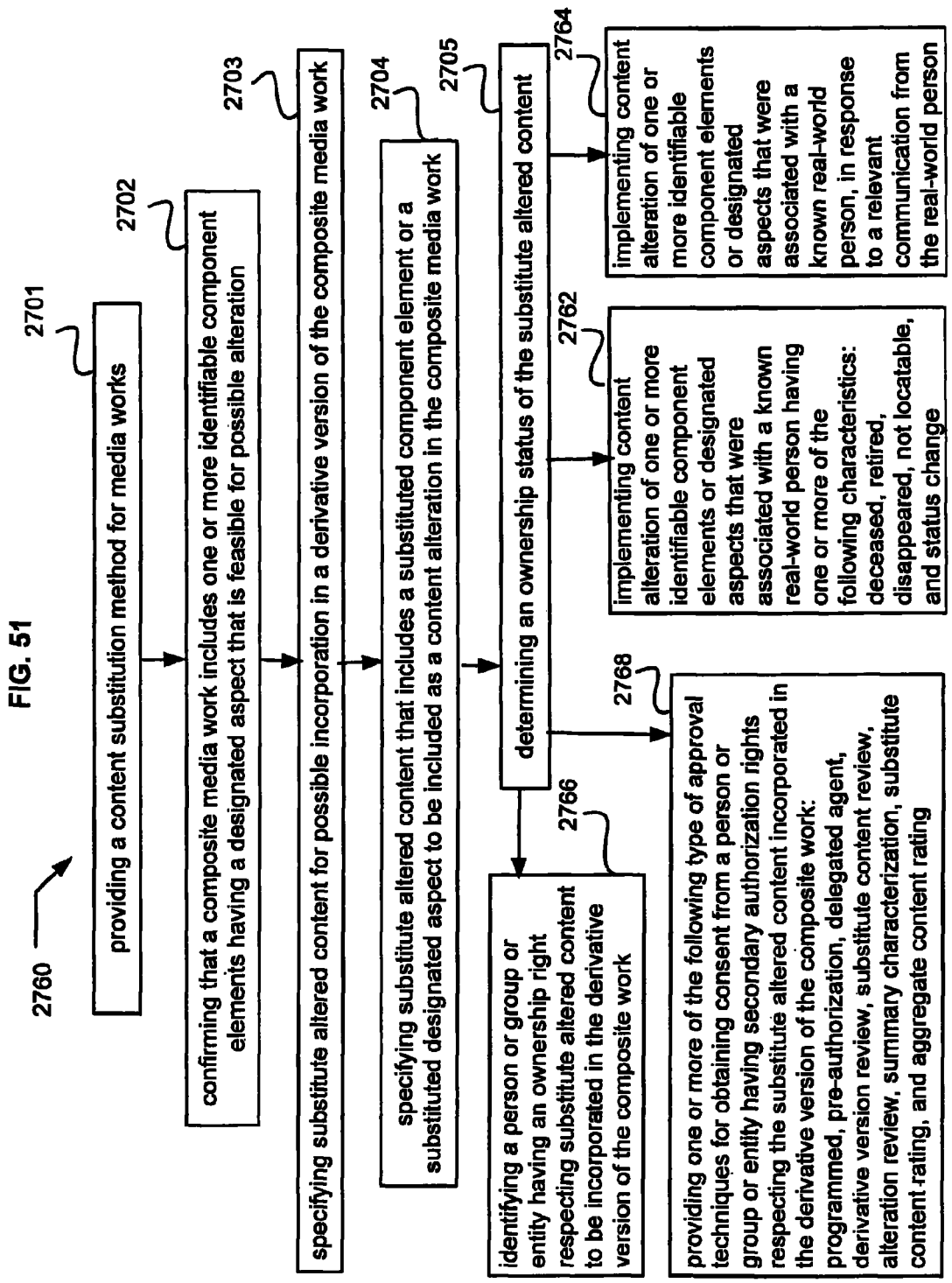

The exemplary embodiments 2760 disclosed in FIG. 51 include previously described process features 2701, 2702, 2703, 2704, 2705 as well as implementing content alteration of one or more identifiable component elements or designated aspects that were associated with a known real-world person having one or more of the following characteristics: deceased, retired, disappeared, not locatable, and status change (block 2762). Additional implementation enhancements may include implementing content alteration of one or more identifiable component elements or designated aspects that were associated with a known real-world person, in response to a relevant communication from the real-world person (block 2764).

Other exemplary features disclosed in FIG. 51 include identifying a person or group or entity having an ownership right respecting substitute altered content to be incorporated in the derivative version of the composite work (block 2766), and providing one or more of the following type of approval techniques for obtaining consent from a person or group or entity having secondary authorization rights respecting the substitute altered content incorporated in the derivative version of the composite work: programmed, pre-authorization, delegated agent, derivative version review, substitute content review, alteration review, summary characterization, substitute content rating, and aggregate content rating (block 2768).

Figure 52:
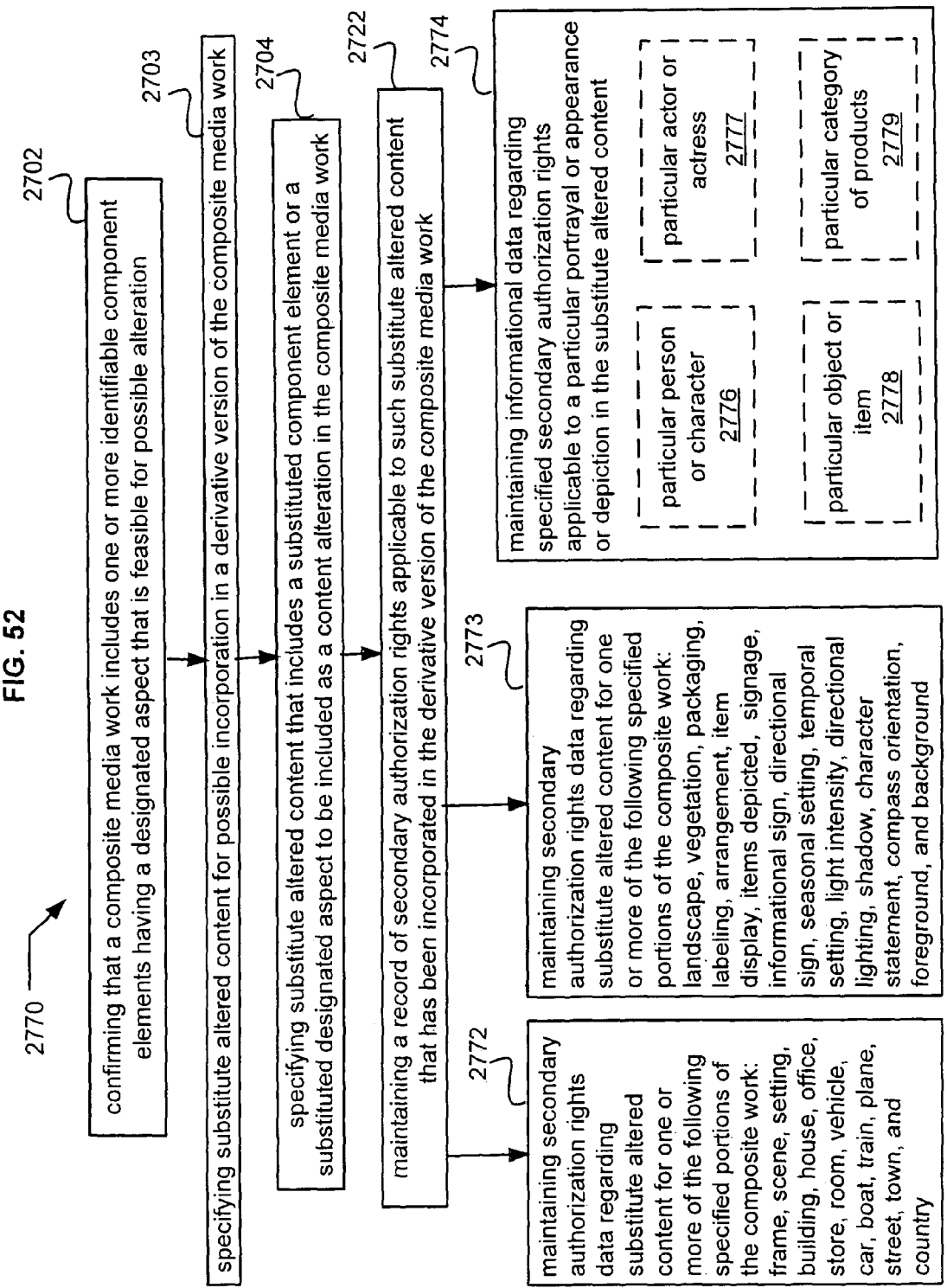

The flow chart of FIG. 52 illustrates further exemplary embodiments 2770 that include previously described possibilities 2702, 2703, 2704, 2722 along with maintaining secondary authorization rights data regarding substitute altered content for one or more of the following specified portions of the composite work: frame, scene, setting, building, house, office, store, room, vehicle, car, boat, train, plane, street, town, and country (block 2772).

Another possible implementation may include maintaining secondary authorization rights data regarding substitute altered content for one or more of the following specified portions of the composite work: landscape, vegetation, packaging, labeling, arrangement, item display, items depicted, signage, informational sign, directional sign, seasonal setting, temporal setting, light intensity, directional lighting, shadow, character statement, compass orientation, foreground, and background (block 2773).

The flow chart of FIG. 52 also illustrates other exemplary possibilities including maintaining informational data regarding specified secondary authorization rights applicable to a particular portrayal or appearance or depiction in the substitute altered content (block 2774). For example, such informational data may be applicable to a portrayal of a particular person or character (block 2776), an appearance by a particular actor or actress (block 2777), a depiction of a particular object or item (block 2778), and a depiction of a particular category of products (block 2779).

Figure 53:
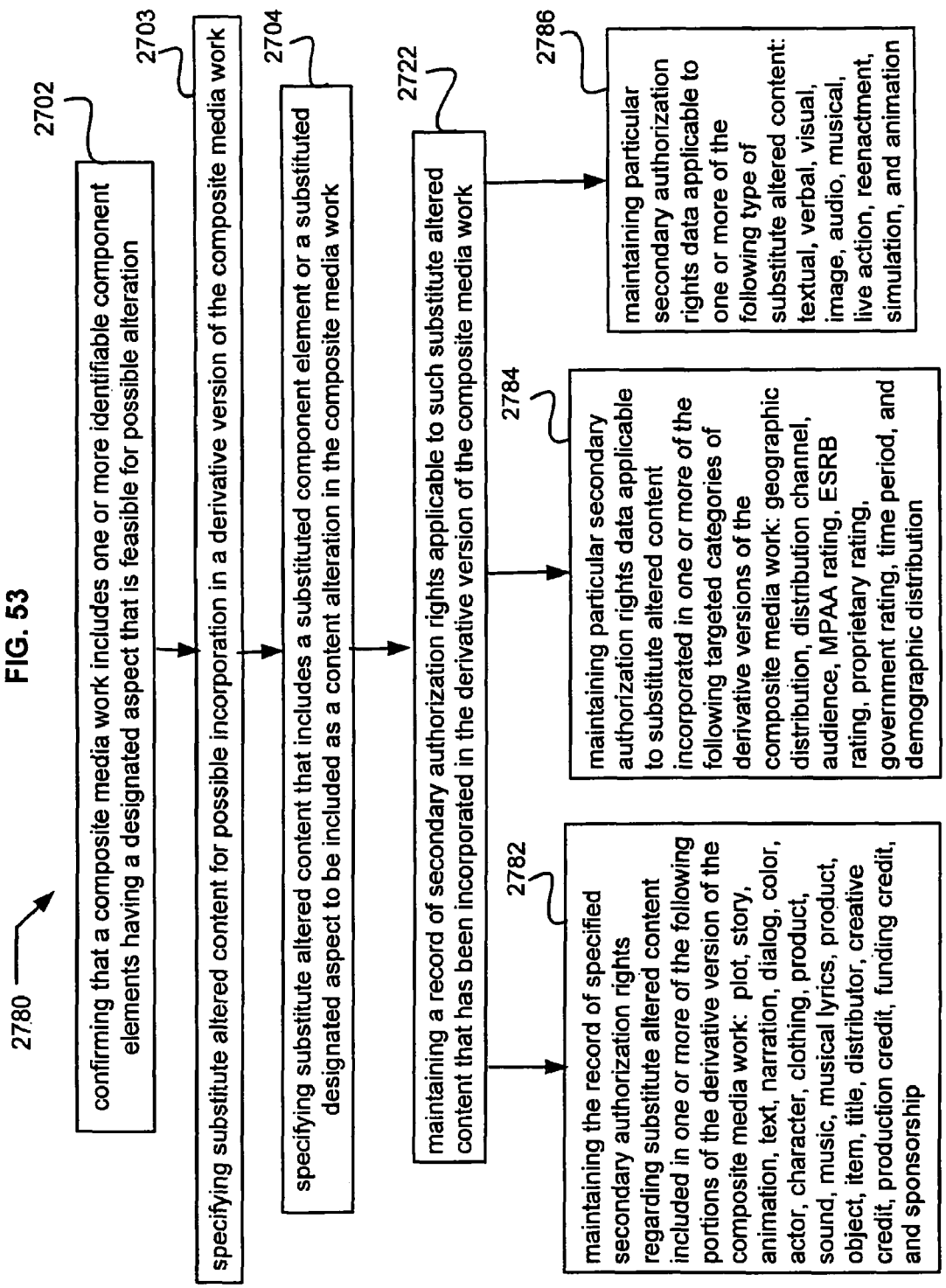

The detailed exemplary features 2780 illustrated in the flow chart of FIG. 53 include previously described features 2702, 2703, 2704, 2722 in combination with maintaining the record of specified secondary authorization rights regarding substitute altered content included in one or more of the following portions of the derivative version of the composite media work: plot, story, animation, text, narration, dialog, color, actor, character, clothing, product, sound, music, musical lyrics, product, object, item, title, distributor, creative credit, production credit, funding credit, and sponsorship (block 2782).

Other possible implementation enhancements may include maintaining particular secondary authorization rights data applicable to substitute altered content incorporated in one or more of the following targeted categories of derivative versions of the composite media work: geographic distribution, distribution channel, audience, MPAA rating, ESRB rating, proprietary rating, government rating, time period, and demographic distribution (block 2784). In some instances an exemplary embodiment may further include maintaining particular secondary authorization rights data applicable to one or more of the following type of substitute altered content: textual, verbal, visual, image, audio, musical, live action, reenactment, simulation, and animation (block 2786).

Figure 54:
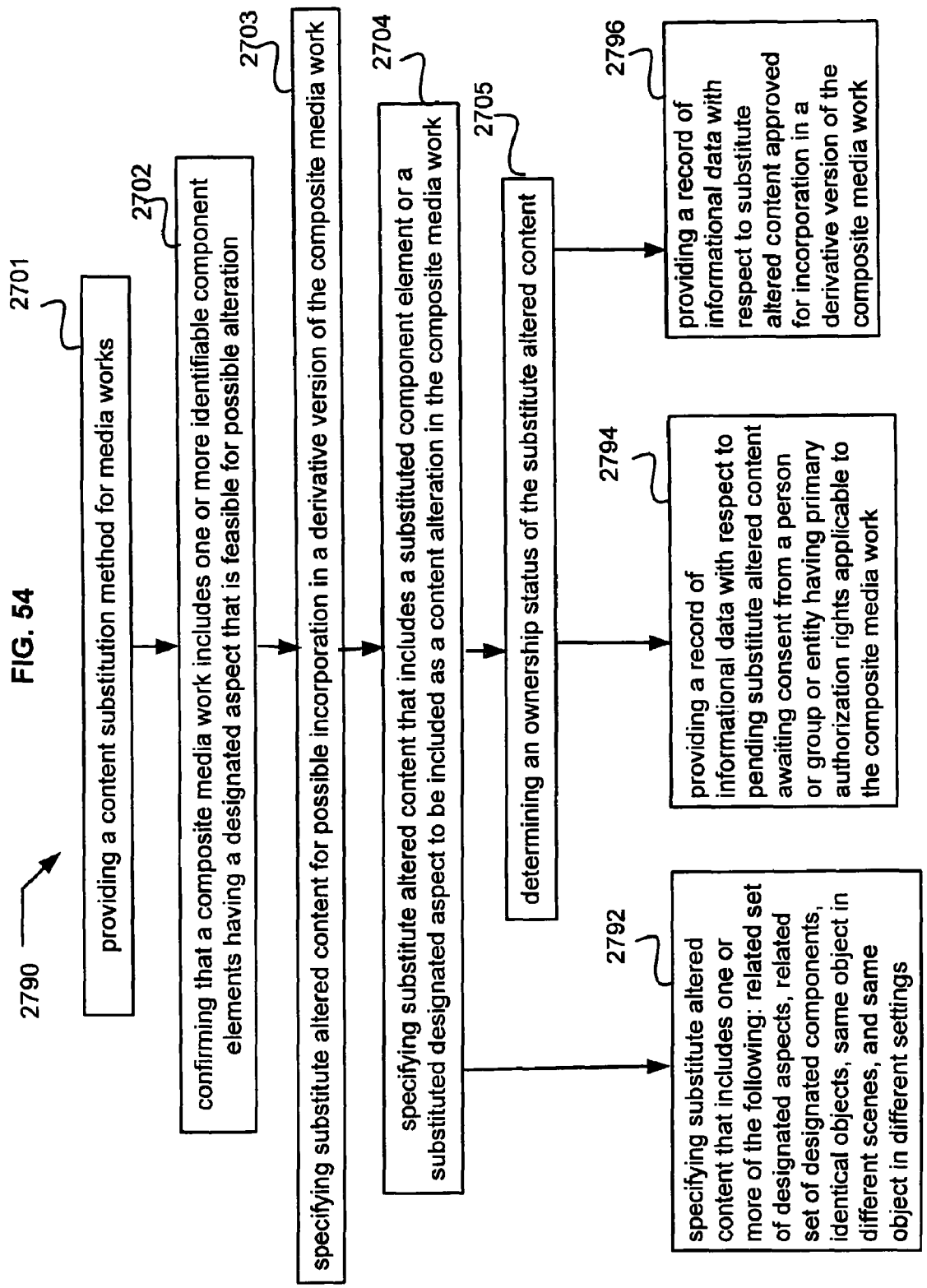

As shown in the illustrated embodiments 2790 of FIG. 54, exemplary possible features may include those previously described 2701, 2702, 2703, 2704, 2705 as well as specifying substitute altered content that includes one or more of the following: related set of designated aspects, related set of designated components, identical objects, same object in different scenes, and same object in different settings (block 2792).

In some instances various enhancements relating to records may be provided, including providing a record of informational data with respect to pending substitute altered content awaiting consent from a person or group or entity having primary authorization rights applicable to the composite media work (block 2794), and providing a record of informational data with respect to substitute altered content approved for incorporation in a derivative version of the composite media work (block 2796).

Figure 55:
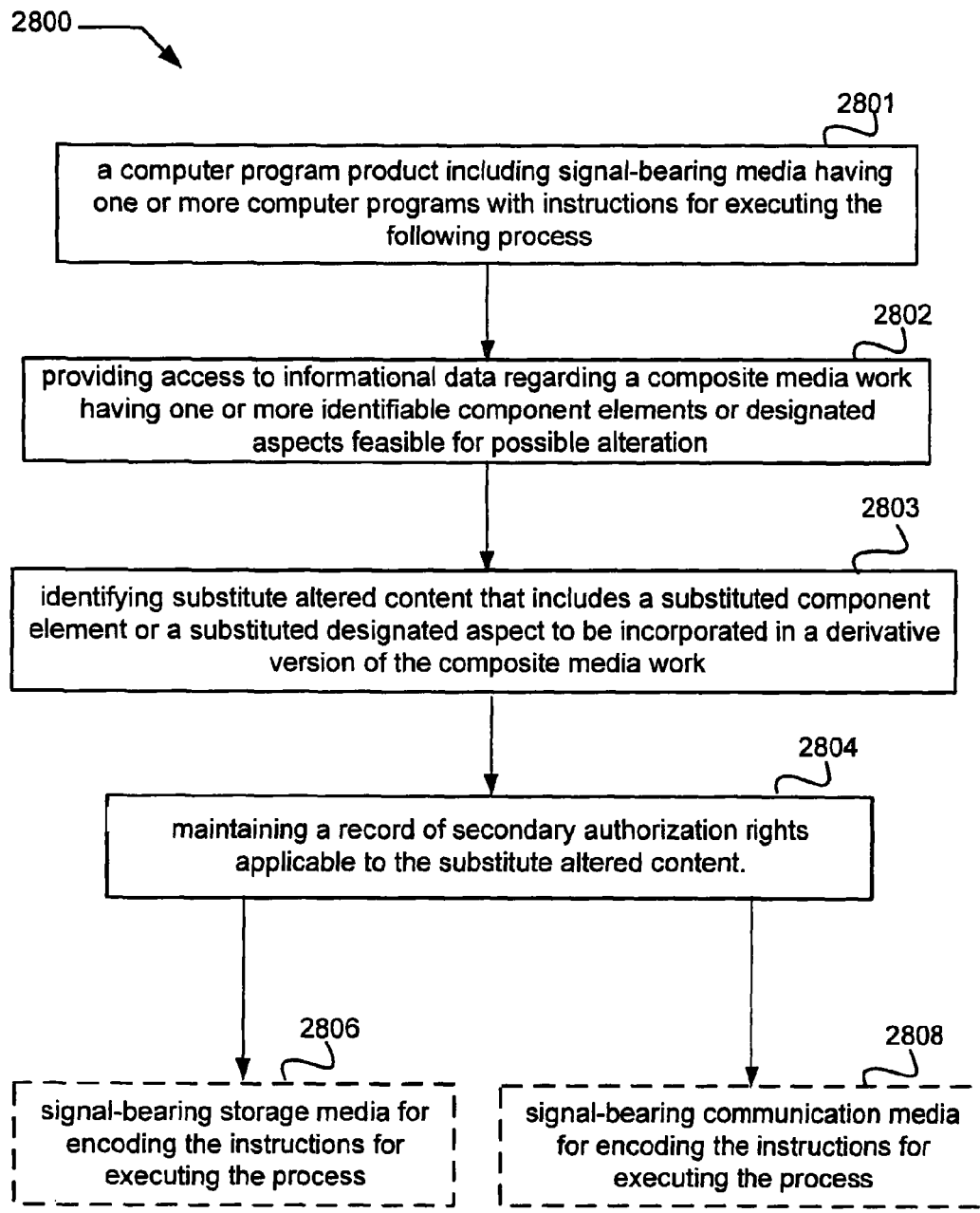
FIG. 55 is a diagrammatic flow chart for another exemplary computer program product embodiment.

The flow chart diagram of FIG. 55 illustrates an exemplary embodiment 2800 for a computer program product, including signal-bearing media having one or more computer programs with instructions for executing a process (block 2801). Such a process may include providing access to informational data regarding a composite media work having one or more identifiable component elements or designated aspects feasible for possible alteration (block 2802), identifying substitute altered content that includes a substituted component element or a substituted designated aspect to be incorporated in a derivative version of the composite media work (block 2803), and maintaining a record of secondary authorization rights applicable to the substitute altered content (block 2804).

Additional possible features may include signal-bearing storage media for encoding the instructions for executing the process (block 2806), and in some instances may include signal-bearing communication media for encoding the instructions for executing the process (block 2808).

Some computer program product implementations regarding substitute altered content may include various combinations of process features in order to achieve the desired benefits. For example, a program process may include maintaining a record of secondary authorization rights applicable to substitute altered content that includes one or more of the following types of content alteration: addition, deletion, modification, and replacement.

Further program product embodiments may identify substitute altered content associated with a real-world entity, and may further maintain specified secondary authorization data applicable to one or more of the following type of substitute altered content associated with the real-world entity: brand, trademark, service mark, copyrighted work, name, company name, identity, symbol, commercial symbol, icon, logotype, trade logo, trade dress, packaging, label, emblem, insignia, acronym, abbreviation, certification, MPAA rating, ESRB rating, proprietary rating, government rating, slogan, jingle, animation, animated character, copyrighted item, and personage.

Other program product embodiments may maintain specified secondary authorization data applicable to one or more of the following portions of substitute altered content associated with the real-world entity: livery, color scheme, dress, fabric, jewelry, pattern, design, sculpture, artistic work, musical work, composition, publication, document, event, exhibit, performance, person, animal, mascot, character, obscured attribute, highlighted attribute, and avatar. Additional possible program product features may include implementing content alteration of one or more identifiable component elements or designated aspects that were associated with a known real-world entity having one or more of the following characteristics: lost, dissolved, bankrupt, insolvent, defunct, non-operative, disqualified, in default of obligation, status change, defective right, relinquished right, faulty claim, non-renewal of prerogative, and expired authorization.

In some instances, a program product feature may maintain specified secondary authorization data applicable to one or more of the following portions of substitute altered content associated with the real-world entity: product, service, invention, accessory, vehicle, place, address, location, store, building, school, university, hospital, church, club, group, organization, and business.

Further program product possibilities may include identifying substitute altered content associated with a real-world person. For example, a program product embodiment may in some instances maintain particular authorization data applicable to one or more of the following type of substitute altered content associated with a real-world person: name, face, personal characteristics, identity, residence, title, achievement, occupation, career, role, activity, hobby, rank, medal, badge, award, identification features, biometric attribute, photographic image, voice recording, accent, dialect, recognizable personality trait, gesture, demeanor, mannerism, appearance, clothing, hairstyle, tattoo, accessory, jewelry, piercing, avatar, setting, item possession, and property ownership.

Other possible program product features regarding substitute altered content may include implementing content alteration of one or more identifiable component elements or designated aspects that were associated with a known real-world person having one or more of the following characteristics: deceased, retired, disappeared, not locatable, and status changed. Another program product embodiment feature may maintain a record of secondary authorization rights applicable to substitute altered content incorporated in one or more of the following portions of a derivative version of the composite media work: textual, verbal, visual, image, audio, musical, live action, reenactment, simulation, and animation.

Some program product embodiments may maintain a record of secondary authorization rights applicable to substitute altered content incorporated in one or more of the following portions of a derivative version of the composite media work: music, setting, hero, heroine, villain, clothing, vehicle, company, animals, food, product, brand, and dialogue. In some instances a further program product feature may include maintaining a record of secondary authorization rights applicable to one or more of the following type of substitute altered content: related set of designated aspects, related set of component elements, identical objects, same object in different scenes, and same object in different settings.

A further possible program product enhancement may include maintaining a record of secondary authorization rights applicable to substitute altered content incorporated in one or more of the following targeted categories of derivative versions of the composite media work: geographic distribution, distribution channel, audience, recipient group, targeted device, time period, and demographic distribution. Other program product possibilities may include maintaining informational data regarding secondary authorization rights applicable to substitute altered content incorporated in one or more of the following type of derivative versions of the composite media work: original, derived, archived, stored, master, edited, combined, mixed, merged, integrated, dubbed, captioned, subtitled, expurgated, uncut, preview, pre-release, final, special edition, animated, freeze frame, sequential still, translated, targeted, restricted access, promotional, sponsored, subsidized, contracted release, and specified purpose.

Additional exemplary program product embodiments may maintain informational data regarding the secondary authorization rights applicable to substitute altered content incorporated in one or more of the following type of media content formats of the composite media work: analog, digital, VHS, CD, VCD, SVCD, DVD, HD, HD DVD, Blu-ray, MPEG, MP3, reformatted, upgraded, downgraded, future format standard, video snippet, digitized vignette, data compression, and data decompression.

Some program product implementations may maintain informational data regarding secondary authorization rights applicable to substitute altered content incorporated in a derivative version for one or more of the following type of distribution arrangements: fund-raising, non-profit, theater, airplane viewing, commercial television, public television, rental, lease, sale, domestic distribution, foreign distribution, exclusive distribution, non-exclusive distribution, foreign language, infomercial, live, real-time, delayed, and on-demand.

Further possibilities for program product features may include maintaining informational data regarding secondary authorization rights applicable to substitute altered content incorporated in a derivative version for one or more of the following type of distribution channels: Internet, network, cable, satellite, wireless, broadcast, narrowcast, download, upload, shared, concurrent, streaming audio, streaming video, packet switching, and storage media delivery. Other possible program product embodiments may maintain informational data regarding one or more of the following type of secondary authorization rights: contractual, proprietary, copyright, patent, trademark, exclusive, non-exclusive, license, consent, governmental, judicial, third party restriction, transfer, exchange, conditional, public domain, and jurisdictional.

Some implementations for program product embodiments may include maintaining informational data regarding one or more of the following type of person or entity having secondary authorization rights: creator, writer, editor, animator, producer, composer, arranger, performer, actor, distributor, agent, investor, sponsor, inventor, animator, depicted person, depicted entity, programmer, copyright owner, subscriber, membership group, and individual group member.

A further example of program product features may include implementing one or more of the following type of approval techniques for obtaining consent from a person or group or entity having secondary authorization rights: programmed, pre-authorization, delegated agent, derivative version review, substitute content review, alteration review, summary characterization, substitute content rating, and aggregate content rating. Other examples of program product features may include maintaining a record of secondary authorization rights applicable to one or more of the following: particular person or character portrayed in the substitute altered content; particular actor of actress appearing in the substitute altered content; particular object or item depicted in the substitute altered content; and particular category of products depicted in the substitute altered content;

Additional exemplary embodiments of program products may maintain a record of specified secondary authorization rights regarding substitute altered content incorporated in one or more of the following portions of a derivative version of the composite media work: plot, story, animation, text, narration, dialog, color, actor, character, clothing, product, sound, music, musical lyrics, product, object, item, title, and credits. Further program product possibilities may include maintaining particular secondary authorization data applicable to substitute altered content incorporated in one or more of the following targeted categories of derivative versions of the composite media work: geographic distribution, distribution channel, audience, MPAA rating, ESRB rating, proprietary rating, government rating, time period, and demographic distribution.

Figure 56:
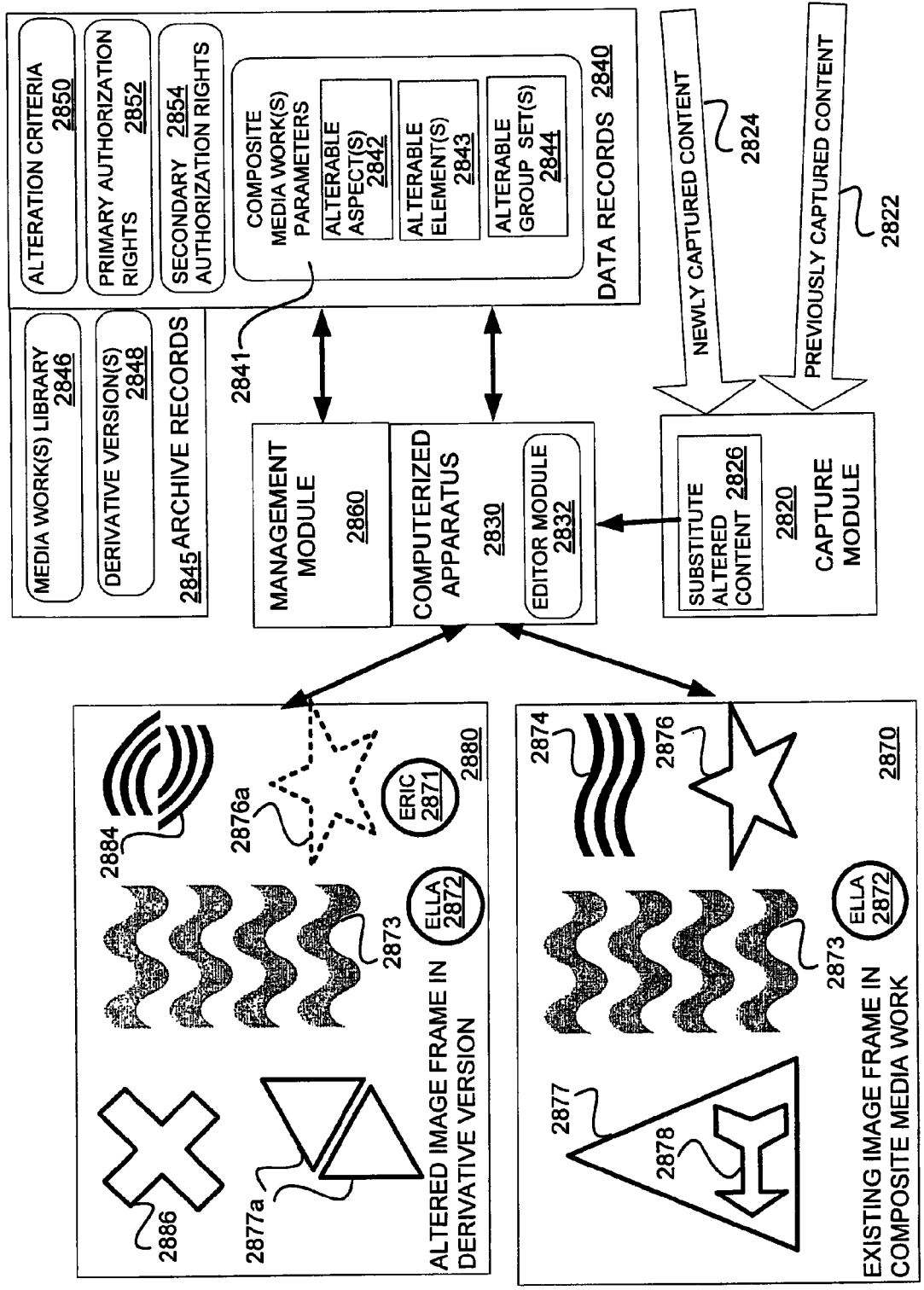
FIG. 56 is a schematic block diagram illustrating further exemplary techniques for incorporation of substitute altered content in a derivative version of a media work.

Referring to the schematic block diagram of FIG. 56, an exemplary system embodiment includes capture module 2820 capable of obtaining previously captured content 2822 or newly captured content 2824 or in some instances combinations thereof in order to create appropriate substitute altered content 2826 for possible incorporation in a derivative version of a composite media work. The capture module may be operably coupled to computerized apparatus 2830 for further processing of the substitute altered content 2826.

As shown in the exemplary embodiment features of FIG. 56, the computerized apparatus 2840 is operably coupled to exemplary data records 2840 that include various informational data that may be helpful in connection with implementing an addition or deletion or modification or replacement of existing content in the composite media work. For example, informational data regarding composite media work parameters 2841 may identify content portions of the composite media work that are feasible for alteration including one or more alterable aspects 2842, one or more alterable elements 2843, as well as one or more alterable group sets 2844.

Additional archive records 2845 may include a media works library 2846 for various original media works as well as a collection of one or more derivative versions 2848. Related data records may include alteration criteria 2850, primary authorization rights 2852, and secondary authorization rights 2854, all of which individually and collectively provide modification guidelines for the media works library 2846 and for derivative versions 2848.

As further shown in FIG. 56, an exemplary management module 2860 is operably coupled to the computer apparatus 2830 and is configured for access to the data records 2840 and to coordinate compliance with the alteration criteria 2850 and with applicable primary authorization rights 2852 and secondary authorization rights 2854.

The exemplary computer apparatus 2830 includes an editor module 2832 to incorporate the substitute altered content 2826 in a derivative version of the composite media work. A schematic diagram portion of FIG. 56 depicts a possible function of the editor module 2832 wherein an existing image frame 2870 in a composite media work has been transformed to a corresponding altered image frame 2880 in a derivative version. Of course various different types of content substitution that may be accomplished in accordance with the alteration techniques disclosed herein, and the examples depicted in FIG. 56 are for illustration only and are not intended to be limiting.

The symbolic representations in existing image frame 2870 include a character component Ella 2872, background elements 2873, foreground elements 2874, a product 2876, and a close-up view of a vehicle 2877 with a logo aspect 2878. In accordance with applicable modification guidelines (e.g., alteration criteria 2850, primary authorization rights 2852, secondary authorization rights 2854, etc.), the background elements 2873 and the character component Ella 2872 are not feasible for alteration, and therefore are shown to be unchanged in the altered image frame 2880.

However various system components including computerized apparatus 2830 with editor module 2832 have implemented alteration of other elements and aspects in the altered image frame 2880 of the derivative version. For example, logo aspect 2878 has been deleted, and the close-up view of vehicle 2877 has been replaced with a medium-distance view of two such vehicles 2877*a*. A new character component Eric 2871 has been added, and a new product 2886 has also been added.

Other alterations shown include a modified product 2876*a* having a different position or appearance (e.g., portions obscured, textual aspect changed, etc.) in altered image frame 2880. Another alteration shown includes a depiction of modified foreground elements 2884 with a somewhat different appearance as compared to the original foreground elements 2874.

Some system data record embodiment features may include different types of informational data, depending on the circumstances. For example, some implementations may provide a listing of at least one designated aspect of the one or more component elements of a composite media work, which aspect is feasible for alteration. Other implementations may include informational data regarding applicable alteration criteria that identifies one or more alteration limitations applicable to the substitute altered content incorporated in a derivative version of the composite media work.

Additional possible system data records for content alteration may include applicable alteration criteria regarding a media format limitation for the derivative version that incorporates the substitute altered content. Related date records may include applicable alteration criteria regarding a limitation allowing or precluding one or more of the following media formats: analog, digital, VHS, CD, VCD, SVCD, DVD, HD, HD DVD, Blu-ray, MPEG, MP3, reformatted, upgraded, downgraded, future format standard, video snippet, digitized vignette, data compression, and data decompression.

Further data record feature enhancements for content alteration may provide informational data regarding applicable alteration criteria that includes one or more distribution channel limitations for the derivative version that incorporates the substitute altered content. Related data record features may include applicable alteration criteria regarding a limitation allowing or precluding one or more of the following distribution channels: Internet, network, cable, satellite, wireless, broadcast, narrowcast, download, upload, shared, concurrent, streaming audio, streaming video, packet switching, and storage media delivery.

Additional exemplary system data records may include informational data that identifies an entity and/or a person associated with substituted content incorporated in the derivative version of the composite media work.

It will be understood that various other system embodiments may be implemented in accordance with the content substitution techniques disclosed herein. For example, an editor module may configured to incorporate in a derivative version one or more of the following categories of substitute altered content: related set of designated aspects, related set of alterable components, identical objects, same object in different scenes, and same object in different settings. As a further example, an editor module may be configured to incorporated substitute altered content in a derivative version targeted for one or more of the following: geographic area, demographic category, ethnic group, restricted audience, specified devices, group membership, subscriber, distribution channel, distribution time period, and media provider.

Additional possible system embodiments may include an editor module configured to incorporated substitute altered content in the derivative version targeted for one or more of the following distribution channels: Internet, network, cable, satellite, wireless, broadcast, narrowcast, download, upload, shared, concurrent, streaming audio, streaming video, packet switching, and storage media delivery.

Some system embodiments may include a capture module capable of obtaining one or more of the following type of substitute altered content: textual, verbal, visual, image, audio, musical, live action, reenactment, simulation, and animation. Other exemplary capture modules may have capability to obtain substitute altered content having one or more of the following type of designated aspects associated with a real-world entity: brand, trademark, service mark, copyrighted work, name, company name, identity, symbol, commercial symbol, icon, logotype, trade logo, trade dress, packaging, label, emblem, insignia, acronym, abbreviation, certification, MPAA rating, ESRB rating, proprietary rating, government rating, slogan, jingle, animation, animated character, copyrighted item, and personage.

Additional exemplary system embodiments may provide a capture module capable of obtaining substitute altered content having one or more of the following type of designated aspects associated with a real-world entity: livery, color scheme, dress, fabric, jewelry, pattern, design, sculpture, artistic work, musical work, composition, publication, document, event, exhibit, performance, person, animal, mascot, character, obscured attribute, highlighted attribute, and avatar. Further exemplary capture module capabilities may include obtaining substitute altered content having one or more of the following type of designated aspects associated with a real-world person: name, face, personal characteristics, identity, residence, title, achievement, occupation, career, role, activity, hobby, rank, medal, badge, award, identification features, biometric attribute, photographic image, voice recording, accent, dialect, recognizable personality trait, gesture, demeanor, mannerism, appearance, clothing, hairstyle, tattoo, accessory, jewelry, piercing, avatar, setting, item possession, and property ownership.

Further possible system embodiment features may include a management module operably coupled to computer apparatus and configured to coordinate compliance with applicable alteration criteria as well as compliance with certain primary authorization rights regarding the composite media work.

Figure 57:
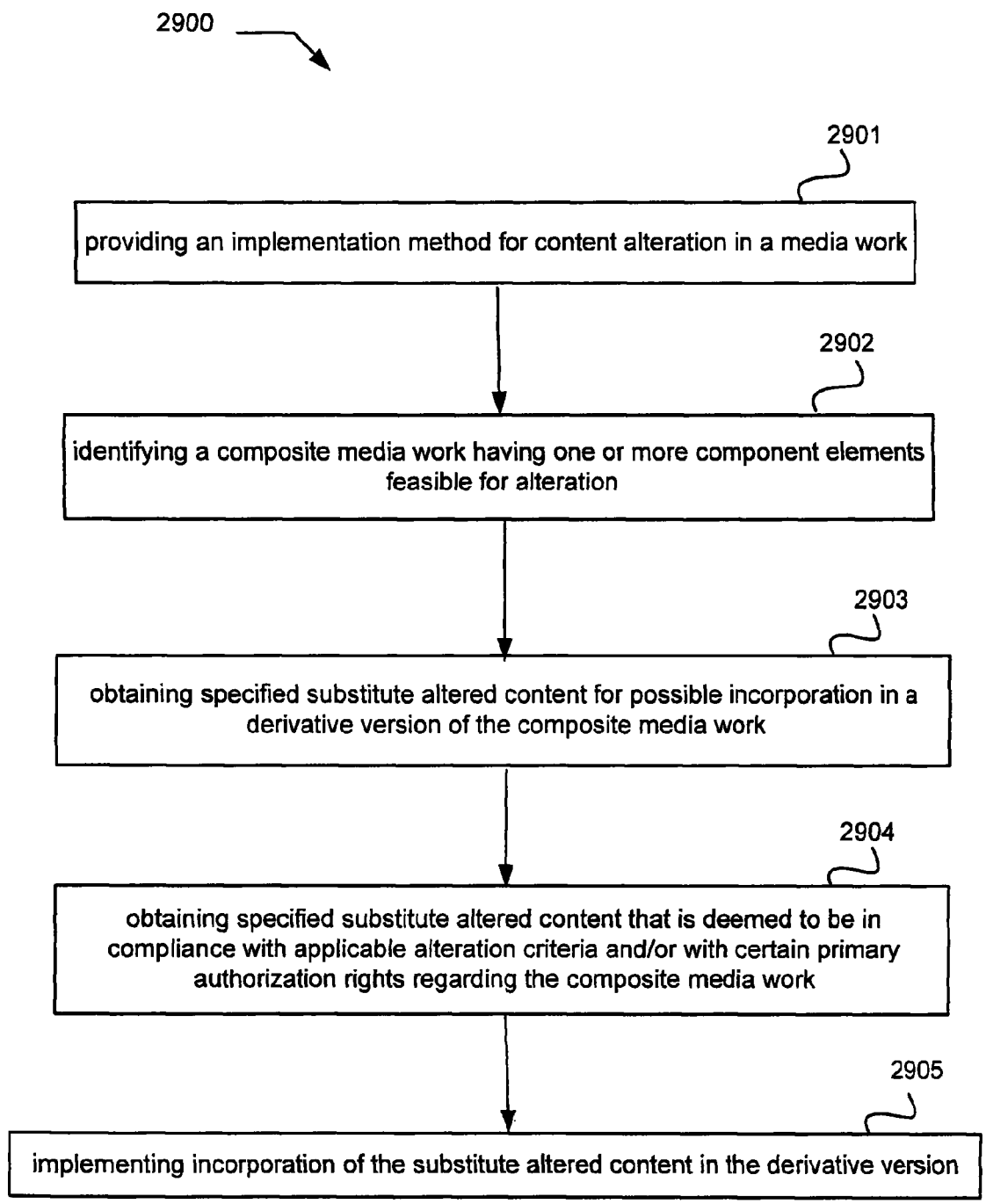
FIG. 57 is a high level flow chart illustrating an additional exemplary process embodiment for content alteration of a media work.

The high level flow chart of FIG. 57 illustrates an exemplary process embodiment 2900 that provides an implementation method for content alteration in a media work (block 2901), including identifying a composite media work having one or more component elements feasible for alteration (block 2902), and obtaining specified substitute altered content for possible incorporation in a derivative version of the composite media work (block 2903). Additional possible features may include obtaining specified substitute altered content that is deemed to be in compliance with applicable alteration criteria and/or with certain primary authorization rights regarding the composite media work (block 2904), and implementing incorporation of the substitute altered content in the derivative version (block 2905).

Figure 58:
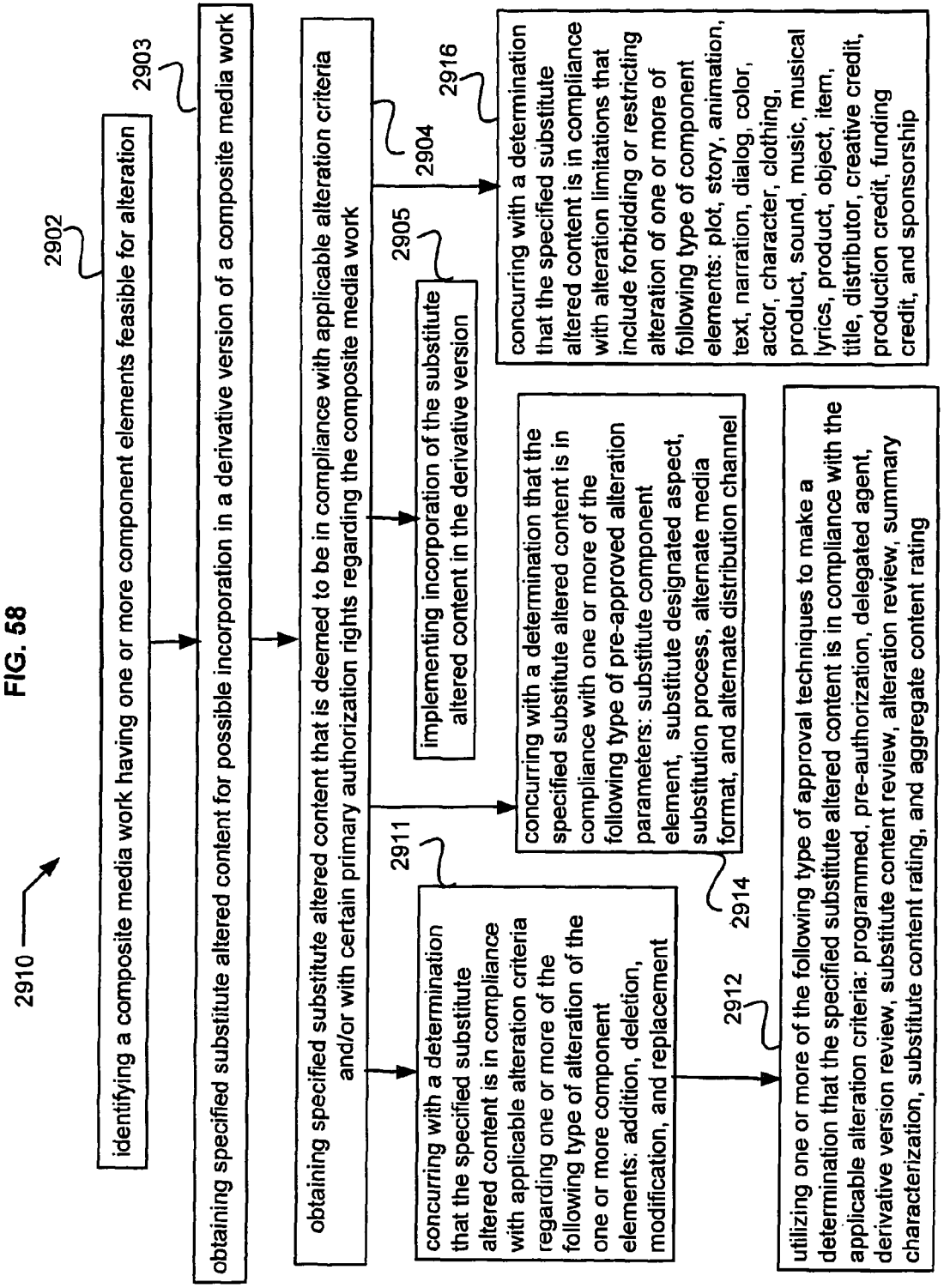
FIGS. 58-64 are more detailed flow charts illustrating further exemplary process features that may be incorporated in media content alteration embodiments.

Referring to detailed exemplary embodiment features 2910 shown in FIG. 58, a possible implementation may include previously described process features 2902, 2903, 2904, 2905, and may further include concurring with a determination that the specified substitute altered content is in compliance with applicable alteration criteria regarding one or more of the following type of alteration of the one or more component elements: addition, deletion, modification, and replacement (block 2911). A possible related feature may include utilizing one or more of the following type of approval techniques to make a determination that the specified substitute altered content is in compliance with the applicable alteration criteria: programmed, pre-authorization, delegated agent, derivative version review, substitute content review, alteration review, summary characterization, substitute content rating, and aggregate content rating (block 2912).

Additional disclosed possibilities may include concurring with a determination that the specified substitute altered content is in compliance with one or more of the following type of pre-approved alteration parameters: substitute component element, substitute designated aspect, substitution process, alternate media format, and alternate distribution channel (block 2914). In some instances a further possible enhancement may include concurring with a determination that the specified substitute altered content is in compliance with alteration limitations that include forbidding or restricting alteration of one or more of following type of component elements: plot, story, animation, text, narration, dialog, color, actor, character, clothing, product, sound, music, musical lyrics, product, object, item, title, distributor, creative credit, production credit, funding credit, and sponsorship (block 2916).

Figure 59:
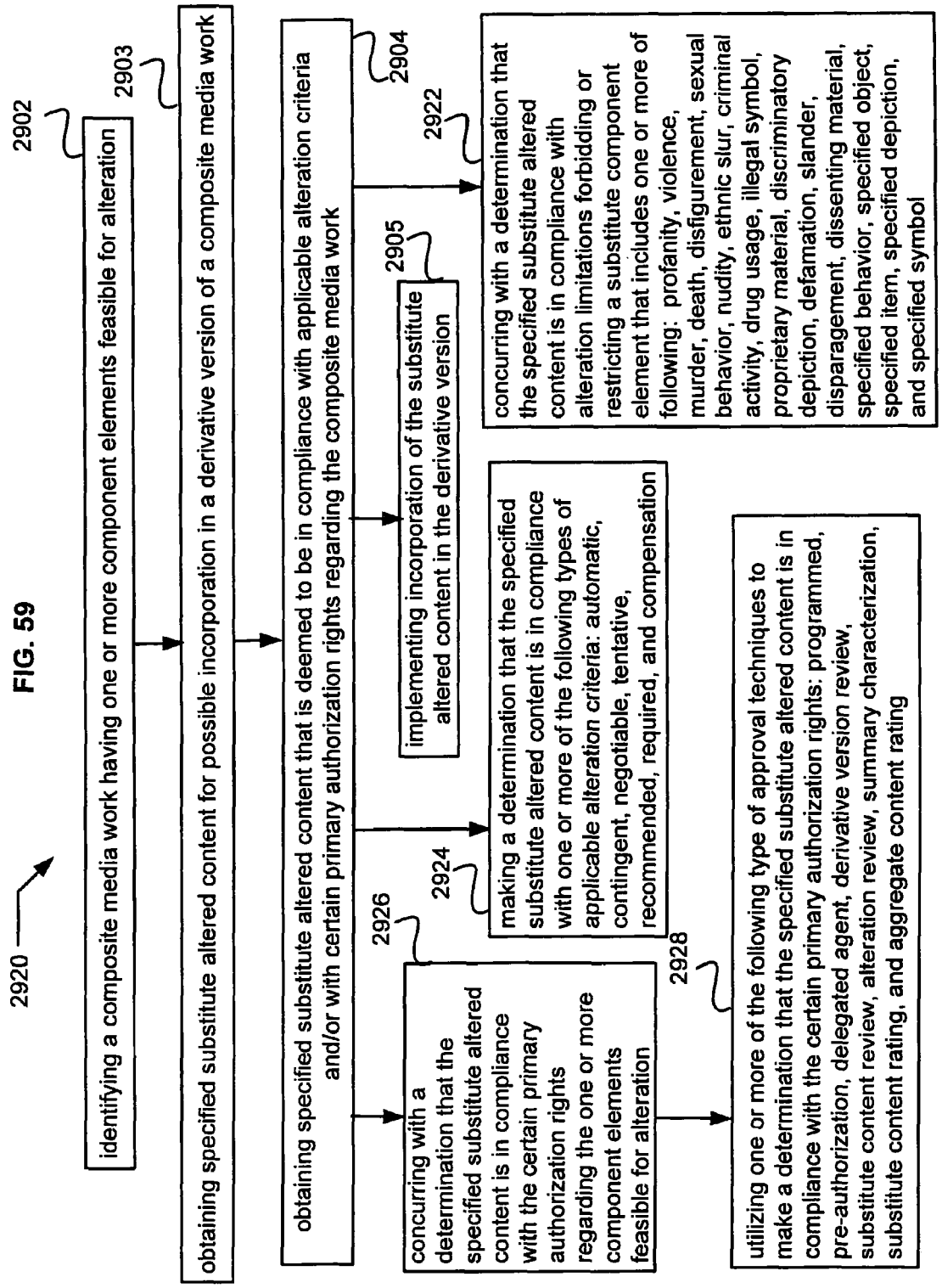

Additional possible embodiments 2920 are depicted in FIG. 59, including previously described process features 2902, 2903, 2904, 2905 as well as further enhancements that may include concurring with a determination that the specified substitute altered content is in compliance with alteration limitations forbidding or restricting a substitute component element that includes one or more of following: profanity, violence, murder, death, disfigurement, sexual behavior, nudity, ethnic slur, criminal activity, drug usage, illegal symbol, proprietary material, discriminatory depiction, defamation, slander, disparagement, dissenting material, specified behavior, specified object, specified item, specified depiction, and specified symbol (block 2922).

Other possibilities may include making a determination that specified substitute altered content is in compliance with one or more of the following types of applicable alteration criteria: automatic, contingent, negotiable, tentative, recommended, required, and compensation (block 2924). Further exemplary features may include concurring with a determination that the specified substitute altered content is in compliance with the certain primary authorization rights regarding the one or more component elements feasible for alteration (block 2926).

The flow chart of FIG. 59 also illustrates a further possible enhancement including utilizing one or more of the following type of approval techniques to make a determination that the specified substitute altered content is in compliance with certain primary authorization rights: programmed, pre-authorization, delegated agent, derivative version review, substitute content review, alteration review, summary characterization, substitute content rating, and aggregate content rating (block 2928).

Figure 60:
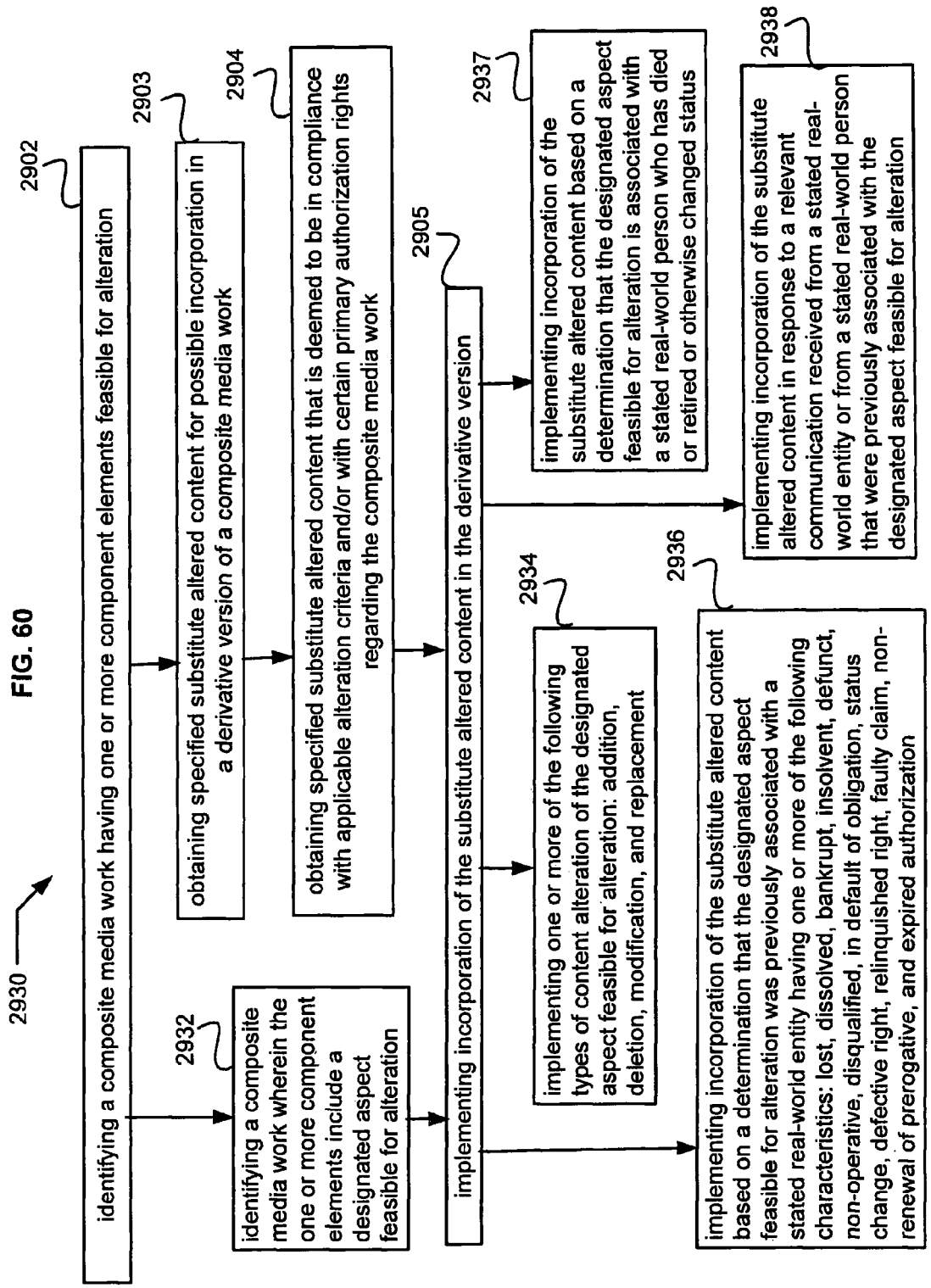

The various exemplary embodiment features 2930 shown in FIG. 60 include previously described features 2902, 2903, 2904, 2905 in combination with identifying a composite media work wherein the one or more component elements include a designated aspect feasible for alteration (block 2932). Further possibilities may include implementing one or more of the following types of content alteration of the designated aspect feasible for alteration: addition, deletion, modification, and replacement (block 2934).

Additional enhancements may include implementing incorporation of the substitute altered content based on a determination that the designated aspect feasible for alteration was previously associated with a stated real-world entity having one or more of the following characteristics: lost, dissolved, bankrupt, insolvent, defunct, non-operative, disqualified, in default of obligation, status change, defective right, relinquished right, faulty claim, non-renewal of prerogative, and expired authorization (block 2936).

As further shown in FIG. 60, in some instances a process embodiment may include implementing incorporation of the substitute altered content based on a determination that the designated aspect feasible for alteration is associated with a stated real-world person who has died or retired or otherwise changed status (block 2937). Other related possible features may include implementing incorporation of the substitute altered content in response to a relevant communication received from a stated real-world entity or from a stated real-world person that were previously associated with the designated aspect feasible for alteration (block 2938).

Figure 61:
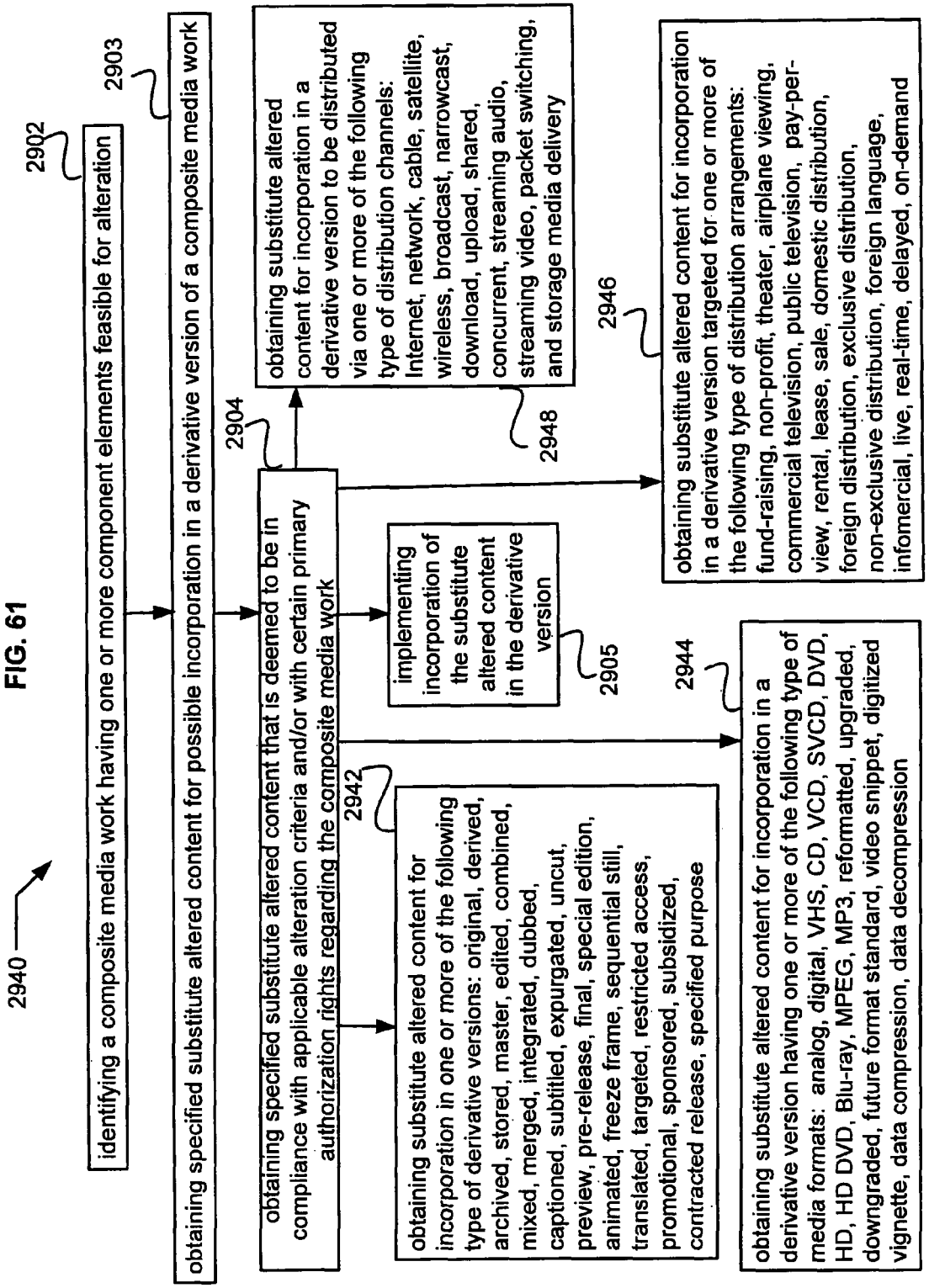

Referring to the detailed flow chart of FIG. 61, additional embodiment features 2940 depicted include previously described process possibilities 2902, 2903, 2904, 2905 in combination with obtaining substitute altered content for incorporation in one or more of the following type of derivative versions: original, derived, archived, stored, master, edited, combined, mixed, merged, integrated, dubbed, captioned, subtitled, expurgated, uncut, preview, pre-release, final, special edition, animated, freeze frame, sequential still, translated, targeted, restricted access, promotional, sponsored, subsidized, contracted release, and specified purpose (block 2942).

Additional possible process implementation features may include obtaining substitute altered content for incorporation in a derivative version having one or more of the following type of media formats: analog, digital, VHS, CD, VCD, SVCD, DVD, HD, HD DVD, Blu-ray, MPEG, MP3, reformatted, upgraded, downgraded, future format standard, video snippet, digitized vignette, data compression, and data decompression (block 2944). Other exemplary possibilities may include obtaining substitute altered content for incorporation in a derivative version targeted for one or more of the following type of distribution arrangements: fund-raising, non-profit, theater, airplane viewing, commercial television, public television, pay-per-view, rental, lease, sale, domestic distribution, foreign distribution, exclusive distribution, non-exclusive distribution, foreign language, infomercial, live, real-time, delayed, and on-demand (block 2946).

Further process enhancements may include obtaining substitute altered content for incorporation in a derivative version to be distributed via one or more of the following type of distribution channels: Internet, network, cable, satellite, wireless, broadcast, narrowcast, download, upload, shared, concurrent, streaming audio, streaming video, packet switching, and storage media delivery (block 2948).

Figure 62:
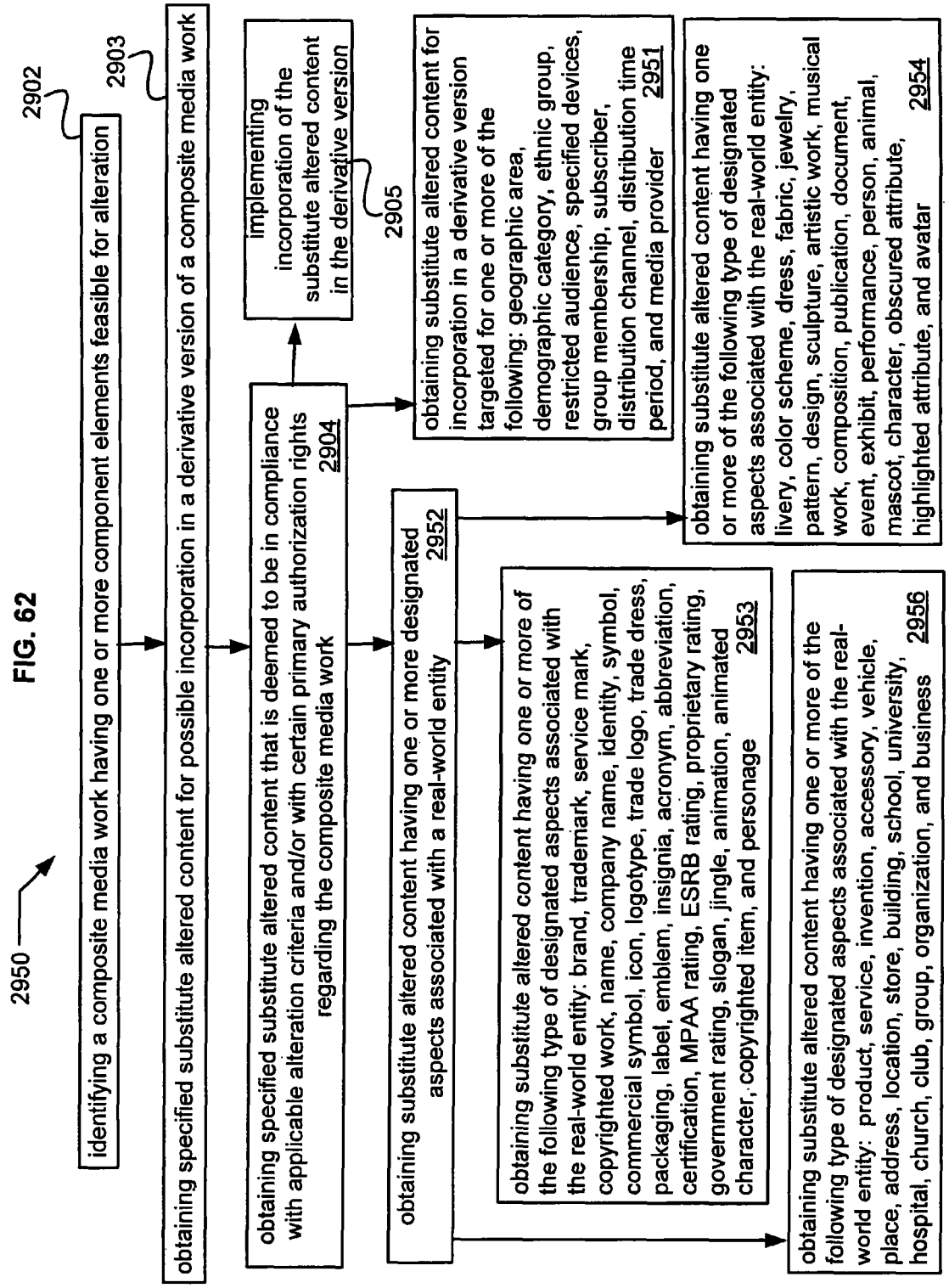

The detailed flow chart of FIG. 62 shows additional exemplary features 2950 that may be included in a process embodiment, including previously described operations 2902, 2903, 2904, 2905 along with obtaining substitute altered content for incorporation in a derivative version targeted for one or more of the following: geographic area, demographic category, ethnic group, restricted audience, specified devices, group membership, subscriber, distribution channel, distribution time period, and media provider (block 2951).

Additional process enhancements may include obtaining substitute altered content having one or more designated aspects associated with a real-world entity (block 2952). A related enhancement may further include obtaining substitute altered content having one or more of the following type of designated aspects associated with the real-world entity: brand, trademark, service mark, copyrighted work, name, company name, identity, symbol, commercial symbol, icon, logotype, trade logo, trade dress, packaging, label, emblem, insignia, acronym, abbreviation, certification, MPAA rating, ESRB rating, proprietary rating, government rating, slogan, jingle, animation, animated character, copyrighted item, and personage (block 2953).

Other process possibilities may include obtaining substitute altered content having one or more of the following type of designated aspects associated with the real-world entity: livery, color scheme, dress, fabric, jewelry, pattern, design, sculpture, artistic work, musical work, composition, publication, document, event, exhibit, performance, person, animal, mascot, character, obscured attribute, highlighted attribute, and avatar (block 2954). Additional possible process features may include obtaining substitute altered content having one or more of the following type of designated aspects associated with the real-world entity: product, service, invention, accessory, vehicle, place, address, location, store, building, school, university, hospital, church, club, group, organization, and business (block 2956).

Figure 63:
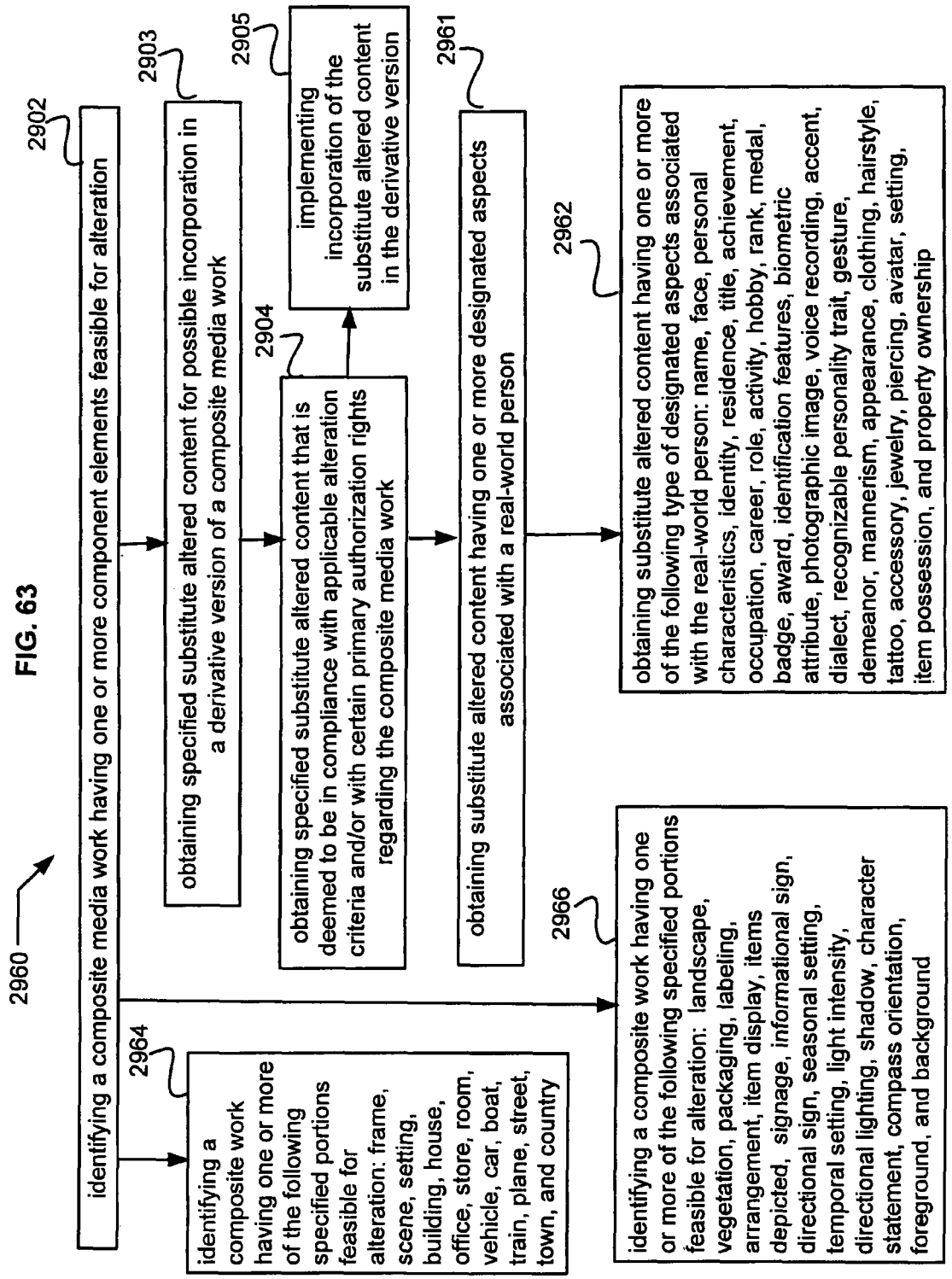

Referring to the exemplary embodiments 2960 depicted in FIG. 63, some process implementations may include previously described features 2902, 2903, 2904, 2905 in combination with obtaining substitute altered content having one or more designated aspects that are associated with a real-world person (block 2961). Further related enhancement possibilities may include obtaining substitute altered content having one or more of the following type of designated aspects associated with the real-world person: name, face, personal characteristics, identity, residence, title, achievement, occupation, career, role, activity, hobby, rank, medal, badge, award, identification features, biometric attribute, photographic image, voice recording, accent, dialect, recognizable personality trait, gesture, demeanor, mannerism, appearance, clothing, hairstyle, tattoo, accessory, jewelry, piercing, avatar, setting, item possession, and property ownership (block 2962).

Other exemplary process features may include identifying a composite work having one or more of the following specified portions feasible for alteration: frame, scene, setting, building, house, office, store, room, vehicle, car, boat, train, plane, street, town, and country (block 2964), and identifying a composite work having one or more of the following specified portions feasible for alteration: landscape, vegetation, packaging, labeling, arrangement, item display, items depicted, signage, informational sign, directional sign, seasonal setting, temporal setting, light intensity, directional lighting, shadow, character statement, compass orientation, foreground, and background (block 2966).

Figure 64:
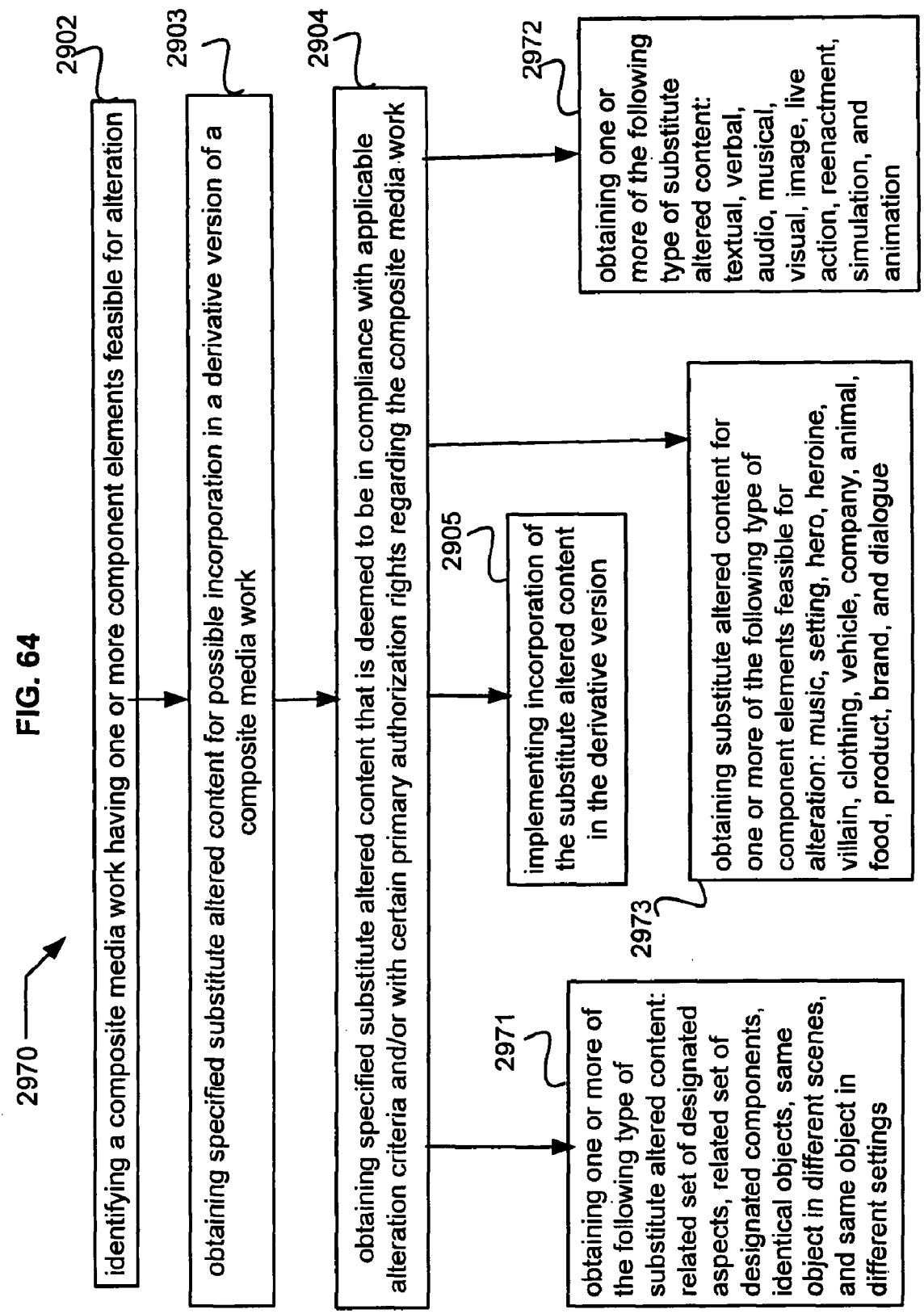

Referring to the flow chart of FIG. 64, additional exemplary embodiment features 2970 may include previously described process operations 2902, 2903, 2904, 2905 as well as other features relating to various types of substitute altered content. For example, some implementations may include obtaining one or more of the following type of substitute altered content: related set of designated aspects, related set of designated components, identical objects, same object in different scenes, and same object in different settings (block 2971). Other possible implementations may include obtaining one or more of the following type of substitute altered content: textual, verbal, audio, musical, visual, image, live action, reenactment, simulation, and animation (block 2972). Additional possible enhancements may include obtaining substitute altered content for one or more of the following type of component elements feasible for alteration: music, setting, hero, heroine, villain, clothing, vehicle, company, animal, food, product, brand, and dialogue (block 2973).

Figure 65:
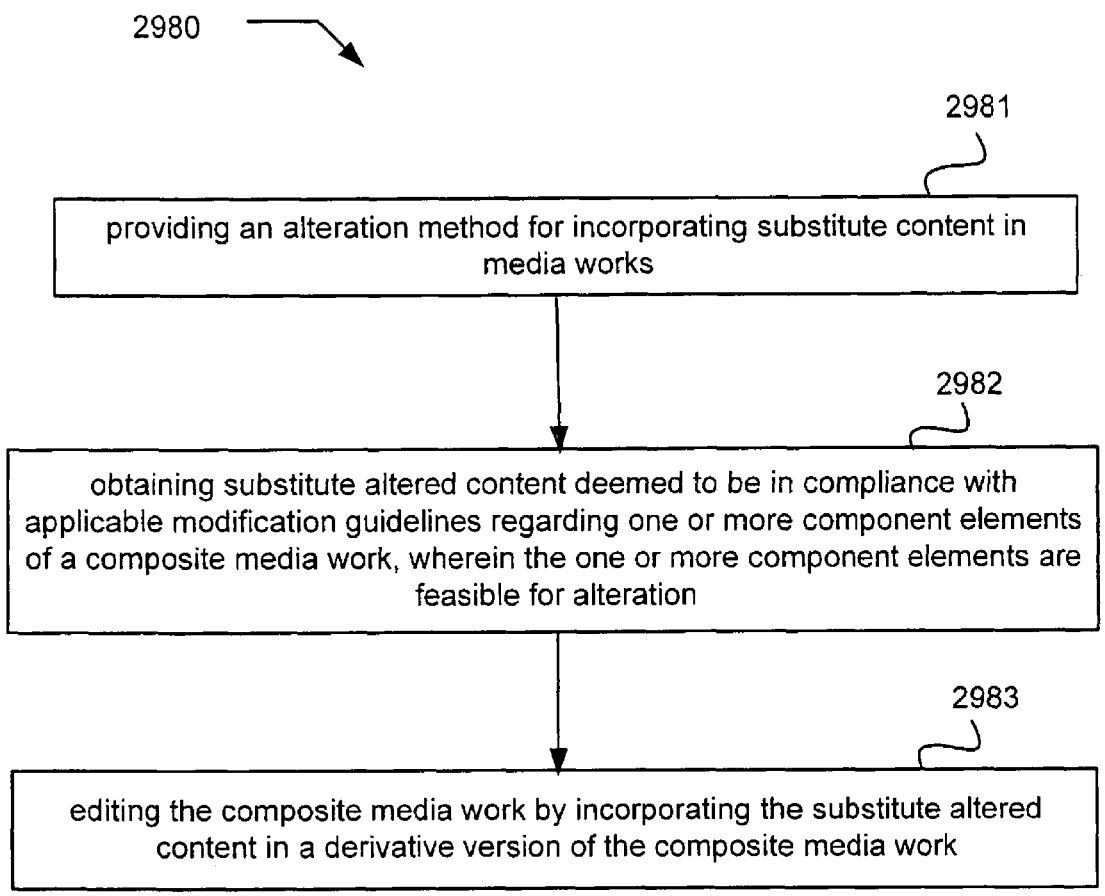
FIG. 65 is high level flow chart illustrating yet another exemplary process embodiment for content alteration of a media work.

The high level flow chart of FIG. 65 illustrates a further exemplary process 2980 providing an alteration method for incorporating substitute content in media works (block 2981). Other exemplary features may include obtaining substitute altered content deemed to be in compliance with applicable modification guidelines regarding one or more component elements of a composite media work, wherein the one or more component elements are feasible for alteration (block 2982). Further possibilities may include editing the composite media work by incorporating the substitute altered content in a derivative version of the composite media work (block 2983).

Figure 66:
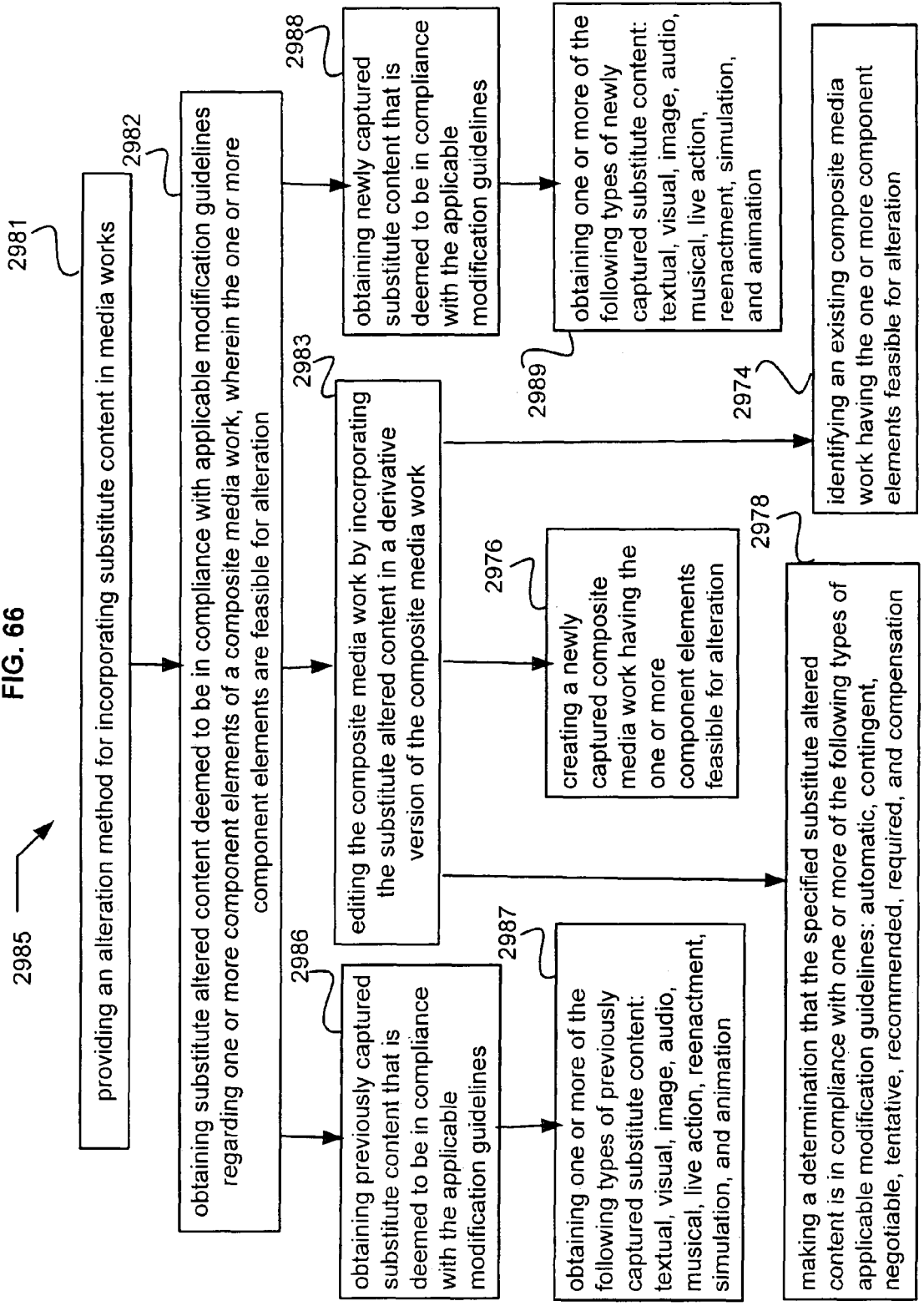
FIG. 66 is a more detailed flow chart illustrating additional possible enhancements for media content alteration embodiments.

Additional possible process features 2985 shown in FIG. 66 may include previously described operations 2981, 2982, 2983 along with further enhancements related to applicable modification guidelines for a composite media work. For example, some embodiments may include obtaining previously captured substitute content that is deemed to be in compliance with the applicable modification guidelines (block 2986), and obtaining one or more of the following types of previously captured substitute content: textual, visual, image, audio, musical, live action, reenactment, simulation, and animation (block 2987).

Other possible embodiment features may include obtaining newly captured substitute content that is deemed to be in compliance with the applicable modification guidelines (block 2988), and obtaining one or more of the following types of newly captured substitute content: textual, visual, image, audio, musical, live action, reenactment, simulation, and animation (block 2989).

As further illustrated in FIG. 66, additional possible enhancements may include identifying an existing composite media work having the one or more component elements feasible for alteration (block 2974), creating a newly captured composite media work having the one or more component elements feasible for alteration (block 2976), and making a determination that the specified substitute altered content is in compliance with one or more of the following types of applicable modification guidelines: automatic, contingent, negotiable, tentative, recommended, required, and compensation (block 2978).

Figure 67:
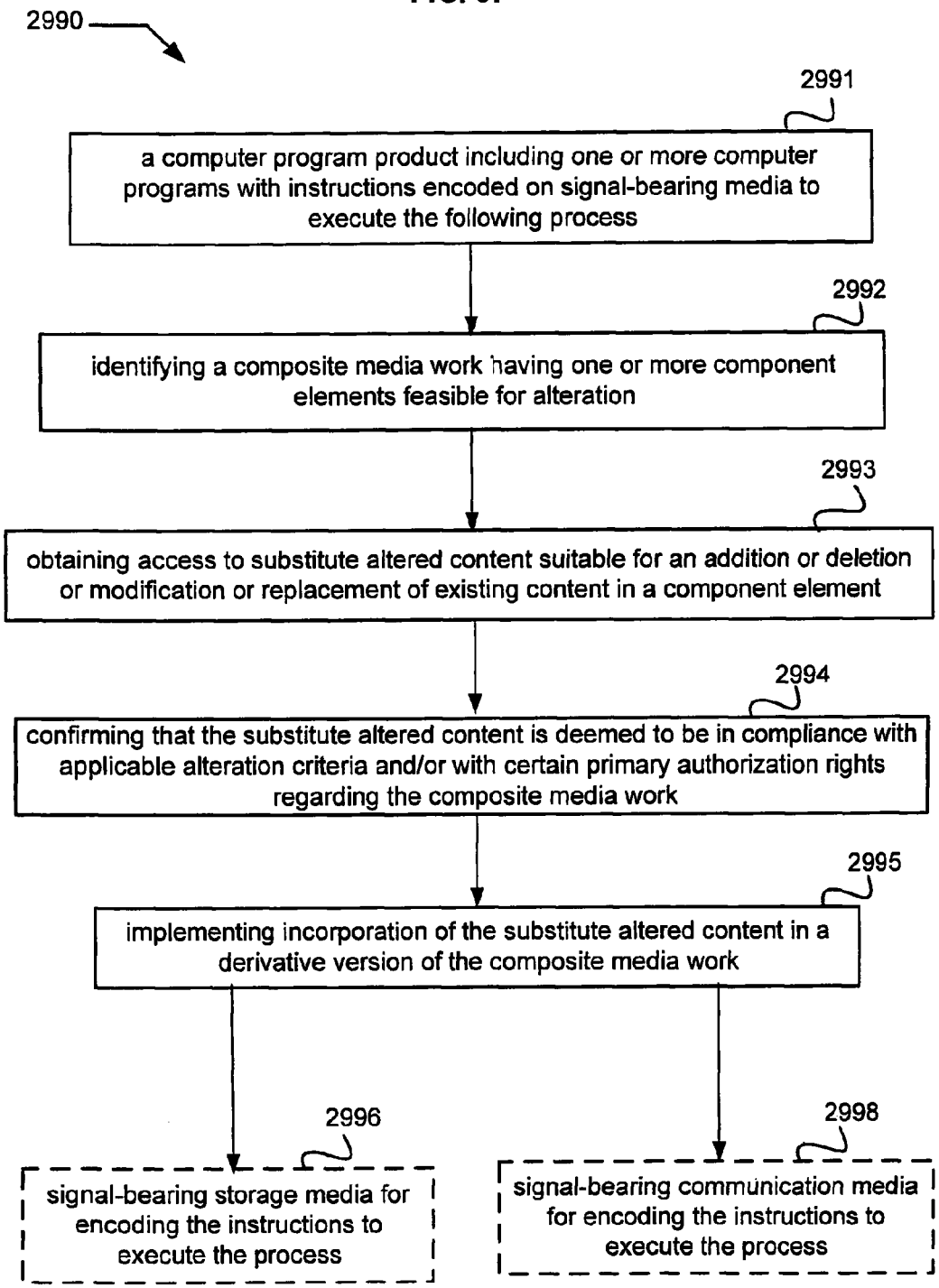
FIG. 67 is a diagrammatic flow chart for an additional exemplary computer program product embodiment.

The embodiment 2990 illustrated in FIG. 67 provides a computer program product including one or more computer programs with instructions encoded on signal-bearing media to execute a process (block 2991). Such a process may include identifying a composite media work having one or more component elements feasible for alteration (block 2992), obtaining access to substitute altered content suitable for an addition or deletion or modification or replacement of existing content in a component element (block 2993), confirming that the substitute altered content is deemed to be in compliance with applicable alteration criteria and/or with certain primary authorization rights regarding the composite media work (block 2994), and implementing incorporation of the substitute altered content in a derivative version of the composite media work (block 2995).

Further possible features may include signal-bearing storage media for encoding the instructions to execute the process (block 2996), and signal-bearing communication media for encoding the instructions to execute the process (block 2998).

It will be understood that computer program product embodiments that implement content alteration have many operational possibilities. For example, some program embodiments may implement incorporation of the substitute altered content in a derivative version targeted for one or more of the following: geographic area, demographic category, ethnic group, restricted audience, specified devices, group membership, subscriber, distribution channel, distribution time period, and media provider.

Additional program product embodiments may confirm compliance regarding one or more of the following type of limitations for the derivative version incorporating the substitute altered content: distribution, media format, pre-approved alteration parameter, objectionable alteration, restricted alteration, and forbidden alteration. Further possible program product features may include implementing incorporation in a derivative version of one or more of the following type of substitute altered content: related set of designated aspects, related set of designated components, identical objects, same object in different scenes, and same object in different settings.

Other exemplary program product embodiments may implement in a derivative version the incorporation of one or more of the following type of substitute altered content: textual, verbal, visual, image, audio, musical, live action, reenactment, simulation, and animation. Other possible program product features may include implementing incorporation of one or more of the following type of substitute altered content: brand, trademark, service mark, copyrighted work, name, company name, identity, symbol, commercial symbol, icon, logotype, trade logo, trade dress, packaging, label, emblem, insignia, acronym, abbreviation, certification, MPAA rating, ESRB rating, proprietary rating, government rating, slogan, jingle, animation, animated character, copyrighted item, and personage.

Further possibilities for program product features include implementing in a derivative version the incorporation of one or more of the following portion of substitute altered content associated with a real-world entity: livery, color scheme, dress, fabric, jewelry, pattern, design, sculpture, artistic work, musical work, composition, publication, document, event, exhibit, performance, person, animal, mascot, character, obscured attribute, highlighted attribute, and avatar. Other program product embodiments may include implementing in a derivative version the incorporation of one or more of the following portion of substitute altered content associated with a real-world entity: product, service, invention, accessory, vehicle, place, address, location, store, building, school, university, hospital, church, club, group, organization, and business.

Additional content substitution possibilities for program product embodiments may include implementing in a derivative version the incorporation of one or more of the following type of substitute altered content associated with a real-world person: name, face, personal characteristics, identity, residence, title, achievement, occupation, career, role, activity, hobby, rank, medal, badge, award, identification features, biometric attribute, photographic image, voice recording, accent, dialect, recognizable personality trait, gesture, demeanor, mannerism, appearance, clothing, hairstyle, tattoo, accessory, jewelry, piercing, avatar, setting, item possession, and property ownership.

In some instances a computer program product embodiment may provide for maintenance of beneficial data records regarding implementation of media content substitution in a derivative version. Possible exemplary features may include maintaining a record of a real-world entity and/or a real-world person associated with substitute altered content that is incorporated in the derivative version of the composite media work. In other instances a program product embodiment may include maintenance of a record of criteria applicable to one or more of the following type of alterable component elements incorporated in a derivative version: music, setting, hero, heroine, villain, clothing, vehicle, company, animals, food, product, brand, and dialogue.

Other implementations of beneficial records regarding implementation of content substitution may include maintenance of a record of criteria that includes forbidding or restricting a substitute component element that includes one or more of following: profanity, violence, murder, death, disfigurement, sexual behavior, nudity, ethnic slur, criminal activity, drug usage, illegal symbol, proprietary material, discriminatory depiction, defamation, slander, disparagement, dissenting material, specified behavior, specified object, specified item, specified depiction, and specified symbol.

Figure 68:
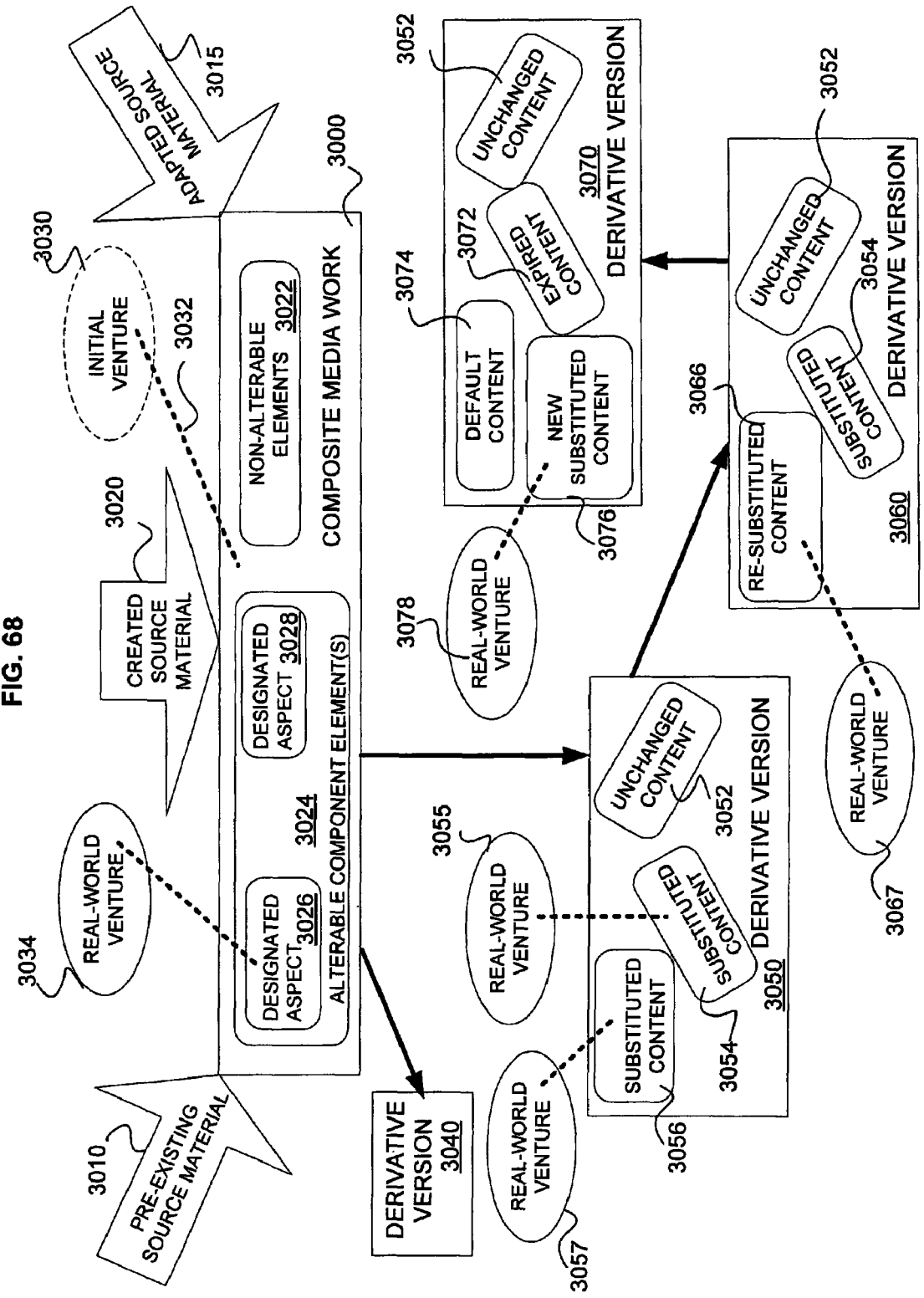
FIG. 68 is a schematic block diagram illustrating other exemplary embodiments that incorporate substitute content in different versions of a media work.

The schematic block diagram of FIG. 68 illustrates various exemplary embodiment features for content substitution in composite media works. An exemplary composite media work 3000 may include contributions from many persons and diverse sources, including but not limited to pre-existing source material 3010, adapted source material 3015, as well as created source material 3020. In some instances an initial venture 3030 may have sole responsibility for the entire composite media work 3000 or may delegate much (possibly all) of that responsibility to other entities or persons. In some circumstances an additional party such as real-world venture 3034 may have direct responsibility for a particular designated aspect 3026 included as part of one or more alterable component elements 3024. Nevertheless another designated aspect 3028 also included as part of alterable component elements 3024 may be the responsibility of a different party. In view of such combined derivation and control, it will be understood that a so-called "original" composite media work is included within the meaning of the term "derivative version" for definitional purposes of the detailed description and claims herein.

Under some circumstances, initial venture 3030 may own primary authorization rights to composite media work 3000 while at the same time world-venture 3034 may own primary authorization rights to a designated aspect 3026. As depicted in FIG. 68, composite media work 3000 may also include some traditional non-alterable elements 3022 as well as one or more alterable component elements 3024.

As further illustrated in FIG. 68, content of alterable component elements 3024 and/or their designated aspects 3026, 3028 may in accordance with applicable guidelines be modified in connection with the creation or production of various types of derivative versions 3040, 3050, 3060, 3070. For example, derivative version 3050 may include unchanged content 3052 as well as altered content such as substituted content 3054 associated with a real-world venture 3055. Other substituted content 3056 in derivative version 3050 may be associated with a different real-world venture 3057.

As a further example, derivative version 3060 may include unchanged content 3052 as well as the same substituted content 3054, and may include some re-substituted content 3066 associated with yet another real-world venture 3067.

As another example, derivative version 3070 may include unchanged content 3052 as well as expired content 3072, some initial default content 3074, and in addition may include new substituted content 3076 associated with still another real-world venture 3078.

It will be understood that such content changes in composite media works as disclosed herein are dependent upon compliance with applicable content alteration guidelines that may specifically include primary authorization rights, secondary authorization rights, as well as content alteration/modification criteria.

As disclosed in various exemplary system embodiments herein, a system for content alteration may be implemented with respect to a group of related component elements that are included in a constituent portion of a composite media work. System data records may include applicable alteration guidelines regarding collective replacement of such a group of related alterable component elements, and such replacement may include an addition or deletion or modification or replacement in a proposed derivative version. For example, a composite media work may include one or more of the following categories of related component elements: related set of designated aspects, related set of alterable components, identical objects, same object in different scenes, and same object in different settings.

In some system embodiments, a composite media work may include a group of one or more of the following type of related component elements associated with a real-world entity: brand, trademark, service mark, copyrighted work, name, company name, identity, symbol, commercial symbol, icon, logotype, trade logo, trade dress, packaging, label, emblem, insignia, acronym, abbreviation, certification, MPAA rating, ESRB rating, proprietary rating, government rating, slogan, jingle, animation, animated character, copyrighted item, and personage. Other exemplary composite media work embodiments may include a group of one or more of the following type of related component elements associated with a real-world entity: livery, color scheme, dress, fabric, jewelry, pattern, design, sculpture, artistic work, musical work, composition, publication, document, event, exhibit, performance, person, animal, mascot, character, obscured attribute, highlighted attribute, and avatar.

In some system implementations, an exemplary composite media work may include a group of one or more of the following type of related component elements associated with a real-world person: name, face, personal characteristics, identity, residence, title, achievement, occupation, career, role, activity, hobby, rank, medal, badge, award, identification features, biometric attribute, photographic image, voice recording, accent, dialect, recognizable personality trait, gesture, demeanor, mannerism, appearance, clothing, hairstyle, tattoo, accessory, jewelry, piercing, avatar, setting, item possession, and property ownership.

Other possible types of system records may include informational data regarding one or more of the following type of limitations applicable to a proposed derivative version: alteration limitation, media format limitation, and distribution limitation.

Of course, other grouped categories of related alterable component elements in a composite media work (e.g. derivative versions thereof, etc.) are possible, as well as related data records for groupings of such related alterable component elements. It will therefore be understood that the examples disclosed herein are for purposes of illustration only and are not intended to be limiting.

The exemplary embodiment 3200 of FIG. 69 provides a method of media content substitution (block 3202) including identifying a group of related content elements in a composite media work (block 3204), wherein the related content elements are feasible for alteration and form a constituent portion of the composite media work (block 3206); and providing applicable alteration guidelines for collective replacement of the group of related content elements in a derivative version of the composite media work (block 3208).

The more detailed embodiments 3210 of FIG. 70 include previously described process features 3202, 3204, 3206 along with identifying a group of one or more of the following type of related content elements: related set of designated aspects, related set of designated components, identical objects, same object in different scenes, and same object in different settings (block 3212). Other depicted enhancements may include identifying a group of one or more of the following type of related content elements: textual, verbal, audio, musical, visual image, live action, reenactment, simulation, and animation (block 3213).

Additional possible process features may include identifying a group of related audio content elements (block 3214) and video content elements (block 3216) and audiovisual content elements (block 3218) in the composite media work. Further implementation features may include identifying a group of related content elements that include a brand or symbol or logo or company name or trademark or service mark (block 3219). Other possible enhancements may include identifying a group of related content elements that include a depiction or representation of a real-world entity (block 3221) and a depiction or representation of a real-world person (block 3222).

The detailed flow chart of FIG. 71 depicts various exemplary features 3220 including previously described operations 3202, 3204, 3206, 3208 along with identifying a group of related content elements that include a depiction or representation of a real-world product (block 3226), and providing a quality control provision regarding specified altered content designated for collective replacement in the derivative version (block 3227).

Additional possible process features may include providing a geographic distribution limitation regarding the derivative version that incorporates the specified altered content designated for the collective replacement (block 3228), and providing a quantitative viewing or quantitative distribution copy limitation regarding the derivative version that incorporates the specified altered content designated for the collective replacement (block 3231). Other exemplary enhancements may include providing a temporal viewing or temporal distribution limitation regarding the derivative version that incorporates the specified altered content designated for the collective replacement (block 3232).

Referring to FIG. 72, exemplary embodiment features 3225 may include previously described operations 3202, 3204, 3206, 3208 in combination with providing a targeted recipient audience limitation (block 3236) and a targeted recipient device (block 3237) regarding the derivative version that incorporates the specified altered content designated for the collective replacement. Other possible implementation features may include providing a compensation guideline including a monetary fee or other consideration for the collective replacement (block 3238), and identifying a group of related content elements that are designated for entire group replacement only (block 3242).

FIG. 72 also illustrates additional possible process features that include providing applicable alteration guidelines for collective replacement of a group of one or more of the following type of related content elements: brand, trademark, service mark, copyrighted work, name, company name, identity, symbol, commercial symbol, icon, logotype, trade logo, trade dress, packaging, label, emblem, insignia, acronym, abbreviation, certification, MPAA rating, ESRB rating, proprietary rating, government rating, slogan, jingle, animation, animated character, copyrighted item, and personage (block 3241).

Referring to exemplary embodiment features 3245 of FIG. 73, previously described process features 3204, 3206, 3208 are illustrated along with a possibility of providing recognition for one or more of the following type of sponsorship credits associated with the collective replacement: monetary contribution, monetary support, product donation, and service donation (block 3246). Other possible features are illustrated including providing applicable alteration guidelines for collective replacement of a group of one or more of the following type of related content elements: livery, color scheme, dress, fabric, jewelry, pattern, design, sculpture, artistic work, musical work, composition, publication, document, event, exhibit, performance, person, animal, mascot, character, obscured attribute, highlighted attribute, and avatar (block 3247).

Additional possibilities may include providing applicable alteration guidelines for collective replacement of a group of one or more of the following type of related content elements: product, service, invention, accessory, vehicle, place, address, location, store, building, school, university, hospital, church, club, group, organization, and business (block 3248). Further exemplary enhancements may provide applicable alteration guidelines for collective replacement of a group of one or more of the following type of related content elements: textual, verbal, audio, musical, visual, image, live action, reenactment, simulation, and animation (block 3249).

Referring to FIG. 74, a further combination of exemplary process features 3250 may include previously described operations 3204, 3206, 3208 along with providing applicable alteration guidelines for collective replacement of a group of one or more of the following type of related content elements: music, setting, hero, heroine, villain, clothing, vehicle, company, animal, food, product, brand, and dialogue (block 3252). Anther possibility may include providing applicable alteration guidelines for collective replacement of a group of one or more related content elements associated with a real-world person (block 3253).

FIG. 74 also depicts additional enhancements including providing applicable alteration guidelines for collective replacement of a group of one or more of the following type of related content elements associated with the real-world person: name, face, personal characteristics, identity, residence, title, achievement, occupation, career, role, activity, hobby, rank, medal, badge, award, identification features, biometric attribute, photographic image, voice recording, accent, dialect, recognizable personality trait, gesture, demeanor, mannerism, appearance, clothing, hairstyle, tattoo, accessory, jewelry, piercing, avatar, setting, item possession, and property ownership (block 3254).

An exemplary computer program product embodiment 3260 in FIG. 75 may include one or more computer programs with instructions encoded on signal-bearing media to execute a process (block 3262), including identifying a group of related content elements in a composite media work, wherein the related content elements are feasible for alteration and form a constituent portion of the composite media work (block 3263). Additional exemplary programmed process features may include maintaining a data record of applicable alteration guidelines for collective replacement of the group of related content elements in a derivative version of the composite media work, and making the applicable alteration guidelines accessible to an interested party (block 3265).

Further illustrated features may include signal-bearing storage media for encoding the instructions to execute the process ((block 3266) and signal-bearing communication media for encoding the instructions to execute the process (block 3268).

It will be understood from the drawings and descriptions herein that many possible operational benefits may be obtained with programmed process instructions. For example, some computerized components and programmed applications may provide for maintaining applicable alteration guidelines regarding collective replacement of one or more of the following type of related content elements: related set of designated aspects, related set of designated components, identical objects, same object in different scenes, and same object in different settings. Other programmed features may include maintaining applicable alteration guidelines regarding collective replacement of one or more of the following type of related content elements: textual, verbal, visual, image, audio, musical, live action, reenactment, simulation, and animation.

A further programmed process may include maintaining applicable alteration guidelines regarding collective replacement of one or more of the following type of related content elements: brand, trademark, service mark, copyrighted work, name, company name, identity, symbol, commercial symbol, icon, logotype, trade logo, trade dress, packaging, label, emblem, insignia, acronym, abbreviation, certification, MPAA rating, ESRB rating, proprietary rating, government rating, slogan, jingle, animation, animated character, copyrighted item, and personage.

It will be understood that programmed process instructions may be implemented for collective replacement (e.g., addition, deletion, modification, replacement, etc.) of various groups of related alterable component elements and designated aspects of a composite media work (e.g., derivative versions thereof), and the exemplary recitation of such a group of related content elements suitable for programmed processing is not intended to be limiting but may be varied depending on the circumstances. In some instances such a group of related content elements may be associated with a real-world venture (e.g., real-world entity, real-world person, etc.), and may be incorporated in a constituent portion of a derivative version to publicize or promote a topic related to the real-world venture.

The exemplary system, apparatus, and computer program product embodiments disclosed herein including FIGS. 1-2, FIGS. 12-13, FIGS. 16-26, FIGS. 34-35, FIGS. 43-44, FIGS. 55-56, FIGS. 67-68 and FIG. 75 along with other components, devices, know-how, skill and techniques known in the art have the capability of implementing and practicing the methods and processes shown in FIGS. 3-11, FIGS. 14-15, FIGS. 27-33, FIGS. 36-42, FIGS. 45-54, FIGS. 57-66 and FIGS. 69-74. However it is to be further understood by those skilled in the art that other systems, apparatus and technology may be used to implement and practice such methods and processes.

As disclosed herein, an exemplary classification method and system for possible content alteration of a media work may include criteria regarding content that is feasible for alteration. Such criteria may be maintained in records that are accessible to an interested party. Some embodiments may include a record of primary authorization rights applicable to a possible content alteration. A further embodiment feature may include a record of secondary authorization rights applicable to substitute altered content incorporated in a derivative version. Some embodiment implementations may include a derivative version of the media work wherein substitute content, such as an alterable component element having one or more designated aspects, is associated with a real-world entity or person. Various techniques may be used to incorporate substitute altered content in a derivative version of the media work in accordance with applicable substitution guidelines, and the examples disclosed herein are not intended to be limiting.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that any disjunctive word and/or phrase presenting two or more alternative terms, whether in the description, claims, or drawings, should be understood to contemplate the possibilities of including one of the terms, either of the terms, or both terms.

For example, the phrase "A or B" will be understood to include the possibilities of "A" or "B" or "A and B."

As a further definition of "open" terms in the present specification and claims, it will be understood that usage of a language construction "A or B" is generally interpreted as a non-exclusive "open term" meaning: A alone, B alone, A and B together.

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interactable and/or logically interacting components.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A processor-executable method of media content substitution comprising:
    identifying a group of related content elements in a composite media work, wherein the related content elements are feasible for alteration and form a constituent portion of the composite media work;
    providing applicable alteration guidelines for collective replacement of the group of related content elements in a derivative version of the composite media work, wherein said providing applicable alteration guidelines for collective replacement includes:
        providing a quality control provision regarding specified altered content designated for collective replacement in the derivative version; and
        providing a geographic distribution limitation regarding the derivative version that incorporates the specified altered content designated for the collective replacement.

2. The method of claim 1 wherein said identifying a group of related content elements includes:
    identifying a group of one or more of the following type of related content elements: related set of designated aspects, related set of designated components, identical objects, same object in different scenes, and same object in different settings.

3. The method of claim 1 wherein said identifying a group of related content elements includes:
    identifying a group of one or more of the following type of related content elements: textual, verbal, audio, musical, visual image, live action, reenactment, simulation, and animation.

4. The method of claim 1 wherein said identifying the group of related content elements includes:
    identifying a group of related audio content elements in the composite media work.

5. The method of claim 1 wherein said identifying the group of related content elements includes:
    identifying a group of related video content elements in the composite media work.

6. The method of claim 1 wherein said identifying the group of related content elements includes:
    identifying a group of related audiovisual content elements in the composite media work.

7. The method of claim 1 wherein said identifying the group of related content elements includes:
    identifying a group of related content elements that include a brand or symbol or logo or company name or trademark or service mark.

8. The method of claim 1 wherein said identifying the group of related content elements includes:
    identifying a group of related content elements that include a depiction or representation of a real-world entity.

9. The method of claim 1 wherein said identifying the group of related content elements includes:
    identifying a group of related content elements that include a depiction or representation of a real-world person.

10. The method of claim 1 wherein said identifying the group of related content elements includes:
    identifying a group of related content elements that include a depiction or representation of a real-world product.

11. The method of claim 1 wherein said providing applicable alteration guidelines for collective replacement includes:
    providing a quantitative viewing or quantitative distribution copy limitation regarding the derivative version that incorporates the specified altered content designated for the collective replacement.

12. The method of claim 1 wherein said providing applicable alteration guidelines for collective replacement includes:
    providing a temporal viewing or temporal distribution limitation regarding the derivative version that incorporates the specified altered content designated for the collective replacement.

13. The method of claim 1 wherein said providing applicable alteration guidelines for collective replacement includes:
    providing a targeted recipient audience limitation regarding the derivative version that incorporates the specified altered content designated for the collective replacement.

14. The method of claim 1 wherein said providing applicable alteration guidelines for collective replacement includes:
    providing a targeted recipient device limitation regarding the derivative version that incorporates the specified altered content designated for the collective replacement.

15. The method of claim 1 wherein said providing applicable alteration guidelines for collective replacement includes:
    providing a compensation guideline including a monetary fee or other consideration for the collective replacement.

16. The method of claim 1 wherein said providing applicable alteration guidelines for collective replacement includes:
    providing recognition for one or more of the following type of sponsorship credits associated with the collective replacement: monetary contribution, monetary support, product donation, and service donation.

17. The method of claim 1 wherein said providing applicable alteration guidelines for collective replacement includes:

identifying a group of related content elements that are designated for entire group replacement only.

18. The method of claim 1 wherein said providing applicable alteration guidelines for collective replacement includes:

providing applicable alteration guidelines for collective replacement of a group of one or more of the following type of related content elements: brand, trademark, service mark, copyrighted work, name, company name, identity, symbol, commercial symbol, icon, logotype, trade logo, trade dress, packaging, label, emblem, insignia, acronym, abbreviation, certification, MPAA rating, ESRB rating, proprietary rating, government rating, slogan, jingle, animation, animated character, copyrighted item, and personage.

19. The method of claim 1 wherein said providing applicable alteration guidelines for collective replacement includes:

providing applicable alteration guidelines for collective replacement of a group of one or more of the following type of related content elements: livery, color scheme, dress, fabric, jewelry, pattern, design, sculpture, artistic work, musical work, composition, publication, document, event, exhibit, performance, person, animal, mascot, character, obscured attribute, highlighted attribute, and avatar.

20. The method of claim 1 wherein said providing applicable alteration guidelines for collective replacement includes:

providing applicable alteration guidelines for collective replacement of a group of one or more of the following type of related content elements: product, service, invention, accessory, vehicle, place, address, location, store, building, school, university, hospital, church, club, group, organization, and business.

21. The method of claim 1 wherein said providing applicable alteration guidelines for collective replacement includes:

providing applicable alteration guidelines for collective replacement of a group of one or more of the following type of related content elements associated with the real-world person: name, face, personal characteristics, identity, residence, title, achievement, occupation, career, role, activity, hobby, rank, medal, badge, award, identification features, biometric attribute, photographic image, voice recording, accent, dialect, recognizable personality trait, gesture, demeanor, mannerism, appearance, clothing, hairstyle, tattoo, accessory, jewelry, piercing, avatar, setting, item possession, and property ownership.

22. The method of claim 1 wherein said providing applicable alteration guidelines for collective replacement includes:

providing applicable alteration guidelines for collective replacement of a group of one or more of the following type of related content elements: textual, verbal, audio, musical, visual, image, live action, reenactment, simulation, and animation.

23. The method of claim 1 wherein said providing applicable alteration guidelines for collective replacement includes:

providing applicable alteration guidelines for collective replacement of a group of one or more of the following type of related content elements: music, setting, hero, heroine, villain, clothing, vehicle, company, animal, food, product, brand, and dialogue.

24. The method of claim 1 wherein said providing applicable alteration guidelines for collective replacement includes:

providing applicable alteration guidelines for collective replacement of a group of one or more related content elements associated with a real-world entity.

25. The method of claim 1 wherein said providing applicable alteration guidelines for collective replacement includes:

providing applicable alteration guidelines for collective replacement of a group of one or more related content elements associated with a real-world person.

26. A system for content alteration of a media work, comprising:

a composite media work having a group of related component elements that are feasible for alteration and are included in a constituent portion of the composite media work;

a data record of applicable alteration guidelines regarding collective replacement of the group of related component elements by an addition or deletion or modification or replacement in a proposed derivative version including a quality control provision regarding specified altered content designated for the collective replacement in the proposed derivative version, wherein the data record of applicable alteration guidelines includes:

a targeted recipient audience limitation regarding the proposed derivative version that incorporates the specified altered content designated for the collective replacement; and a targeted recipient device limitation regarding the derivative version that incorporates the specified altered content designated for the collective replacement; and computerized apparatus operably coupled to the data record and to the composite media work; and an access interface linked to the computerized apparatus.

27. The system of claim 26 wherein said composite media work includes one or more of the following categories of related component elements: related set of designated aspects, related set of alterable components, identical objects, same object in different scenes, and same object in different settings.

28. The system of claim 26 wherein said composite media work includes a group of one or more of the following type of related component elements associated with a real-world entity: brand, trademark, service mark, copyrighted work, name, company name, identity, symbol, commercial symbol, icon, logotype, trade logo, trade dress, packaging, label, emblem, insignia, acronym, abbreviation, certification, MPAA rating, ESRB rating, proprietary rating, government rating, slogan, jingle, animation, animated character, copyrighted item, and personage.

29. The system of claim 26 wherein said composite media work includes a group of one or more of the following type of related component elements associated with a real-world entity: livery, color scheme, dress, fabric, jewelry, pattern, design, sculpture, artistic work, musical work, composition, publication, document, event, exhibit, performance, person, animal, mascot, character, obscured attribute, highlighted attribute, and avatar.

30. The system of claim 26 wherein said composite media work includes a group of one or more of the following type of related component elements associated with a real-world person: name, face, personal characteristics, identity, residence, title, achievement, occupation, career, role, activity, hobby, rank, medal, badge, award, identification features, biometric attribute, photographic image, voice recording, accent, dialect, recognizable personality trait, gesture, demeanor, mannerism, appearance, clothing, hairstyle, tattoo, accessory, jewelry, piercing, avatar, setting, item possession, and property ownership.

31. The system of claim 26 wherein said data record includes applicable alteration criteria regarding a limitation allowing or precluding one or more of the following distribution channels for the proposed derivative version: Internet, network, cable, satellite, wireless, broadcast, narrowcast, download, upload, shared, concurrent, streaming audio, streaming video, packet switching, and storage media delivery.

32. A computer program product comprising one or more computer programs including instructions that, when executed by one or more processors, execute the following process:
identifying a group of related content elements in a composite media work, wherein the related content elements are feasible for alteration and form a constituent portion of the composite media work;
maintaining a data record of applicable alteration guidelines for collective replacement of the group of related content elements in a derivative version of the composite media work, the data record including a quality control provision regarding specified altered content designated for collective replacement in the derivative version, the maintaining applicable alteration guidelines regarding collective replacement of one or more of the following type of related content elements: livery, color scheme, dress, fabric, jewelry, pattern, design, sculpture, artistic work, musical work, composition, publication, document, event, exhibit, performance, person, animal, mascot, character, obscured attribute, highlighted attribute, and avatar, and the maintaining applicable alteration guidelines regarding collective replacement of one or more of the following type of related content elements associated with a real-world person: name, face, personal characteristics, identity, residence, title, achievement, occupation, career, role, activity, hobby, rank, medal, badge, award, identification features, biometric attribute, photographic image, voice recording, accent, dialect, recognizable personality trait, gesture, demeanor, mannerism, appearance, clothing, hairstyle, tattoo, accessory, jewelry, piercing, avatar, setting, item possession, and property ownership; and
making the applicable alteration guidelines accessible to an interested party.

33. The computer program product of claim 32 further comprising:
signal-bearing storage media for encoding the instructions to execute the process.

34. The computer program product of claim 32 further comprising:
signal-bearing communication media for encoding the instructions to execute the process.

35. The computer program product of claim 32, wherein said process feature maintaining the data record includes:
maintaining applicable alteration guidelines regarding a derivative version targeted for one or more of the following: geographic area, demographic category, ethnic group, restricted audience, specified devices, group membership, subscriber, distribution channel, distribution time period, and media provider.

36. The computer program product of claim 32, wherein said process feature maintaining the data record includes:
maintaining applicable alteration guidelines regarding collective replacement of one or more of the following type of related content elements: related set of designated aspects, related set of designated components, identical objects, same object in different scenes, and same object in different settings.

37. The computer program product of claim 32, wherein said process feature maintaining the data record includes:
maintaining applicable alteration guidelines regarding collective replacement of one or more of the following type of related content elements: textual, verbal, visual, image, audio, musical, live action, reenactment, simulation, and animation.

38. The computer program product of claim 32, wherein said process feature maintaining the data record includes:
maintaining applicable alteration guidelines regarding collective replacement of one or more of the following type of related content elements: brand, trademark, service mark, copyrighted work, name, company name, identity, symbol, commercial symbol, icon, logotype, trade logo, trade dress, packaging, label, emblem, insignia, acronym, abbreviation, certification, MPAA rating, ESRB rating, proprietary rating, government rating, slogan, jingle, animation, animated character, copyrighted item, and personage.

39. The computer program product of claim 32, wherein said process feature maintaining the data record includes:
maintaining applicable alteration guidelines regarding collective replacement of one or more of the following type of related content elements associated with a real-world entity: product, service, invention, accessory, vehicle, place, address, location, store, building, school, university, hospital, church, club, group, organization, and business.

* * * * *